United States Patent
Voss

(10) Patent No.: US 7,350,787 B2
(45) Date of Patent: Apr. 1, 2008

(54) VEHICLES AND METHODS USING CENTER OF GRAVITY AND MASS SHIFT CONTROL SYSTEM

(76) Inventor: Darrell W. Voss, 1409 Broadway, Vancouver, WA (US) 98663

( * ) Notice: Subject to any disclaimer, the term of this patent is extended or adjusted under 35 U.S.C. 154(b) by 0 days.

(21) Appl. No.: 10/113,931

(22) Filed: Apr. 2, 2002

(65) Prior Publication Data
US 2002/0180166 A1 Dec. 5, 2002

Related U.S. Application Data

(60) Provisional application No. 60/280,851, filed on Apr. 3, 2001.

(51) Int. Cl.
*B60G 17/00* (2006.01)
(52) U.S. Cl. .................... 280/5.5; 180/218; 280/281.1; 280/283.1
(58) Field of Classification Search ............... 280/5.5, 280/5.507, 281.1, 283, 288.4; 180/218
See application file for complete search history.

(56) References Cited

U.S. PATENT DOCUMENTS

| | | | |
|---|---|---|---|
| 2,176,397 A * | 10/1939 | Flanders et al. ............... 280/16 |
| 4,881,750 A | 11/1989 | Hartmann ...................... 280/276 |
| 5,217,246 A | 6/1993 | Williams et al. ............. 280/707 |
| 5,445,401 A | 8/1995 | Bradbury ...................... 280/276 |
| 5,456,480 A | 10/1995 | Turner et al. ................ 280/276 |
| 5,509,677 A | 4/1996 | Bradbury ...................... 280/276 |
| 5,580,075 A | 12/1996 | Turner et al. ................ 280/276 |
| 5,911,768 A | 6/1999 | Sasaki .......................... 701/38 |
| 5,971,091 A * | 10/1999 | Kamen et al. ............... 180/218 |
| 5,975,225 A | 11/1999 | Kamen et al. ............... 180/7.1 |
| 6,026,939 A | 2/2000 | Girvin et al. ............. 188/266.7 |
| 6,149,174 A | 11/2000 | Bohn .......................... 280/283 |
| 6,311,794 B1 * | 11/2001 | Morrell et al. ............... 180/8.3 |
| 6,367,817 B1 * | 4/2002 | Kamen et al. ........... 280/5.507 |
| 6,896,276 B1 * | 5/2005 | Sparrow ..................... 280/276 |

OTHER PUBLICATIONS

Vos et al, "Dynamics and Non-Linear Adaptive Control of an Autonomous Unicycle: Theory and Experiment", American Institute of Aeronautics and Astronautics Dept., pp. 182-187.
Koyanagi et al "A Wheeled Inverse Pendulum Type Self Contained mobile Robot and Its Two Dimensional Trajectory Control", Proceedings of the Second International Symposium on Measurement and Control in Robotics, Japan (1992), pp. 891-898.
1998 Noleen Cross-Link Owner's Manual—PDF.

* cited by examiner

*Primary Examiner*—Eric Culbreth
(74) *Attorney, Agent, or Firm*—Jim Zegeer

(57) ABSTRACT

A center of gravity (C/G) control system for a vehicle includes sensors to measure the center of gravity shift and mass shift of the human body in relation to the vehicle, a controller to determine outputs, a dynamically adjustable vehicle system, and a power supply. The sensor measures the direction and rate of shift of the center of gravity and mass shift of the human and creates a representative input signal. The controller determines the appropriate outputs in response to the relative center of gravity shift data received. The dynamically adjustable vehicle system receives the controller output and performs the expected action.

5 Claims, 101 Drawing Sheets

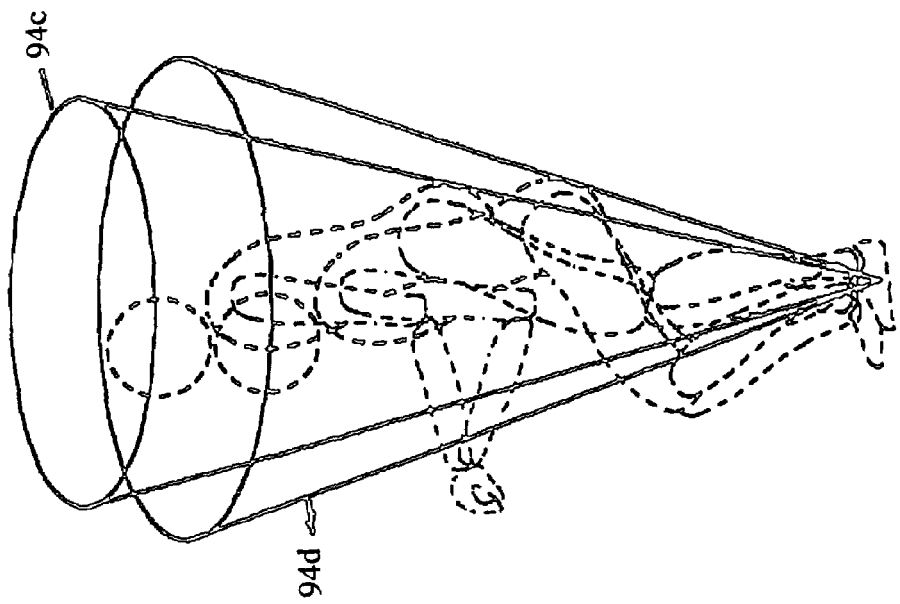
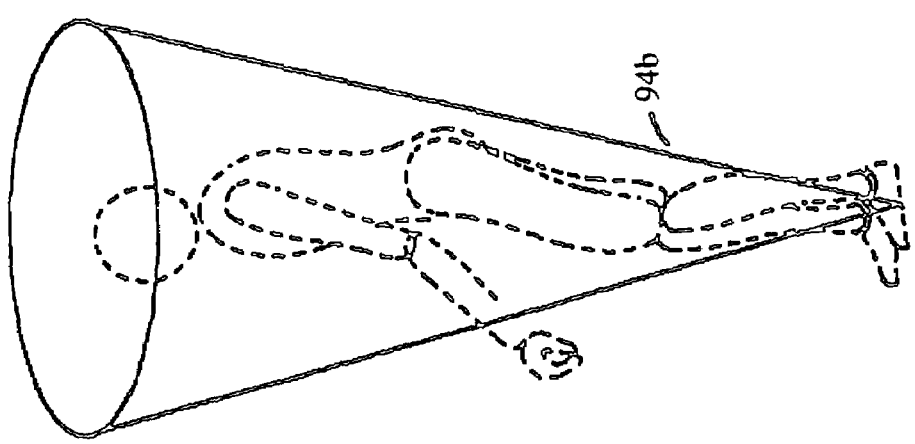
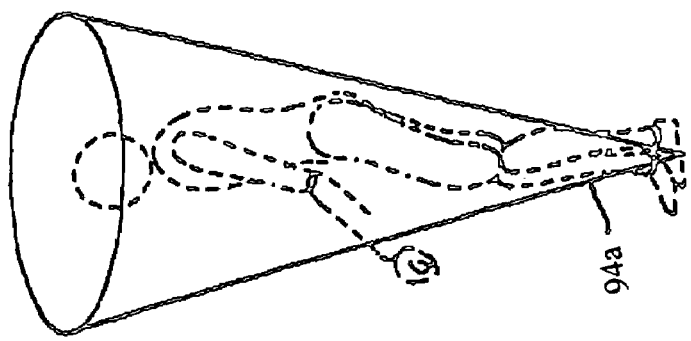
FIG. 94

VEHICLES AND METHODS USING CENTER OF GRAVITY AND MASS SHIFT CONTROL SYSTEM

REFERENCE TO RELATED APPLICATION

The present application is the subject of provisional application Ser. No. 60/280,851 filed Apr. 3, 2001 entitled SUSPENSION SYSTEM FOR VEHICLES FOR TRANSPORTING A HUMAN BODY, for which priority is claimed.

BACKGROUND OF THE INVENTION

1. Field of the Invention

This invention relates to vehicles, specifically to improve passenger/payload positioning by using a center of gravity and mass shift control system.

2. Description of the Prior Art

Prior art has focused on the effect the regular and irregular surfaces of the ground has on the vehicle and thus to the passenger through the vehicle to passenger contact points. Prior art focuses on adjusting the vehicle system's alignment to the ground to reduce abrupt changes in position of the vehicle to passenger contact points. Prior art does not attempt to directly control the passenger center of gravity or mass except by indirect methods.

Prior art consists of automotive, motorcycle, bicycle and the like, designs that react after contacting an irregular surface in the vehicle path by releasing stored energy in suspension systems. Examples are the bicycle suspension systems disclosed in U.S. Pat. No. 4,881,750 to Hartmann, U.S. Pat. Nos. 5,445,401 and 5,509,677 to Bradbury, U.S. Pat. Nos. 5,456,480 and 5,580,075 to Turner, et al. The prior suspension systems during use are preset and not adjustable so these are passive or static suspension systems. The suspension may be too harsh or too soft for the surface conditions.

Prior art consists of automobile and bicycle suspension designs that react to the contact of an irregular surface and are controlled by measuring the rate of travel or the distance traveled by the device itself. Examples are the front bicycle suspension shocks that operate valves based on the speed of the shock piston shaft as disclosed in U.S. Pat. No. 6,026,939 to Girvin and Jones, as disclosed in U.S. Pat. No. 6,149,174 to Bohn, and automobile wheel suspension that is stiffened under increased loads from cornering as disclosed in U.S. Pat. No. 5,217,246 to Williams, et al. The above-cited systems are semi-active systems limited to the switching between two positions of hard and soft.

Prior art also includes designs that measure movement and timing of the suspension device after contacting an irregular surface then calculate the reaction with a preprogrammed controller that is limited in scope and without user input. One example of this system is disclosed in U.S. Pat. No. 5,911,768 to Sasaki. The above cited system is an active system and yet still limited by the preprogrammed controller.

Prior art also includes designs that measure movement of the C/G of the passenger/payload balanced above and rotated around a single axle restricting the C/G movement to a limited arc along one lateral plane as cited in U.S. Pat. No. 5,975,225 to Kamen, et al., as cited by the papers by Voss et al., "Dynamics and Nonlinear Adaptive Control of an Autonomous Unicycle—Theory and Experiment", American Institute of Aeronautics and Astronautics, A90-26772 10-39, Washington, D.C. (1990), pp. 487-494 (Abstract only) and Koyanagi et al. "A Wheeled Inverse Pendulum Type Self-Contained Mobile Robot and its Two Dimensional Trajectory Control", Proceeding of the Second International Symposium on Measurement and Control in Robotics, Japan (1992), pp. 891-898.

Prior art of the suspension systems disclosed earlier are based on the relationship of the contact points between the vehicle and the ground. The vehicle contact points to the passenger/payload are measured last or ignored all together. The range of motion of the C/G shifting in relationship to the constraints of the vehicle's passenger contact points has not been considered. Prior art control systems disclosed earlier focused on the measurement of the distance traveled or the rate of speed of the suspension devices themselves. The ride characteristics encountered by the center of gravity and mass shift of the passenger is two systems or linkages away from the attempted control points.

Prior art control systems disclosed earlier that appear to use center of gravity and mass shift measurements for control are actually measuring the pitch (lateral movement in one plane x) of a plate or body mounted above a single axle. The theoretical center of gravity is a gross approximation using this method. The inverse pendulum balancing method does work to place the center of gravity y-axis plane over the axle by moving the vehicle forward or back in a continuous recovery from a falling state. The C/G and mass elevation position in the Z-plane is disregarded and yet the height of the actual center of mass above the axle has a great influence on the effectiveness of the drive and balancing system. The single axle, single pendulum control method also has a weakness when encountering irregular surfaces that are soft or severely irregular. Power is applied through the wheels to continually adjust the location of the axle under the center of gravity. The reactive control has difficulty in keeping a constant power balance when a vehicle wheel has lost traction. An interactive center of gravity and mass shift control system that incorporated the measurement of the position of the center of gravity and mass in multiple planes would help prevent the over rotation of the center of gravity y plane at increased speeds.

Prior art active suspension systems based on ground induced input systems are not active in relationship to the actual rider position. All the prior active systems have focused on measuring the velocity or stroke (travel delta) of the suspension and then creating an output signal. The inputs have been velocity or travel measuring devices to a control circuit that outputs back to the original suspension devices. The advantage of the center of gravity and mass shift control system controlling a dynamically attached suspension system is the active relationship to the rider position.

SUMMARY OF THE INVENTION

The present invention provides a control system for improving the ride characteristics for a vehicle transporting a human body and or payload by:

(a) obtaining from a set of sensor means, a signal to denote the position of the center of gravity and mass shift of the human body;

(b) determining from the set of relative center of gravity inputs a set of estimated absolute center of gravity and mass shift values in relation to the vehicle;

(c) deriving an output control signal from the said set of center of gravity and mass shift values; and (d) applying the output control signal to a vehicle system effecting a ride characteristic.

The sensor means actively measures the center of gravity and mass shift of the human body in relation to the vehicle wherein the set of center of gravity and mass shift signals will be input into the control system to comprise estimated values for output signals:

(a) sensors determine direction of the center of gravity and mass shift and the rate of shift.
(b) sensors may be located on the human body in the same manner as a wristwatch, on the vehicle, or on a system external to the vehicle.
(c) sensors may be of different forms including accelerometers, strain gauges, gyroscopes (single and multi-axis), inclinometers, capacitive extensiometers, load cells, pressure gauges, rotational gages, positional gages, magnetic devices, optical, laser, sonar, ultrasonic, infrared (IR), velocity, light emitting diodes (LED), Hall's Effect sensors, vibration gages, temperature gauges, transducers, user input switches, preprogrammed computer programs, voice, satellite Global Positioning System, and the like (wired or wireless sensor systems included).

The present invention enables the use of a control system using an electronic control module that has the ability to be preprogrammed, reprogrammed, adjusted during use, have multiple programs installed, have programs upgraded as human skills increase, have a learn mode, an interactive mode with other electronic control modules, and have an indeterminate number of variables available for user selection.

The present invention will be able to attain an interactive process through the control system electronic controller module to:

(a) allow pre-programmed input data,
(b) allow adjusting to interactive data during use,
(c) allow for external variables to be considered during operation of the device,
(d) establish parameters that can be modified while in use,
(e) create parameters based on changing weather,
(f) preset parameters for travel or speed limits
(g) create parameters biased for safety based on ability level of user
(h) monitor parameters that can activate a warning light or other safety systems.

The invention control system allows the human center of gravity and mass shift values to control vehicle systems over irregular surfaces.

These and other advantages are achieved by this invention in a vehicle shifting control system by obtaining from sensors mounted on the vehicle to sense center of gravity and mass shift of the human body even during vehicular use over level regular surfaces. A set of relative center of gravity and mass shift signals based on the determined change in the center of gravity and mass shift of a standing or sprinting human body can produce signals to lock out a suspension device or lock in a shifting device to eliminate inadvertent shifts.

These and other advantages are achieved by this invention in a vehicle braking system by (a) obtaining from sensors, mounted on the vehicle to sense the center of gravity and mass shift of the human body a set of relative center of gravity and mass signals; (b) determine from the set of relative signals a set of estimated absolute body center of gravity and mass; and (c) control a brake system responsive to the determined set of estimated body center of gravity and mass position signals.

These and other advantages are achieved by this invention in a vehicle adjustable geometry system by (a) obtaining from sensors, mounted the vehicle to sense the center of gravity and mass shift of the human body a set of relative center of gravity and mass signals; (b) determine from the set of relative signals a set of estimated absolute body center of gravity and mass; and (c) control an adjustable vehicle geometry system responsive to the determined set of estimated body center of gravity and mass position signals.

These and other advantages are achieved by this invention in a vehicle power system by (a) obtaining from sensors, mounted on the vehicle to sense the center of gravity and mass shift of the human body a set of relative center of gravity and mass signals; (b) determine from the set of relative signals a set of estimated absolute body center of gravity and mass; and (c) control an adjustable power system responsive to the determined set of estimated body center of gravity and mass position signals.

These and other advantages are achieved by this invention in a safety system by (a) obtaining from sensors, mounted on the vehicle to sense the center of gravity and mass shift of the human body a set of relative center of gravity and mass signals; (b) determine from the set of relative signals a set of estimated absolute body center of gravity and mass; and (c) control a safety system responsive to the determined set of estimated body center of gravity and mass position signals. The above safety system can include warning lights, warning siren, external lights, anti-lock brake circuit, external cornering wheels, and the like.

These and other advantages are achieved by this invention in a steering control system by (a) obtaining from sensors, mounted on the vehicle to sense the center of gravity and mass shift of the human body a set of relative center of gravity and mass signals; (b) determine from the set of relative signals a set of estimated absolute body center of gravity and mass; and (c) control a steering control system responsive to the determined set of estimated body center of gravity and mass position signals.

These and other advantages are achieved by this invention in a data acquisition system by (a) obtaining from sensors, mounted on the vehicle to sense the center of gravity and mass shift of the human body a set of relative center of gravity and mass signals; (b) determine from the set of relative signals a set of estimated absolute body center of gravity and mass; and (c) control a data acquisition system responsive to the determined set of estimated body center of gravity and mass position signals. The data acquisition system can be used to develop virtual reality game data, interactivity with group of other units on stationary exercise equipment, inputs from professional riders for training evaluations, inputs from professional riders for downloading to interactive personal computer programs, and amusement or destination vehicle park interactive packages.

The advantages of the center of gravity (C/G) control systems is to use the C/G and mass shift to control the vehicle systems, regardless of the limitations of the contact points to the vehicle, or the vehicle to ground contact points. Example: C/G and mass shift of passenger/payload is monitored, passenger has a free range of motion within the constraints of the contact points to the vehicle, and the vehicle has contact points to a regular or irregular surface. A control system based on the C/G and mass shift sends outputs to one or more of the vehicle systems. The C/G and mass shift control system is an interactive system. The passenger is able to input variable data into the base control program (BCP). A C/G and mass shift sensor on the vehicle can input data into the BCP. A C/G and mass shift sensor located off the vehicle can input data into the BCP via telemetry or infrared wireless systems.

The advantage of the center of gravity and mass control system is the ability to adapt formulas based on Human/

Payload to Vehicle Mass ratios, center of gravity and mass shifts, and their effects as rate, and vector. The center of gravity and mass formulas can also be influenced by inputs from a human pertaining to: weight of human body, height of human body, shape of human body, pedal cadence parameter, riding position parameter, style of riding parameters, terrain parameters, speed parameters, power output parameters, input from cycle computer, input from heart monitor, bike geometry parameters, brake system parameters, drive system parameters, and the like.

An additional advantage of the control system is the ability for the system to be used with current devices and interactive devices co-operatively. The active control is able to take in combinations of human inputs and reactive devices, interlocked or independent. The system will allow adaptability to current vehicles as add-on and upgradeable devices.

Additional advantages of the control system will be the ease of adaptability for use with existing vehicular control systems and devices including but not limited to manual suspension lockout systems, automatic drive indexing systems, current bicycle and motorcycle frame geometries with and without rear pivots, and other available existing control systems. The advantages of using the INTERACTIVE human center of gravity and mass shift controls are that terrain is not required to be the initiator of the vehicle's dynamic systems.

BRIEF DESCRIPTION OF THE DRAWINGS

The above and other objects, advantages and features of the invention will become more clear when considered with the following specification and accompanying drawings wherein:

FIG. 94 is a C/G shift description and people representation.

DETAILED DESCRIPTION OF THE INVENTION

Figure 1:
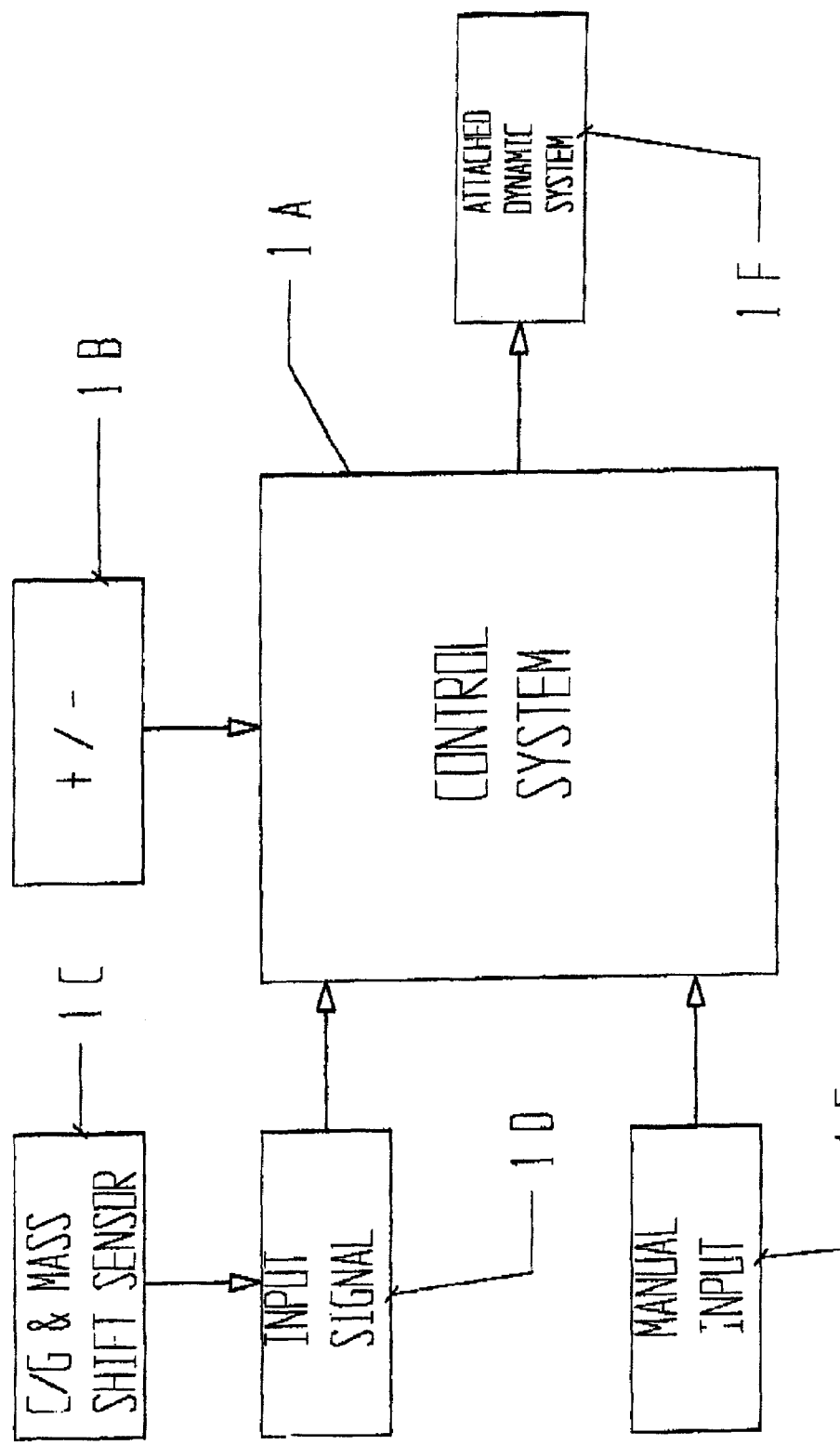
FIG. 1 is a diagrammatic representation of a center of gravity and mass shift control system apparatus, which can function as a two wheeled personal vehicle front suspension.

FIG. 1 is a diagrammatic representation of a center of gravity shift and mass shift control system apparatus, which can function as a control system for a two wheeled personal vehicle front suspension. Control system 1a receives input signal 1D from C/G shift sensor device 1c. Control system 1a processes the input signal 1d and provides an output signal to an attached dynamic system 1f of a vehicle. The control system 1A has a power supply 1B. A manual input device 1e sends data for modification of control parameters incorporated in control system 1a.

Figure 2:
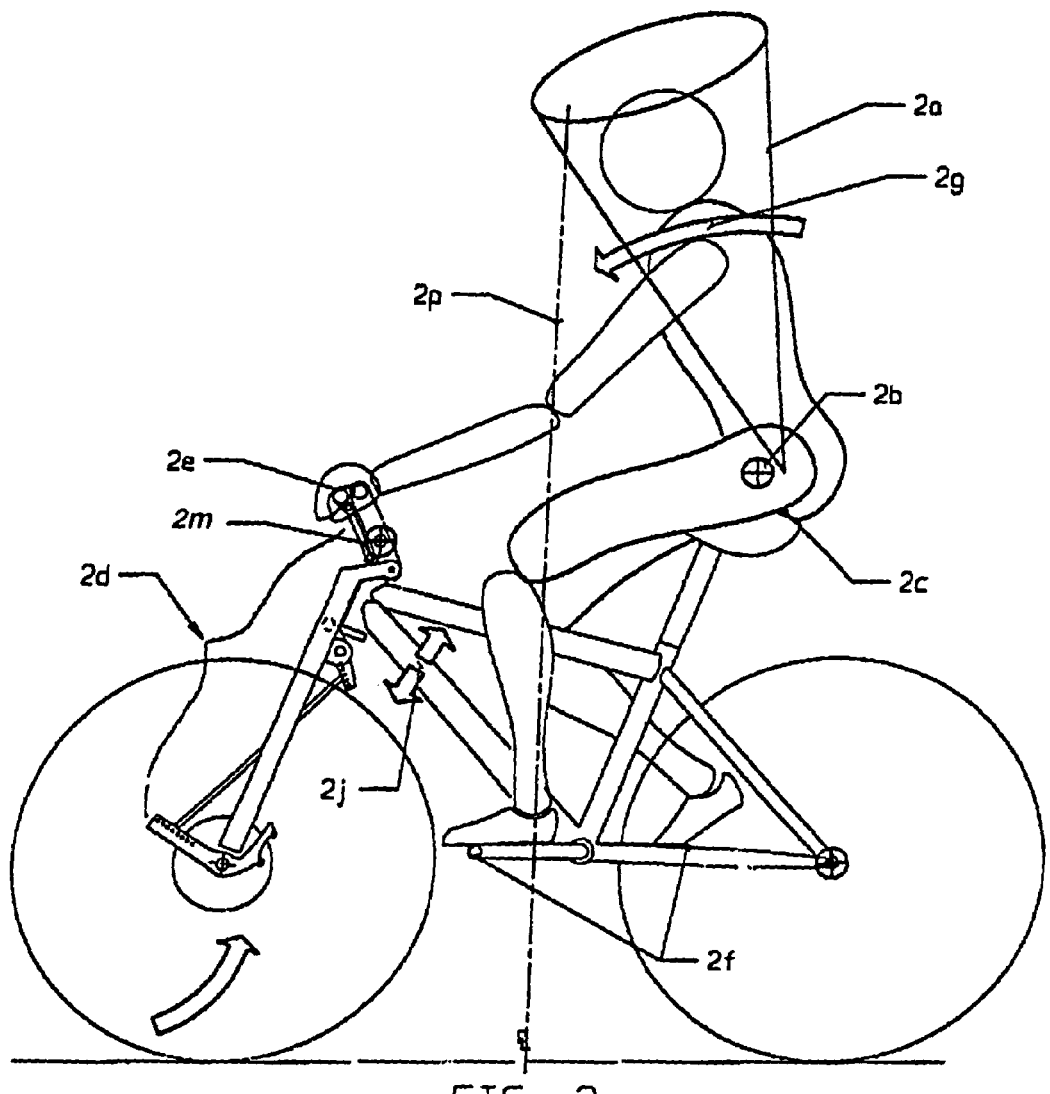
FIG. 2 is a side view of one embodiment of the invention on a bicycle.

FIG. 2 is a side view of a C/G and mass shift control system apparatus as described in FIG. 1 installed on a bicycle with an attached dynamic front suspension assembly 2d. The control system 2m senses the movement of C/G and mass shifts in the conical representation area of 2a. The Center of wheelbase of the vehicle is represented by line 2p. Human contact points to the vehicle are defined as seat contact location 2c, foot contact location 2f, and hand contact location 2e. The representation of the pivot point of a human seated 2b is the focal point of the human range of motion in the 'x' plane (forward and back) and the focal point for the conical range of motion for all other planes. The suspension movement 2j is the reaction of the vehicle when the front suspension assembly means 2d is active. The C/G shift and mass shift vector 2g is represented by force vector arrow 2g.

Figures 3A, 3B:
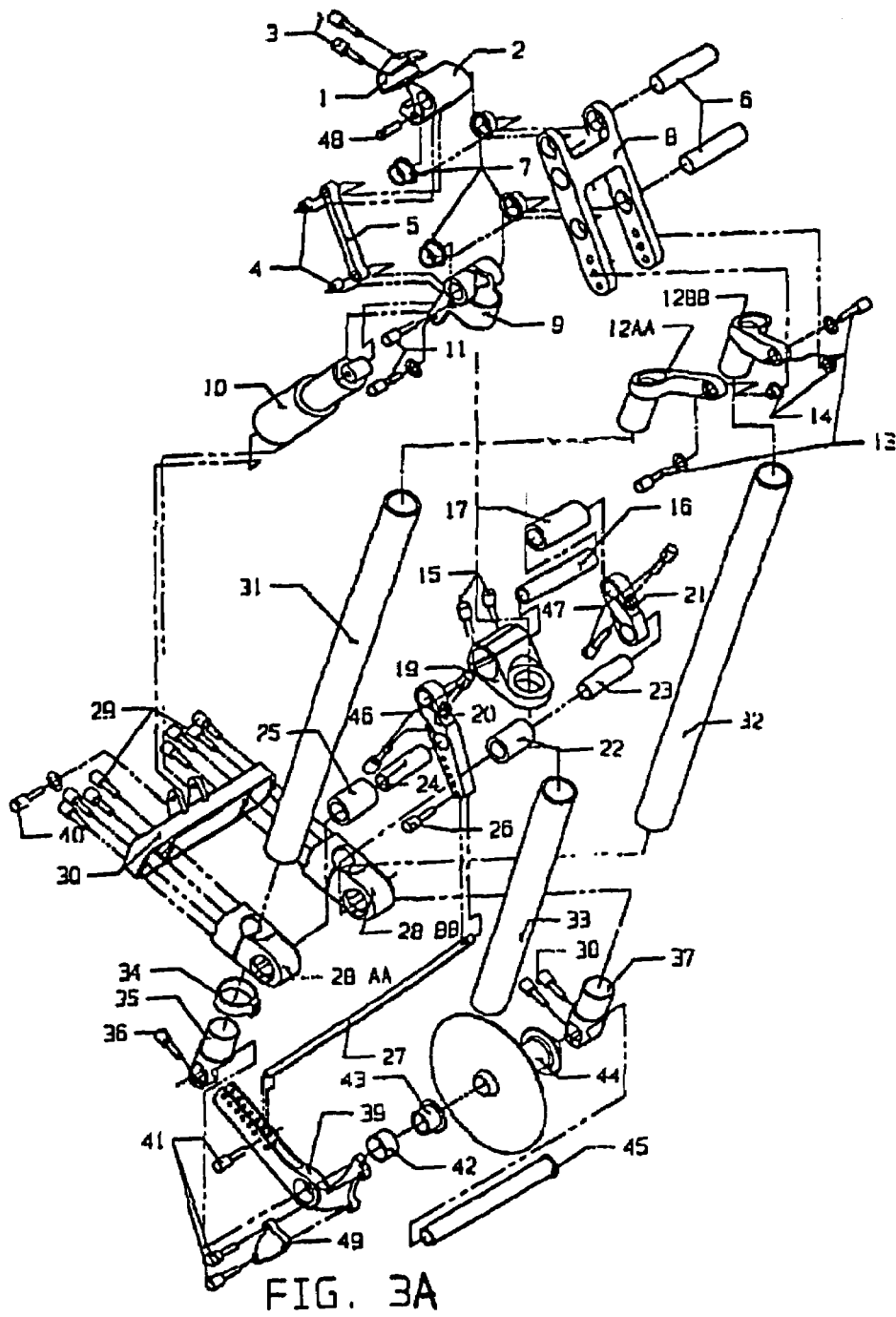
FIG. 3A is an exploded isometric view of the vehicle front suspension.
FIG. 3B is a modification thereof.

FIG. 3A is an exploded isometric view of the front wheel suspension dynamic device 2d introduced in FIG. 2 using a mechanical system sensor. A handle bar clamp 1 is attached to a handle bar clamp body 2 by attachment bolts 3 designed to hold a common bicycle handle bar. The handle bar clamp body 2 pivots on upper link bushings 7 around the upper link pivot rod 6 supported by the front of upper link 8. Lower link 5 with installed lower link bushing 4 connects to handle bar clamp body 2 and pivots freely as the lower link bushing 4 rests on the lower link pivot pin 48. Upper steerer clamp with shock mount 9 pivots freely about an upper link pivot 6 located in the center of upper link 8 and is clamped to the top of steerer 33 by a lower link attachment bolt 11. Right stanchion upper link mount 12BB and left stanchion upper link mount 12AA are connected to the long open end of upper link 8 by an upper link attachment bolt 13. Shock absorber 10 is connected to the upper steerer clamp with shock mount 9 by a lower link attachment bolt 11. Main pivot bushing 17 and main pivot rod 16 are clamped into the lower steerer main pivot clamp 19 by main pivot attachment bolts 15. (FIG. 3B illustrates spring member assembly 18 as an optional replacement for main pivot bushing 17 and main pivot rod 16.) Lower steerer main pivot clamp 19 is secured to the lower end of steerer 33. Left pivot clamp with brake rod mount 20 is attached to the main pivot rod 16 by left pivot attachment bolt 46 and right pivot clamp 21 is attached to the main pivot rod 16 by right pivot clamp attachment bolt 47. Right pivot bushing 22 is secured into right stanchion clamp 28BB and fits around right pivot rod 23 which is clamped to right pivot clamp 21 with right pivot attachment bolts 47. The left pivot rod 24 is clamped into the left pivot clamp with brake rod mount 20 with left pivot clamp bolts 46. The other end of left pivot rod 24 is inserted into left pivot bushing 25 which is secured into left stanchion clamp 28AA. Right stanchion upper link mount 12BB is secured to the top end of right stanchion 32 and right stanchion lower attachment 37 is secured to the bottom end of right stanchion 32. Left stanchion upper link mount 12AA is secured to the top end of left stanchion 31 and left stanchion lower attachment 35 is secured to the bottom end of left stanchion 31. The stanchion brace plate 30 provides the spacing required for the correct width of the stanchions 31 and 32, for torsional resistance of the entire assembly to twisting forces, structural stiffness by creating a bridge between the two legs, and is clamped to the stanchions 31 and 32 at the correct height by stanchion clamp bolts 29. The kinetic energy of the vehicle is transferred by the brake transfer rod 27 connected to the end of left pivot clamp with brake end mount 20 by the transfer rod bolt 26 and to the brake adapter arm 39 by brake connector bolt 41 during braking to increase spring rate to resist the downward force created by a forward C/G shift. A prior art front disc brake system 49 is attached to the brake energy transfer adapter arm 39 with brake connector bolts 41. The hub with brake disc 44 is supported by the hub axle 45 which is clamped at one end to the left stanchion lower attachment 35 by the left stanchion lower attachment bolt 36 and is clamped at the other end to the right stanchion lower attachment 37 by the right stanchion lower attachment bolts 38. The brake energy transfer adapter arm 39 is free to pivot around brake pivot bushing 42 which is held in place by brake pivot guide 43 mounted on hub axle 45. The lower end of shock absorber 10 is connected to the stanchion brace plate 30 by pivot connector bolt 40.

FIGS. 3A AND 3B PARTS LIST

| Part # | Description |
|---|---|
| 1 | handle bar clamp |
| 2 | handle bar clamp body |
| 3 | attachment bolt |
| 4 | lower link bushing |
| 5 | lower link |
| 6 | upper link pivot |
| 7 | upper link bushing |
| 8 | upper link |
| 9 | upper steerer clamp with shock mount |
| 10 | shock absorber |
| 11 | lower link attachment bolt |
| 12A | left stanchion upper link mount |
| 12B | right stanchion upper link mount |
| 13 | upper link attachment bolt |
| 14 | upper link attachment bushing |
| 15 | main pivot attachment bolt |
| 16 | main pivot rod |
| 17 | main pivot inner bushing |
| 18 | main pivot outer bushing |
| 19 | lower steerer main pivot clamp |
| 10 | left pivot clamp w/brake rod mount |
| 21 | right pivot clamp |
| 22 | right pivot bushing |
| 23 | right pivot rod |
| 24 | left pivot rod |
| 25 | left pivot bushing |
| 26 | transfer rod bolt |
| 27 | brake energy transfer rod |
| 28 | stanchion clamp |
| 29 | stanchion clamp bolt |
| 30 | stanchion brace plate |
| 31 | left stanchion |
| 32 | right stanchion |
| 33 | steerer |
| 34 | left stanchion clamp ring |
| 35 | left stanchion lower attachment |
| 36 | left stanchion lower attachment bolt |
| 37 | right stanchion lower attachment |
| 38 | right stanchion lower attachment bolt |
| 39 | brake energy transfer adapter arm |
| 40 | pivot connector bolt |
| 41 | brake connector bolt |

-continued

| Part # | Description |
| --- | --- |
| 42 | brake pivot bushing |
| 43 | brake pivot guide |
| 44 | hub and brake disc |
| 45 | hub axle |
| 46 | left pivot clamp attachment bolt |
| 47 | right pivot clamp attachment bolt |
| 48 | lower link front pivot pin |
| 49 | prior art disc brake system |

Figure 4:
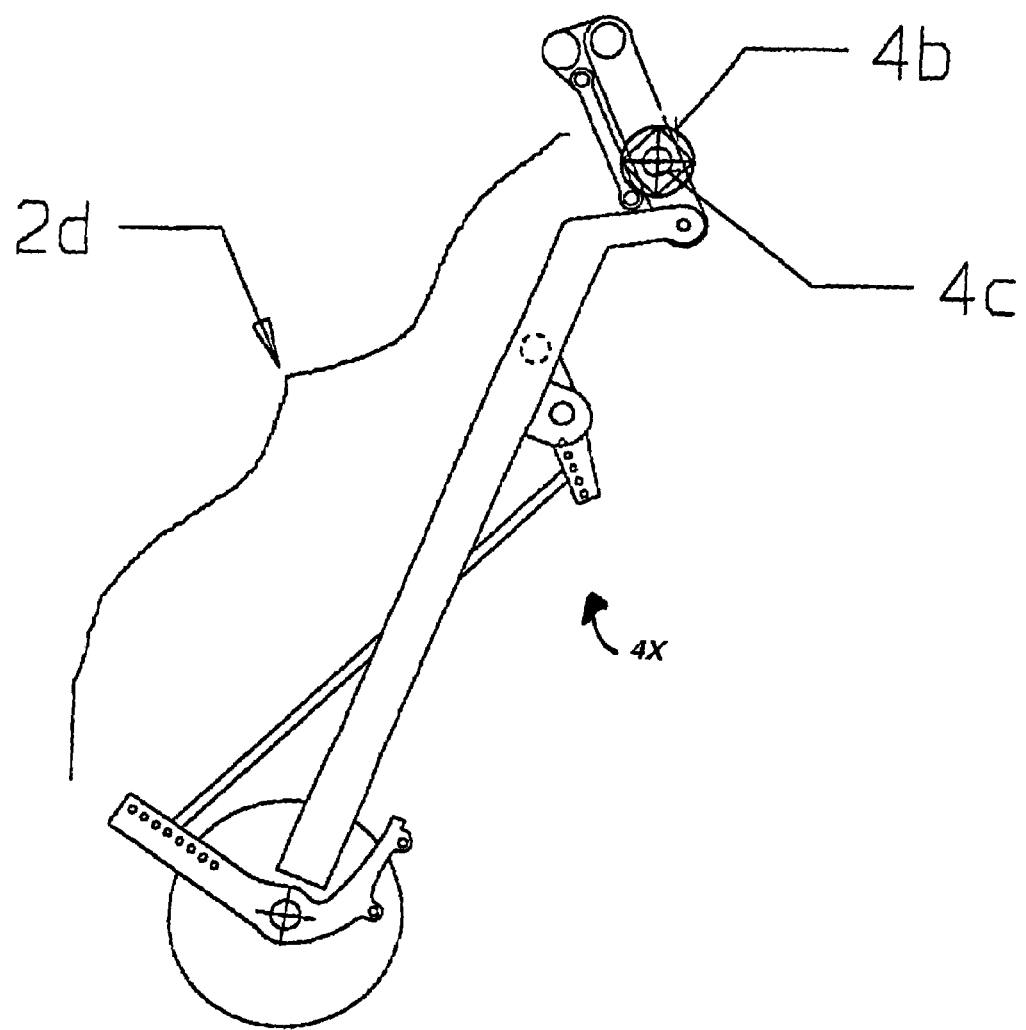
FIG. 4 is an assembled view of the apparatus.

FIG. 4 is a side view of an assembled front suspension assembly 4x consisting of a front suspension assembly as shown in FIG. 3A, a C/G and mass shift control system device 4b, and a C/G and mass shift sensor device 4c. The C/G and mass shift control system 4b measures changes in the C/G position 2a of a rider as represented in FIG. 2. The C/G and mass shift sensor device 4c sends inputs to the C/G shift control system 4b to output control signals to the front suspension assembly 2d.

Figure 5A:
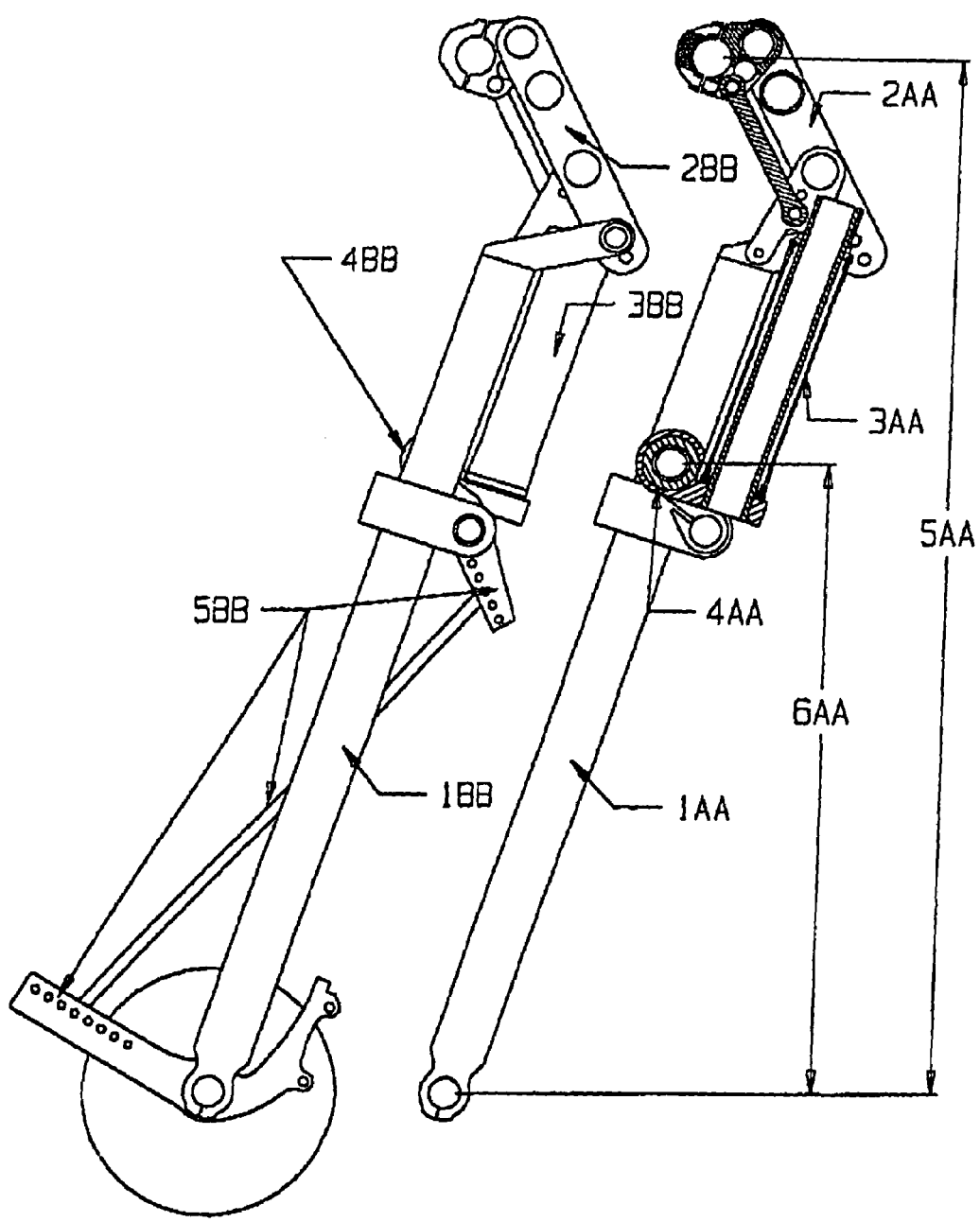
FIGS. 5A-8B are side elevational views of the apparatus in various travel positions without the control system device attached.
Figure 5B:
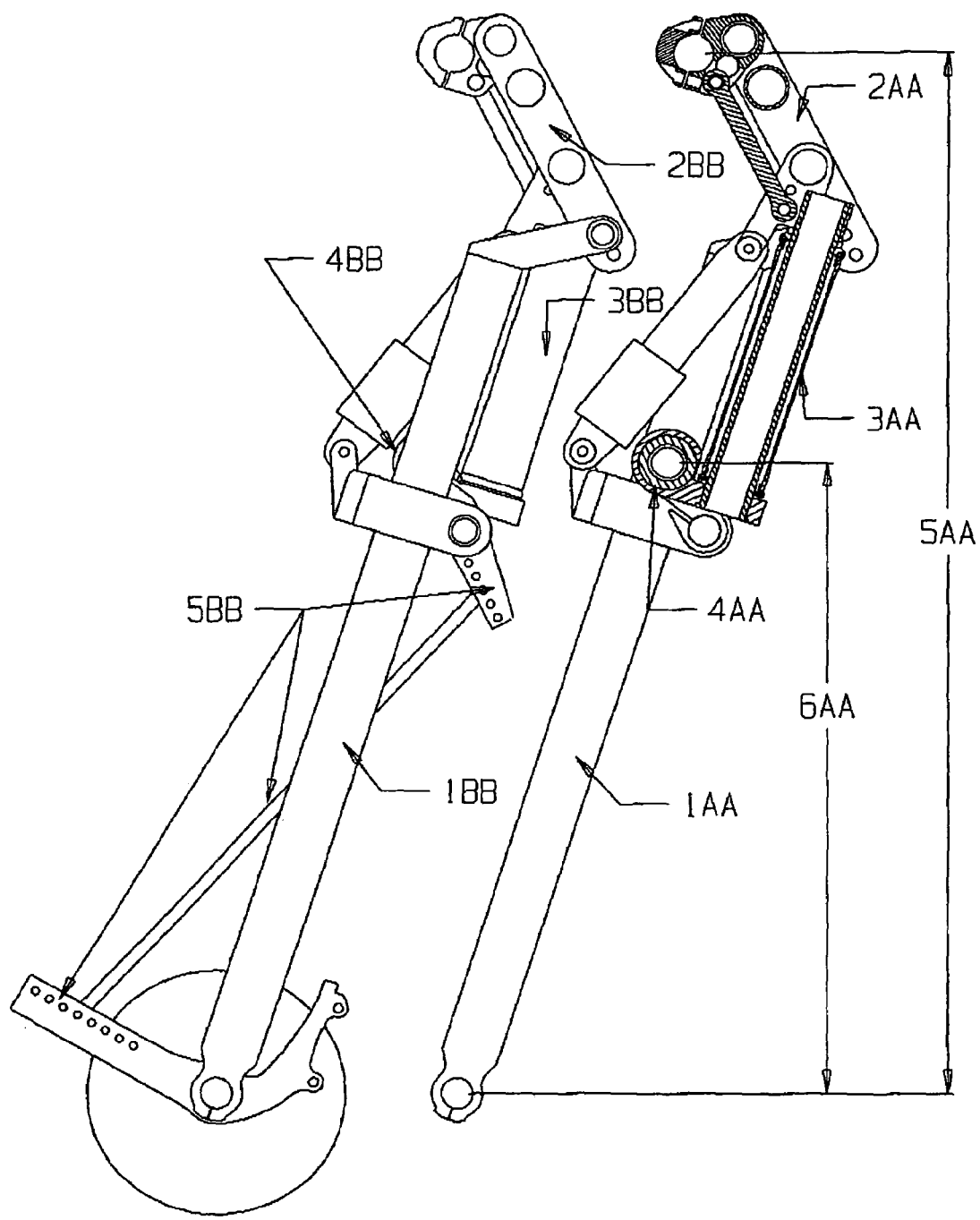
Figure 6A:
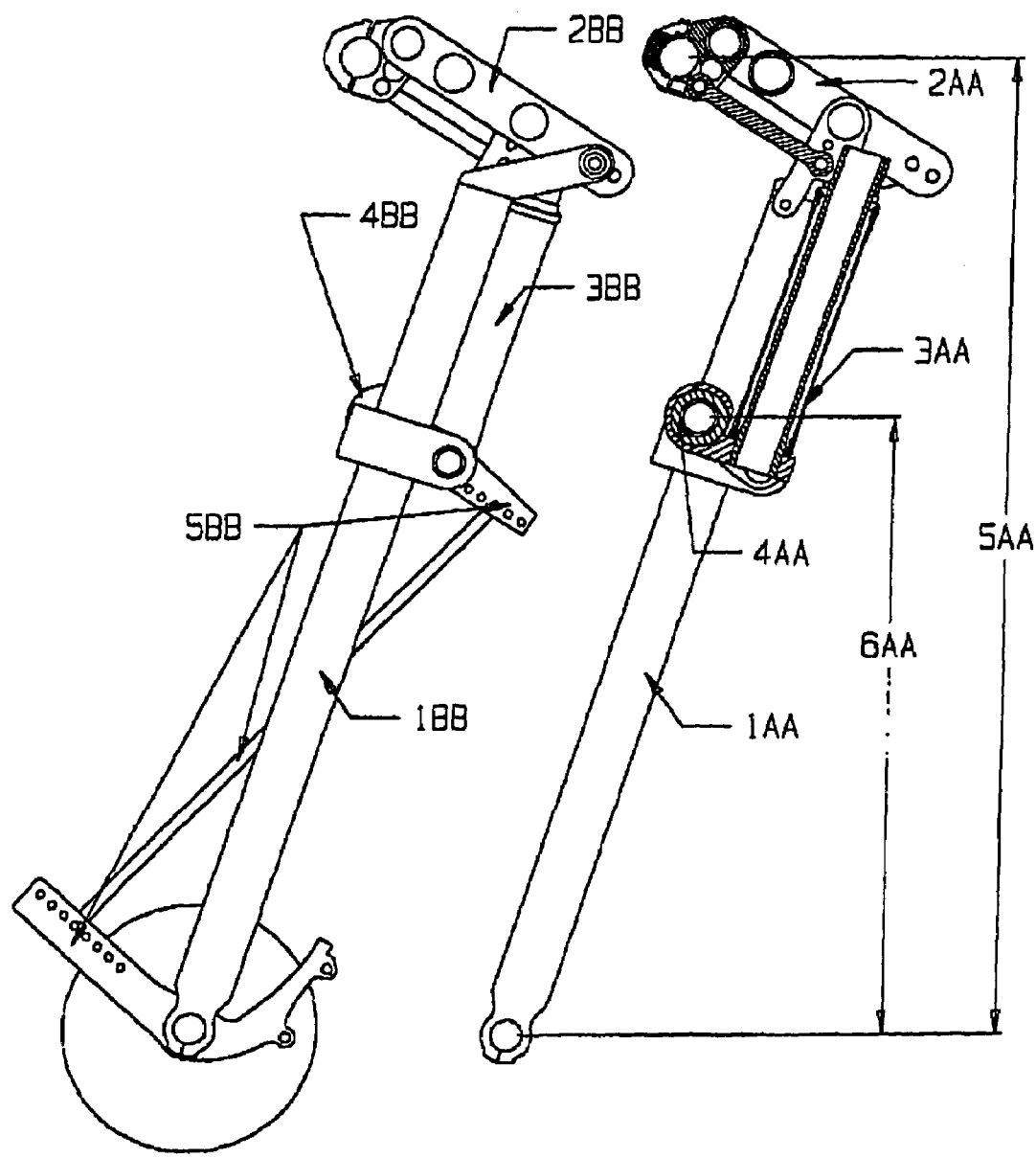
Figure 6B:
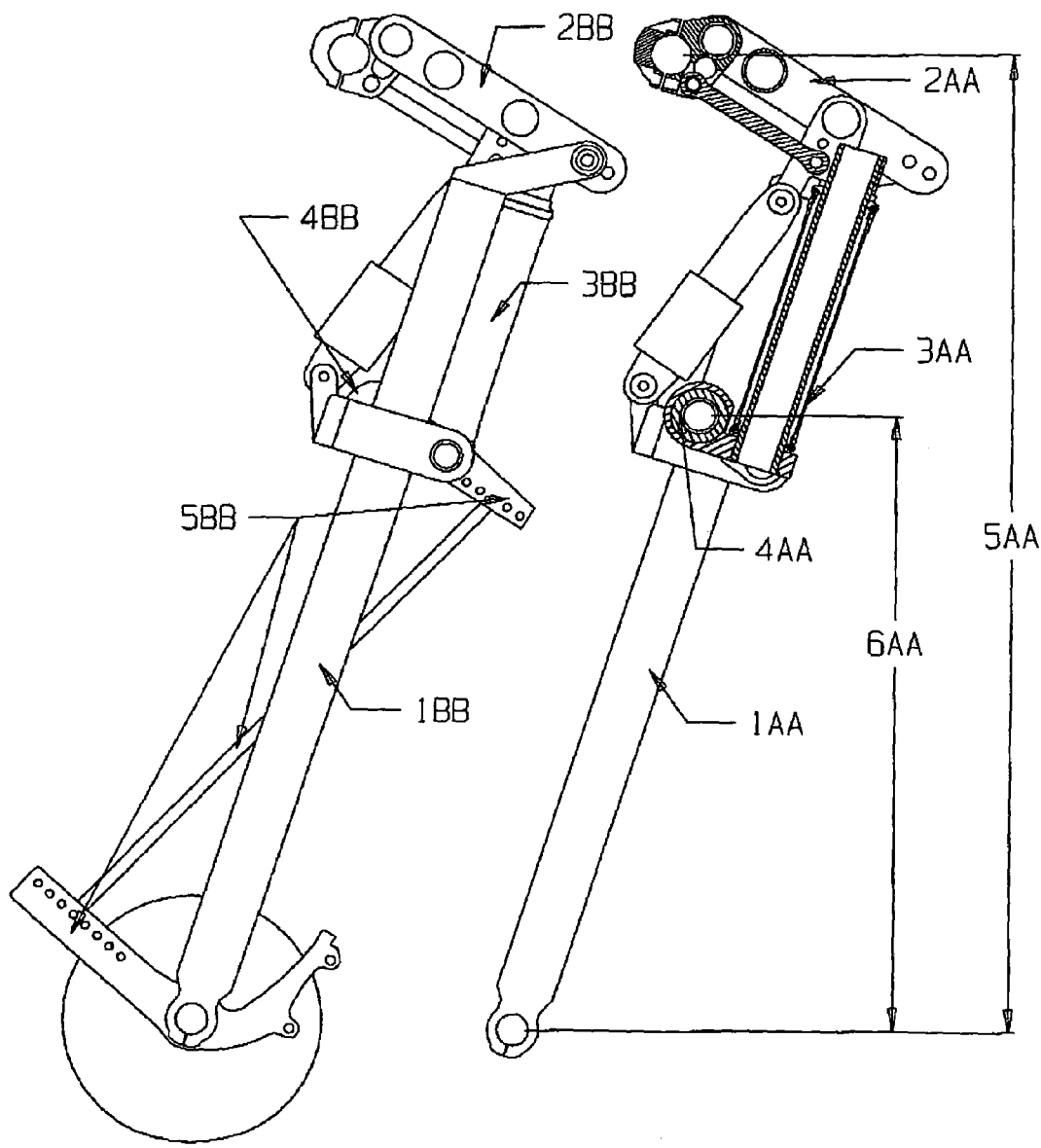
Figure 7A:
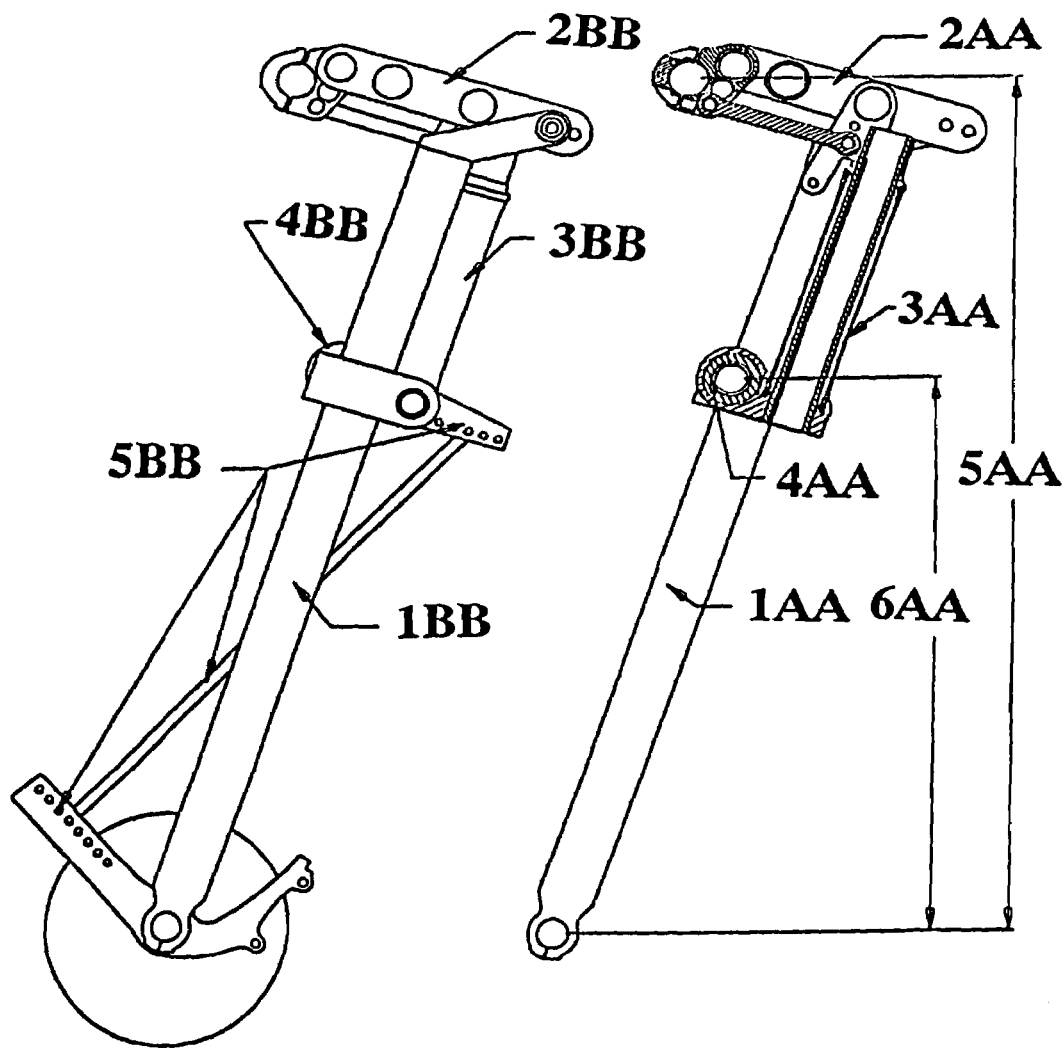
Figure 7B:
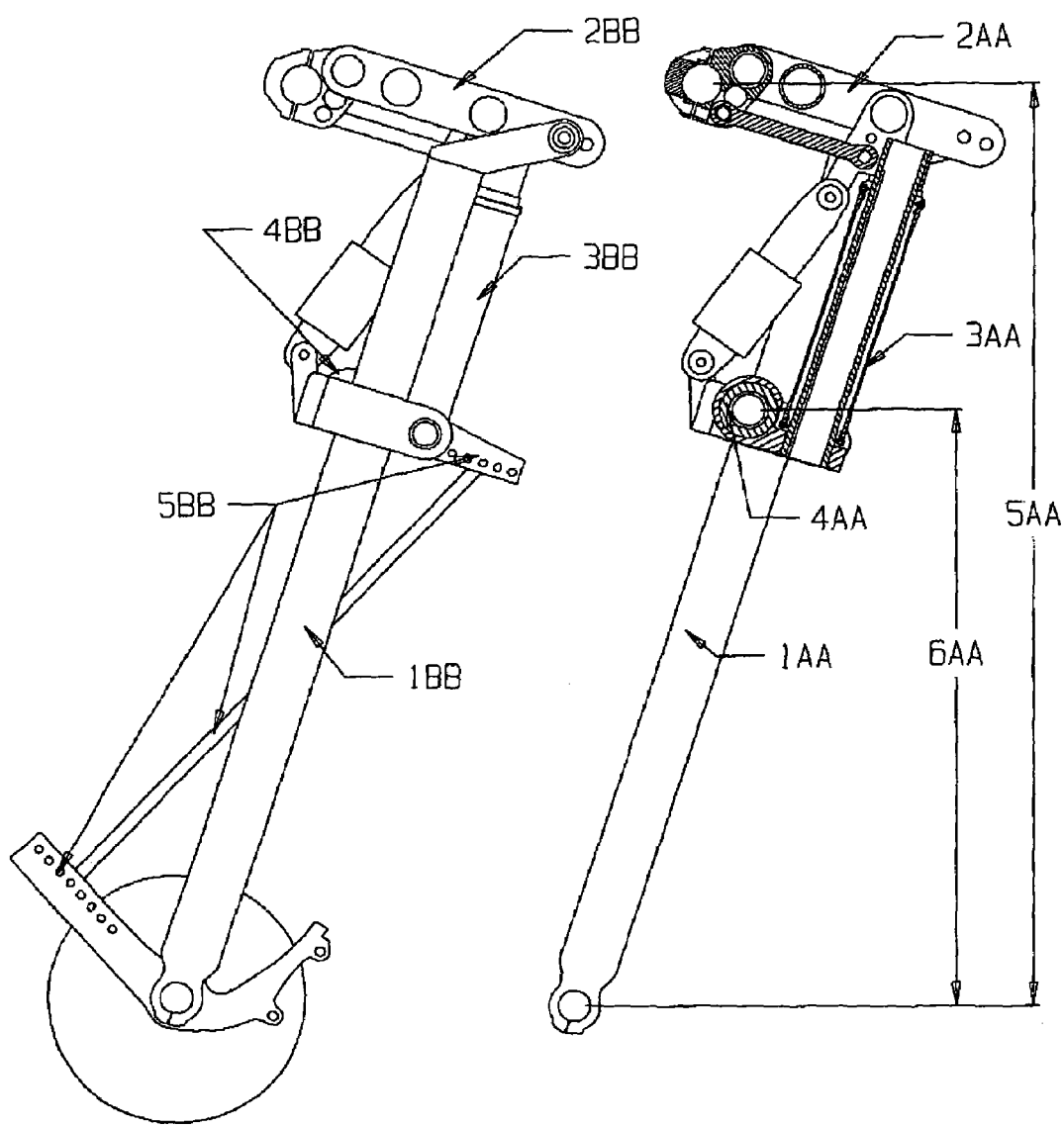
Figure 8A:
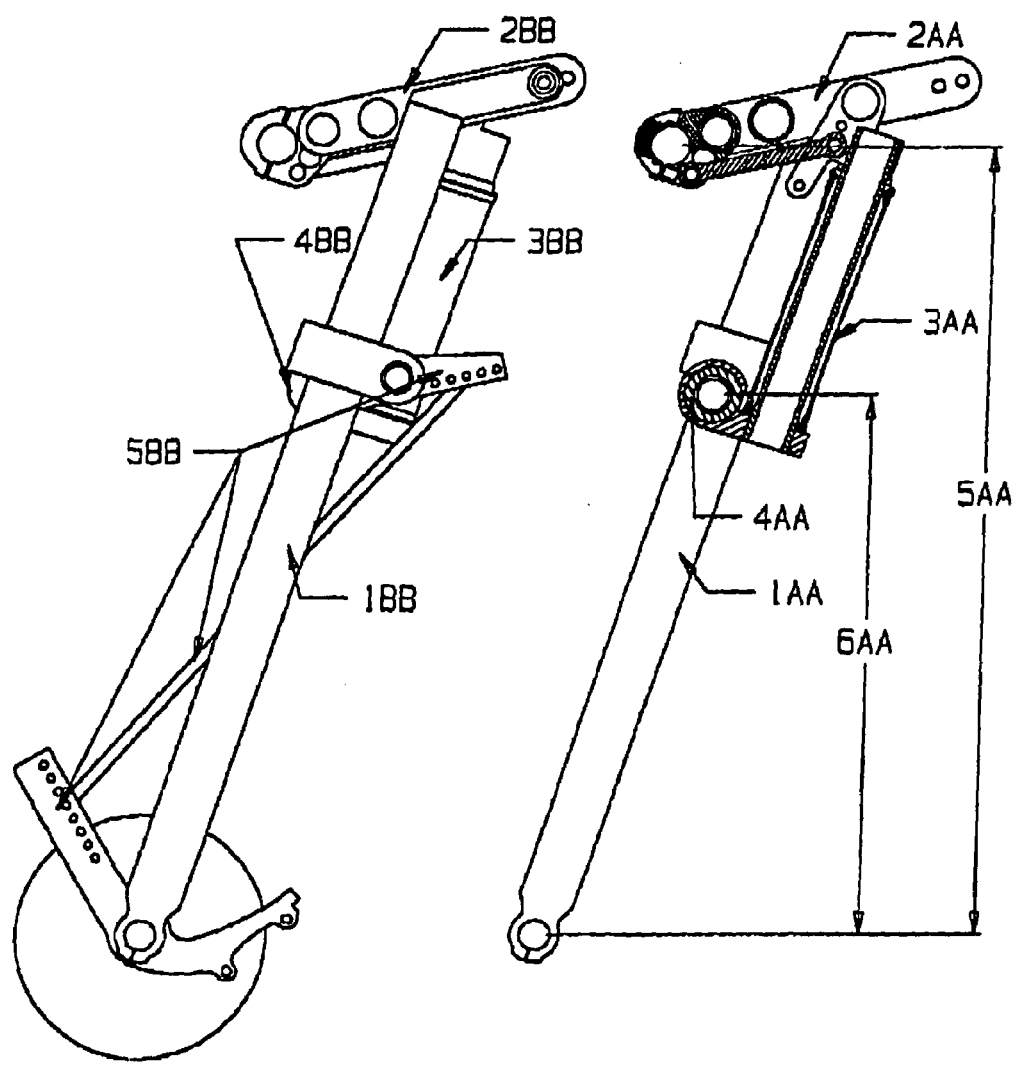
Figure 8B:
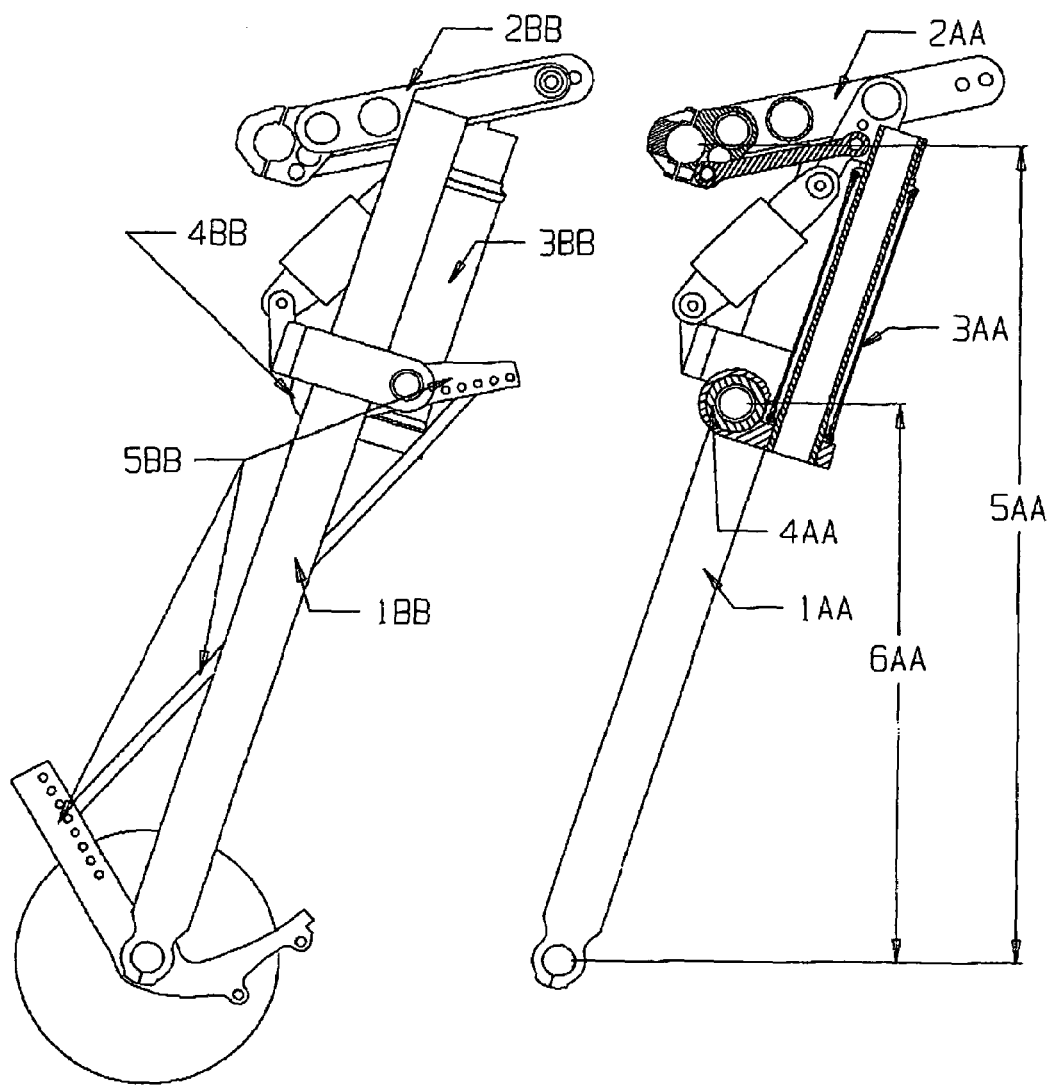

FIGS. 5A-8B are side elevational views of the suspension assembly 2d which illustrate the advantage of the unique application of multiple pivot locations on the front suspension assembly 2d shown in FIG. 3A and they illustrate different positions of the assembly during the suspension action. In FIGS. 5A-8B, the left view is the left stanchion and the right view is a cut away view of the centerline of the vehicle head tube 3AA and the main pivot 4AA. (In FIGS. 5A, 6A, 7A AND 8A, the shock absorber 10 is removed to show the pivoting action of the assembly more clearly.) The C/G shift control system is mechanically introduced to the assembly through the connection of the rider's arms. As the rider shifts his mass and thus C/G, his arms 9n connected at the position 2e as illustrated in FIG. 2 transfer the mass shift vector 2g to the suspension assembly 2d through the handle bar connection at the end of 2BB as shown in FIGS. 5A and 5B. The present invention offers many advantages over existing front suspension systems. The combination of a hinged upper link 8 and hinged lower legs 1AA and 1BB provides a leveraged advantage for a front suspension travel system. The leverage of the upper hinge provides a distinct benefit during small rapid suspension movements. The handlebar clamp body 2 is able to absorb a majority of the small rapid impact forces with a small un-weighting of the handlebar by the rider while prior art designs must choose a pre-set spring rate. With no mechanical leverage one advantage of this front suspension assembly embodiment is the amount of suspension travel gained by the leverage and pivoting action of the upper link assembly as represented by 2AA and 2BB. The main pivot bushing 17 which supports the lower leg right and left pivot clamps, 20 and 21 respectively, is secured in the lower steerer clamp 19 which is positioned in place at the bottom of the vehicle head tube 3BB. The upper steerer clamp with shock mount 9 is located at the top end of the head tube 3BB. The upper link 8 pivots on the upper pivot 6 that is clamped in the upper steer clamp 9. In this way, the front suspension works as two systems working together as one integrated assembly. The upper link leverage and the lower leg pivot rotation provide compliant movement to a response for short travel impact forces and provides long travel movement to absorb large impacts as well.

Thus, there has been provided a human and/or payload transport vehicle shown in FIGS. 5A-8B which has a ride characteristic adjustment mechanism, sensor apparatus for sensing the center of gravity position and mass shift of said human and/or payload relative to said vehicle and producing signals corresponding thereto and means coupling said signals to said ride adjustment mechanism to adjust the ride characteristic of said vehicle.

Figure 9:
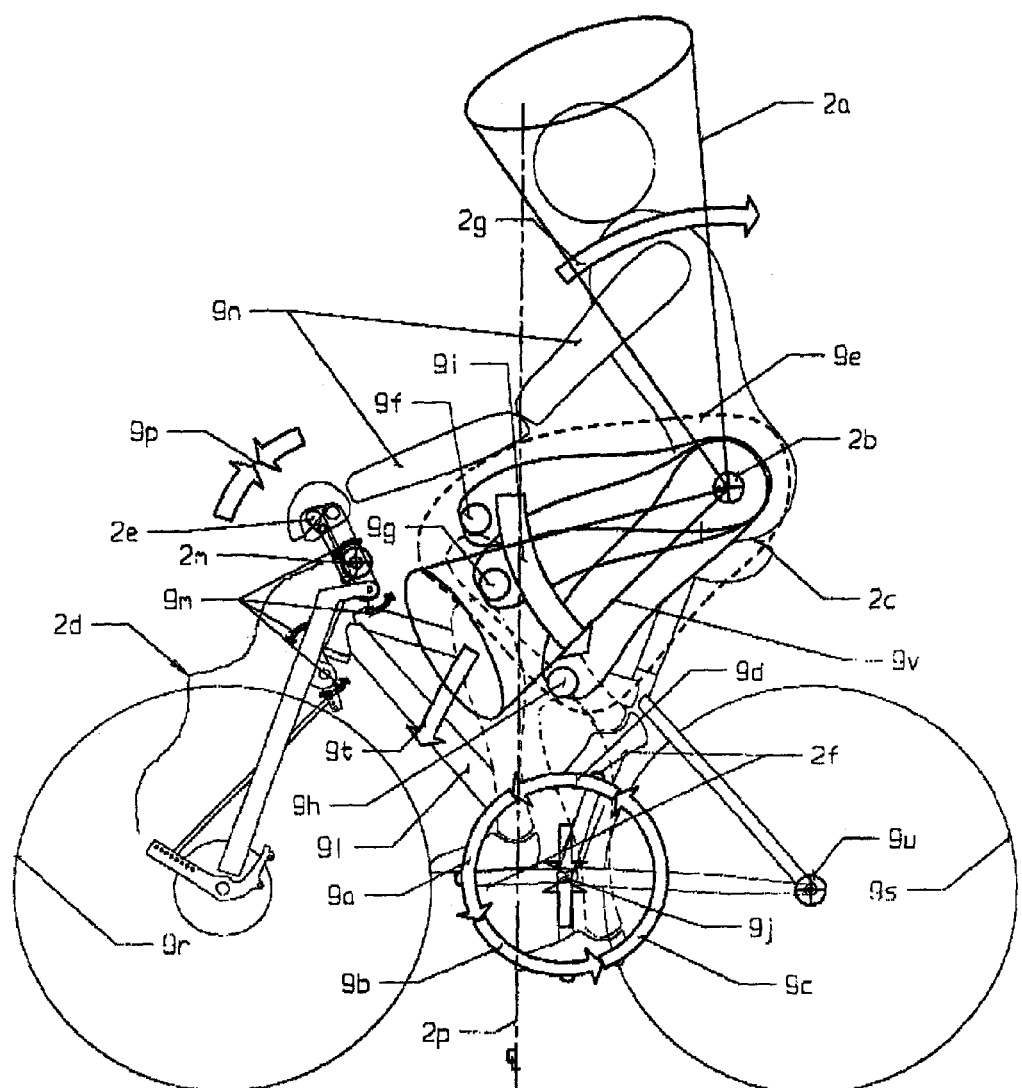
FIG. 9 is a side elevation view of the human range of motion and the force vectors during seated pedaling with the front suspension assembly in FIG. 4.

FIG. 9 is a side elevation view of the operative embodiment of converting the measurement of the center of gravity in cone 2a and mass shift vector 2g of the body by the control system 2m to the activation of the front suspension assembly 2d introduced in FIG. 2. The vehicle center of wheelbase 2p reference is normally located between front wheel 9r and rear wheel 9s during seated riding. The dotted area 9e is the representative envelope of the seated cyclist's reciprocating leg movement when pedaling, while force vectors 9a, 9b, 9c, and 9d are representations of the four phases of the pedaling cycle—build up, power, return, and coast respectively. The leg positions of the human range of motion during seated pedaling are upper leg position 9f, middle leg position 9g, and lower leg position 9h and these develop the inertia 9i which creates a force vector 9t transferred into the vehicle frame structure 9l through the bottom bracket 9j which is connected to the cyclist's legs through pedal connecting points 2f. The inertia 9i transferred into bottom bracket 9j then creates a rotational force 9m on the front suspension assembly 2d multiple pivot points. The arms of the rider 9n form the linkage of the center of gravity 2a and mass shift vector 2g to the front suspension assembly 2d through the connecting point 2e. The rotational forces 9m being transferred through front suspension assembly 2d pivots are counterbalanced by the front suspension spring (in shock absorber 10) compression during the pedaling phases 9a, 9b, 9c, and 9d; this is represented by the force vectors 9p at the connection point 2e.

Figure 10:
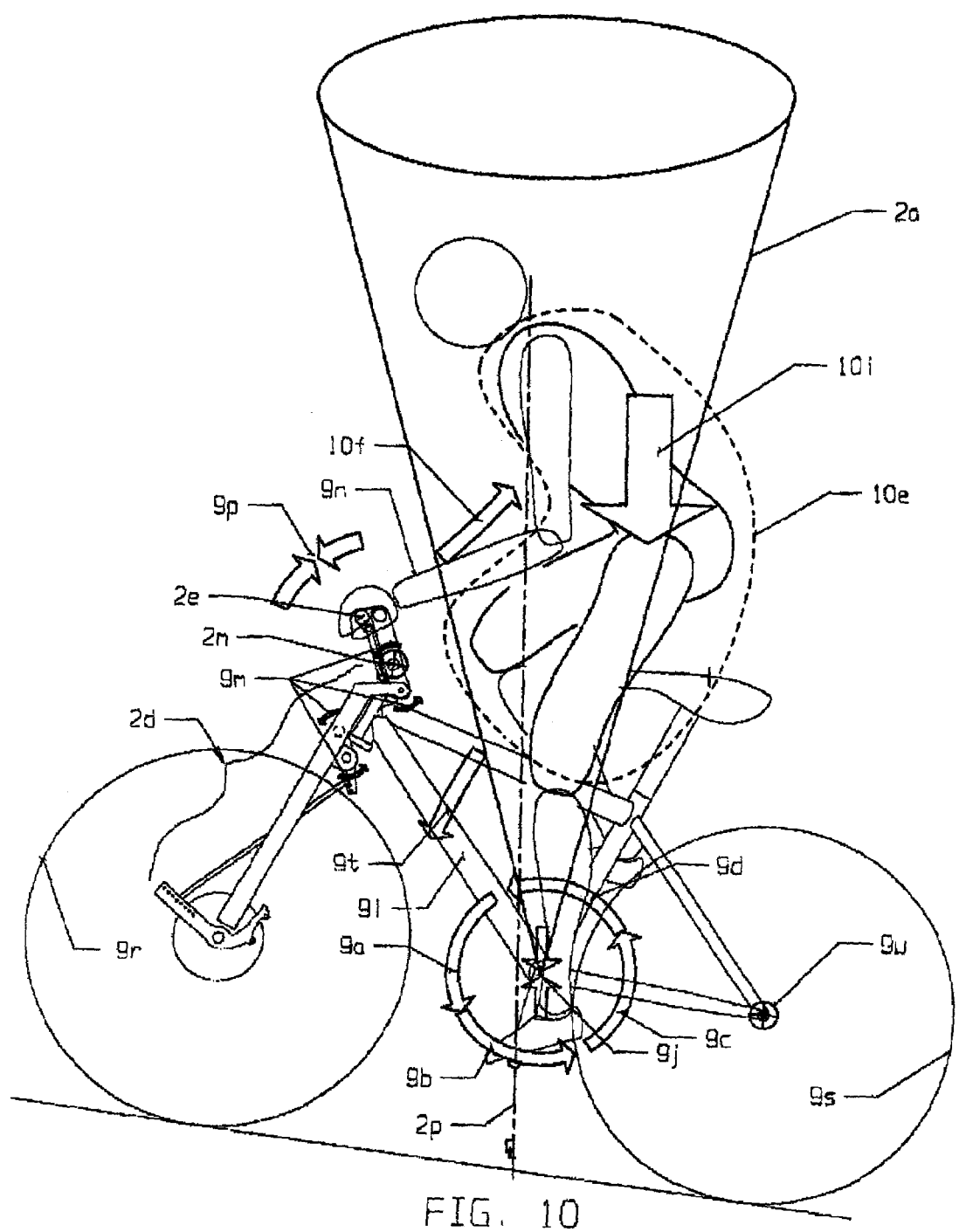
FIG. 10 is a side elevation view of the human range of motion and force vectors during standing pedaling with the front suspension assembly in FIG. 4.

FIG. 10 is a side elevation view of the operative embodiment of converting the measurement of the center of gravity in cone 2a and mass shift vector 2g of the body by the control system 2m into activation of the front suspension assembly 2d introduced in FIG. 2 for a standing pedaling rider. The vehicle center of wheelbase 2p reference is normally located behind the front wheel 9r and close to the rear wheel 9s during standing riding. The dotted area 10e is the representative envelope of the cyclist's reciprocating leg movement and upper torso shift when pedaling, while force vectors 9a, 9b, 9c, and 9d (e.g. pedaling phases) are representations of the four phases of the pedaling cycle—build up, power, return, and coast respectively. The shifting of the mass during standing pedaling causes the creation of a large downward inertia 10i which causes the force vector 9t to transfer nto the vehicle frame structure 9l through the bottom bracket 9j connected to the cyclist's legs through pedal connecting points 2f. The inertia 10i transferred into bottom bracket 9j then creates a rotational force 9m on the front suspension assembly 2d multiple pivot points. The arms of the rider 9n form a transfer linkage from the center of gravity 2a and mass shift 2g to the front suspension assembly 2d through the connecting point 2e. The rotational forces 9m being transferred through the front suspension assembly 2d pivots are counterbalanced during the pedaling phases 9a, 9b, 9c, and 9d by the front suspension spring compression force; this is represented by the force vectors 9p at the connection point 2e. The rider exerts a force 10f as he pulls on the handlebar connection 2e to assist in balancing as he performs the pedal cycle. The standing riding position only uses two of the rider connecting points, 2e at the hands, and 2f, at the feet, and this mode creates a taller center of gravity cone 2a to measure as the 2a focal point originates in effect at the 9j bottom bracket.

Figure 11:
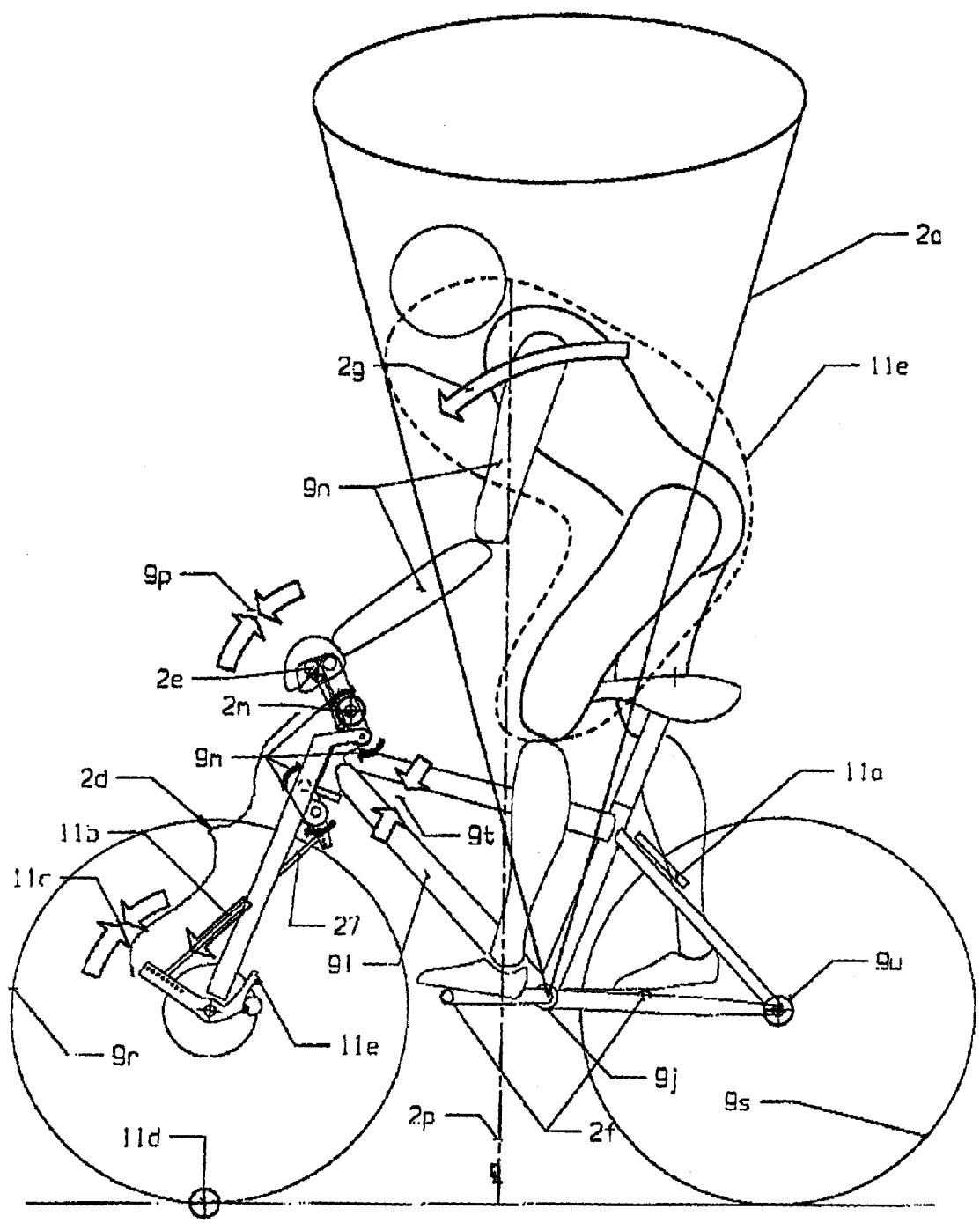
FIG. 11 is a side elevation view of the force vectors when a standing human shifts forward while braking on a bicycle that is using the front suspension assembly in FIG. 4.

FIG. 11 is a side elevation view of the operative embodiment converting the measurement of the center of gravity in cone 2a and mass shift 2g of the body by the control system 2m into activation of the front suspension assembly 2d introduced in FIG. 2 for a standing braking rider. The vehicle center of wheelbase 2p reference is normally located centered between the front wheel 9r and the rear wheel 9s during standing braking. The dotted area 11e is the representative envelope of the cyclist's leg movement and upper torso shift area when braking. The arms of the rider 9n form the transfer linkage of the center of gravity 2a and mass shift vector 2g to the front suspension assembly 2d through the connecting point 2e. The braking function causes a force vector at the rear brake caliper 11a and a force vector 11b along the attached brake energy transfer rod 27. The force vector 11b causes rotation vector forces 9m at the front suspension assembly 2d pivots which assists the front suspension spring rate. When the forward mass shift 2g of the rider occurs, the mass shift 2g acting through the connecting arms 9n of the rider to the front suspension assembly 2d effectively provides neutralized force vectors 11c and 9p. The shifting of the mass 2g during standing braking causes the rotation of energy around the rear dropout 9u which is the center of the wheel 9s. The braking forces are transferred by the brake energy transfer rod 27 and this assists the front suspension compression spring force which creates a counterbalanced force vector 9t that is loading the frame 9l through the bottom bracket 9j connected to the cyclist's legs through pedal connecting points 2f. The standing braking position only uses two of the rider connecting points, 2e at the hands, and 2f at the feet, and this creates a taller center of gravity cone 2a to measure as the 2a focal point originates in effect at the 9j bottom bracket.

Figure 12:
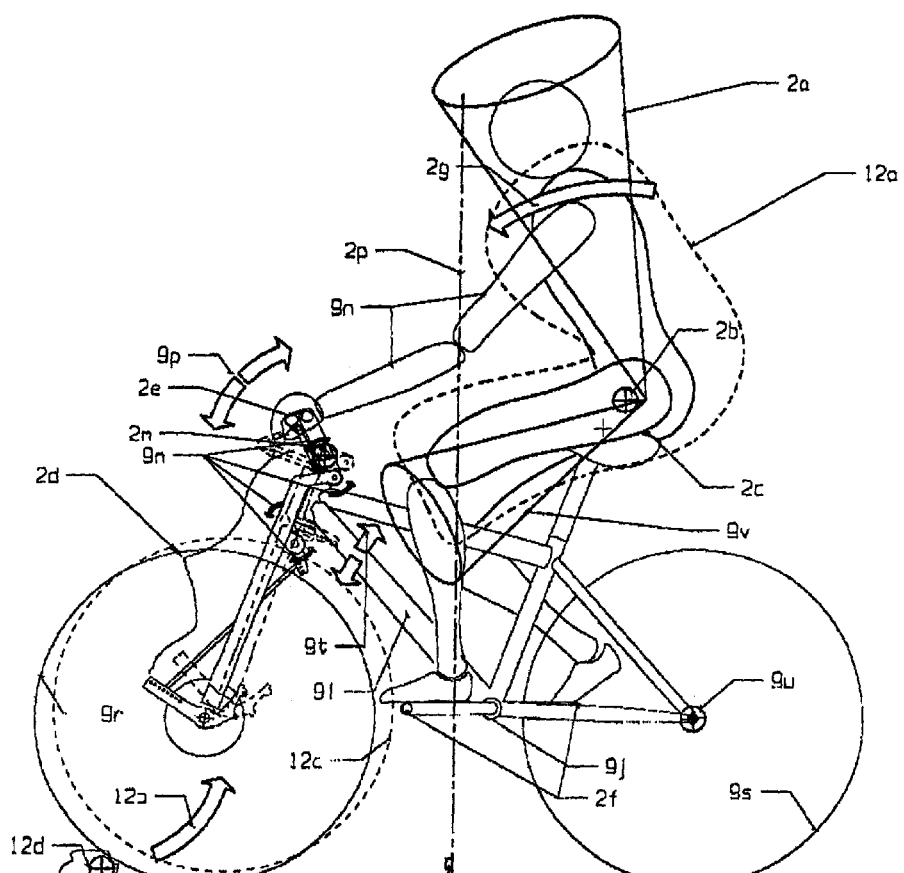
FIG. 12 is a side elevation view of the force vectors of a sitting human on a bicycle with the front suspension assembly in FIG. 4 when the front wheel encounters an obstruction.

FIG. 12 is a side elevation view of the operative embodiment of converting the measurement of the center of gravity in cone 2a and mass shift 2g of the body by the control system 2m to the activation of the front suspension assembly 2d introduced in FIG. 2 for a sitting rider who encounters an obstacle such as rock 12d. The vehicle center of wheelbase 2p reference is normally located centrally between the front wheel 9r and the rear wheel 9s during riding in a seated position. The dotted area 12a is the representative envelope of the cyclist's leg movement and upper torso shift when riding over an obstacle. The vector force 12b is from the impact of wheel 9r with rock 12d. The impact causes a forward mass shift 2g which rotates around the rear dropout 9u which is the center of the wheel 9s. The arms of the rider 9n form the linkage of the center of gravity 2a and mass shift 2g to the front suspension system 2d through the connecting point 2e. The mass shift 2g created by the vector force 12b in the forward direction transfers through the connecting point 2e which causes the front suspension assembly 2d to shorten in length and the connecting point 2e to lower which absorbs the forward shift 2g of the rider as shown by the force vector 9p location. The rotational forces 9m are transferred through the front suspension assembly 2d pivots as the wheel 9r moves to wheel location 12c. The changing of length of the assembly 2d allows the frame 9l to achieve a neutral position represented by force vectors 9t. The sitting riding position uses three rider connecting points, 2e at the hands, 2f at the feet, and 2c at the seat where the focal point 2b for the center of gravity cone 2a is located.

Figure 13:
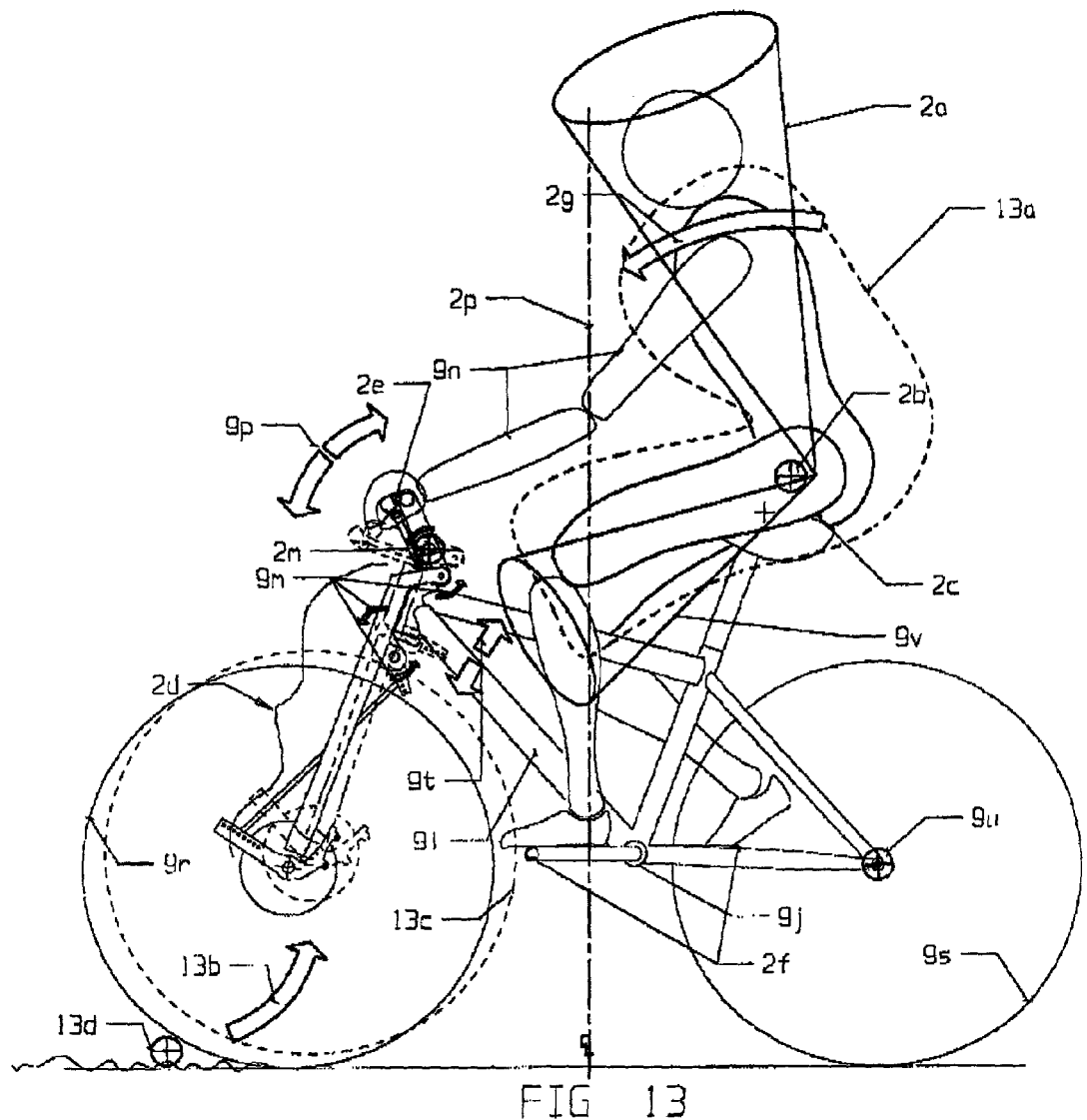
FIG. 13 is a side elevation view of the force vectors of a sitting human on a bicycle with the front suspension assembly in FIG. 4 when the front wheel encounters a succession of small obstructions.

FIG. 13 is a side elevation view of the operative embodiment of converting the measurement of the center of gravity in cone 2a and mass shift 2g of the body by the control system 2m to the activation of the front suspension system 2d introduced in FIG. 2 for a seated rider who encounters a rapid sequence of small obstacles such as rocks 13d. The vehicle center of wheelbase 2p reference is normally located centrally between the front wheel 9r and the rear wheel 9s during riding in a seated position. The dotted area 13a is the representative envelope of the cyclist's leg movement and upper torso shift when riding over a rapid sequence of small obstacles. The vector force 13b is from the impact of wheel 9r with rocks 13d. The vector force 13b causes a forward mass shift 2g which rotates around the rear dropout 9u which is the center of the wheel 9s. The arms of the rider 9n form a linkage to the center of gravity cone 2a and mass shift vector 2g and allows the transfer of the mass shift vector 2g to the front suspension assembly 2d through the connecting point 2e. The load transfer of the mass shift causes the front suspension assembly 2d to shorten in length and the connecting point 2e to lower which absorbs the forward shift 2g of the rider as shown by the force vector 9p location. The rotational forces 9m are transferred through the front suspension assembly 2d pivots as the wheel 9r moves to wheel location 13c. The changing of length of the front suspension assembly 2d allows the frame 9l to achieve a neutral position represented by force vectors 9t. The seated riding position uses three rider connecting points, 2e at the hands, 2f at the feet, and 2c at the seat where the focal point 2b for the center of gravity cone 2a is located.

Figure 14:
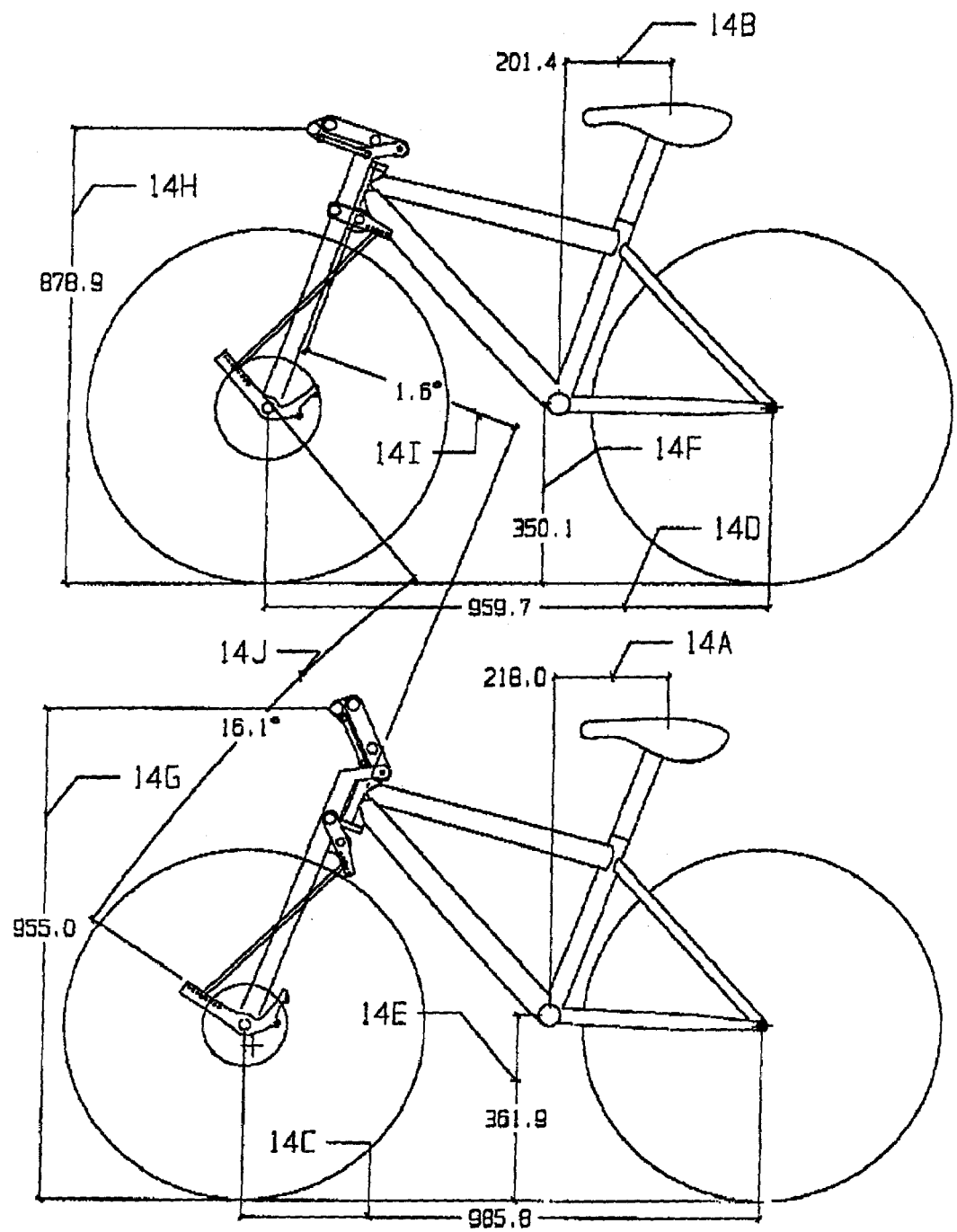
FIG. 14 is the side elevation view of a bicycle using the front suspension assembly in FIG. 4 in a compressed and uncompressed mode for geometric comparison.

FIG. 14 is the side elevation view of a bicycle using the front suspension assembly 2d in FIG. 2 in a compressed and uncompressed position for geometric comparison versus prior art suspension devices to show the handling benefits of the suspension system design. Two unique benefits of the embodiment of the front suspension assembly 2d is that the vehicle wheelbase will only shorten in length approximately 25 mm as shown by head tube angle measurements 14D and 14C which allows for stable vehicle handling and, second, the head tube angle and height will not change drastically during the length of stroke of the suspension action. As a large change in head tube angle will adversely affect the ride characteristics of the vehicle by causing inefficient and delayed steering response angles for the vehicle steering assembly, this design minimizes this adverse effect to a greater degree than current front suspension systems as shown by head tube angle measurement 14I. Note the rotational change 14J (16.1 degree) in brake adapter location. The front suspension assembly handlebar position change is capable of 75 mm of travel as shown by measurements 14G and 14H. This allows the front suspension design to absorb a C/G and mass shift well without decreasing other important ride characteristics of the vehicle. Measurements 14E and 14F for the change in bottom bracket height and measurements 14A and 14B for the seat position change show that the change in the front suspension position is not adversely affecting these key ride characteristics.

Figure 15:
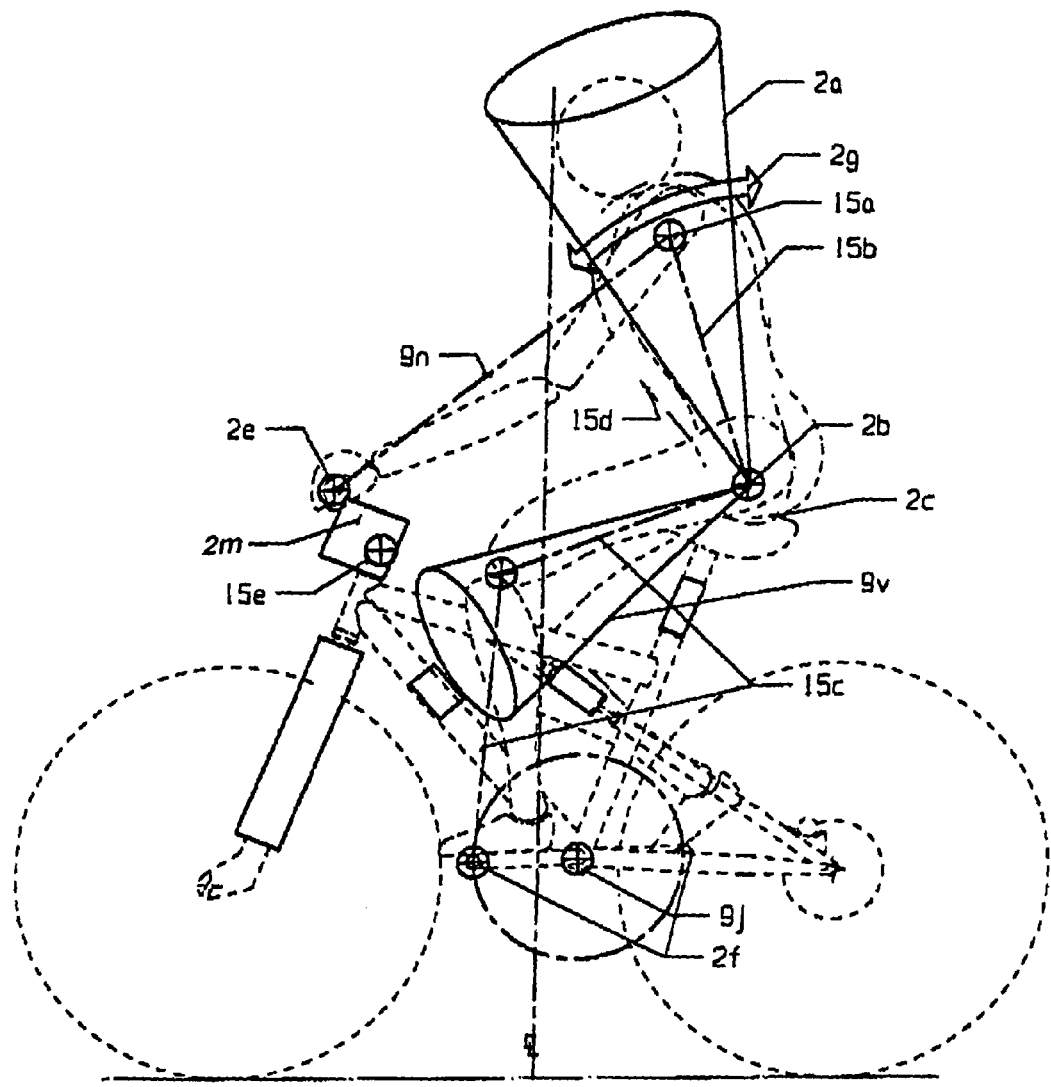
FIG. 15 is the side elevation view displaying the bicycle contact points and linkages to the upper torso approximate center of gravity of a human sitting on a bicycle.

FIG. 15 is the side elevation view displaying the vehicle to rider contact points, the system linkages to the upper torso, and the initial approximate center of gravity position of a human sitting on a bicycle. The common contact points for a human rider to a bicycle are hand location 2e, seat location 2c, and foot location 2f. The arms of the rider 9n are a link between the hand location 2e and the upper torso 15a. The seated rider upper torso 15a will pivot at the torso seat location 2b. The upper torso 15d has a link 15b between the upper torso 15a and seat pivot 2b. The lower torso is connected between the seat pivot 2b and the foot location 2f by links 15c. The lower torso range of motion is represented by 9v. A C/G shift control system 2m monitors the movement of the upper torso 15d in the center of gravity zone 2a and the movement of the torso is represented as mass shift 2g. The C/G shift control system 2m will send output signals to attached dynamic systems such as a dynamic front suspension system assembly 15e. The C/G shift control system 2m outputs may be sent to attached dynamic devices such as front suspension 15e and others through electrical wire harness, by wireless electrical, hydraulic, pneumatic, mechanical, and the like.

Figure 16:
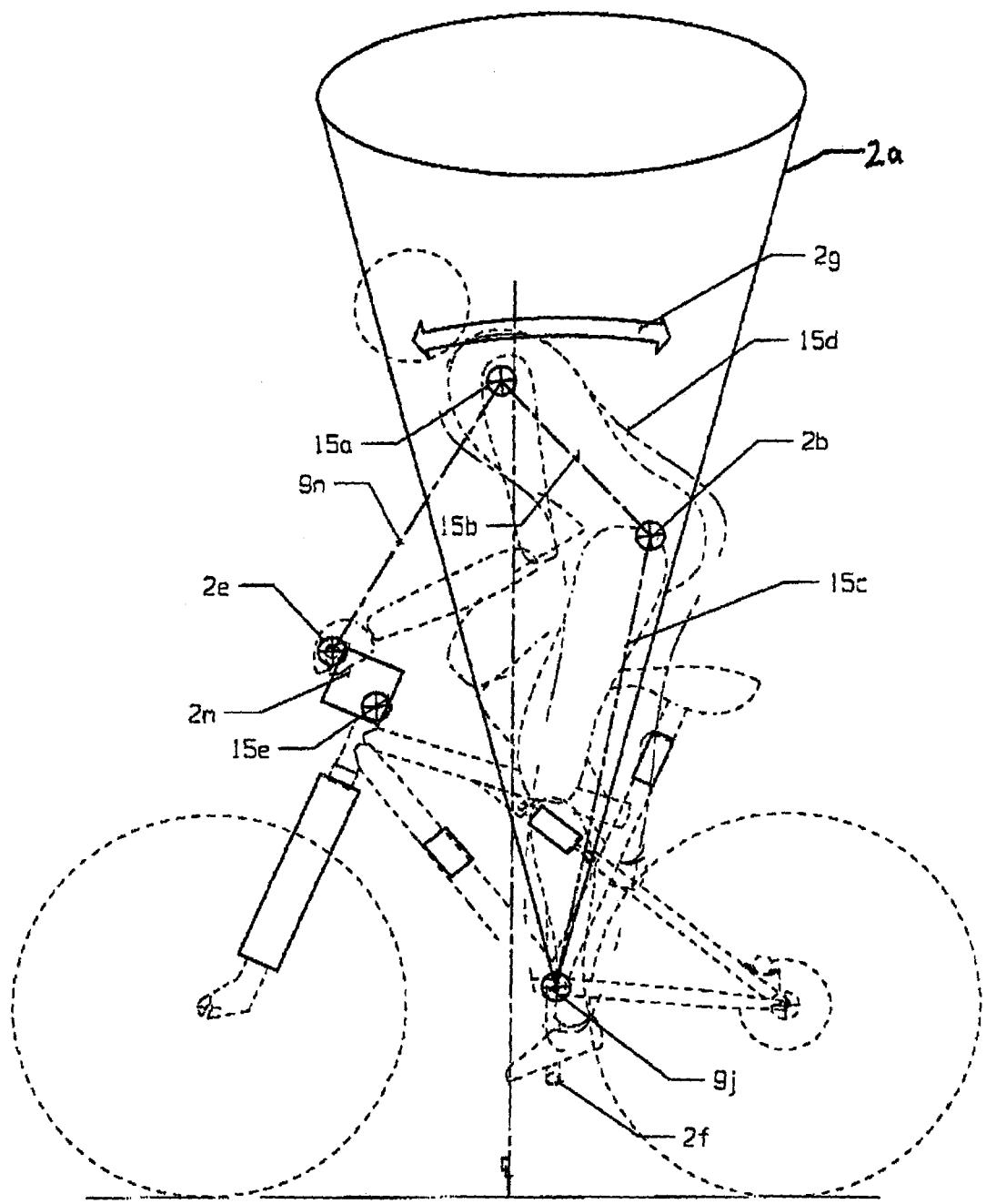
FIG. 16 is the side elevation view displaying the bicycle contact points and linkages to the upper torso approximate center of gravity of a human standing on a bicycle with the feet one above the other in line with the body vertically.

FIG. 16 is the side elevation view displaying the bicycle contact points and linkages to the upper torso approximate center of gravity position of a human standing on a bicycle with one foot above the other in line with the body vertically. The standing rider is connected to the vehicle at hand contact point 2e and foot location 2f. Link 15c is a representation of the connection of the bottom bracket 9j and the seat pivot 2b and link 15b is the connection from seat pivot 2b to the upper torso arm pivot 15a. The upper torso pivot 15a is connected to the hand connection location 2e by arm link 9n. Control system 2m will measure the C/G shift area 2a for mass shift vector 2g then send appropriate output signals to front suspension assembly system 15e.

Figure 17:
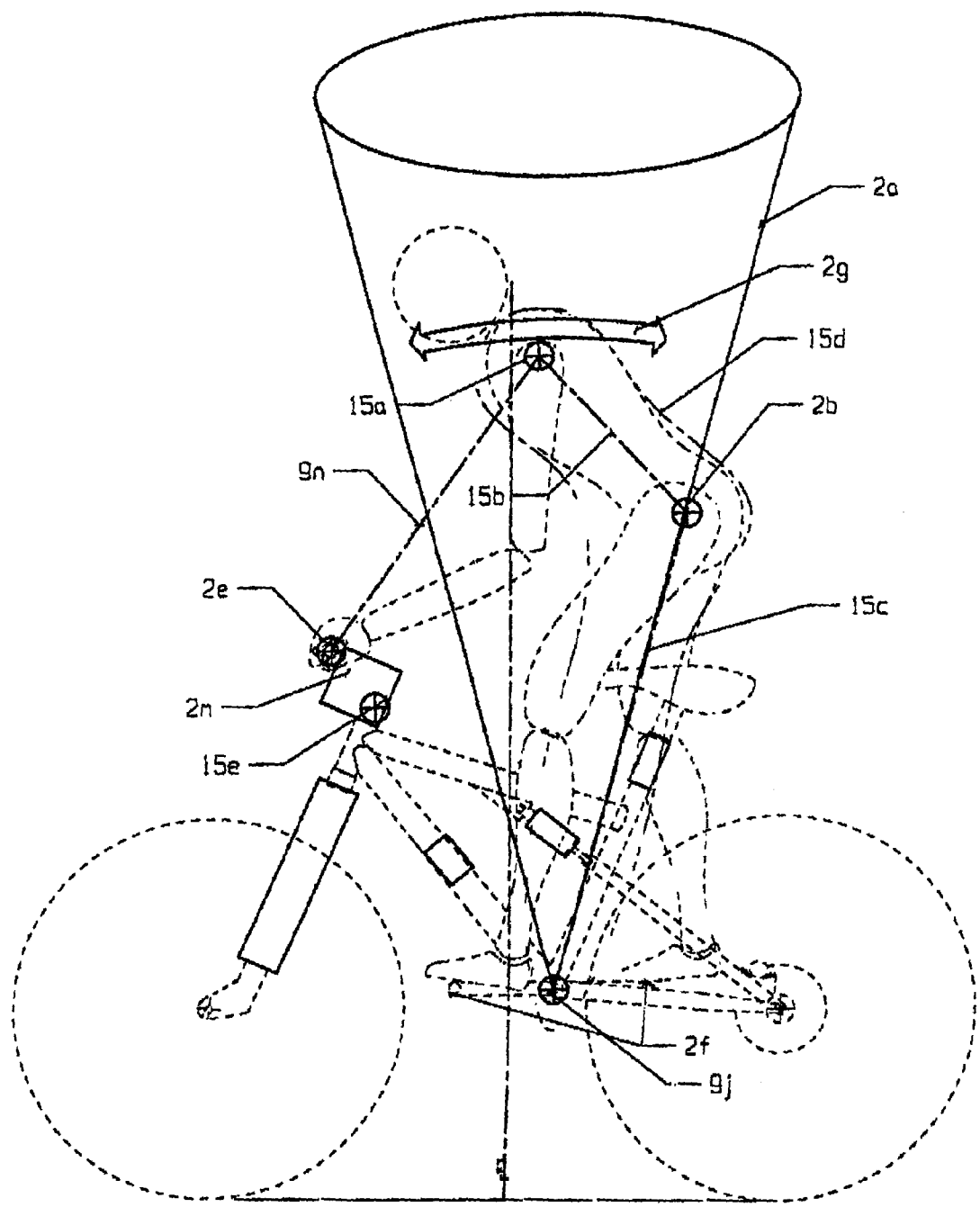
FIG. 17 is the side elevation view displaying the bicycle contact points and linkages to the upper torso approximate center of gravity of a human standing on a bicycle with the feet level.

FIG. 17 is the side elevation view displaying the bicycle contact points and linkages to the upper torso approximate center of gravity position of a human standing on a bicycle with the feet parallel to the ground plane while riding. The position of the rider affects the C/G shift area 2a as the seat pivot 2b is located farther away from the vehicle centerline. The lower connecting link 15c and torso connecting link 15b are at a greater angle than when sitting. The mass shift 2g is more dynamic and responsive to the vehicle movements. The benefit of the present invention is apparent as the C/G shift control system 2m controls the attached device 15e to respond to any C/G shifts 2a and mass shifts 2g.

Figure 18:
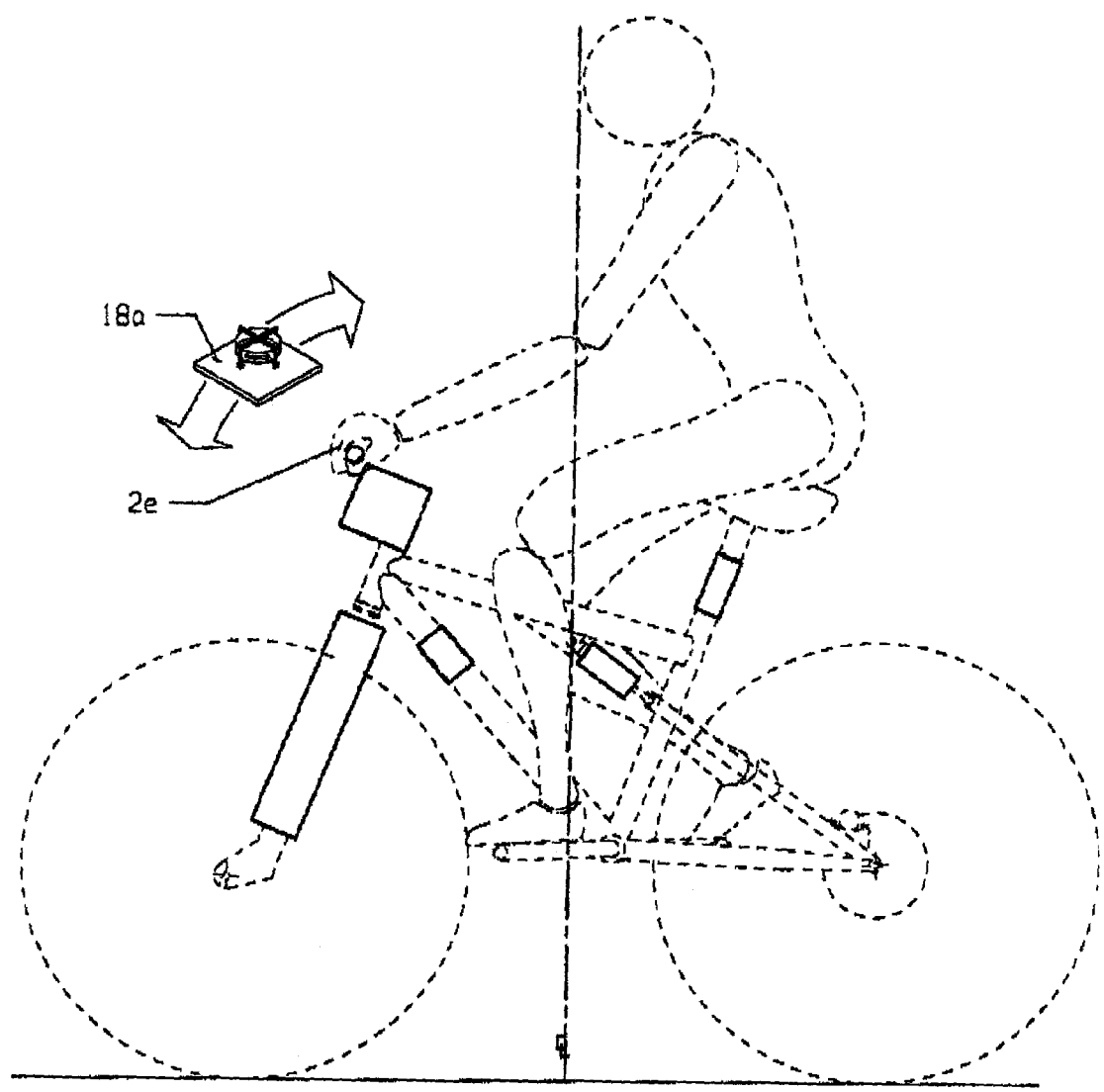
FIG. 18 is the side elevation view of a human sitting on a bicycle and the location for a sensor.

FIG. 18 is the side elevation view of a human sitting on a bicycle and the application of a sensor device as illustrated. The strain gauge sensor 18a when mounted on the handlebar assembly provides sensor output signals derived from the loading sensed from the hand connection location 2e.

Figure 19:
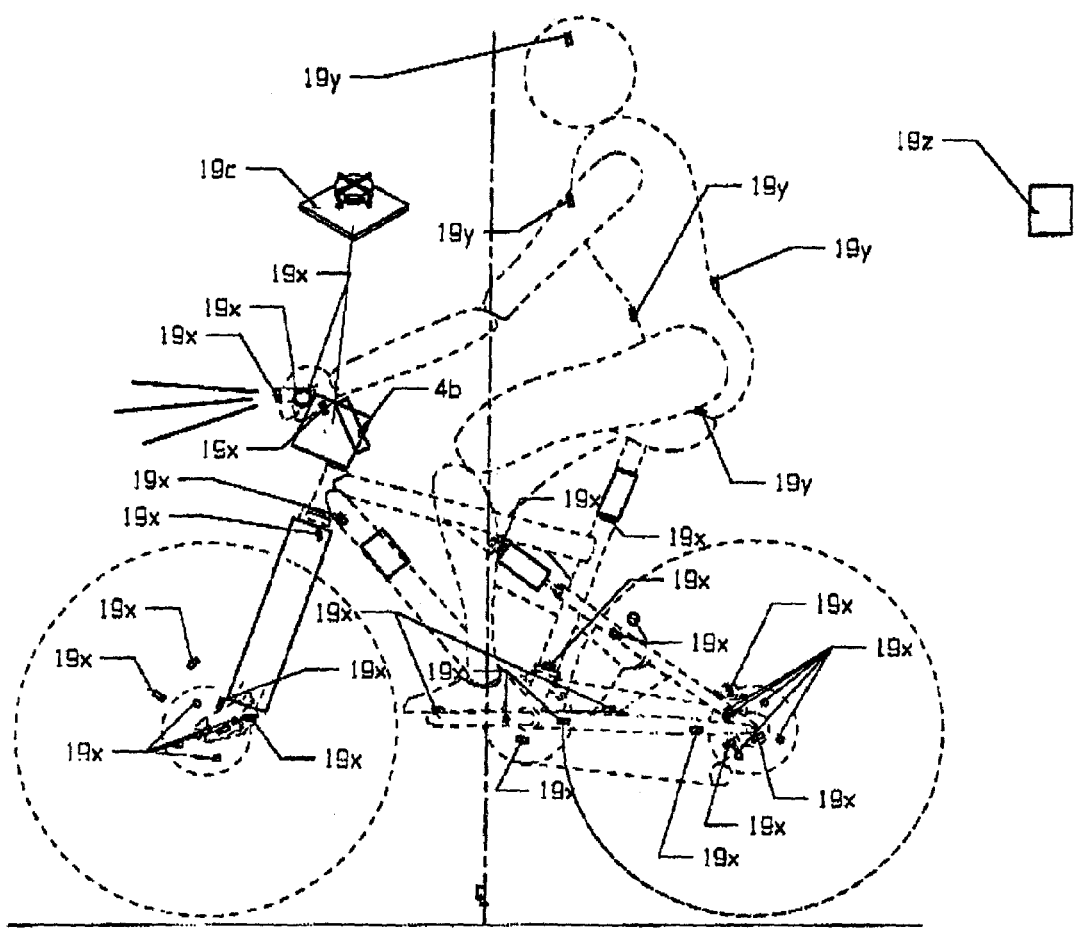
FIG. 19 is the side elevation view of a human sitting on a bicycle and the approximate locations that sensors can be positioned on the bicycle or human.

FIG. 19 is the side elevation view of a human sitting on a bicycle and the approximate locations that sensors can be positioned on the bicycle, on a human, or externally designated by locations 19x, 19y, and 19z respectively. A sensor 19c is shown as an example of a sensing device and its mounting location. Exact sensor positions can vary dependent on the size and shape of the vehicle, the type of sensor used, and the contact points available with the human rider. Sensor mounting methods to the vehicle will be dependent on size and type of sensor used. The sensors may use wire harness assemblies or wireless outputs such as infrared to send signals to the C/G shift system controller 4b.

Figure 20:
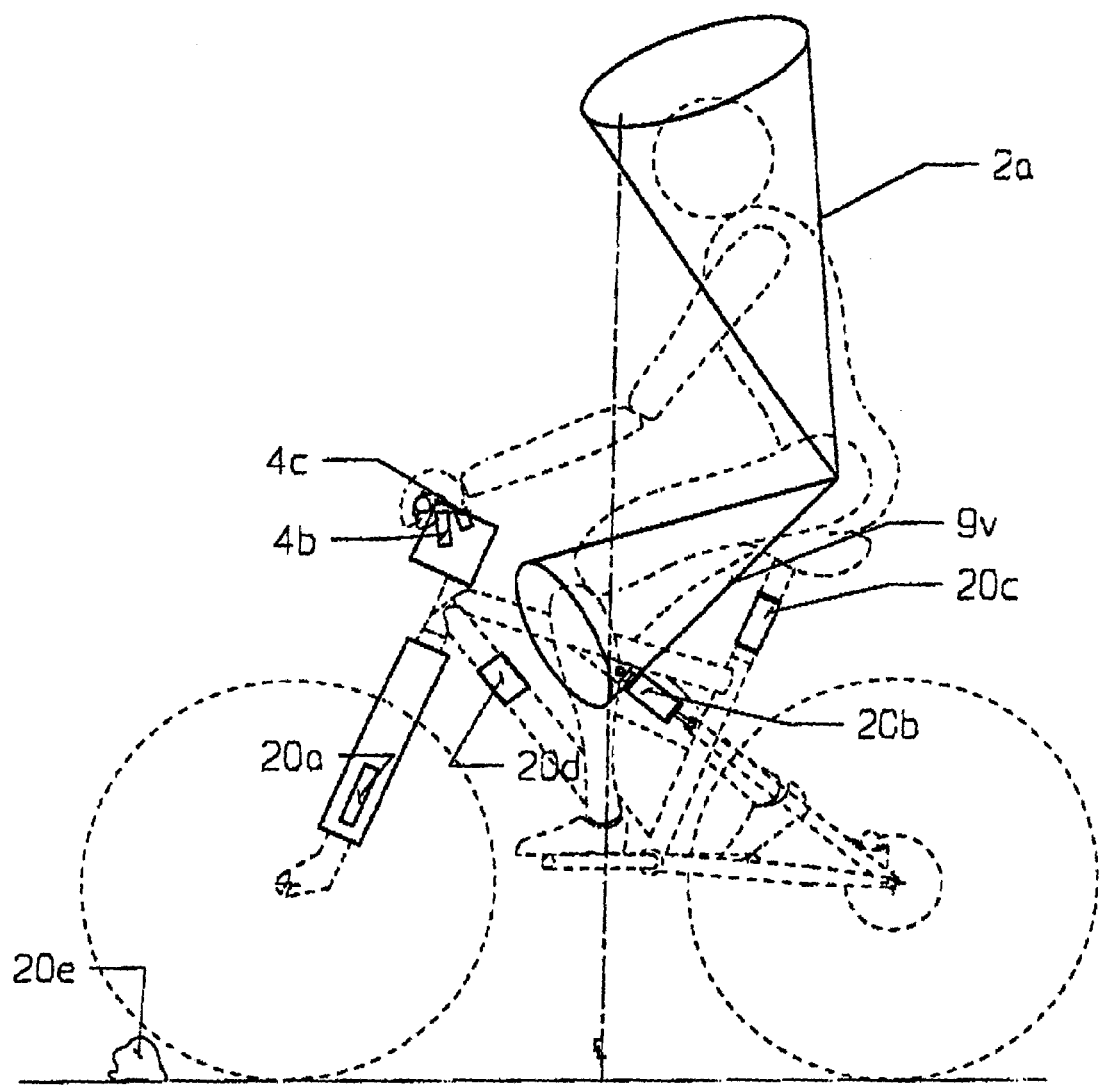
FIG. 20 is the side elevation view of a bicycle having multiple suspension systems to which the control system of the present invention can be applied.

FIG. 20 is the side elevation view of a bicycle having multiple suspension systems to which the control system of the present invention is applied. The bicycle may have one, two, three, or more suspension system means that work independently from each other or interdependently based on the controller mechanism chosen. FIG. 20 shows the approximate position of suspension system placements on bicycles as shown in prior art. Front suspension assembly 20a, front frame suspension assembly 20d, rear suspension assembly 20b, and seat suspension assembly 20c are all controlled by the C/G shift controller 4b. As the C/G shift sensing device 4c monitors the center of gravity and mass shift areas 2a and 9v output signals are sent to the C/G system controller 4b. The C/G shift controller will then send outputs to the attached suspension devices as determined by the riding condition parameters.

Figure 21:
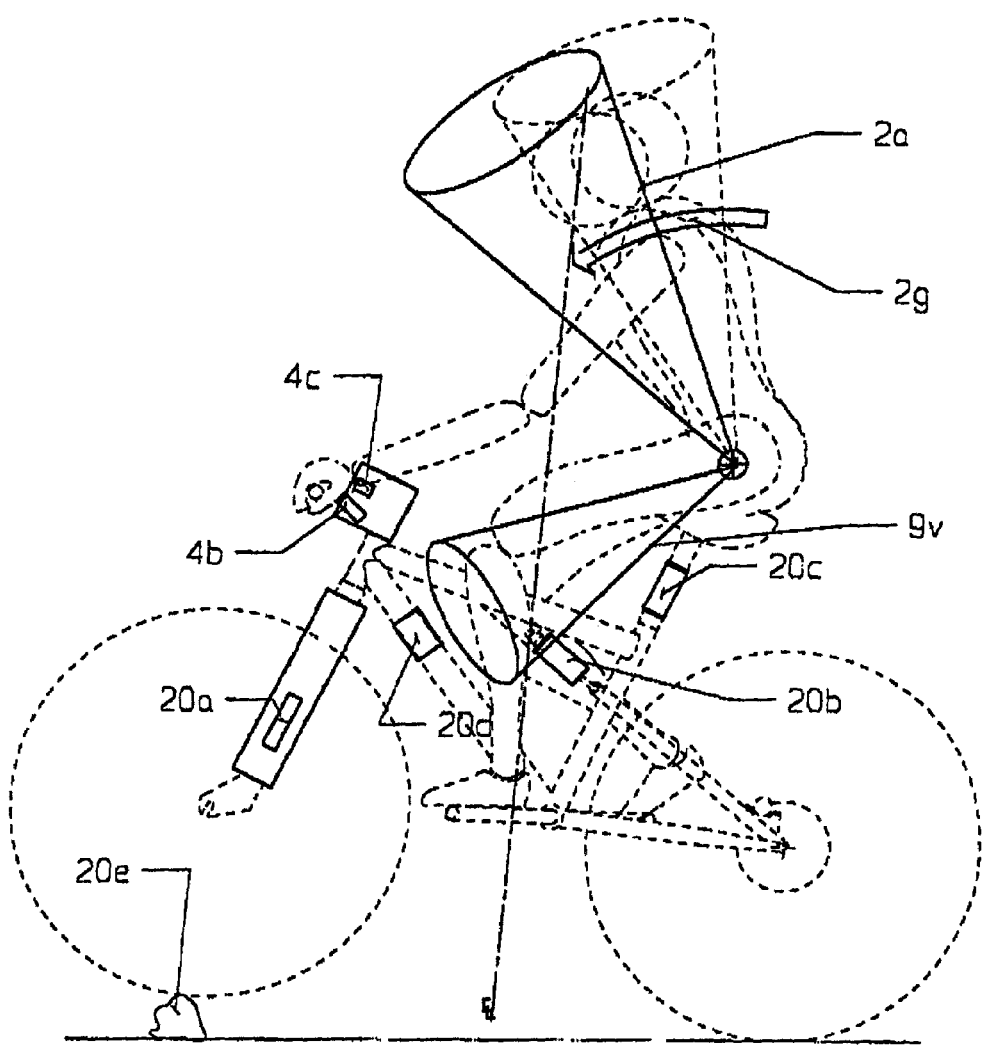
FIG. 21 is the side elevation view of human seated on a bicycle encountering an obstruction and the resulting shift forward of the upper torso.

FIG. 21 is the side elevation view of human seated on a bicycle encountering an obstruction 20e and the resulting center of gravity shift 2a forward along with the mass shift 2g of the upper torso. Vehicle suspension devices 20a, 20b, 20c, and 20d are adjusted by C/G shift system controller 4b after signals are received from the C/G shift sensor 4c that measured the mass shift 2g.

Figure 22:
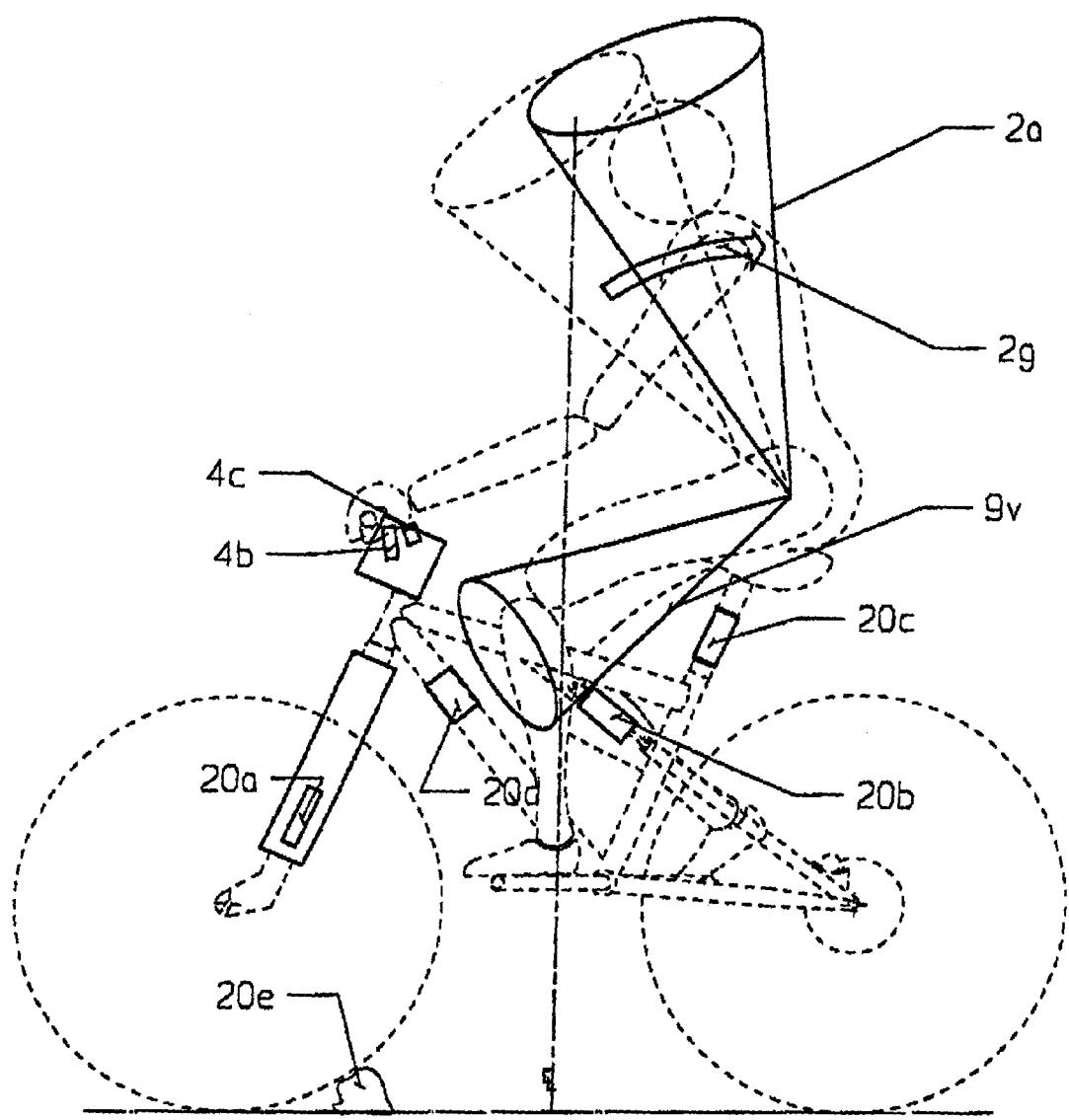
FIG. 22 is the side elevation view of human seated on bicycle back to the original position after encountering the obstacle.

FIG. 22 is the side elevation view of human seated on bicycle back to the original position after encountering the obstruction 20e. The C/G shift system controller 4b receives signals from the C/G shift sensor 4c regarding the mass shift 2g is now in a backward direction. The C/G shift system controller 4c sends a signal to one or multiple suspension devices 20a, 20b, 20c, and 20d introduced in FIG. 20 to compensate for the shift. The suspension devices are relaxed or stiffened to compensate for the mass shift 2g force and direction.

Figure 23:
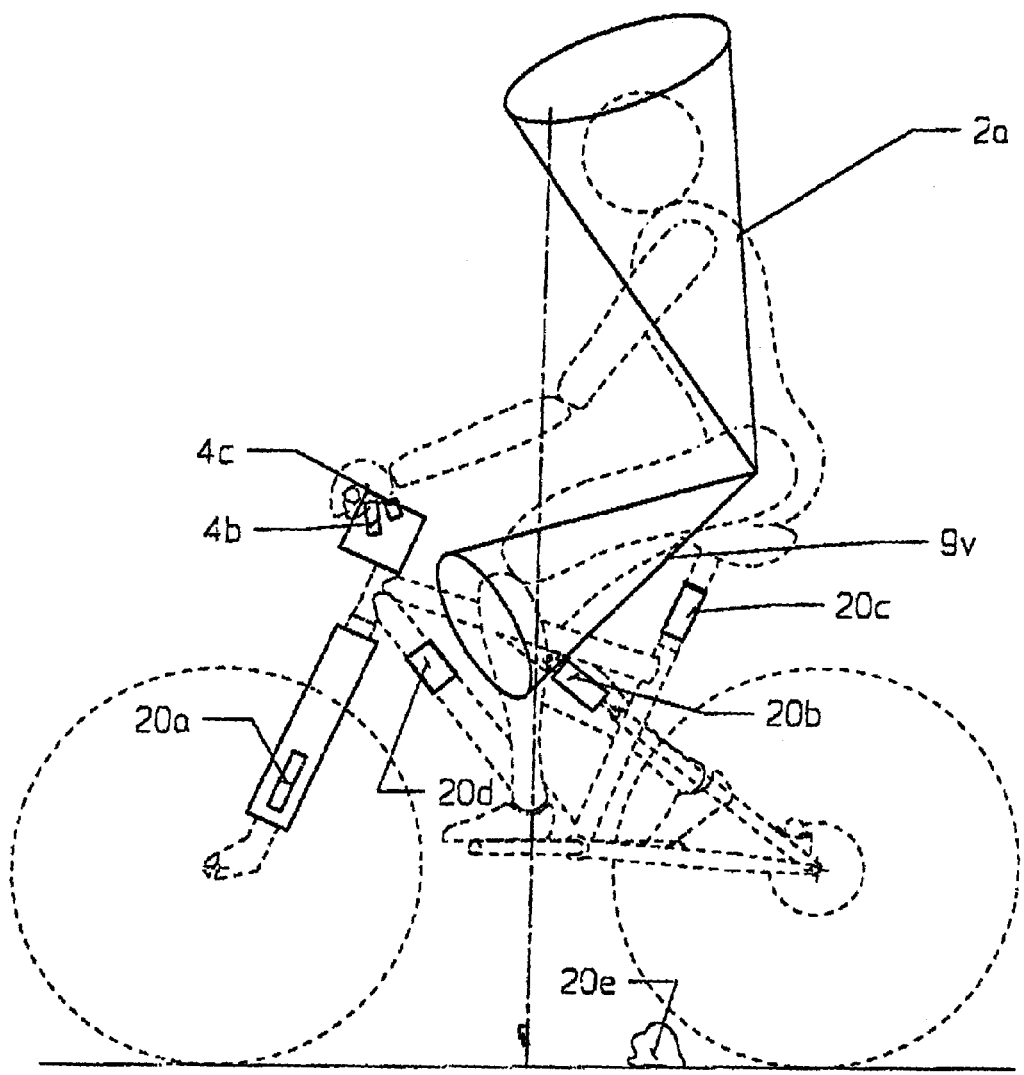
FIG. 23 is the side elevation view of a human seated on bicycle moving forward and the rear tire approaches an obstacle.

FIG. 23 is the side elevation view of a human seated on bicycle moving forward and the rear tire approaches an obstacle.

Figure 24:
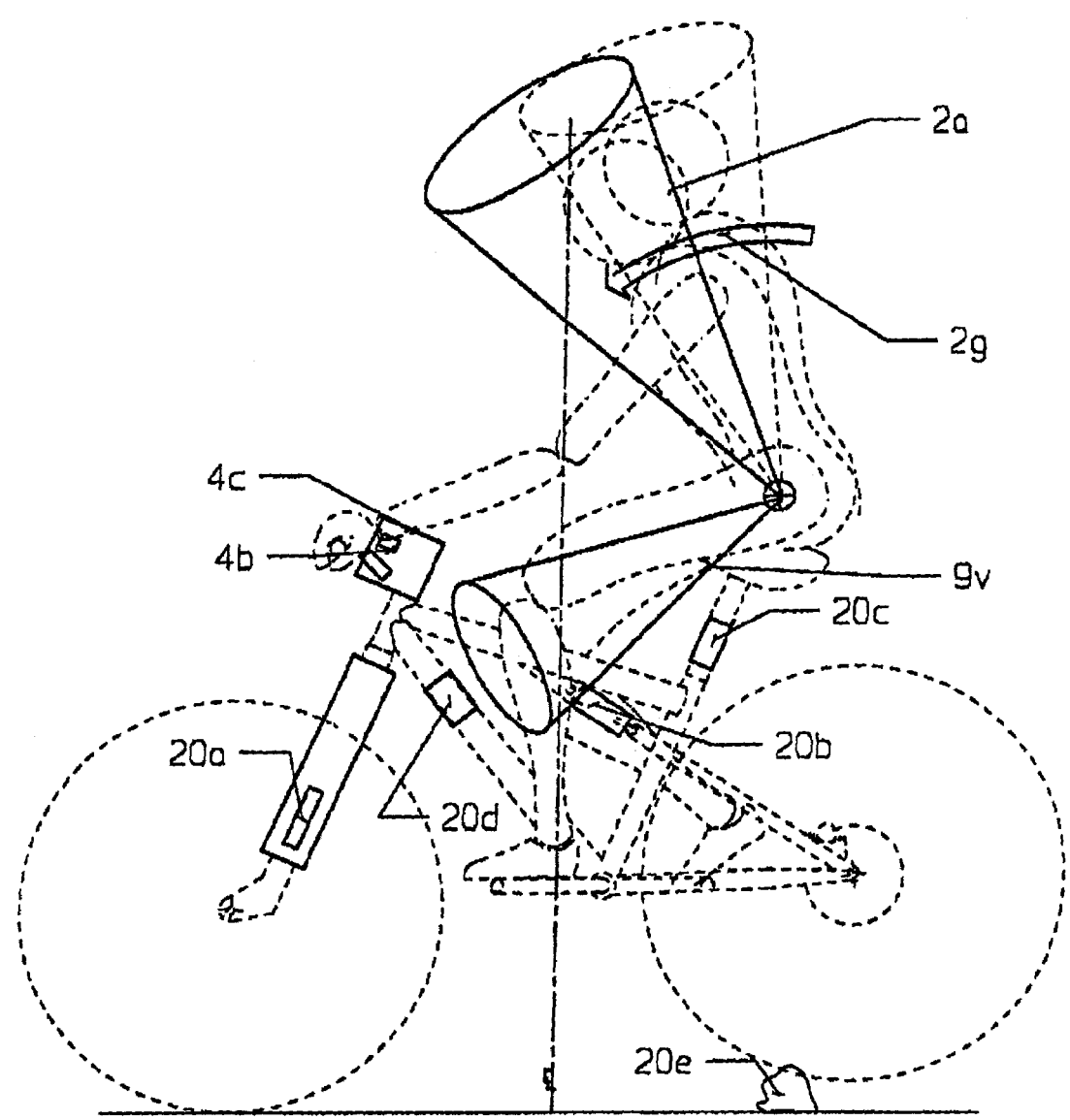
FIG. 24 is the side elevation view of the shift of the upper torso of a human seated on a bicycle when the rear tire encounters an obstacle.

FIG. 24 is the side elevation view of the shift of the upper torso of a human seated on a bicycle when the rear tire encounters an obstacle.

Figure 25:
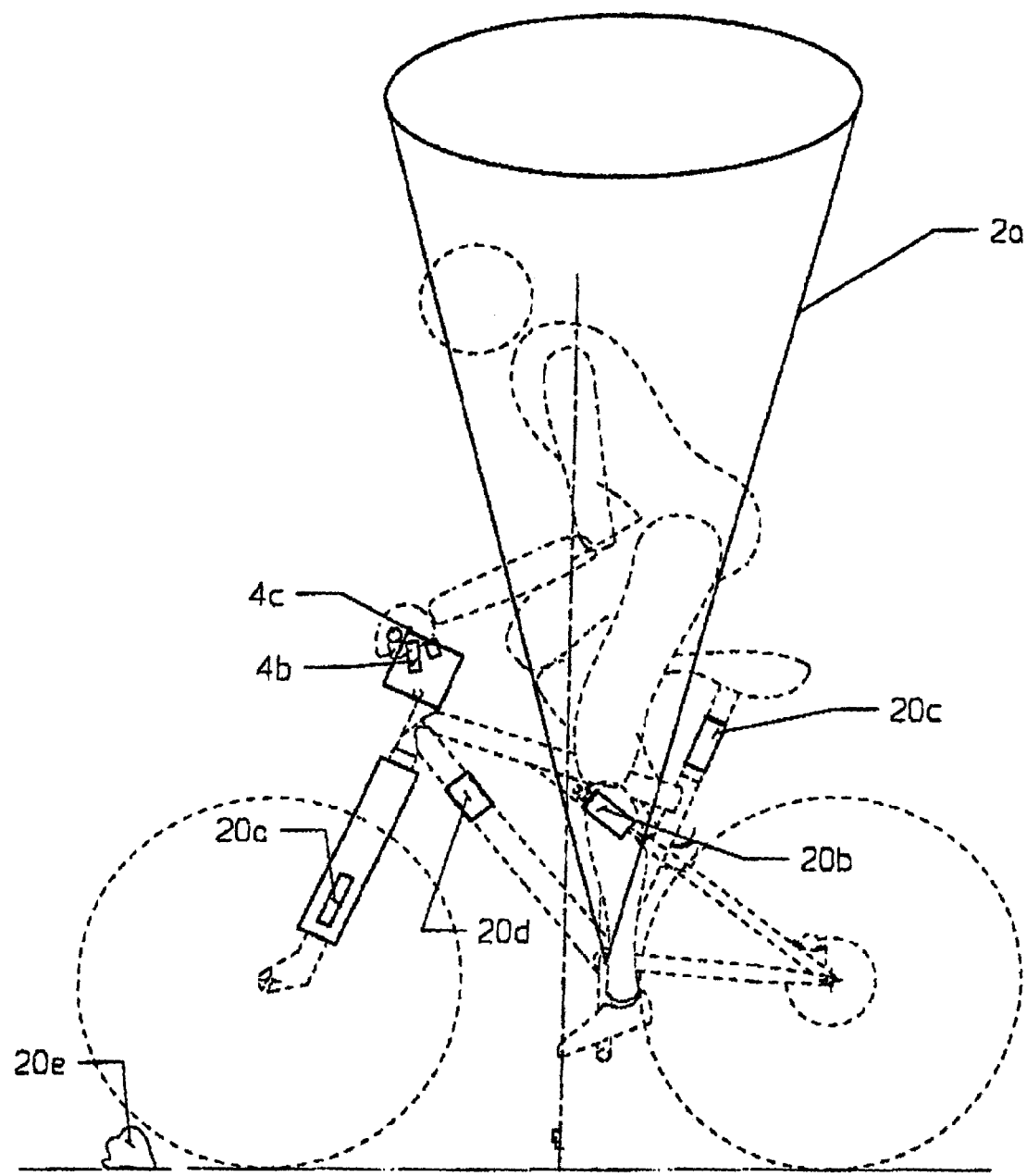
FIG. 25 is the side elevation view of human standing on a bicycle before encountering an obstruction and the position of the upper torso.

FIG. 25 is the side elevation view of human standing on a bicycle before encountering an obstruction and the position of the upper torso.

Figure 26:
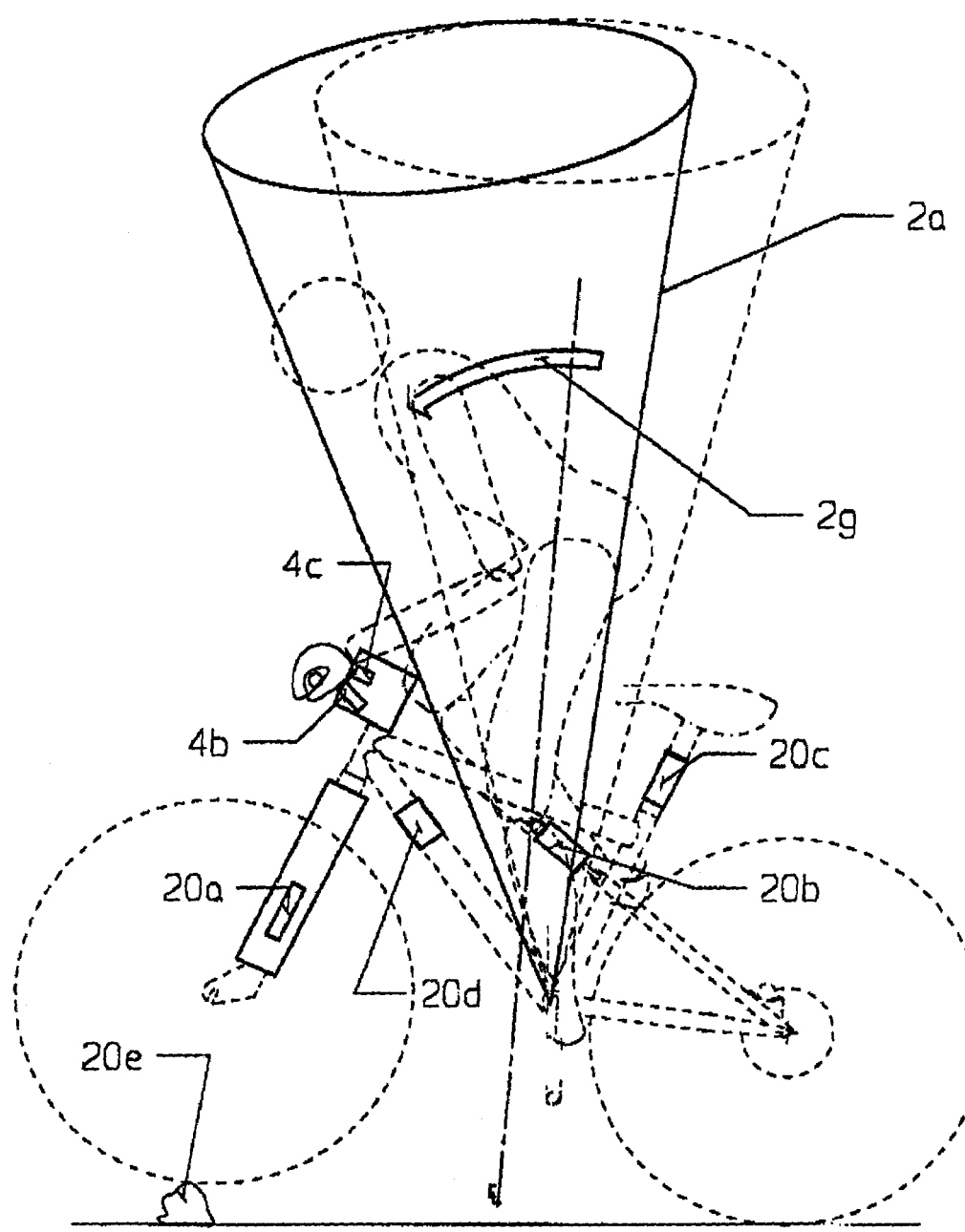
FIG. 26 is the side elevation view of human standing on a bicycle encountering an obstruction and the resulting shift forward of the upper torso.

FIG. 26 is the side elevation view of human standing on a bicycle encountering an obstruction and the resulting shift forward of the upper torso.

Figure 27:
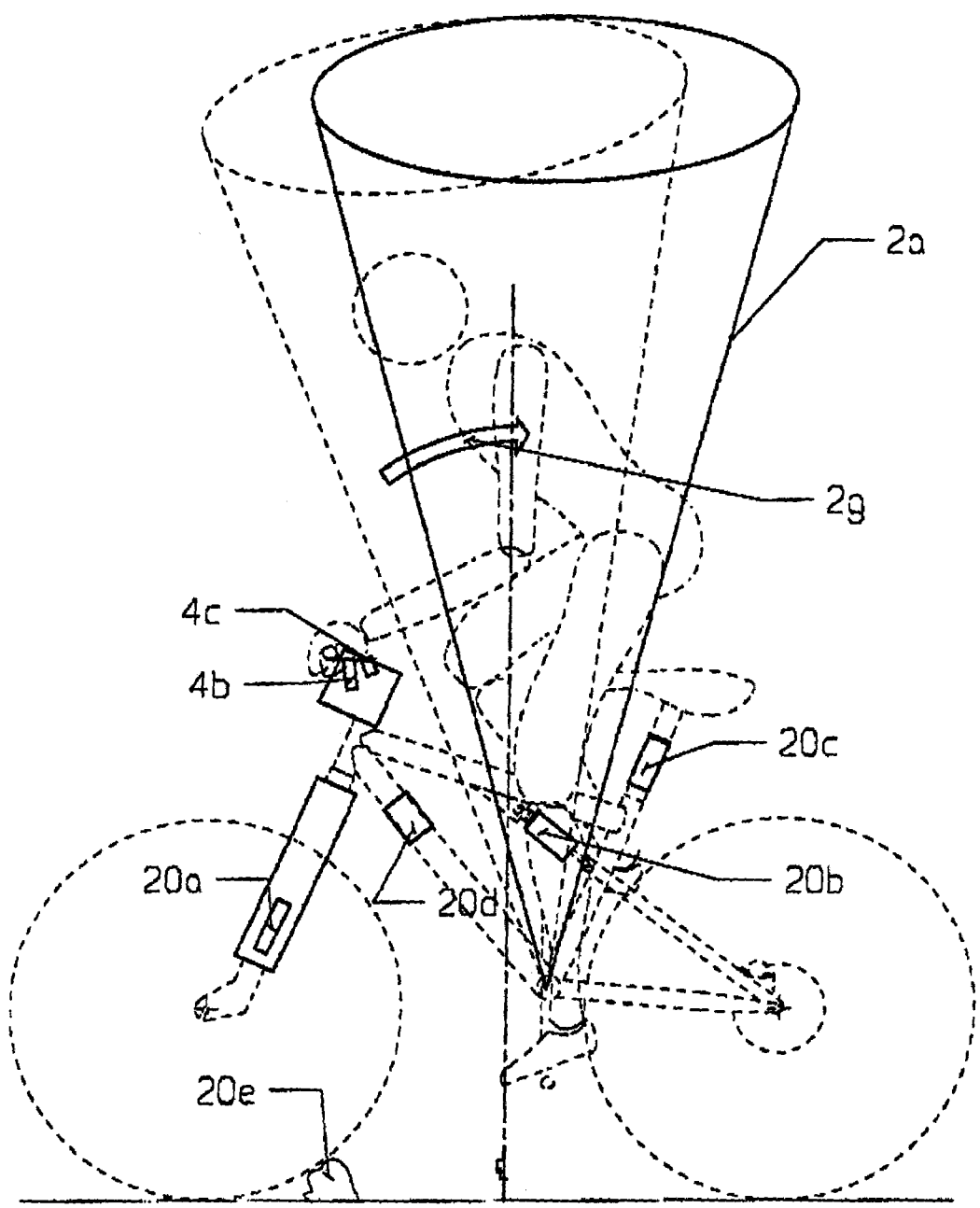
FIG. 27 is the side elevation view of human standing on bicycle back to the original position after encountering the obstacle.

FIG. 27 is the side elevation view of human standing on bicycle back to the original position after encountering the obstacle.

Figure 28:
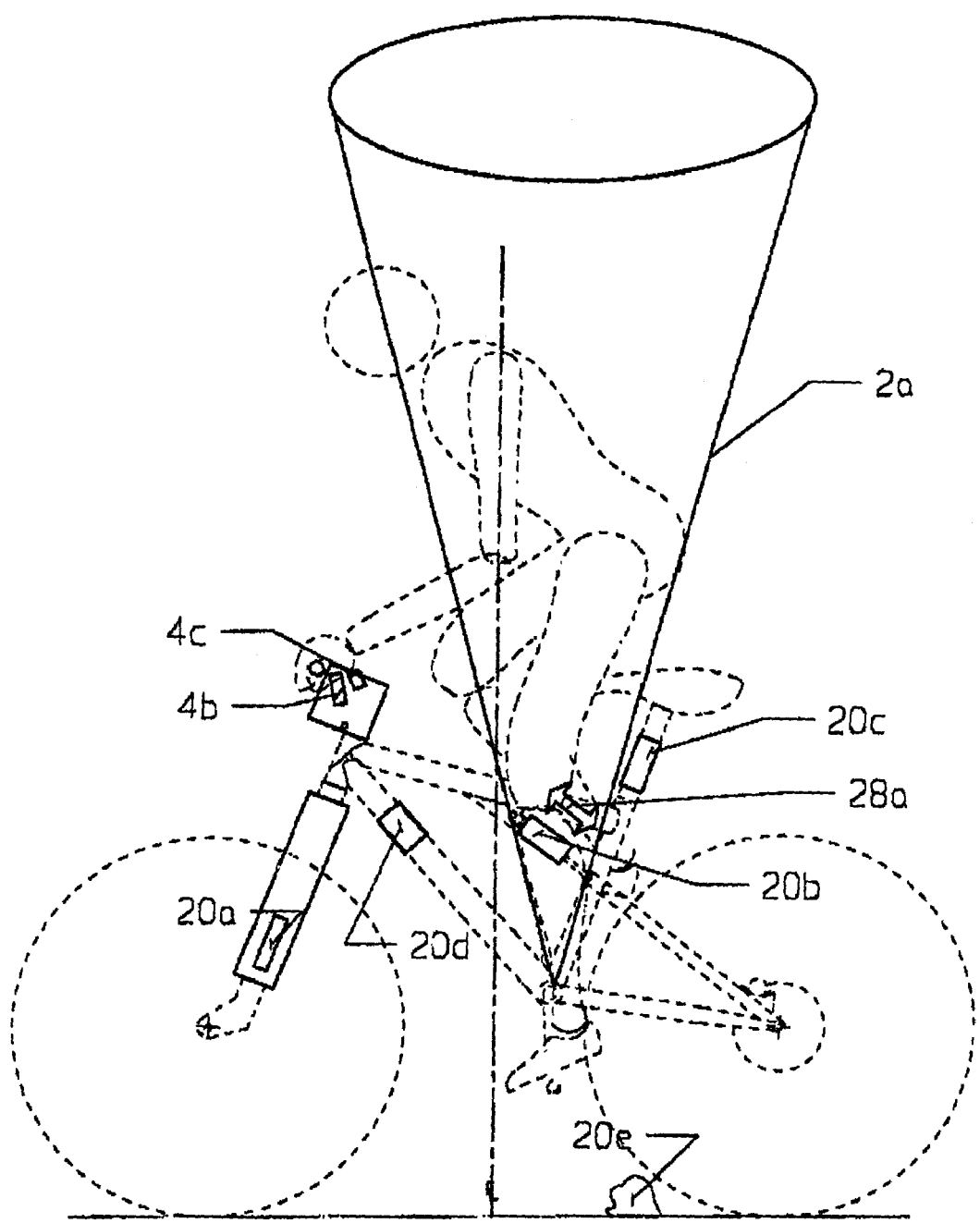
FIG. 28 is the side elevation view of a human standing on bicycle moving forward and the rear tire approaches an obstacle.

FIG. 28 is the side elevation view of a human standing on bicycle moving forward and the rear tire approaches an obstacle.

Figure 29:
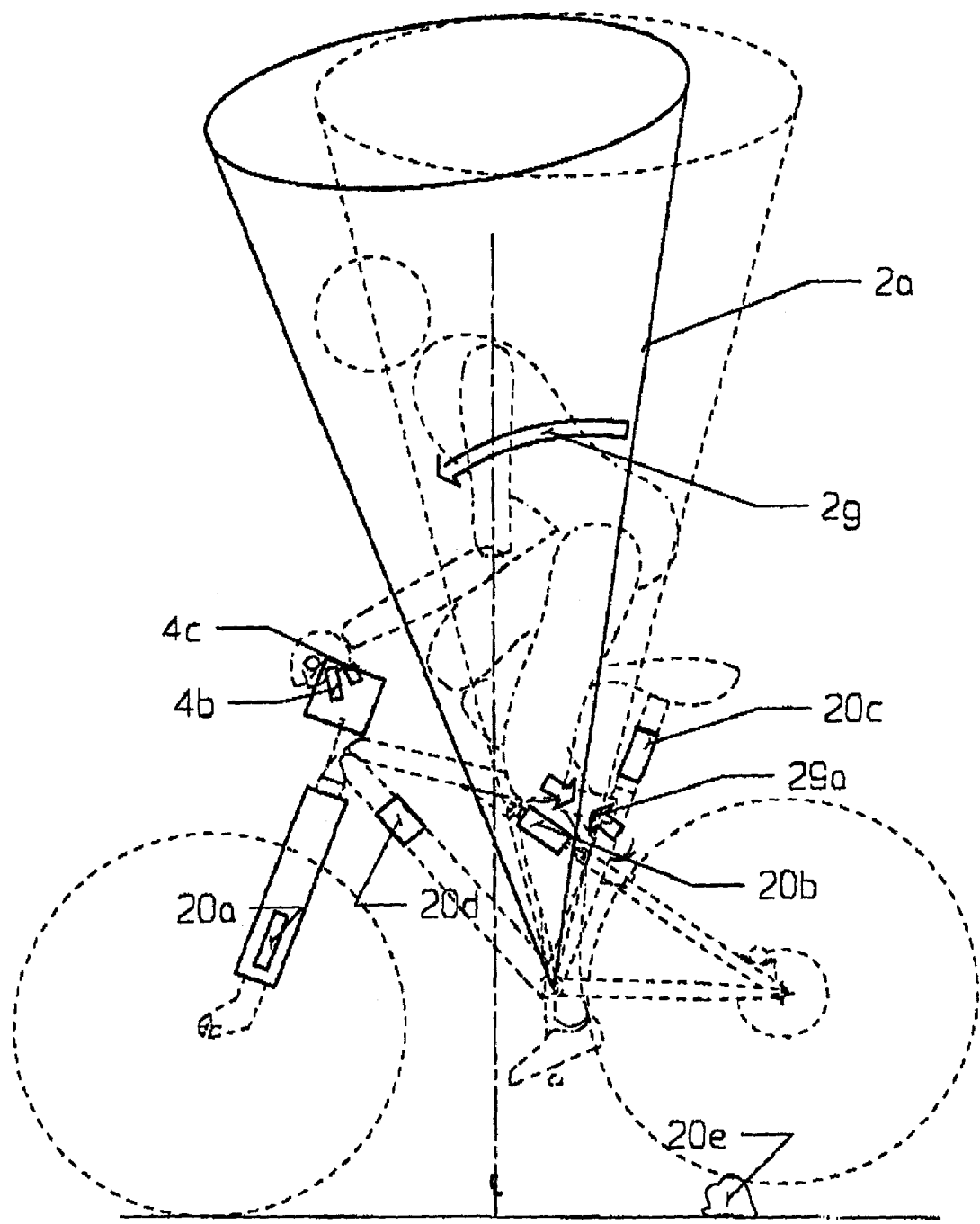
FIG. 29 is the side elevation view of the shift of the upper torso of a human standing on a bicycle when the rear tire encounters an obstacle.

FIG. 29 is the side elevation view of the shift of the upper torso of a human standing on a bicycle when the rear tire encounters an obstacle 30e.

Figure 30:
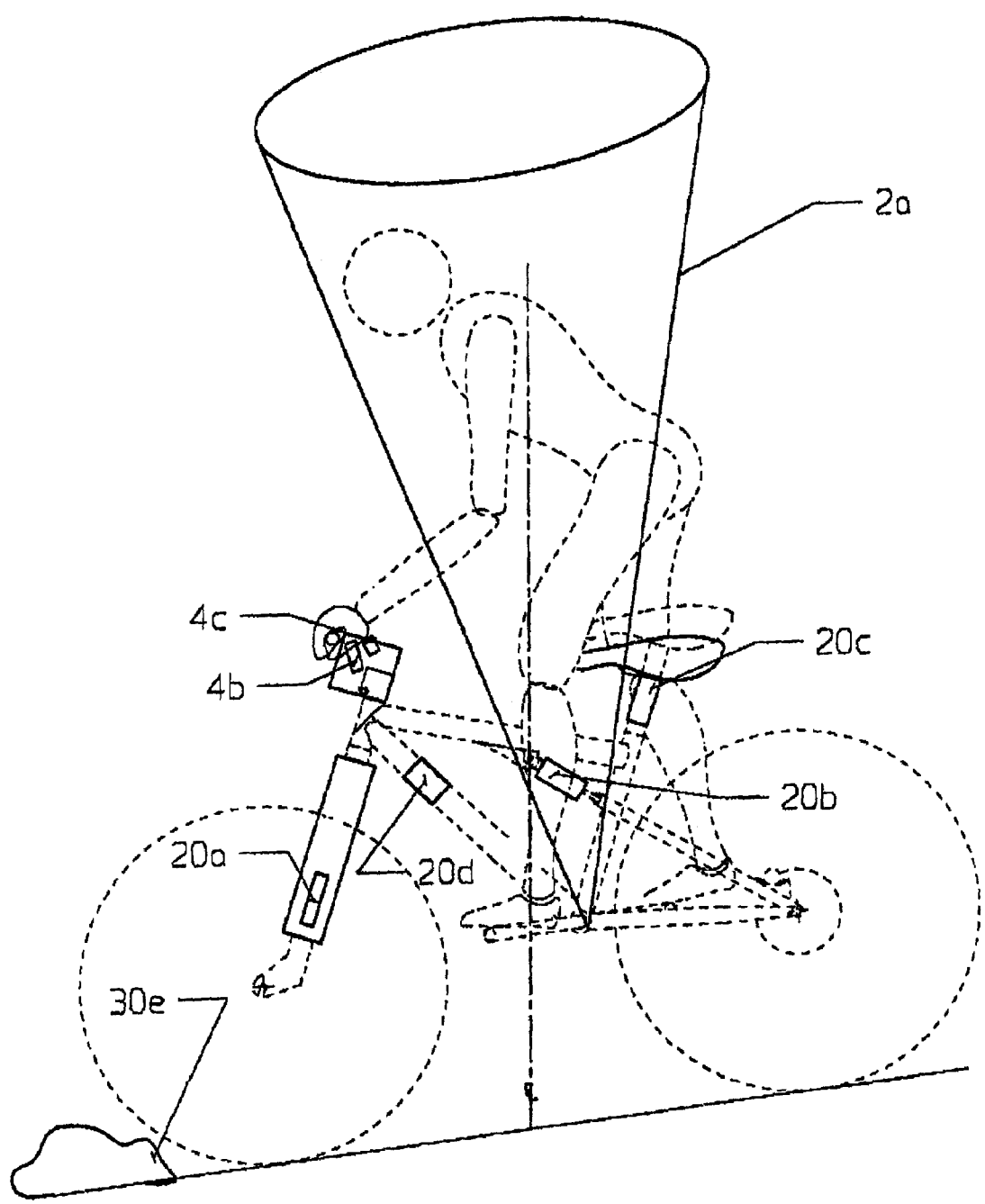
FIG. 30 is the side elevation view of a human standing on a bicycle with feet level before encountering an obstruction and the position of the upper torso.

FIG. 30 is the side elevation view of a human standing on a bicycle with feet level before encountering an obstruction and the position of the upper torso.

Figure 31:
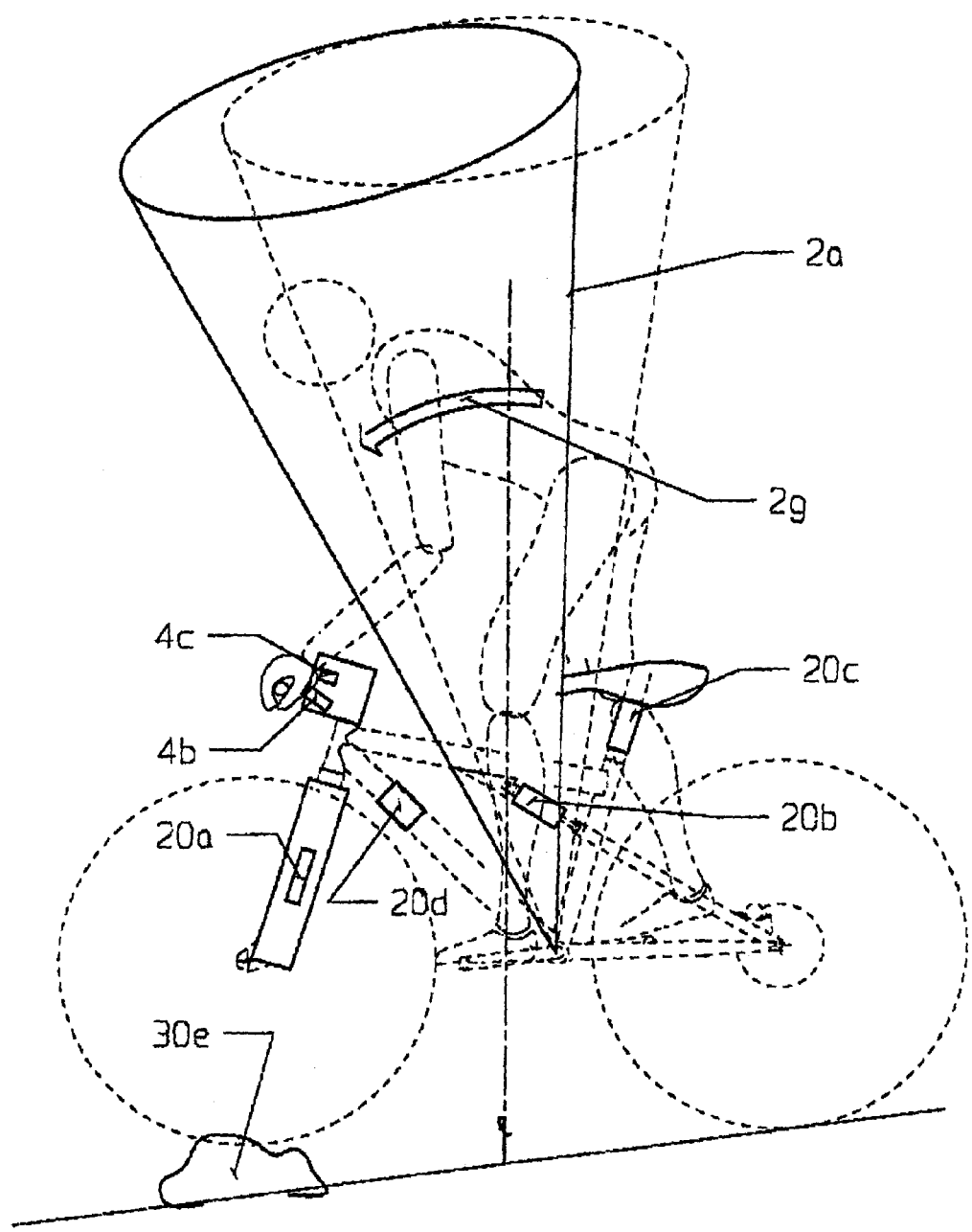
FIG. 31 is the side elevation view of a human standing on a bicycle encountering a large obstruction and the required suspension action to prevent forward shift of the upper torso.

FIG. 31 is the side elevation view of a human standing on a bicycle encountering a large obstruction 30e and the required suspension action to prevent forward shift of the upper torso.

Figure 32:
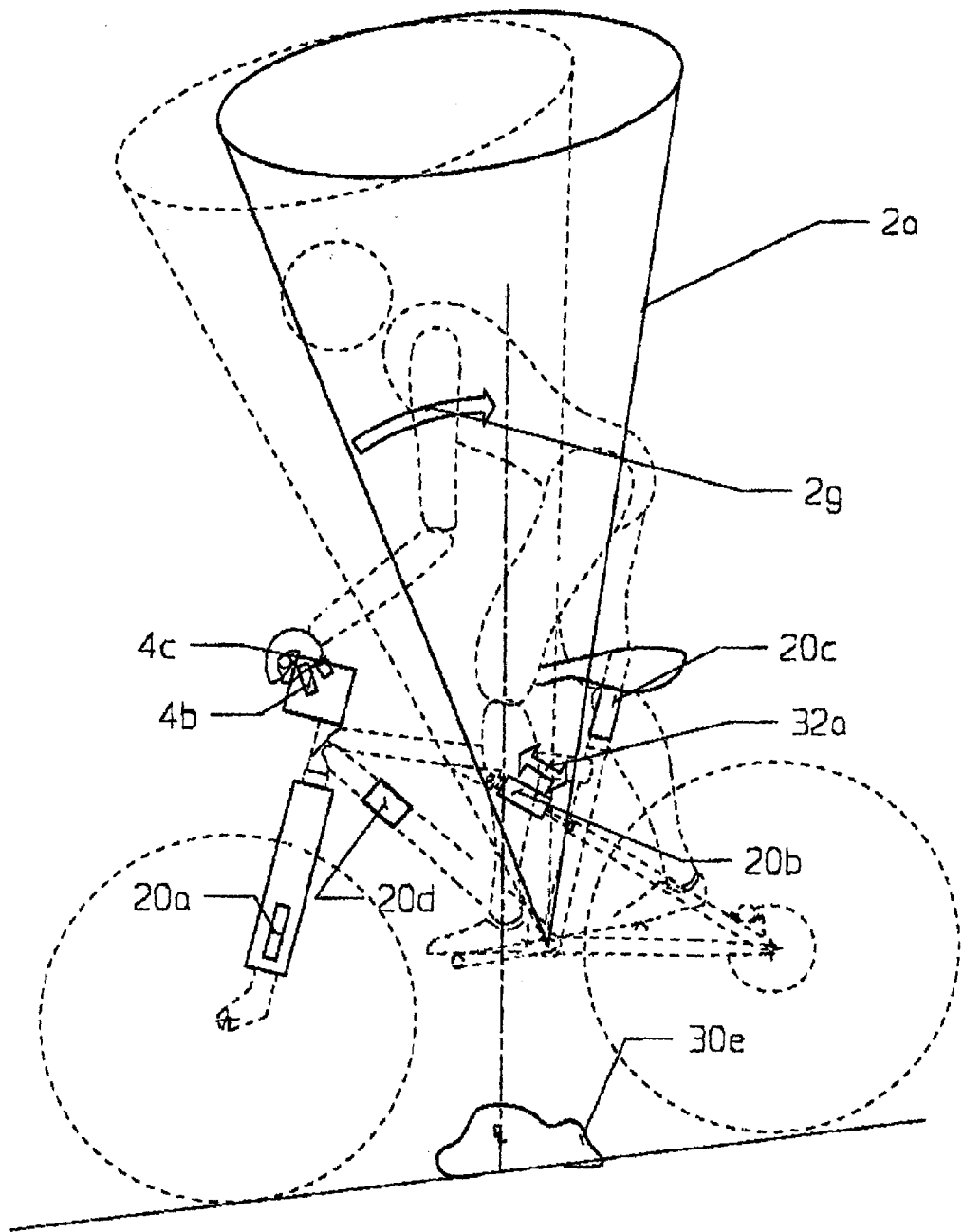
FIG. 32 is the side elevation view of a human standing on a bicycle with the rear suspension extending prior to the rear wheel encountering the obstacle.

FIG. 32 is the side elevation view of a human standing on a bicycle with the rear suspension extending prior to the rear wheel encountering the obstacle 30e.

Figure 33:
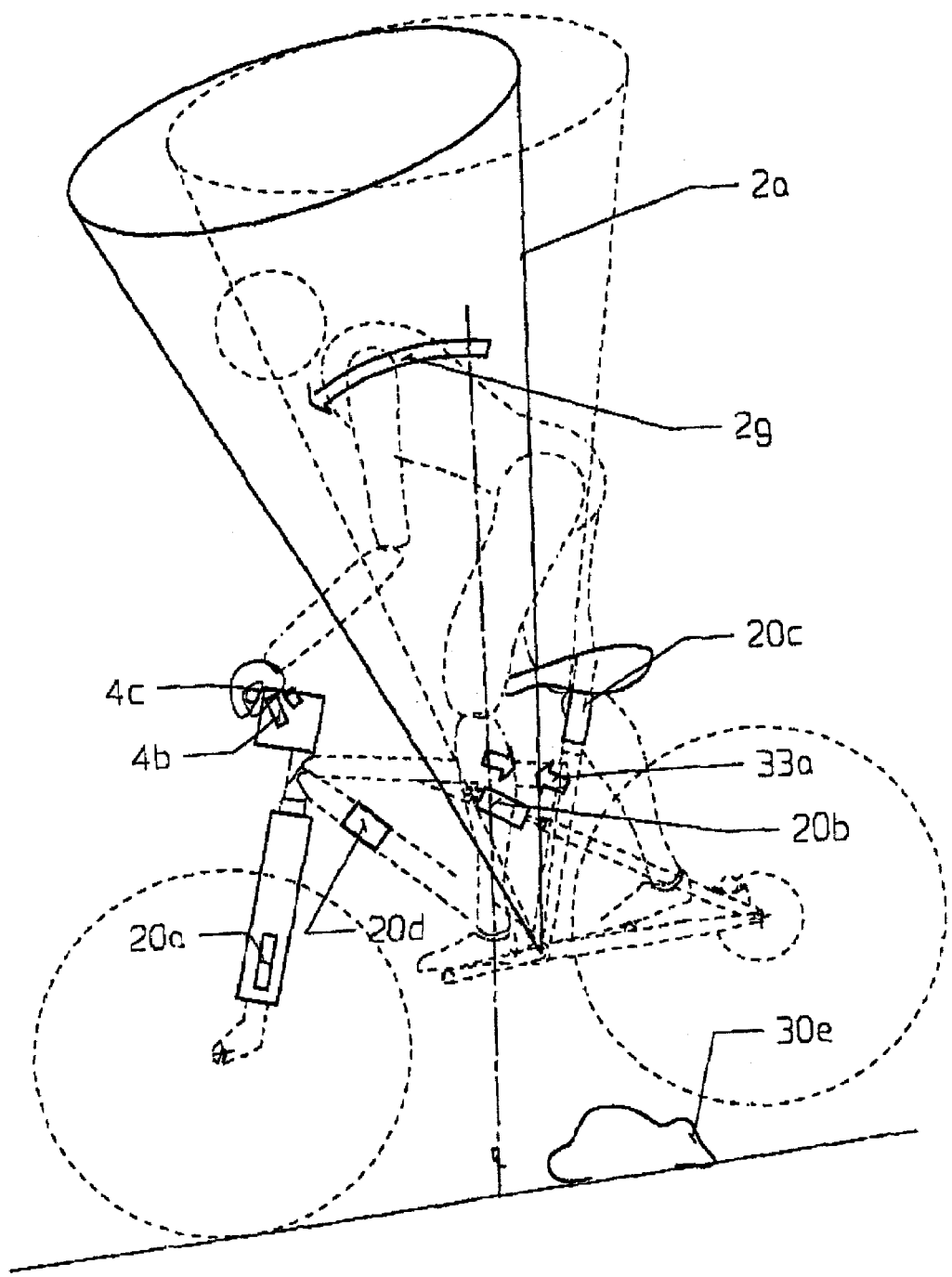
FIG. 33 is the side elevation view of a human standing on a bicycle with the rear suspension compressing as the rear tire encounters an obstacle.

FIG. 33 is the side elevation view of a human standing on a bicycle with the rear suspension compressing as the rear tire encounters an obstacle 30e.

Figure 34:
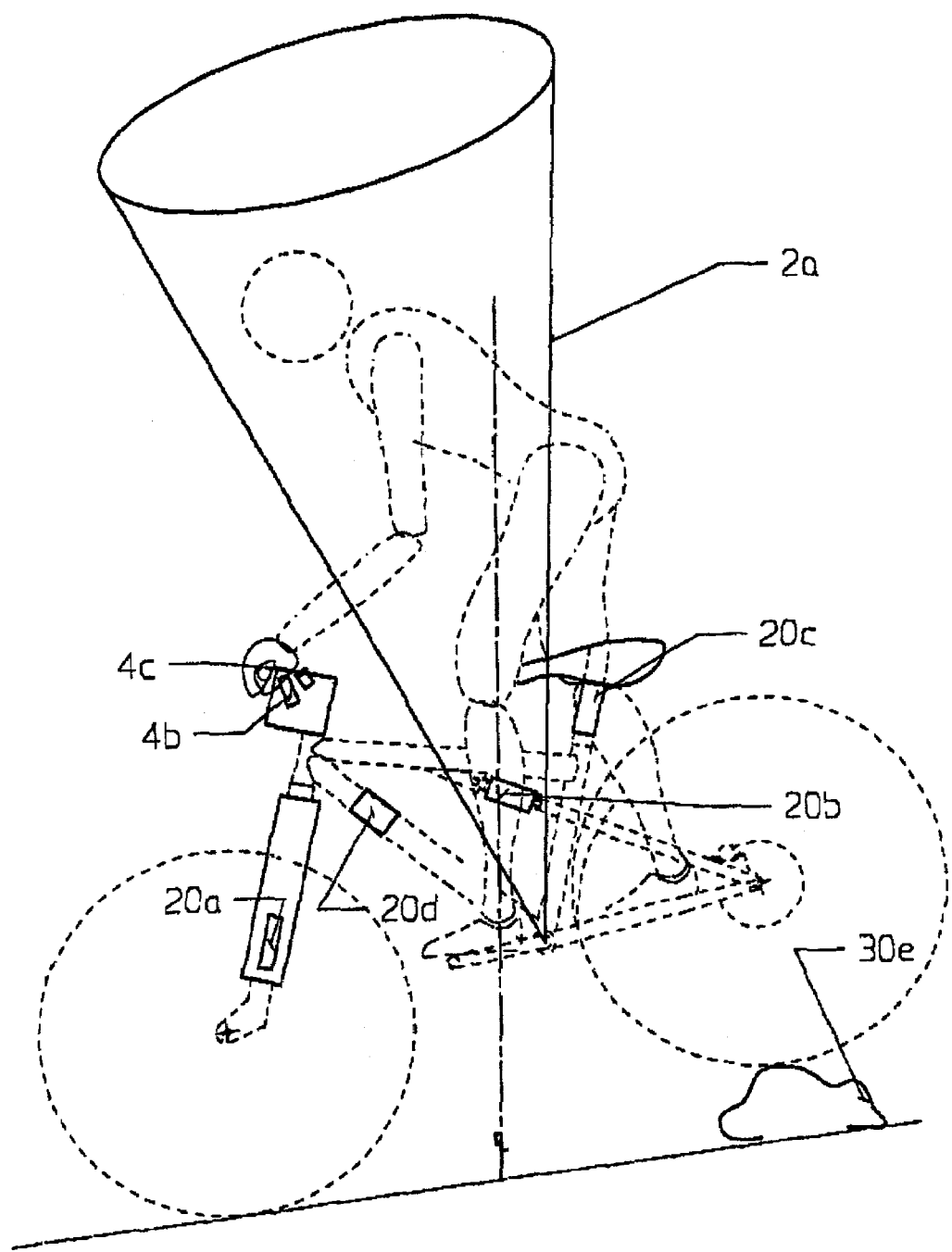
FIG. 34 is the side elevation view of a human standing on a bicycle with the rear tire on top of the obstacle.

FIG. 34 is the side elevation view of a human standing on a bicycle with the rear tire on top of an obstacle 30e.

Figure 35:
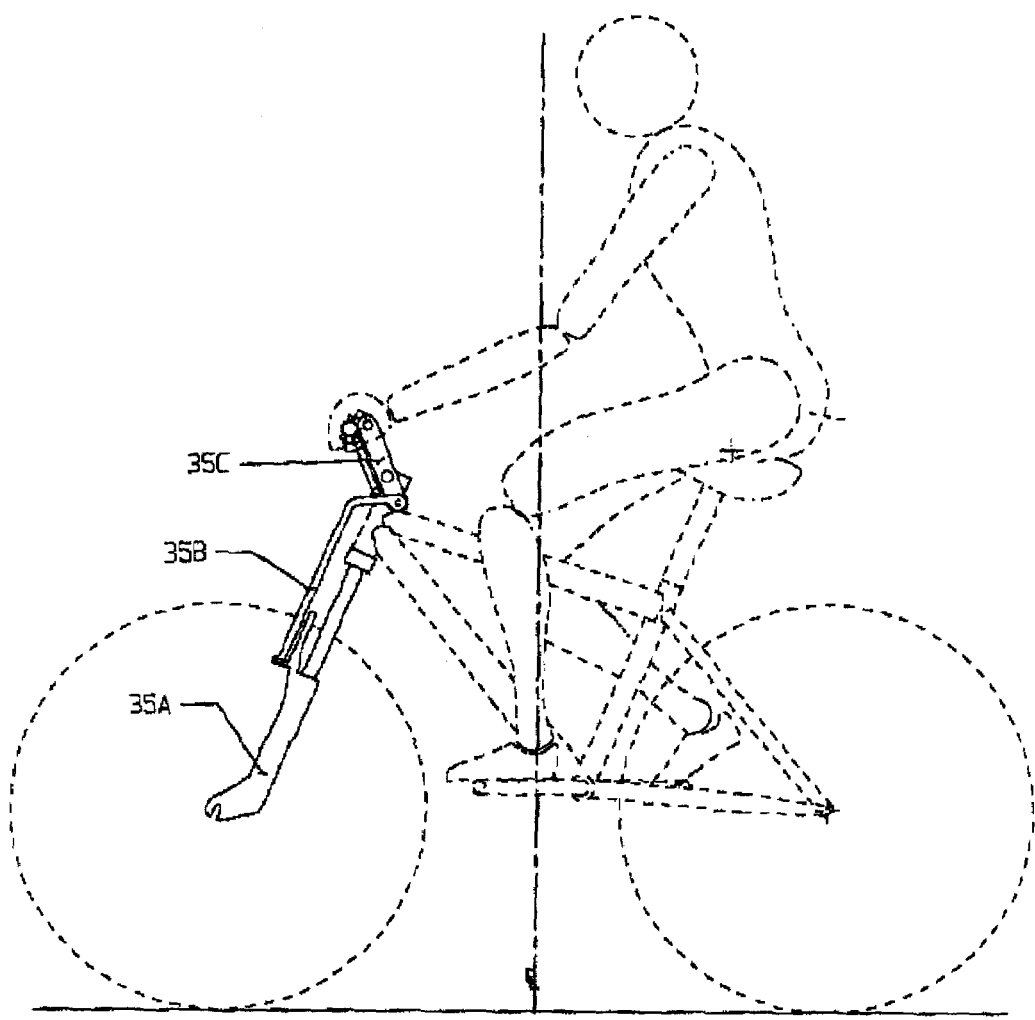
FIG. 35 is the side elevation view of a human sitting on a bicycle with the representation of a prior art front suspension combined with a modified C/G control system stem and linkage arm.

FIG. 35 is the side elevation view of a human sitting on a bicycle with the representation of a prior art bicycle front suspension assembly 35A connected to a modified stem C/G shift control system assembly 35C by an adapter linkage arm 35B. The adapter linkage arm 35B provides the C/G shift control system 35C to be effectively adapted to the prior art front suspension assembly. When the rider shown in FIG. 35 shifts his or her position forward, as shown in FIG. 36, the C/G shift control system assembly 35c actuates adaptor linkage arm 35b and the front suspension assembly 35a is compressed.

Figure 36:
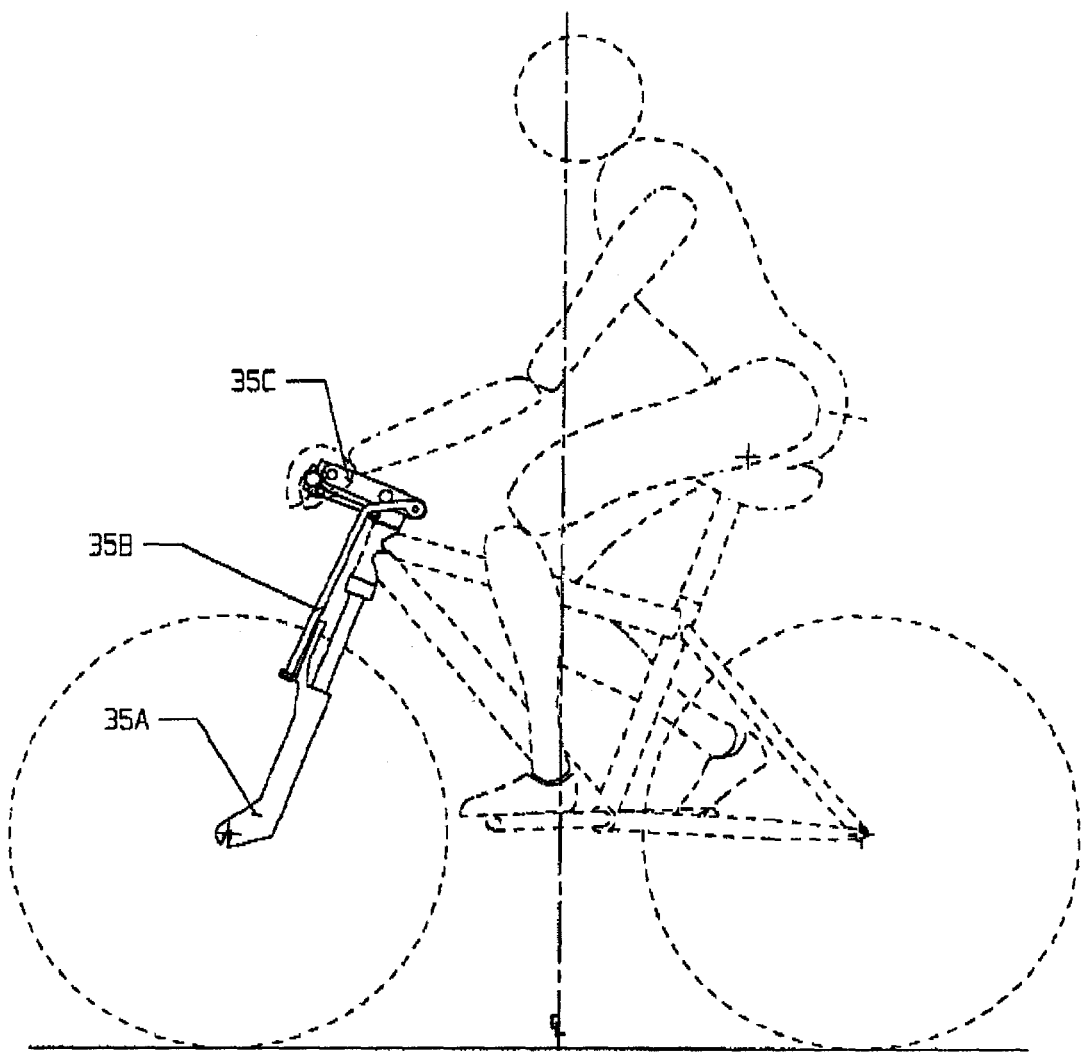
FIG. 36 is the side elevation view of a human sitting on a bicycle with the representation of a prior art front suspension combined with a modified C/G control system stem and linkage arm in a compressed position.

FIG. 36 is the side elevation view of a human sitting on a bicycle with the embodiment of FIG. 35 in a compressed position absorbing a forward C/G and mass shift of the human.

Figure 37:
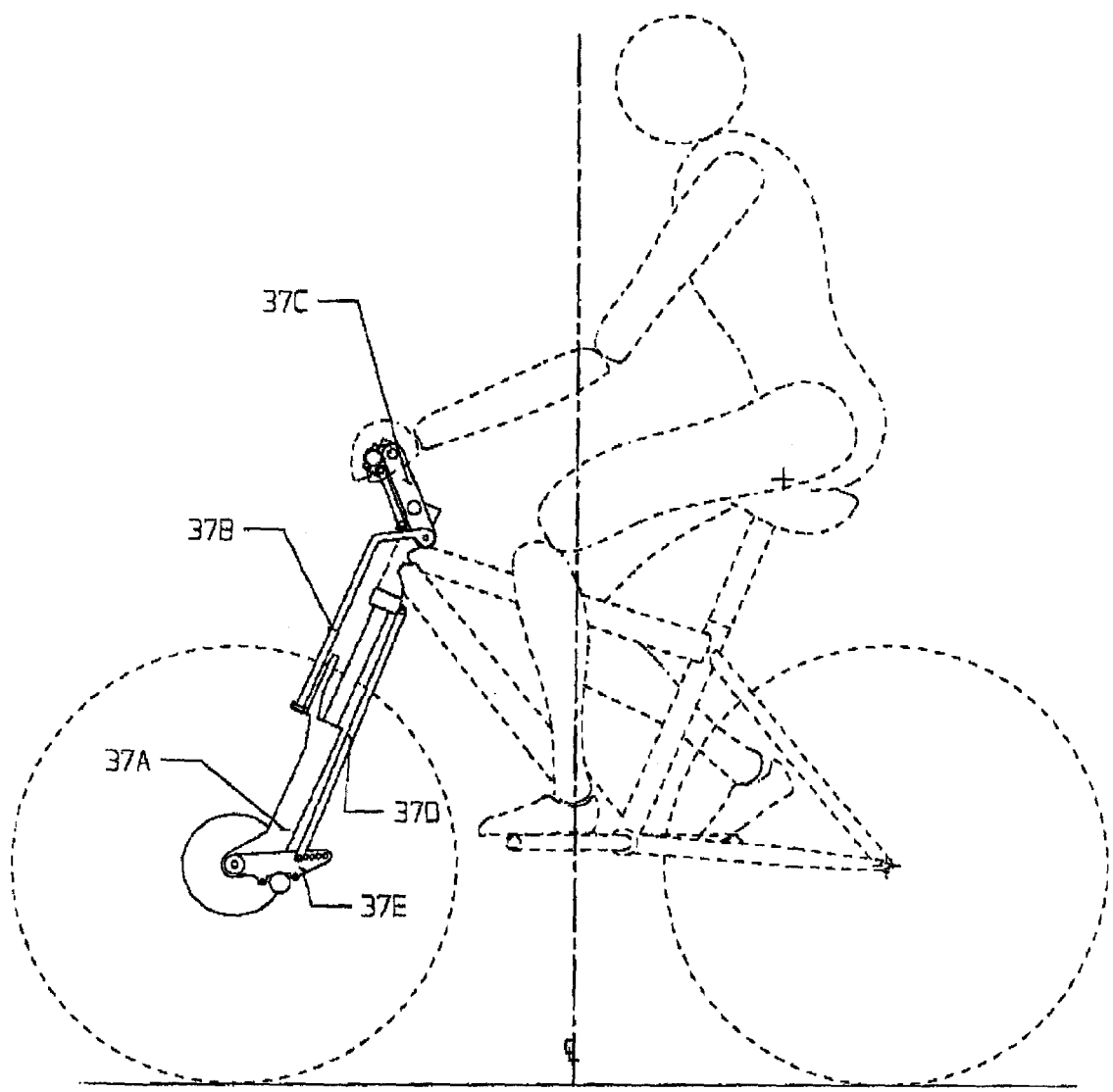
FIGS. 37-38 are the side elevation views of a human sitting on a bicycle with the representation of a prior art front suspension combined with a modified stem C/G control system assembly, front linkage arm, and a brake energy transfer linkage assembly.
Figure 38:
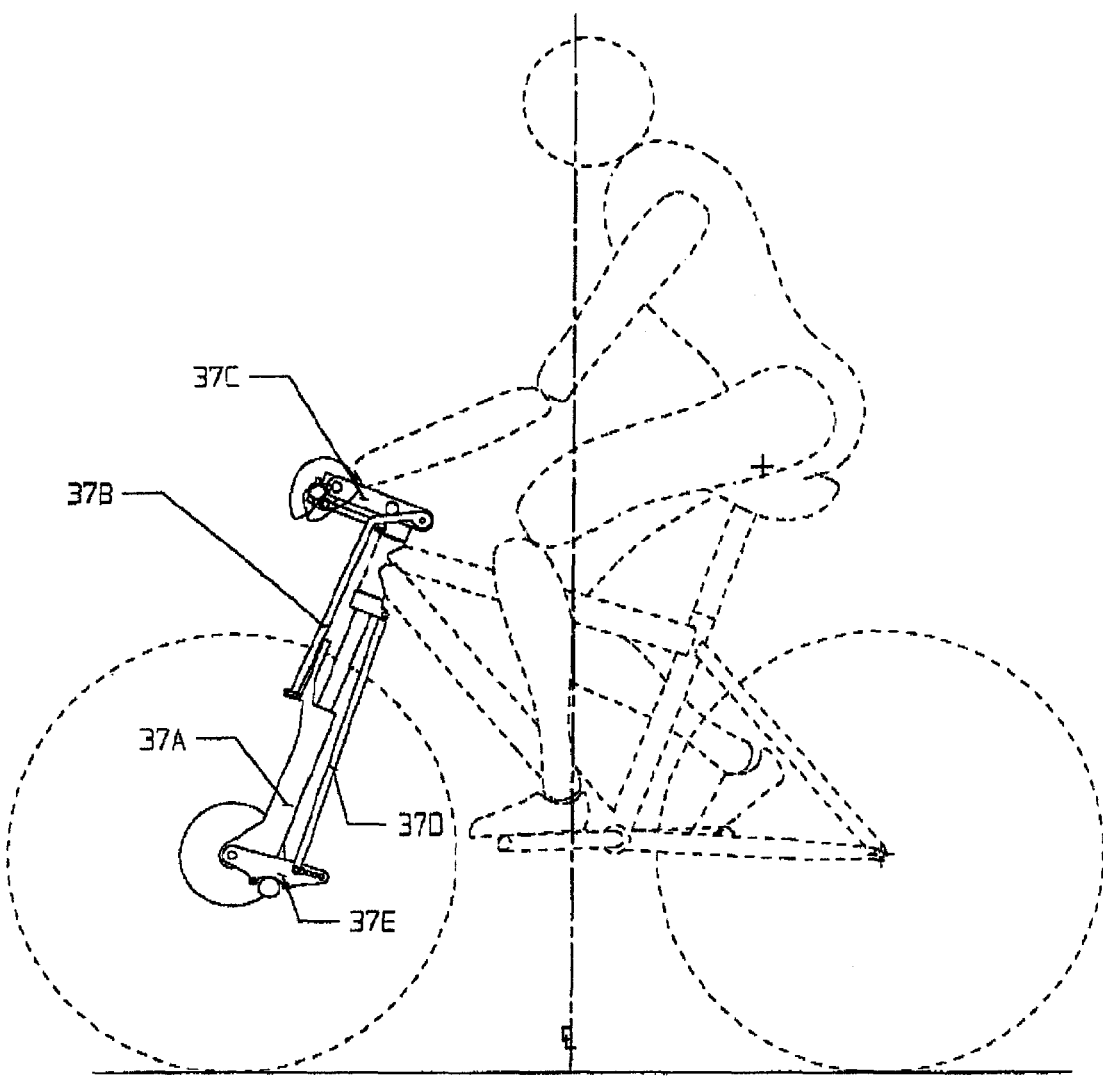

FIGS. 37-38 are the side elevation views of a human sitting on a bicycle with the representation of a prior art bicycle front suspension assembly 37A connected to a an arrangement of the embodiment stem C/G shift control system assembly 37C by a front linkage adapter arm 37B. The brake energy transfer adapter rod 37D is connected on the upper end to the C/G shift control system assembly 37C and on the bottom end to a brake linkage assembly 37E. The brake energy transfer adapter rod 37D and brake linkage assembly 37E convert the vehicle kinetic energy generated by the braking function to assist the spring rate of the C/G shift control system assembly 37C. The brake linkage assembly 37E multiple mounting holes provide for variability for the brake energy transfer adapter rod adjustable spring rate settings for the modified stem C/G shift control system assembly 37C to utilize.

FIG. 38 is the side elevation view of the embodiment of FIG. 37 in a compressed position. The C/G and mass shift of the rider has compressed the suspension and resulted in a higher spring rate to compensate for the forward shift.

Figure 39:
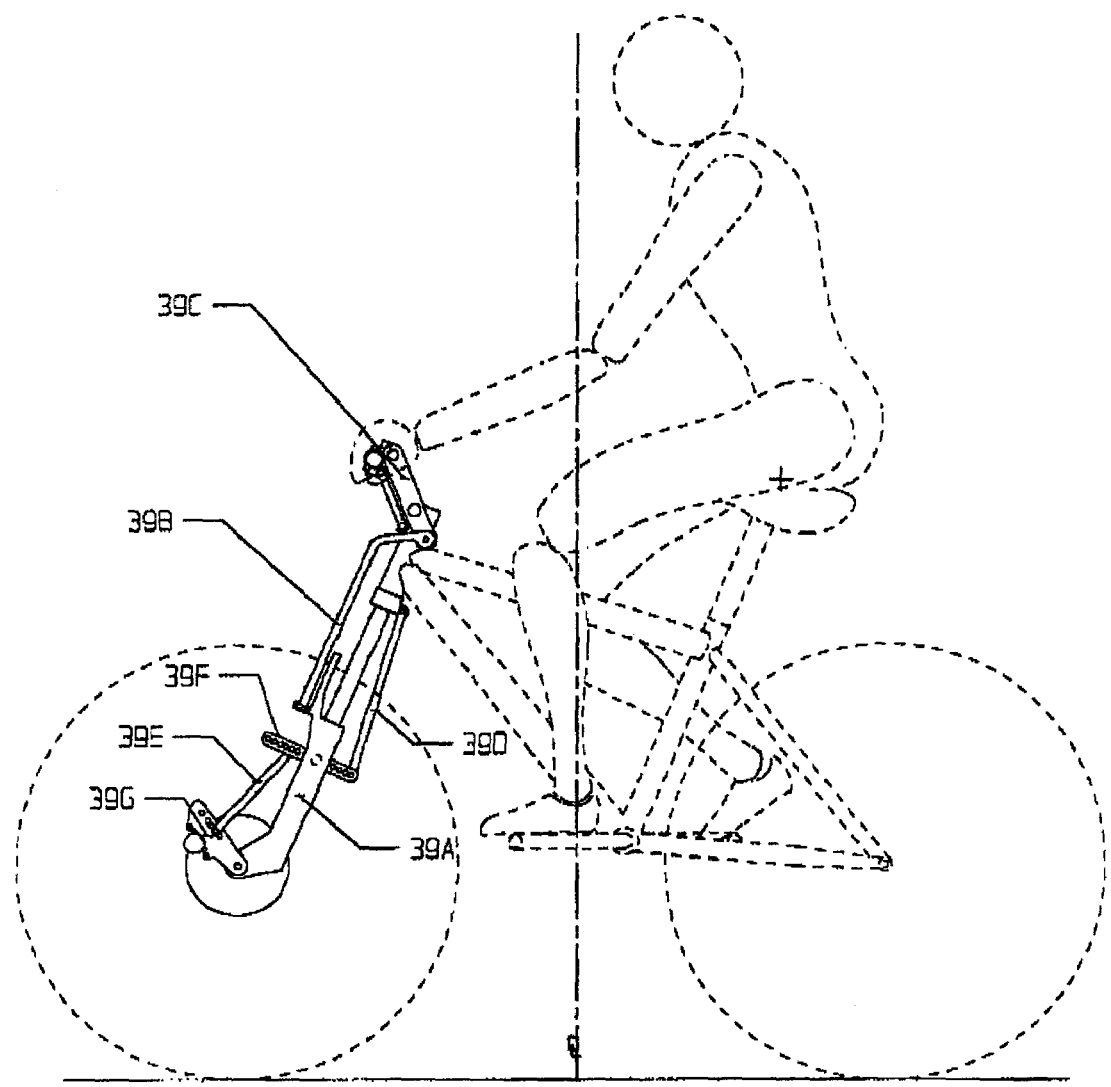
FIGS. 39-40 are the side elevation views of a human sitting on a bicycle with the representation of a prior art front suspension combined with a modified stem C/G control system assembly, front linkage arm assembly, and a brake energy transfer linkage assembly.
Figure 40:
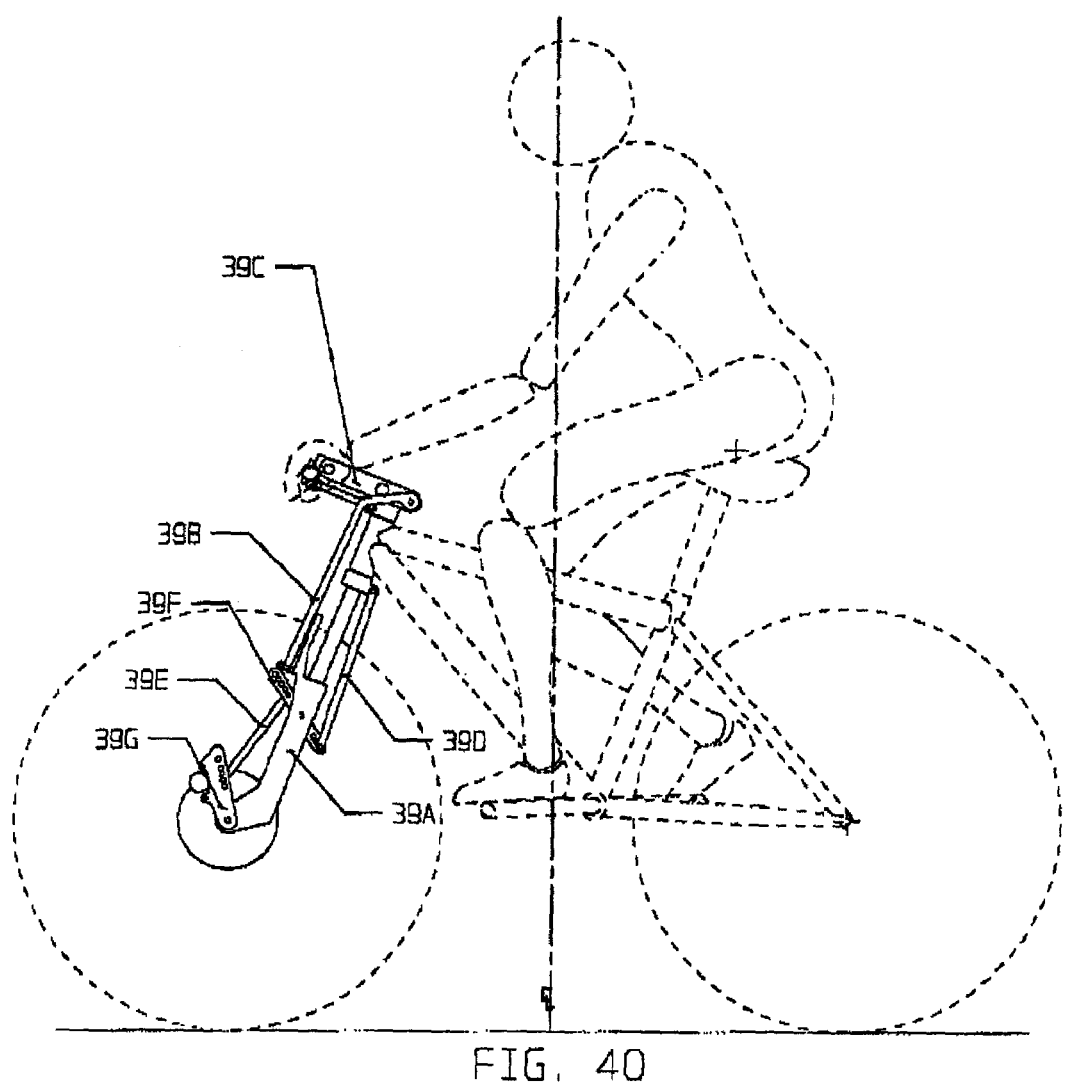

FIGS. 39-40 are the side elevation views of a human sitting on a bicycle with the representation of a prior art bicycle front suspension assembly 39A connected to a modified stem C/G shift control system assembly 39C by a front linkage adapter arm 39B. The upper brake energy transfer adapter rod 39D is connected on the upper end to the modified stem C/G shift control system assembly 39C and on the bottom end to a linkage bar assembly 39F. The lower brake energy transfer adapter rod 39E is connected at the upper end to the linkage adapter bar assembly 39F and at the lower end to brake linkage assembly 39G. The linkage bar assembly 39F combined with the upper and lower brake energy transfer bars, 39D and 39E respectively, convert the vehicle kinetic energy generated by the braking function to assist in increasing the spring rate of the front suspension assembly 39A. The multiple mounting holes on linkage adapter bar 39F provide for variability for the upper and lower brake energy transfer bars, 39D and 39E respectively, which provides for adjustable assists of the spring rate settings for the modified stem C/G shift control system assembly 39C to utilize.

FIG. 40 shows the embodiments of FIG. 39 in a compressed position. The C/G and mass shift of the rider has compressed the suspension and resulted in a higher spring rate to compensate for the forward shift.

Figure 41:
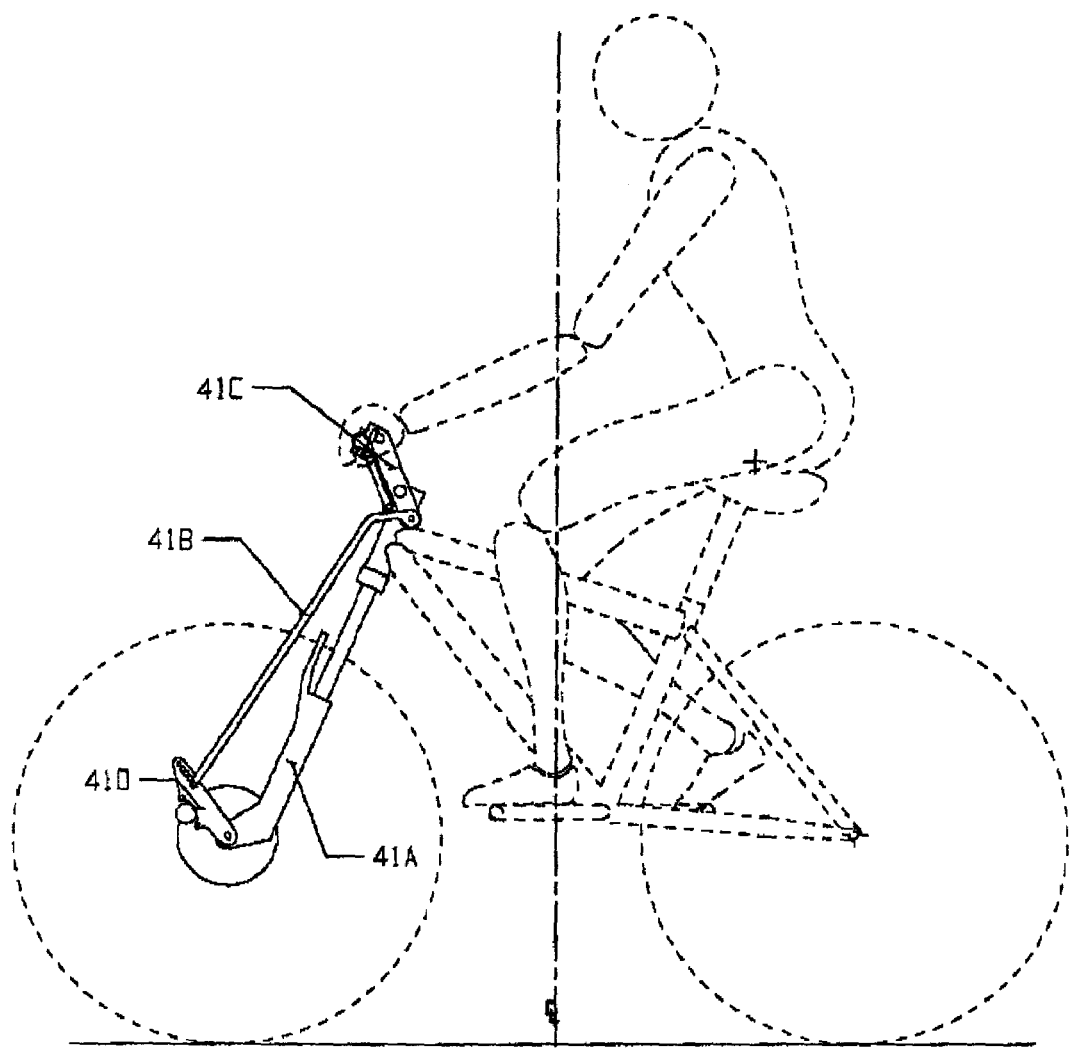
FIGS. 41-42 are the side elevation views of a human sitting on a bicycle with the representation of a prior art front suspension combined with a modified stem C/G control system assembly, front linkage arm, and a forward mounted brake energy transfer linkage assembly.
Figure 42:
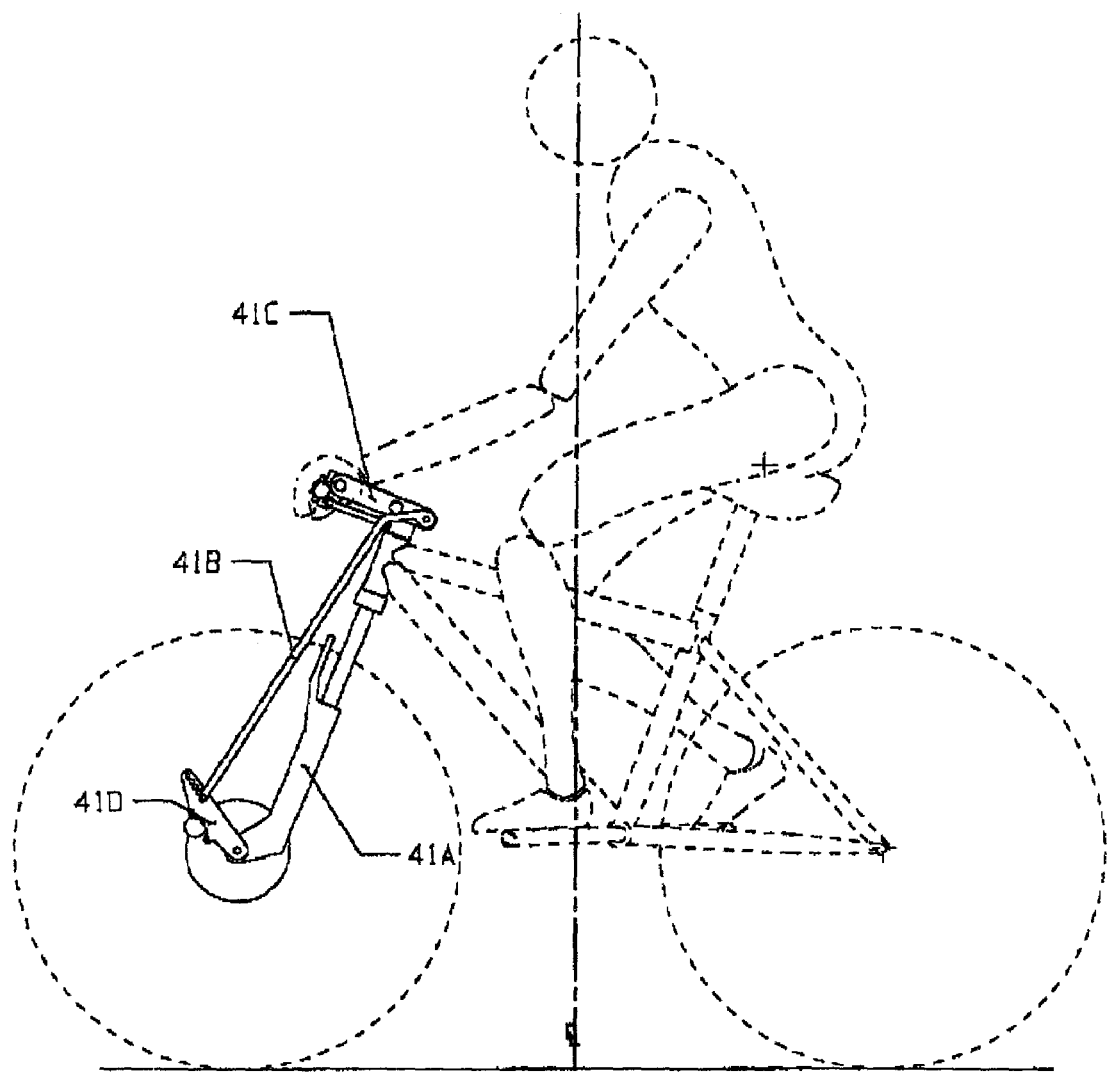

FIGS. 41-42 are the side elevation views of a human sitting on a bicycle with the representation of a prior art bicycle front suspension assembly 41A connected to a modified stem C/G shift control system assembly 41C by a front linkage arm 41B and a front mounted brake linkage assembly 41D. The front linkage arm 41B is pivotally connected on its upper end to the modified stem C/G shift control system assembly 41C (see FIG. 3A for details) and on the bottom end to brake linkage assembly 41D. The front linkage arm 41B and brake linkage assembly 41D convert the vehicle kinetic energy generated by the braking function to assist the increase of the spring rate of the front suspension assembly 41A. The brake linkage assembly 41D has variable mounting locations to allow ratio change to the front linkage arm 41B which provides adjustable rate settings for the modified stem C/G shift control system assembly 41C to utilize.

FIG. 42 shows the embodiments of FIG. 41 in a compressed position. The C/G and mass shift forward of the rider has compressed the front suspension assembly 41A and resulted in a higher spring rate to compensate for the forward shift.

Figure 43:
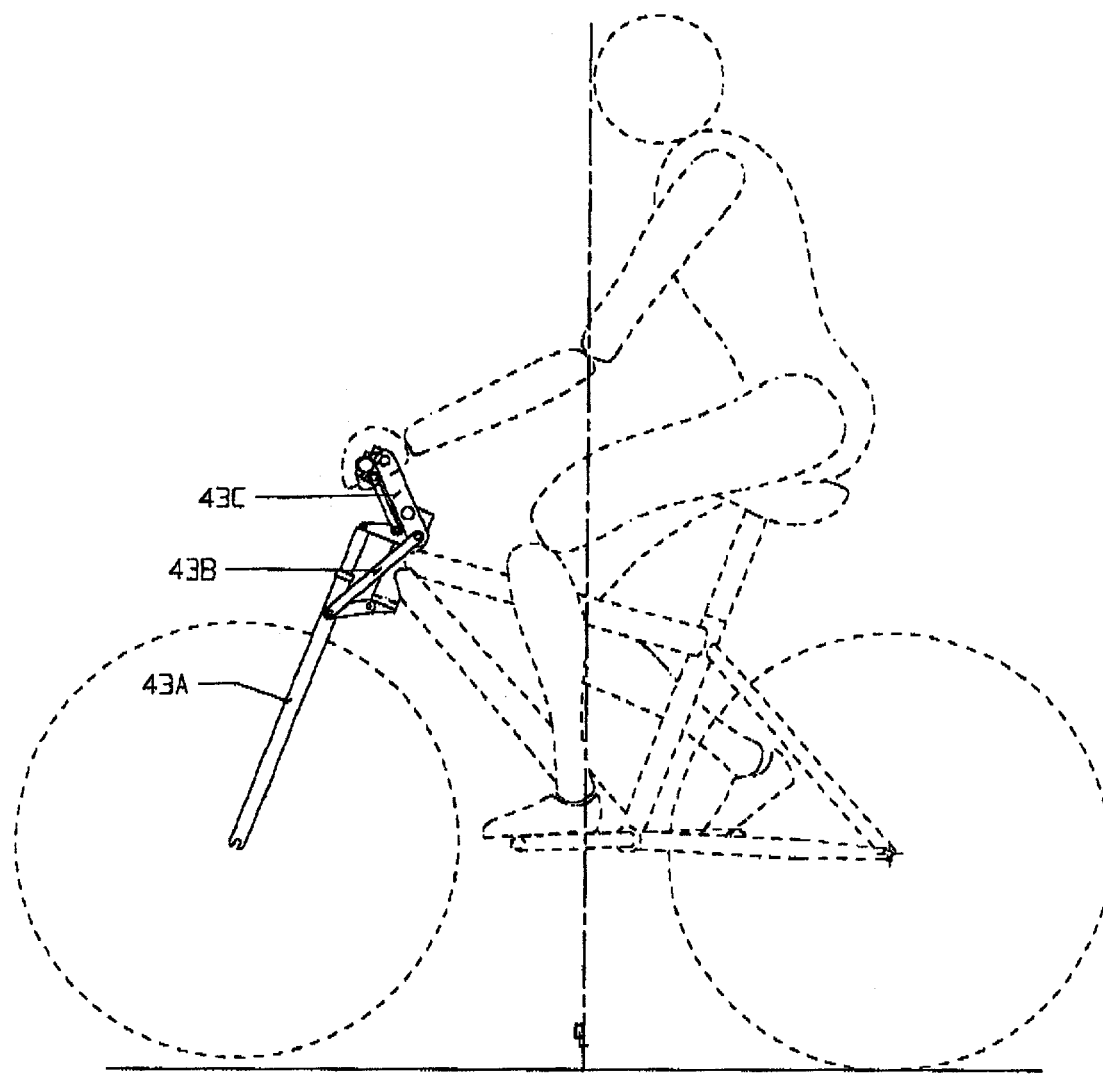
FIG. 43 is prior art combined with a modified stem C/G shift control system assembly and a compression linkage.

FIG. 43 is the side elevation view of a prior art bicycle front suspension assembly 43A combined with a modified stem C/G shift control system assembly 43C (see FIG. 3A for details) and linkage 43B. The linkage 43B provides for the energy transfer to allow C/G shift control of the prior art front suspension assembly 43A.

Figure 44:
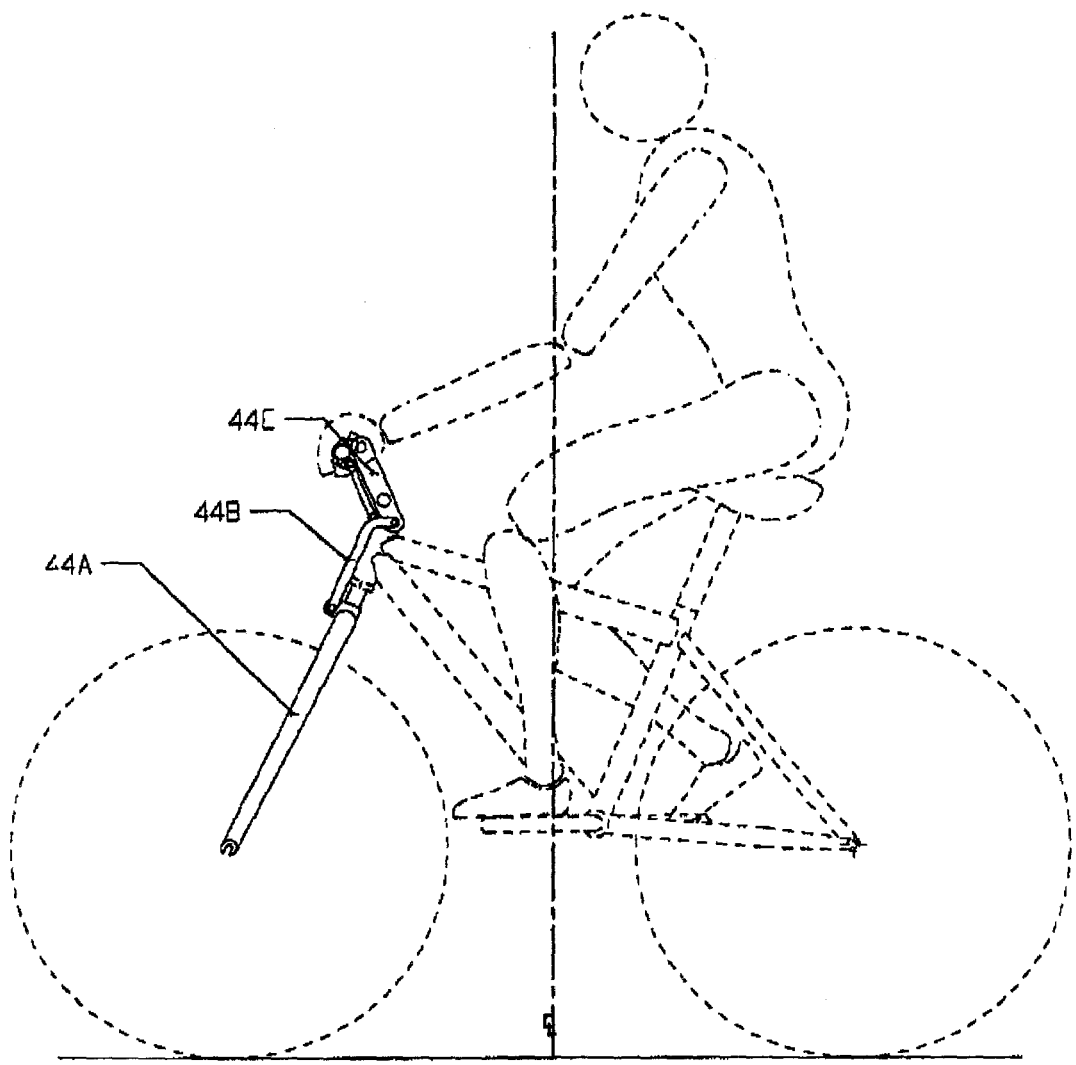
FIG. 44 is prior art combined with a modified stem C/G shift control system assembly and a compression linkage.

FIG. 44 is the side elevation view of a prior art bicycle front suspension assembly 44A combined with a modified stem C/G shift control system assembly 44C (see FIG. 3A for details) using a linkage 44B. The linkage 44B provides for the energy transfer to allow C/G shift control of the prior art front suspension assembly 44A.

Figure 45:
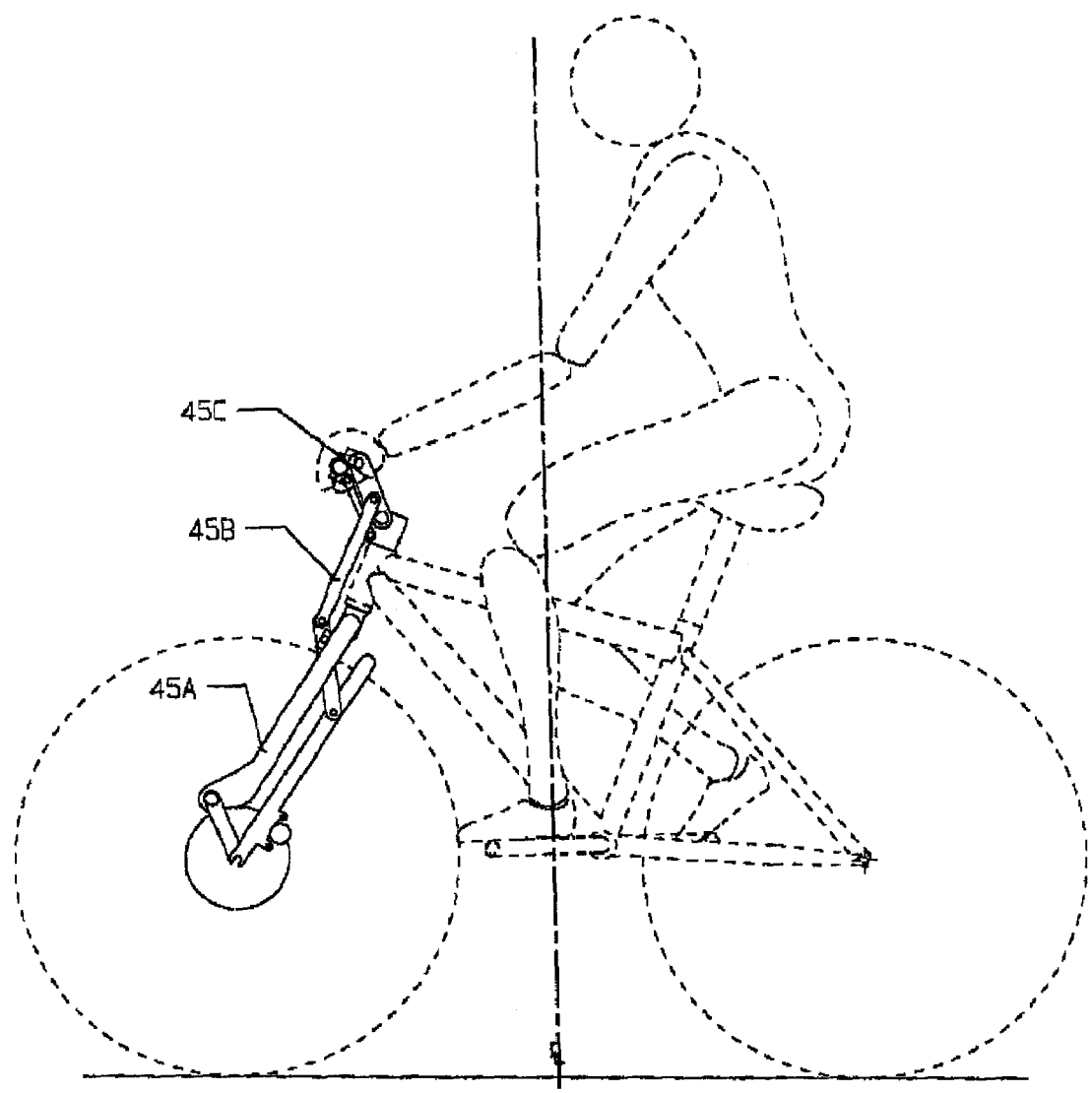
FIG. 45 is prior art combined with a modified stem C/G shift control system assembly and a compression linkage.

FIG. 45 is the side elevation view of a prior art bicycle front suspension assembly 45A combined with an arrangement of the embodiment stem C/G shift control system assembly 45C (see FIG. 3A for details) and linkage 45B. The linkage 45B provides for the energy transfer to allow C/G shift control of the prior art front suspension assembly 45A.

Figure 46:
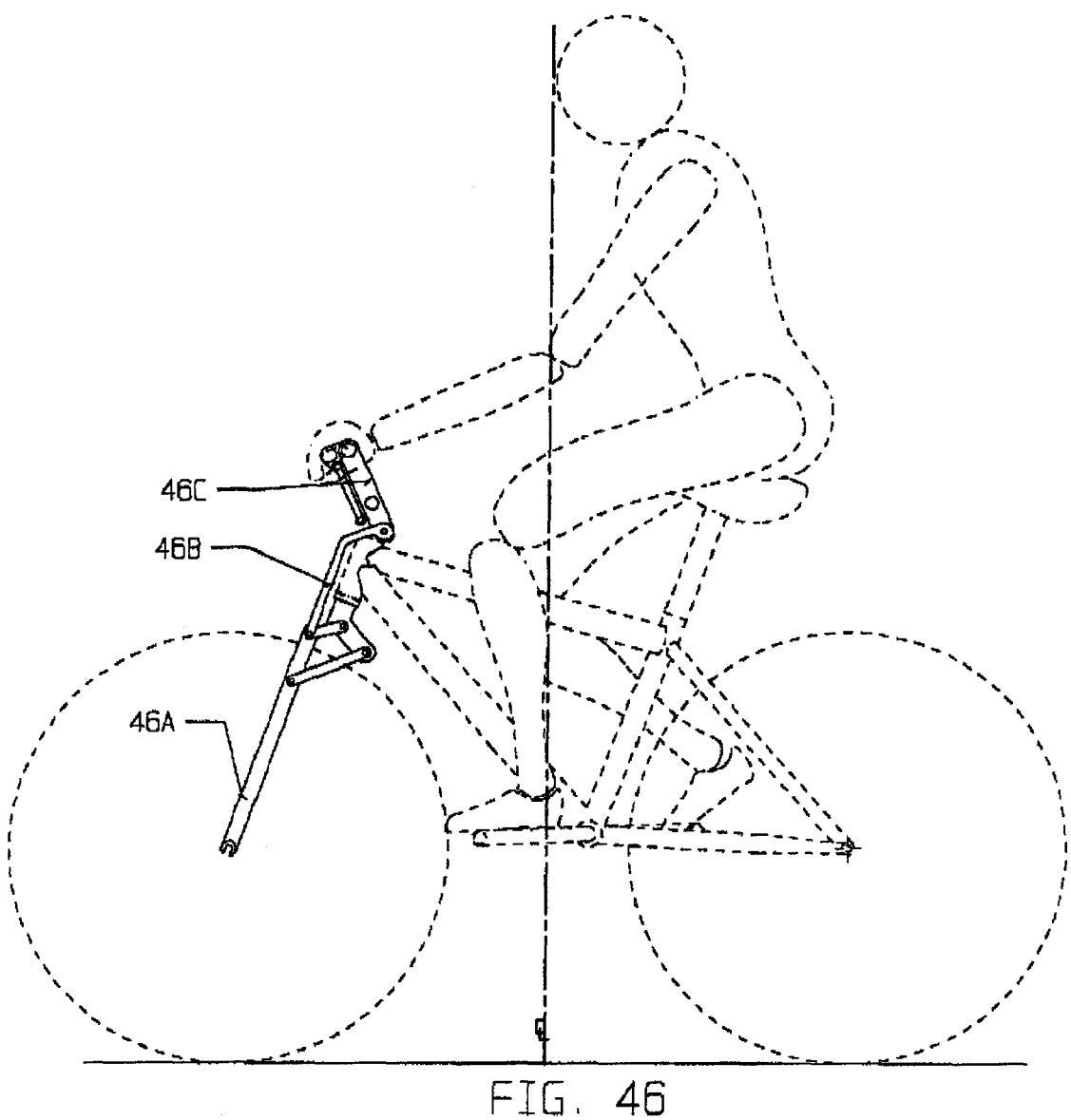
FIG. 46 is prior art combined with a modified stem C/G shift control system assembly and a compression linkage.

FIG. 46 is the side elevation view of a prior art bicycle front suspension assembly 46A combined with a modified stem C/G shift control system assembly 46C (see FIG. 3A for details) using a linkage 46B. The linkage 46B provides for the effective energy transfer to allow C/G shift control of the prior art front suspension assembly 46A.

Figure 47:
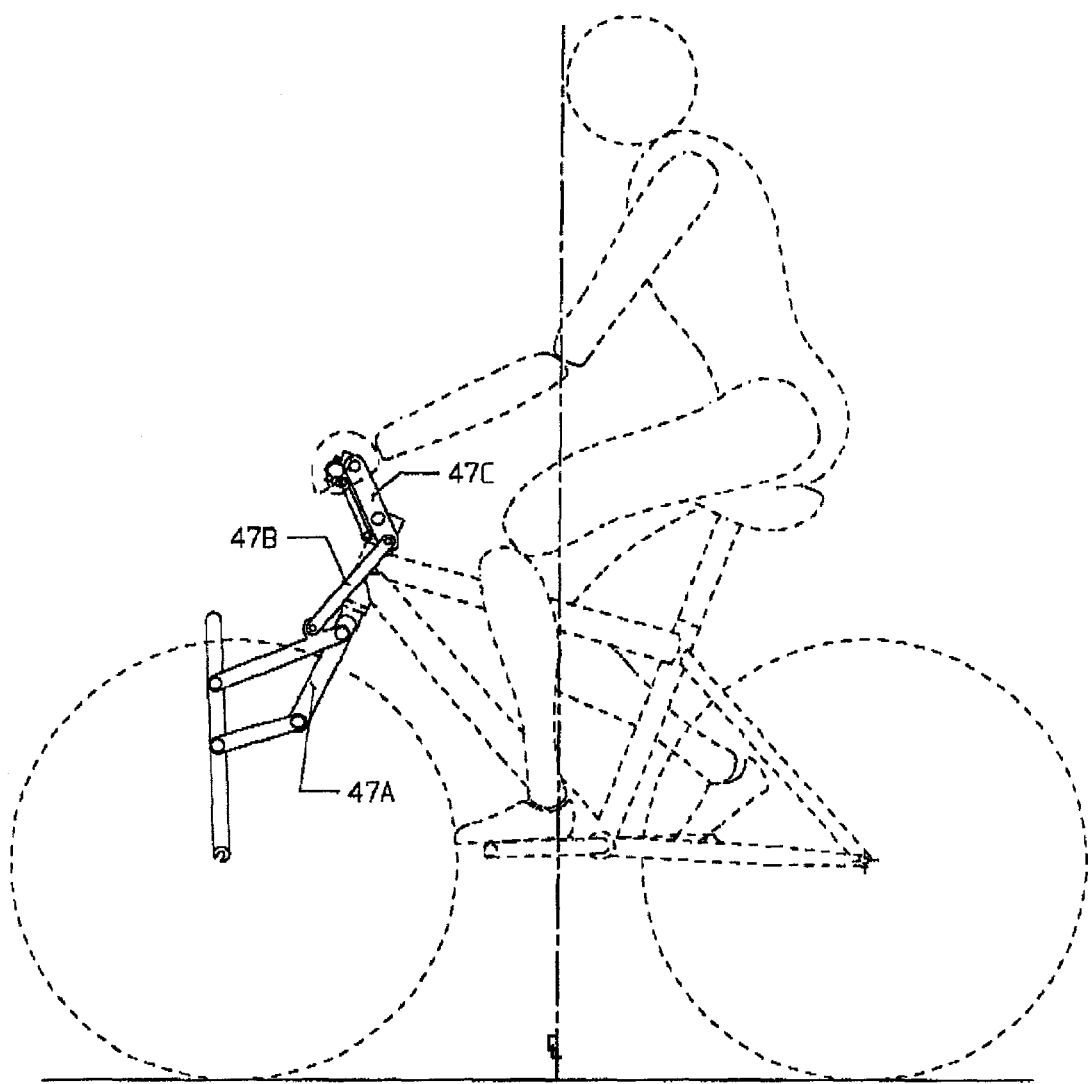
FIG. 47 is prior art combined with a modified stem C/G shift control system assembly and a compression linkage.

FIG. 47 is the side elevation view of a prior art bicycle front suspension assembly 47A combined with an arrangement of the embodiment stem C/G shift control system assembly 47C (see FIG. 3A for details) using a linkage 47B. The linkage 47B provides for the effective energy transfer to allow C/G shift control energy transfer to the prior art front suspension assembly 47A.

Figure 48:
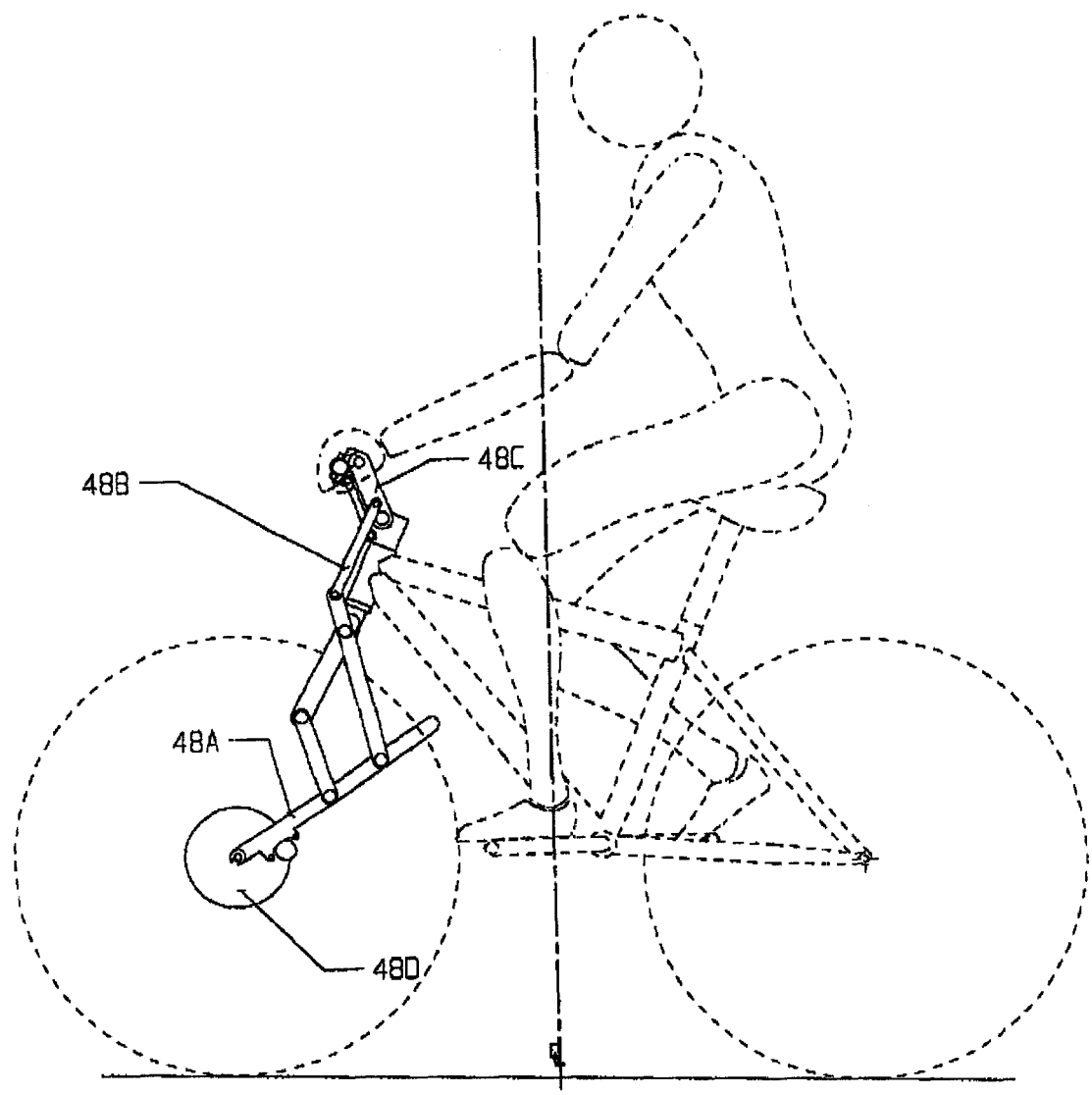
FIG. 48 is prior art combined with a modified stem C/G shift control system assembly and a compression linkage arm.

FIG. 48 is the side elevation view of a prior art bicycle front suspension assembly 48A combined with an arrangement of the embodiment stem C/G shift control system assembly 48C (see FIG. 3A for details) and linkage 48B. The linkage 48B provides C/G shift control energy transfer to allow C/G shift control energy transfer to the prior art front suspension assembly 48A. The C/G shift control system 48C also utilizes the energy transfer provided by the brake system 48D which is connected to the prior art front suspension assembly 48A.

Figure 49:
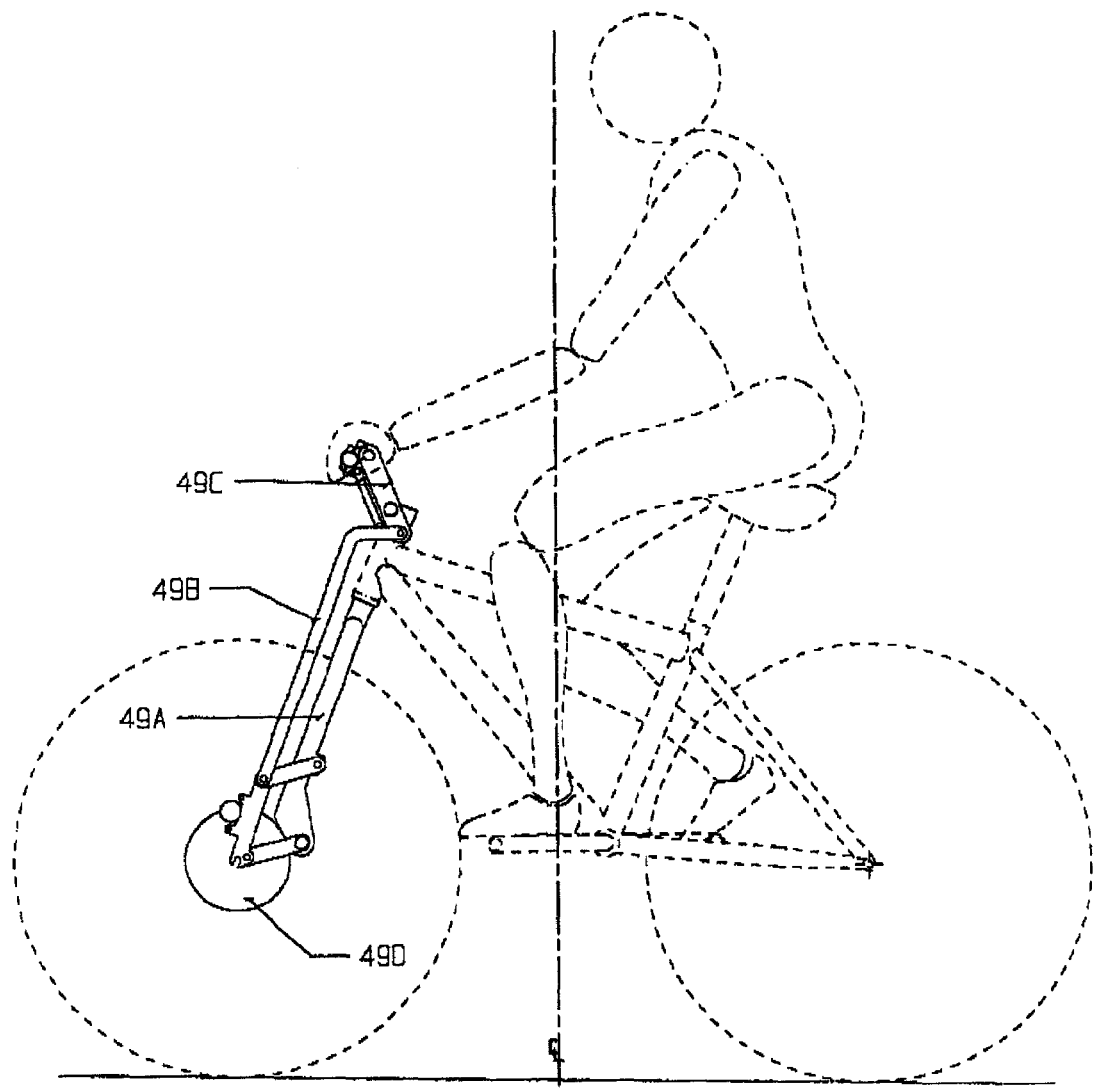
FIG. 49 is prior art combined with a modified stem C/G shift control system assembly and compression linkage arm.

FIG. 49 is the side elevation view of a prior art bicycle front suspension assembly 49A combined with an arrangement of the embodiment stem C/G shift control system assembly 49C (see FIG. 3A for details) and linkage 49B. The linkage 49B provides C/G shift control energy transfer to the prior art front suspension assembly 49A. The C/G shift control system 49C also utilizes the energy transfer provided by the brake system 49D which is connected to the prior art front suspension assembly 49A.

Figure 50:
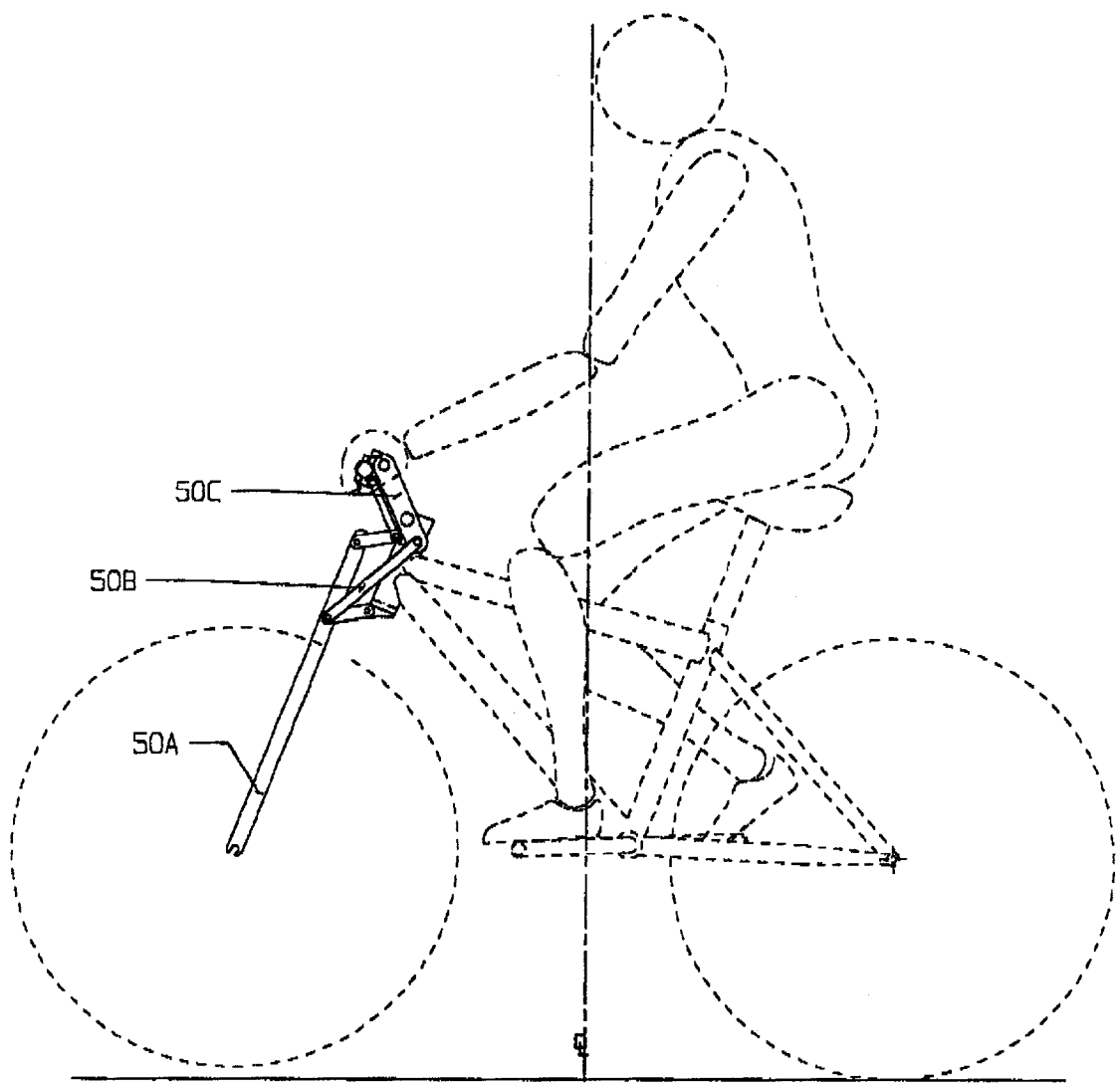
FIG. 50 is prior art combined with a modified stem C/G shift control system assembly and compression linkage arm.

FIG. 50 is the side elevation view of a prior art bicycle front suspension assembly 50A combined with an arrangement of the embodiment stem C/G shift control system assembly 50C (see FIG. 3A for details) and linkage 50B. The linkage 50B provides C/G shift control energy transfer to allow C/G shift control energy transfer to the prior art front suspension assembly 50A.

Figure 51:
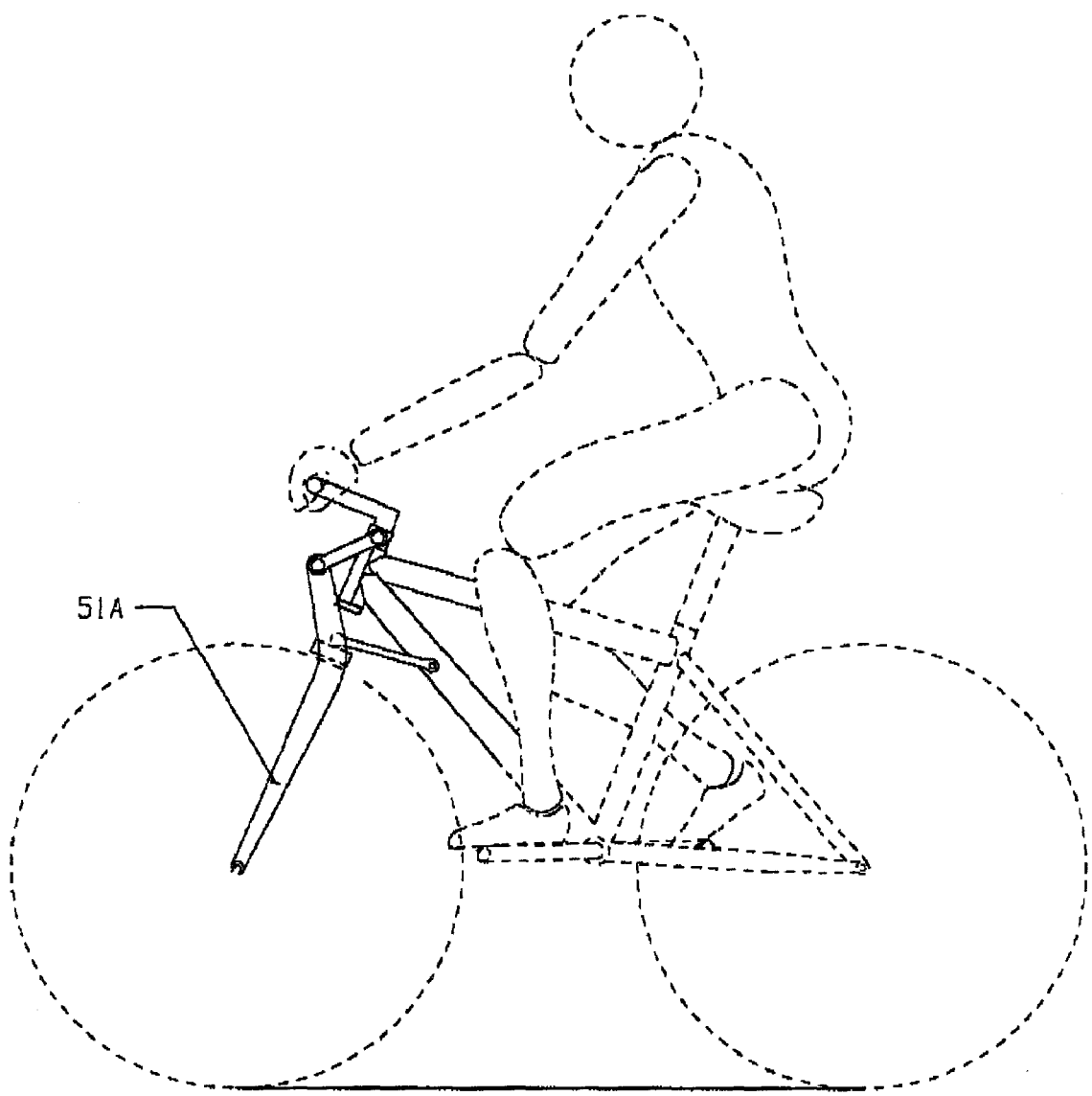
FIG. 51 is the side elevation view of a human sitting on a bicycle with the representation of a front suspension frame member of prior art.

FIG. 51 is the side elevation view of a human seated on a bicycle with the representation of a front suspension frame member that is prior art. The prior art connects a front suspension assembly to the frame assembly by using a linkage rod.

Figure 52:
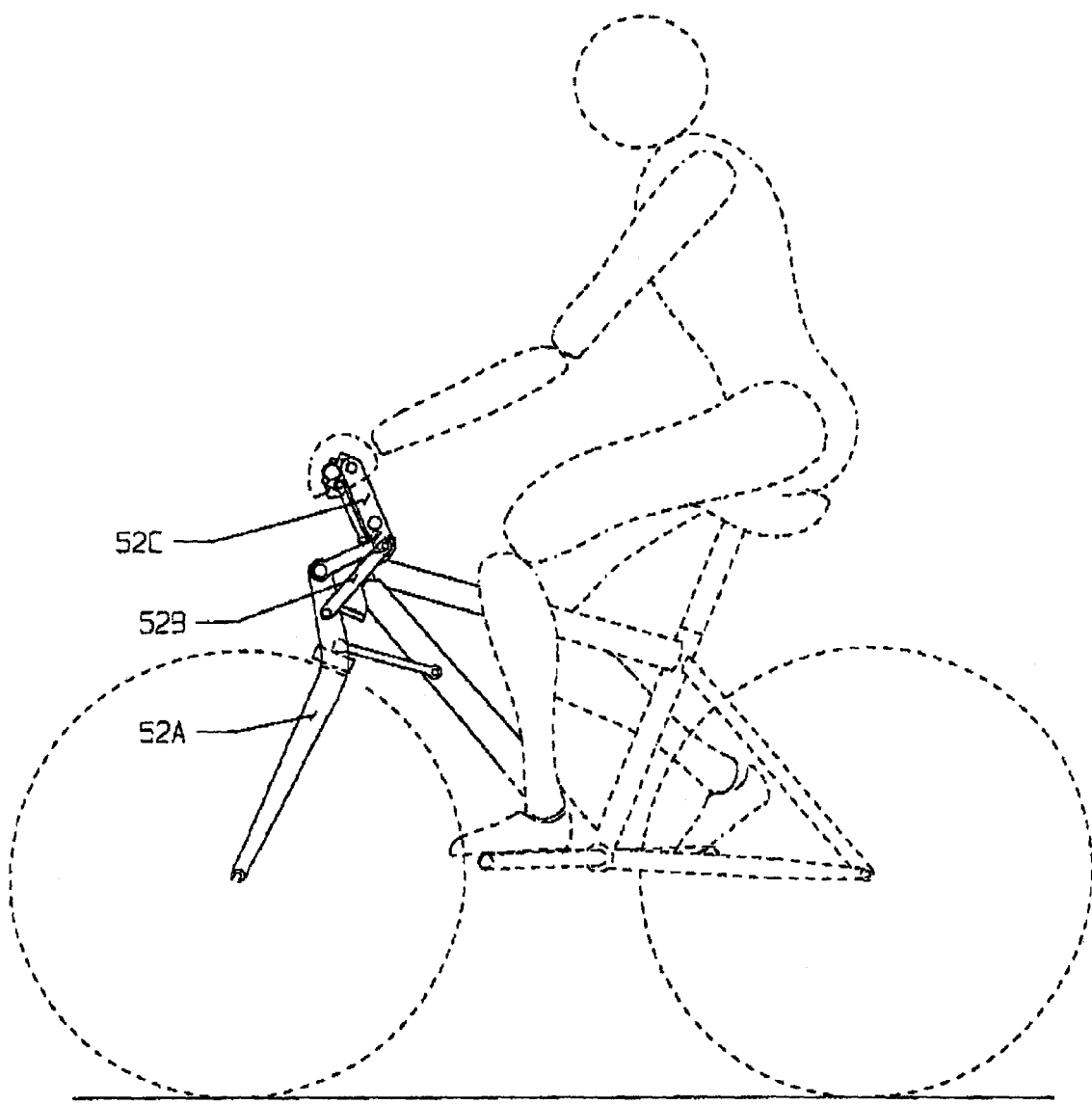
FIG. 52 is the embodiment of FIG. 51 combined with a modified stem C/G shift control system and front linkage arm.

FIG. 52 is the embodiment of FIG. 51, where the prior art frame and front suspension assembly 51A is an arrangement of the embodiment to become frame and front suspension assembly 52A, combined with an arrangement of the embodiment C/G shift control system stem assembly 52C (see FIG. 3A for details), and front linkage arm 52B. The front linkage arm 52B enables the energy transfer from the C/G shift control system stem assembly 52C to be applied to the frame and front suspension assembly 52A.

Figure 53:
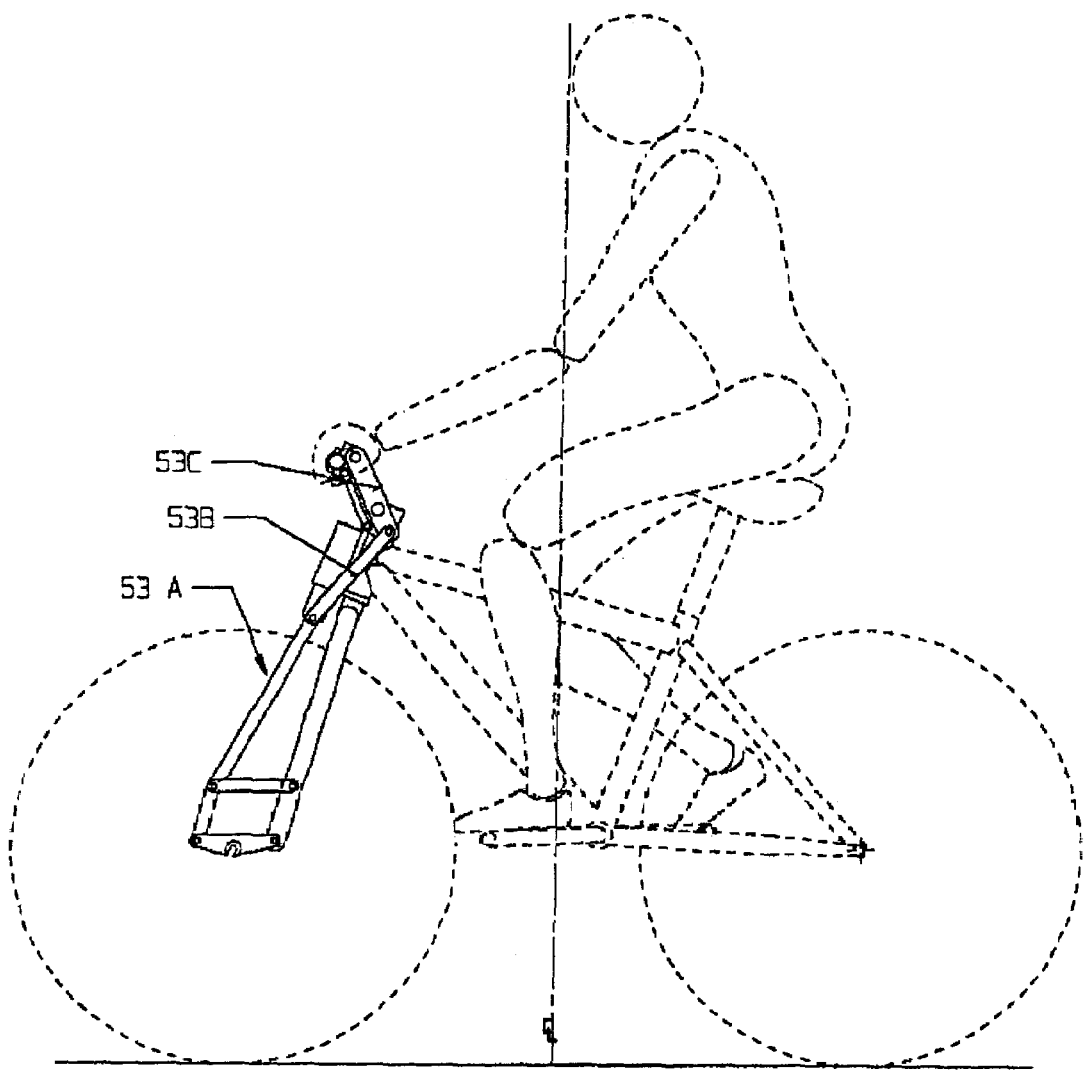
FIG. 53 is prior art combined with a modified stem C/G control system and front linkage arm.

FIG. 53 is an arrangement of the embodiment prior art bicycle front suspension assembly 53A combined with a modified stem C/G shift control system assembly 53C (see FIG. 3A for details) and a compression linkage 53B. The compression linkage 53B provides a method for C/G shift control energy transfer to the prior art front suspension assembly 53A.

Figure 54:
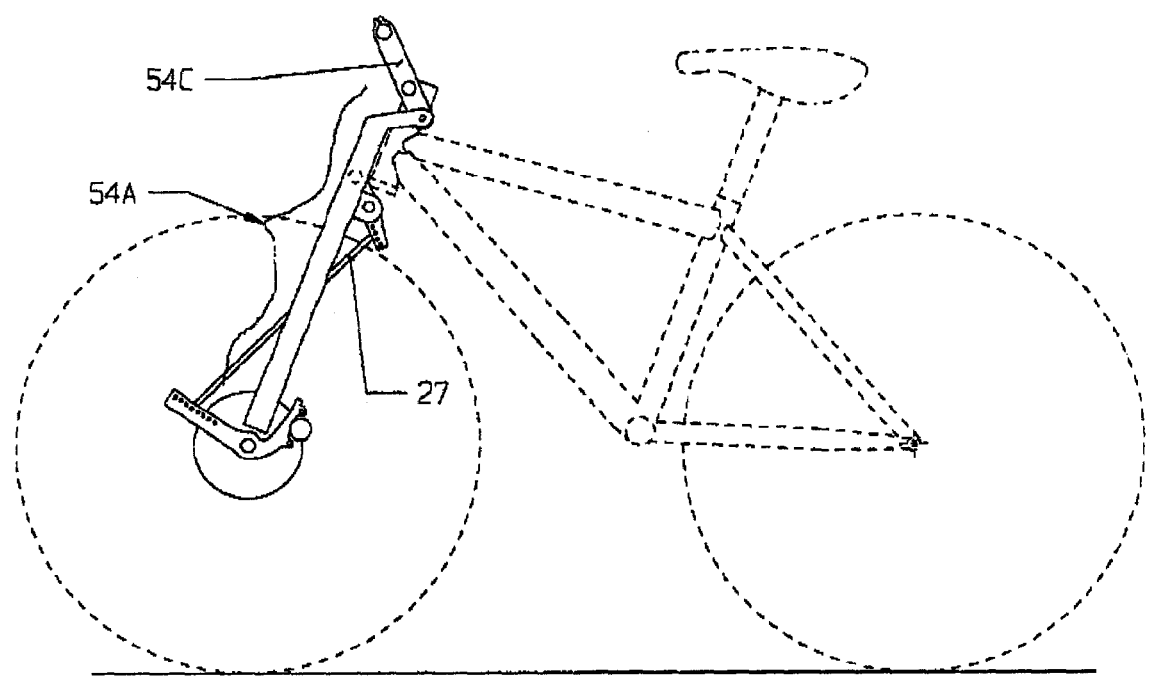
FIG. 54 is the assembly of FIG. 4 combined with a single pivot modified C/G control system stem.

FIG. 54 is the embodiment of the front suspension assembly 2d of FIG. 2 to use a single axis C/G shift control system stem assembly 54C (see FIG. 3A for details). The front suspension assembly 54A illustrates the ability for parts of the control system to be and still perform the C/G shift control function. The C/G shift control system stem is able to transfer mass shift energy to activate the front suspension assembly 54A. The front suspension assembly 54A is also able to transfer and utilize braking energy in this embodiment using the brake energy transfer rod 27.

Figure 55:
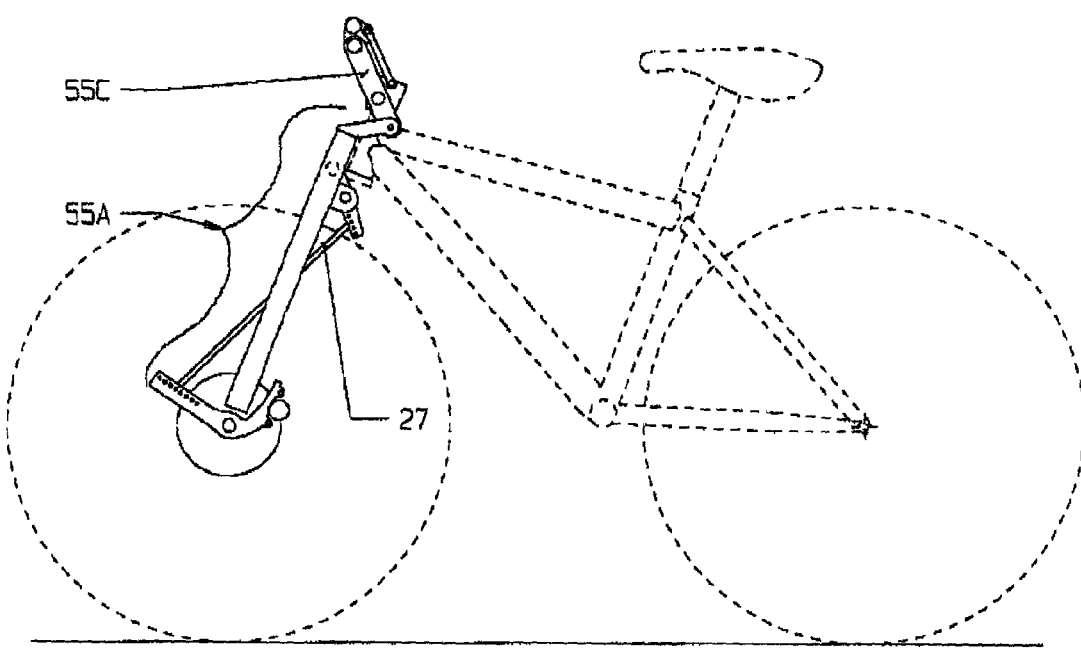
FIG. 55 is the embodiment of FIG. 54 combined with a modified C/G control system stem assembly.

FIG. 55 is the embodiment of front suspension assembly 2d of FIG. 2 modified to use a C/G shift control system assembly 55C (see FIG. 3A for details). The front suspension assembly as shown in FIG. 3A is altered by using the upper link 8 from FIG. 3A replaces the lower link 5 from FIG. 3 on top as shown in this illustration. The C/G shift control system stem 55C is able to transfer mass shift energy to activate the front suspension assembly 55A. The front suspension assembly 55A is used to transfer and utilize braking energy using the brake energy transfer rod 27.

Figure 56:
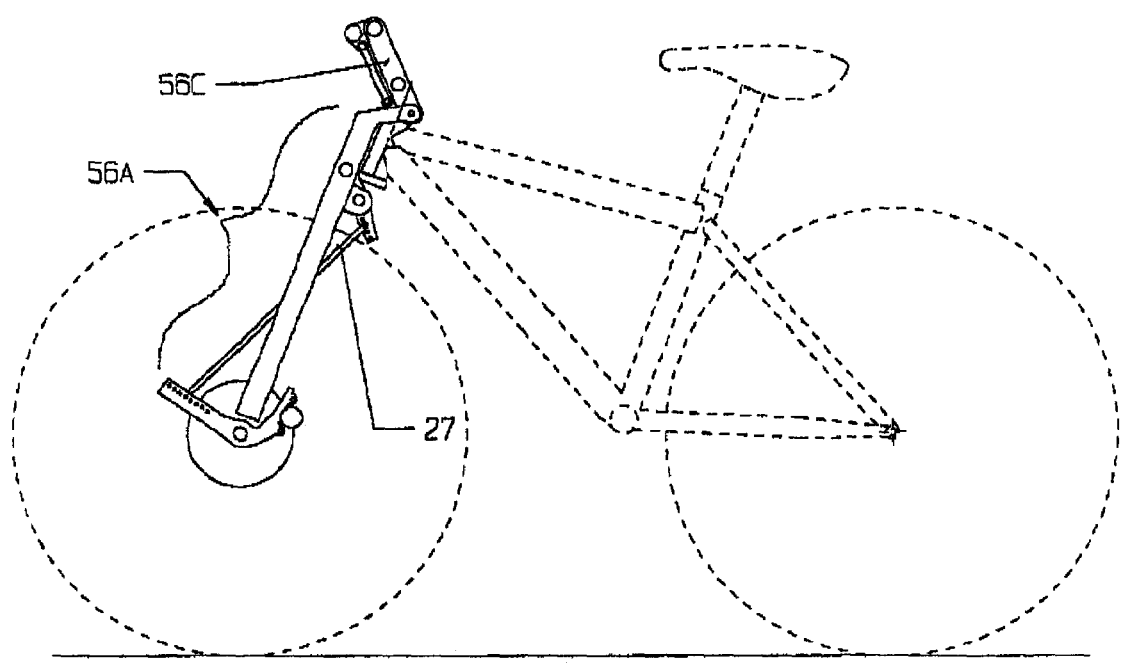
FIG. 56 is the embodiment of FIG. 54 combined with a modified stem C/G control system assembly.

FIG. 56 is the embodiment of the front suspension assembly 2d of FIG. 2 adapted to use a C/G shift control system stem assembly 56C (see FIG. 3A for details). The front suspension assembly as shown in FIG. 3A is altered using the upper link 8 of FIG. 3A to mount the lower link 5 of FIG. 3A and to attach the lower link in a different position as shown in this illustration. The C/G shift control system stem 56C is able to transfer mass shift energy to activate the front suspension assembly 56A. The front suspension assembly 56A is also able to transfer and utilize braking energy in this embodiment using the brake energy transfer rod 27.

Figure 57:
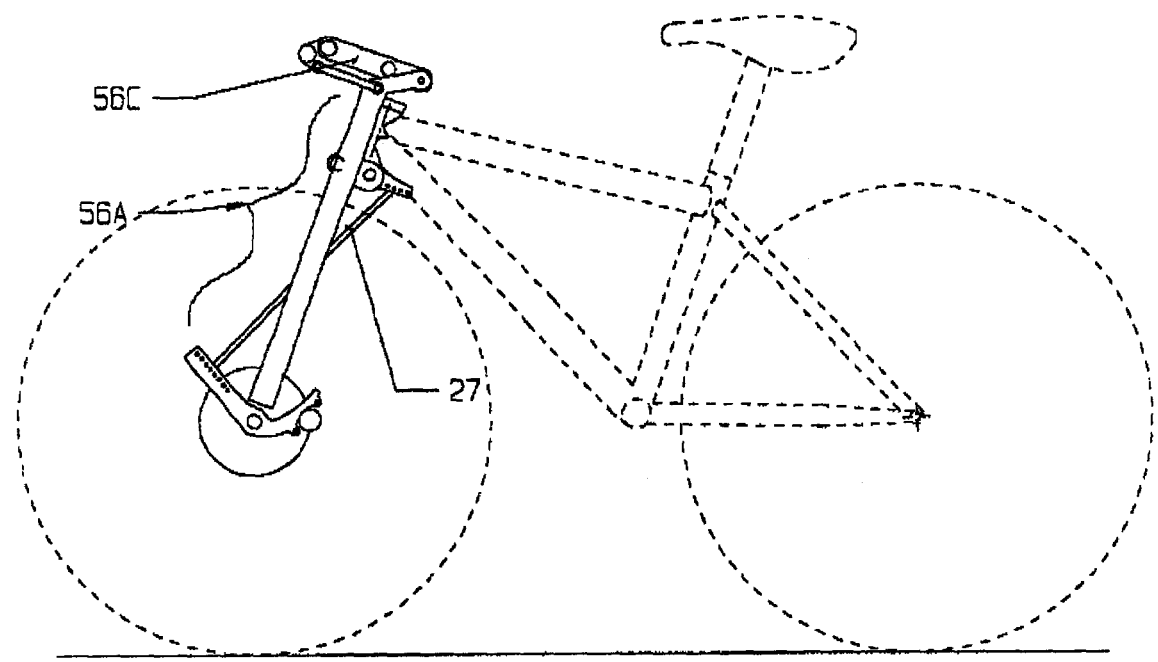
FIG. 57 is the embodiment of FIG. 56 in a compressed position.

FIG. 57 is the embodiment of the C/G shift control system 56C and front suspension assembly of FIG. 56 in a compressed position.

Figure 58:
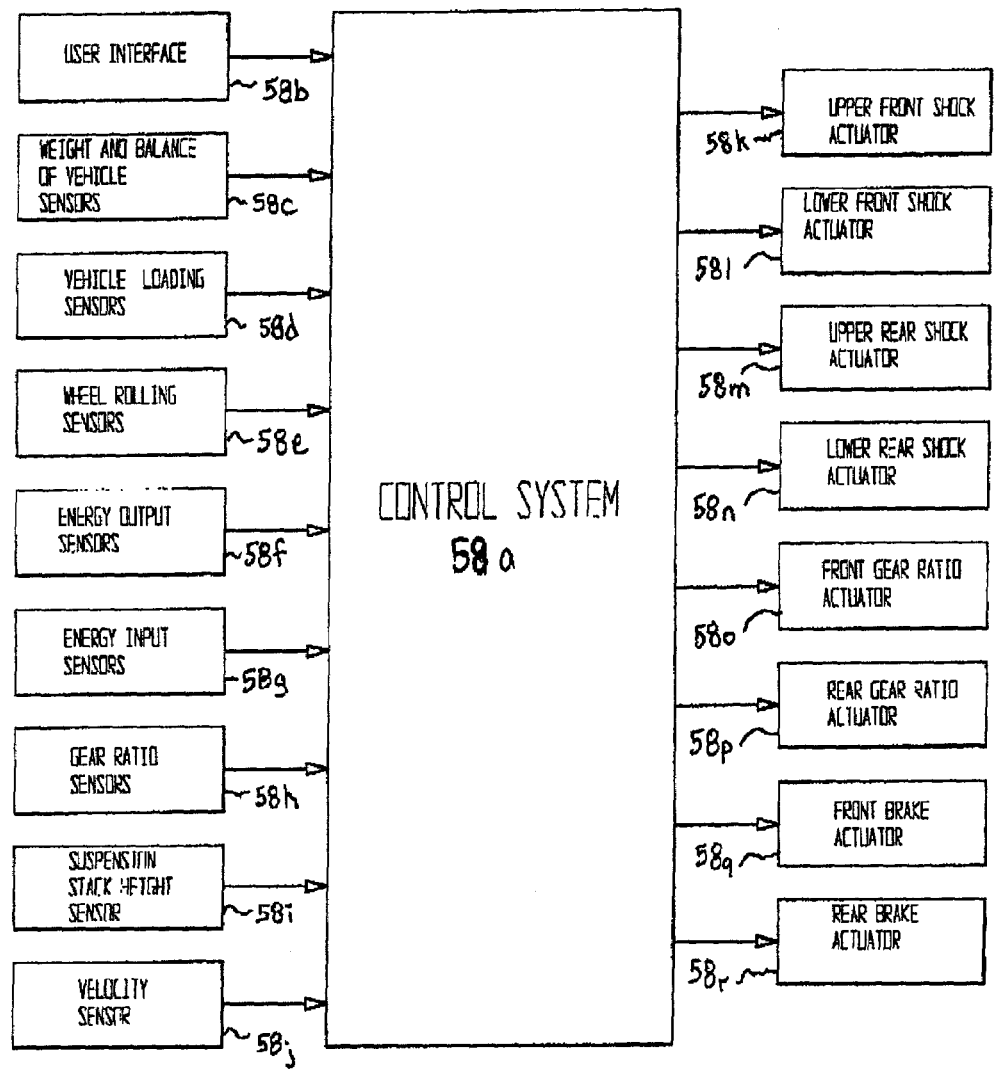
FIG. 58 is the block diagram for a C/G control system circuit.

FIG. 58 is a block diagram for a control system 58a used to control dynamic systems attached to a vehicle by using signals provided by C/G and mass shift sensor systems as embodied in FIG. 1. Vehicle dynamic systems include upper front shock 58k and lower front shock 58l actuators as applied in front suspension systems. Additional dynamic systems include but are not limited to upper rear 58m and lower rear 58n shock actuators, front gear 58o and rear gear 58p ratio actuators, front brake 58q and rear brake 58r actuators that are incorporated into a vehicle. The control system 58a has data inputs including user interface 58b, weight and balance sensors 58c, vehicle loading sensors 58d, wheel rolling sensors 58e, energy output sensors 58f, energy input sensors 58g, gear ratio sensors 58h, suspension stack height sensors 58i, and velocity sensors 58j. The control system 58a monitors the data inputs and provides appropriate outputs to adjust the attached dynamic systems 58k through 58r as required by the system control parameters.

Figure 59:
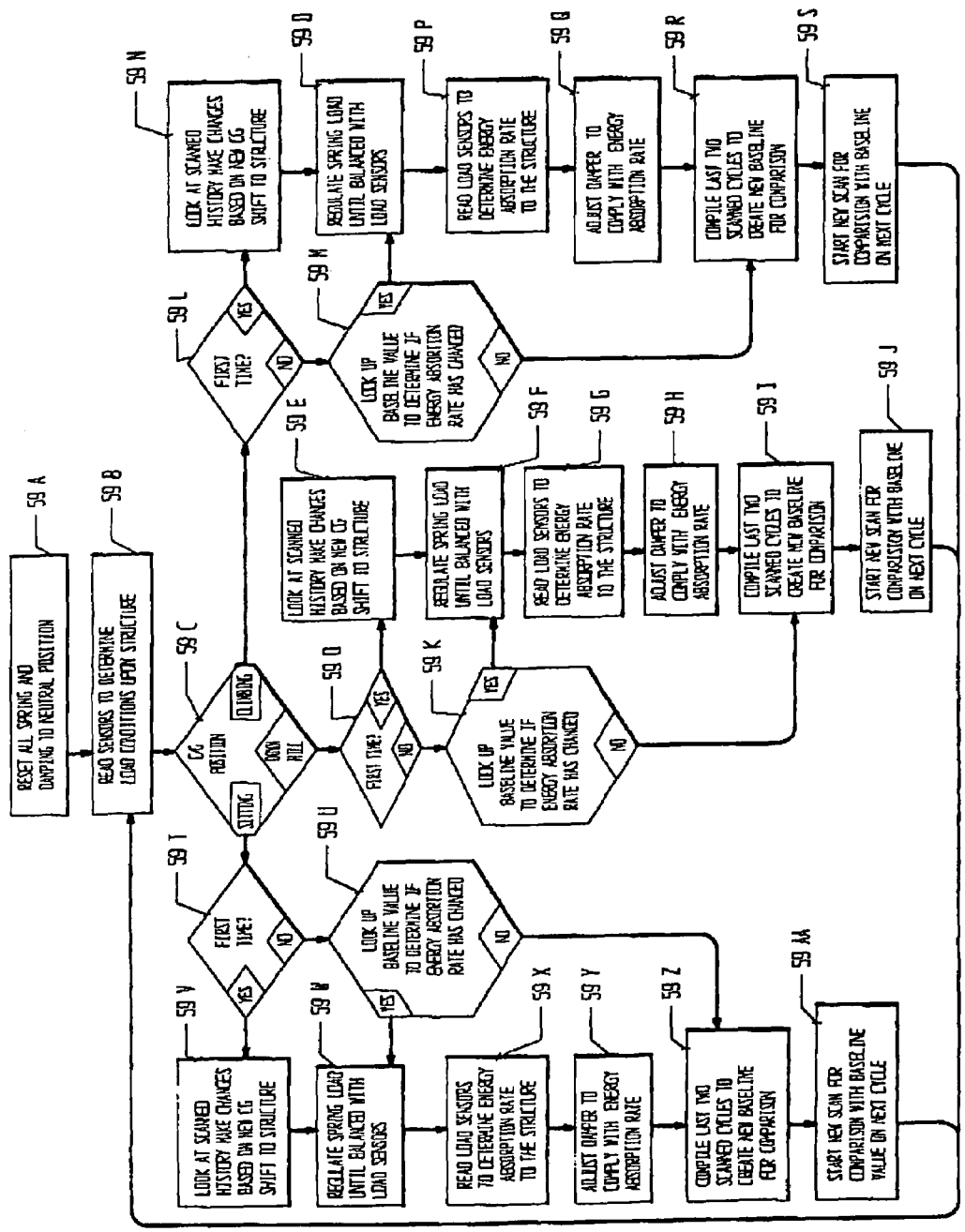
FIG. 59 is a logic flow diagram for a C/G system programmable control.

FIG. 59 is a logic flow diagram for a programmable control to show one manner of C/G shift control of spring and damper rate with the embodiment of FIG. 1. In the initial control cycle the system is reset to zero (shown in block diagram 59A) then initial load measurements are taken (block 59B). The C/G position is determined by the inputs (block 59C) and the decision tree is then routed to the corresponding start blocks (blocks 59L, 59D, or 59T) for different C/G positions, Climbing, Downhill, and Sitting respectively. The routing for a C/G position described as Climbing is, as follows, if the cycle is the first cycle (block 59L) then the control system will look up the scanned history and make changes (or not) based on the new C/G position data (block 59L). The system will send a signal to regulate spring load until balanced with the load sensor data (block 59O). The system will read load sensors (block 59P) to determine the energy absorption rate of the vehicle structure and adjust the damping rate to match conditions (block 59Q). The system will compute the last two scanned cycles to create a new baseline (block 59R) to use as comparison for the next cycle (block 59S) then return to the beginning of the cycle (block 59B). If the cycle was not the first cycle (block 59L), then the control system would look up the baseline value (block 59M) to determine if the energy absorption rate has changed (block 59M) and would regulate the spring load (block 59O), or if the baseline value has not changed then the system would start the recomputed cycle (blocks 59R and 59S) and return to the beginning (block 59B). An analogous procedure is followed for the C/G Downhill position using system parameter data designed for the optimal operating load conditions for the position. The control system (block 59D) routes to a new scan process (block 59E) of regulating the spring load until balanced with sensors (block 59F) if the cycle is beginning a first pass then reading the load sensors on the vehicle structure (block 59G) and adjusting to comply with the energy absorption rate parameters (block 59H) set for the C/G downhill position. If the look up table at (block 59D) is not the first cycle then the control system will route to (block 59K) to determine if there has been a change in load. The control system then will route to the load adjusting path (blocks 59F, 59G, and 59H) or the re-scan path (blocks 59I and 59J) based on the yes/no data value (in block 59K). Another analogous procedure is followed for the C/G Sitting position using system parameter data designed for the optimal operating load conditions for the position. The control system (block 59T) routes to a new scan process (block 59V) of regulating the spring load until balanced with sensors (block 59W) if the cycle is beginning a first pass then reading the load sensors on the vehicle structure (block 59X) and adjusting to comply with the energy absorption rate parameters (block 59Y) set for the C/G downhill position. If the look up table at (block 59T) is not the first cycle then the control system will route to (block 59U) to determine if there has been a change in load. The control system then will route to the load adjusting path (blocks 59W, 59x, and 59Y) or the re-scan path (blocks 59Z and 59AA) based on the yes/no data value (in block 59U).

Figure 60:
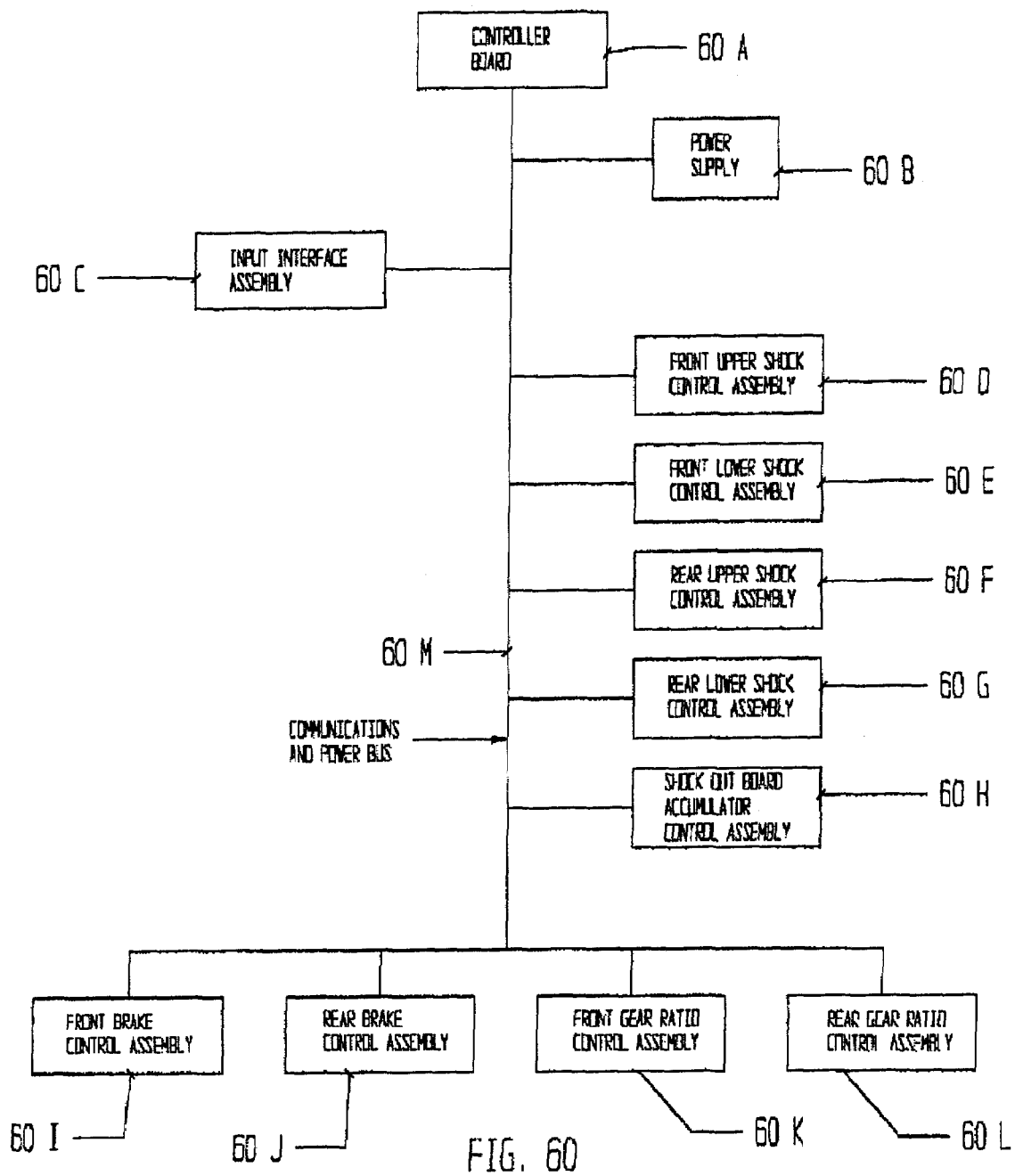
FIG. 60 is a wire harness diagram for a C/G control system assembly.

FIG. 60 is a block diagram of the control system output communication with the vehicle assemblies identified in FIG. 58, used for the vehicle suspension as shown in FIG. 20.

Similar sets of assemblies may be used for any of the other embodiments described herein. The C/G control system is powered by a power supply 60B. Communications bus 60M provides signals to the various dynamic assemblies. C/G shift system control of the vehicle dynamic systems is provided by a controller board 60A. Interface assembly 60C allows inputs to be sent to the controller board 60A, sample inputs are described below in connection with FIG. 64. The front, upper and lower, shock and rear, upper and lower, shock suspensions of FIG. 19 are adjusted by front upper shock control assembly 60D, front lower shock control assembly 60E, rear upper shock control assembly 60F, and rear lower shock control assembly 60G respectively. Application of the vehicle braking systems are controlled by the front brake control assembly 60I and the rear brake control assembly 60J. Indexing of the vehicle shifting systems are controlled by the front gear ratio assembly 60K and rear gear ratio assembly 60L.

Figure 61:
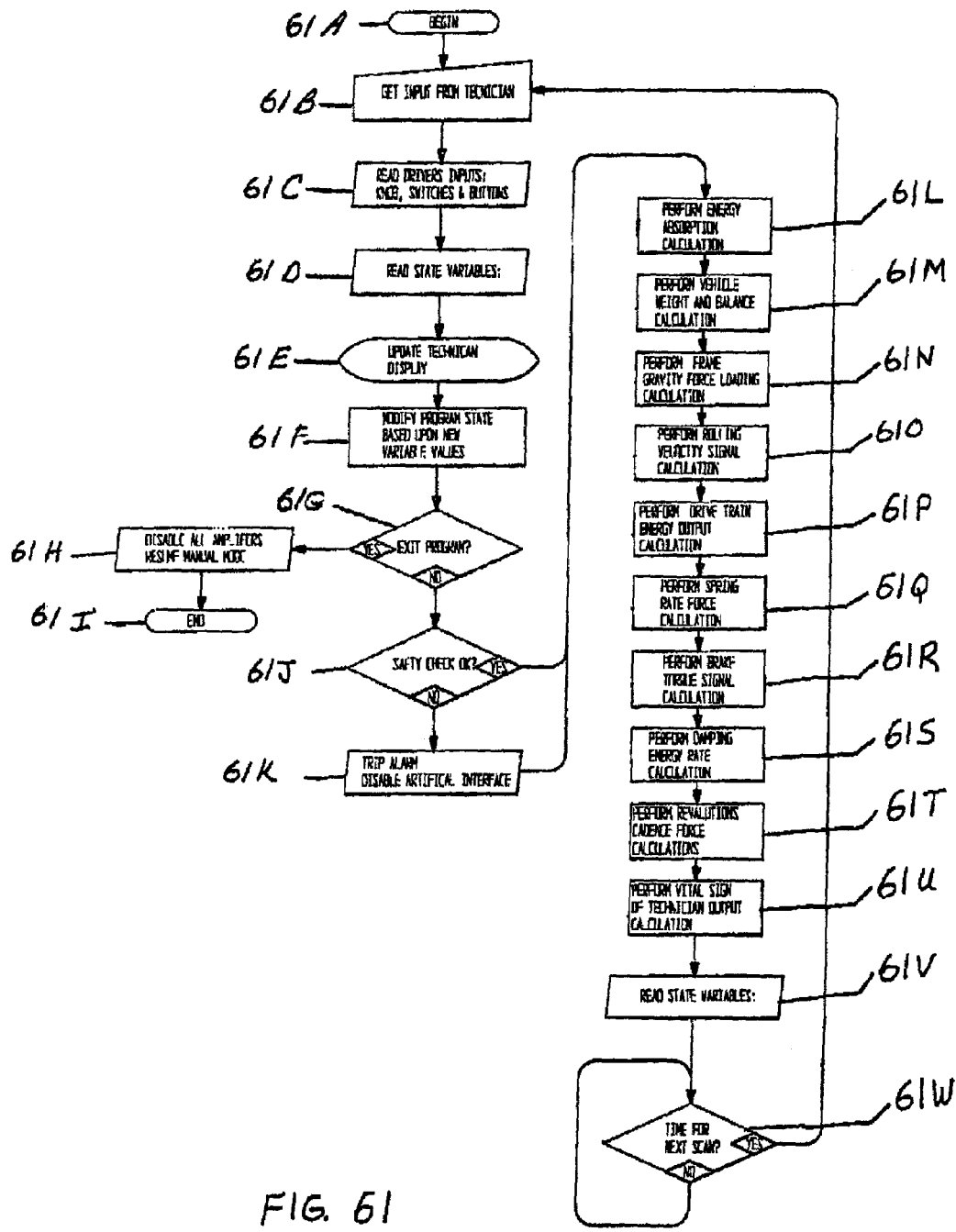
FIG. 61 is a flow diagram example for external inputs to effect changes in the C/G control system parameters.

FIG. 61 is a flow diagram example for external inputs to effect changes in the control system parameters, and reference numerals 61A through 61W designate steps with their respective function inscribed therein.

Figure 62:
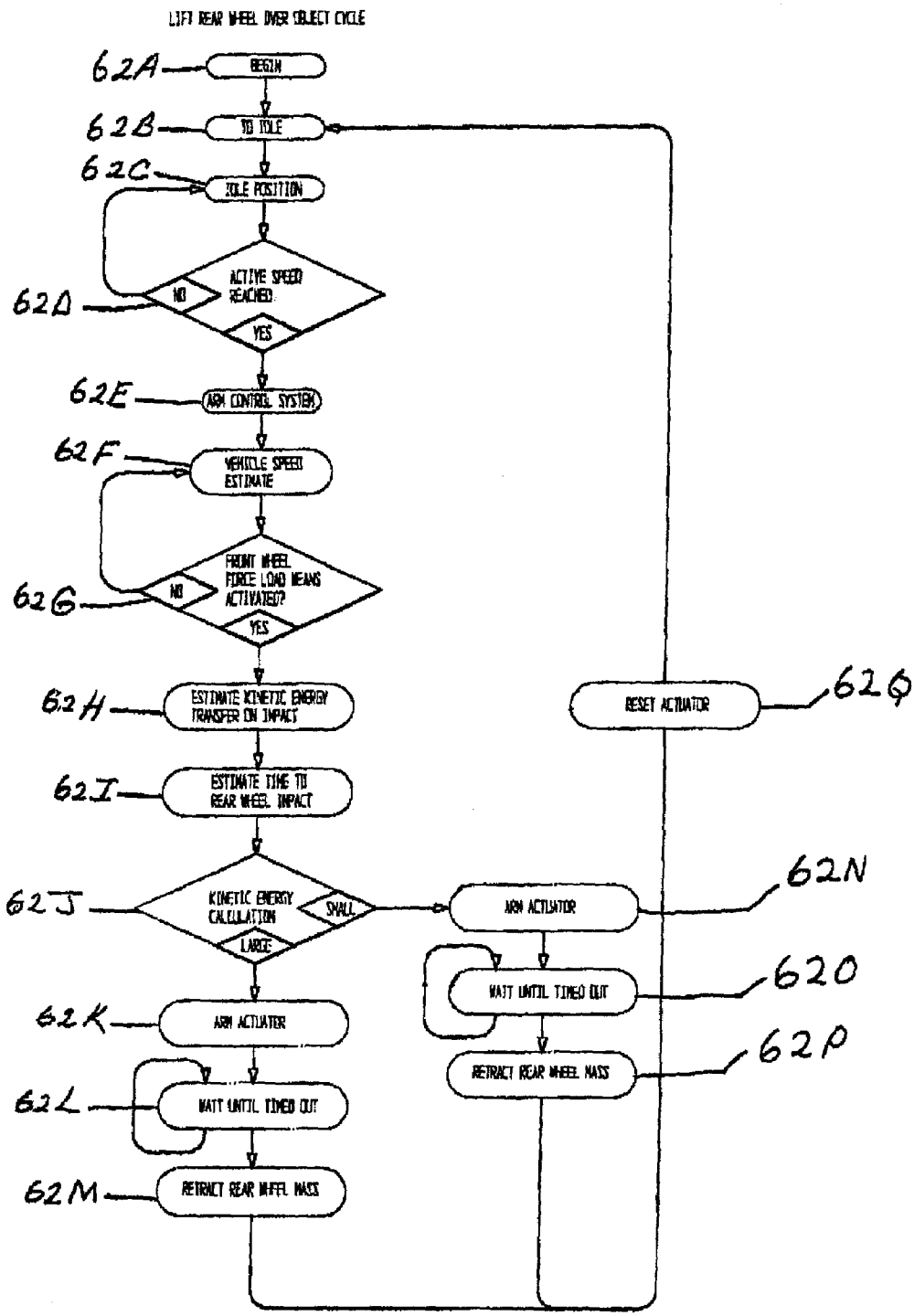
FIG. 62 is a flow diagram example for a C/G shift control loop.

FIG. 62 is a flow diagram example for a C/G shift control loop, and reference numerals 62A through 62Q designate steps with their respective function inscribed therein.

Figure 63:
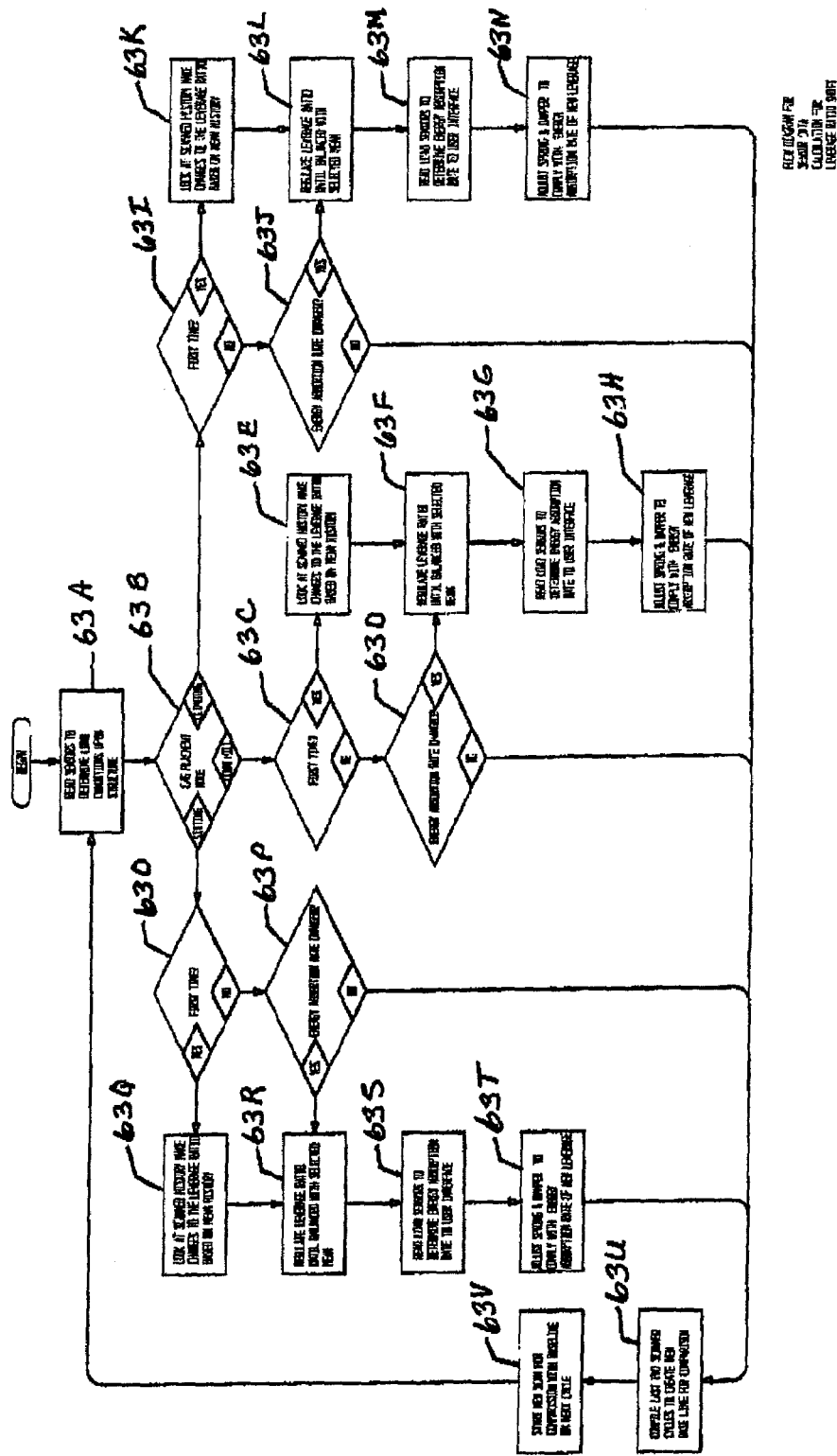
FIG. 63 is a flow diagram example of a load sensor system integrating data with the C/G shift control system.

FIG. 63 is a flow diagram example of a load sensor system integrating data with the C/G shift control system, and reference numerals 63A through 63V designate steps with their respective function inscribed therein.

Figure 64:
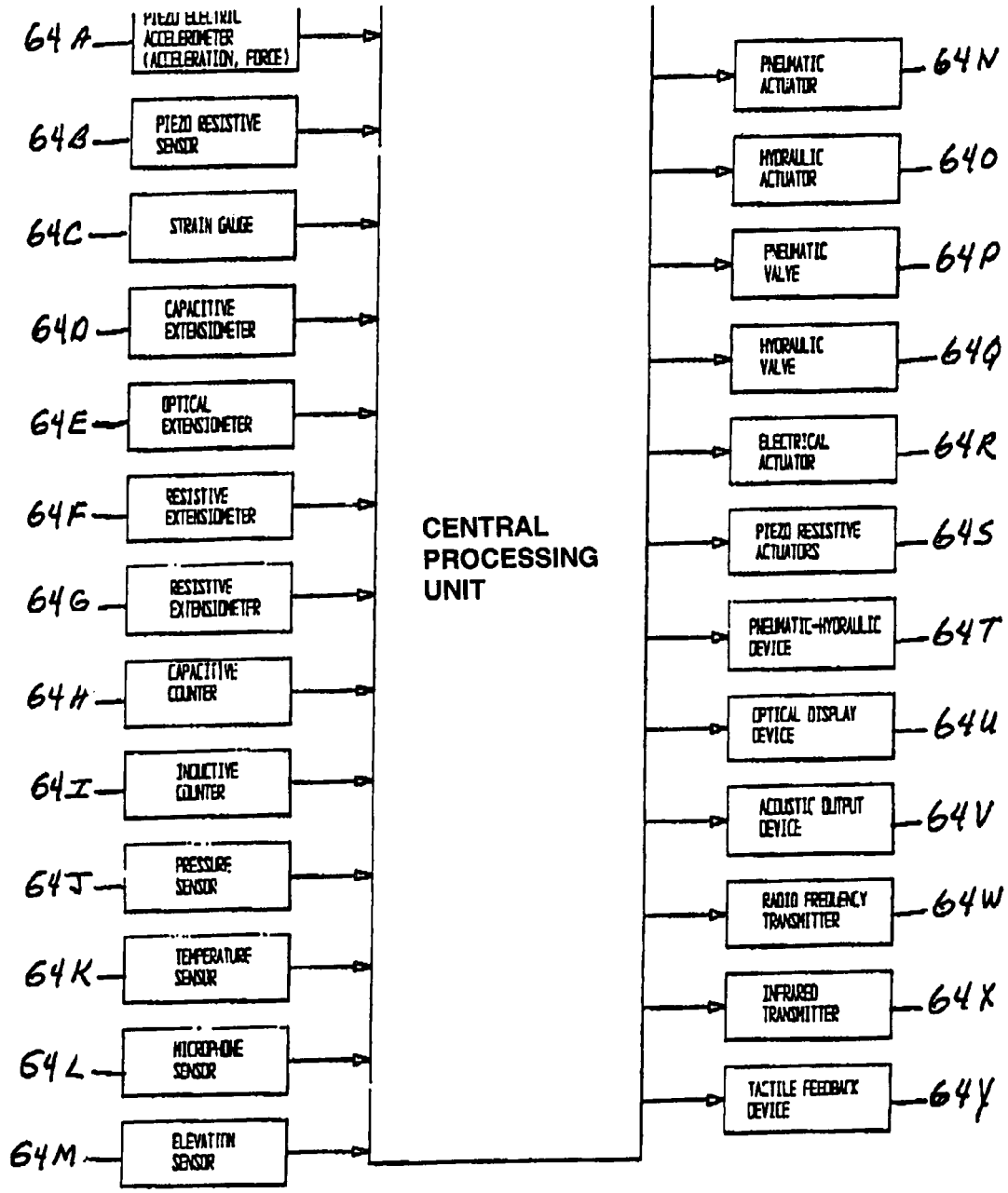
FIG. 64 is a block diagram of the C/G system electronic module input and output potentials.

FIG. 64 is a central processing unit that illustrates the embodiments of the C/G shift control system consisting of processing unit 64Z. The central processing unit of the C/G shift control system receives imputes singly or in combination from one or more sensor devices, such as 64A piezo electronic accelerometer, 64B piezo resistive, 64C strain gauge, 64D capacitive extensiometer, 64E optical extensiometer, 64F resistive extensiometer, 64G resistive extensiometer, 64H capacitive counter, 64I inductive counter, 64J pressure sensor, 64K temperature sensor, 64L microphone sensor, 46M elevation sensor. Upon receiving the input signal or signals, the central processor 64Z determines the appropriate output signal to send changes to one or more of the vehicles dynamic attached dynamic devices such as, 64N pneumatic actuator, 64O hydraulic actuator, 64P pneumatic valve, 64Q hydraulic valve, 64R electrical actuator, 64S peizo resistive actuator, 64T pneumatic hydraulic device, 64U optical display device, 64V acoustic output device, 64W radio frequency transmitter, 64X infrared transmitter, 64Y tactile feedback devices. That affects one or more ride characteristic to the vehicle.

Figure 65:
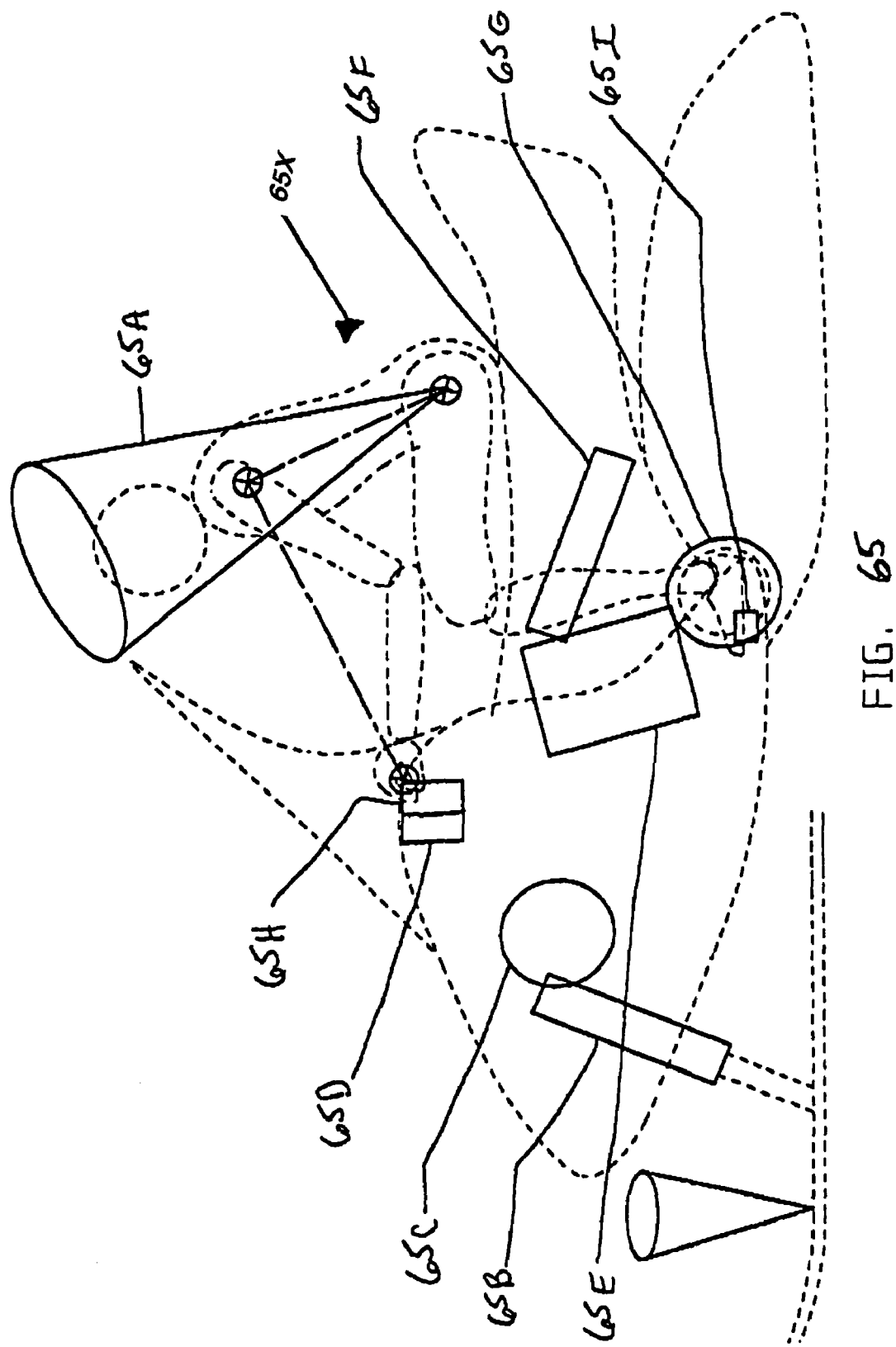
FIG. 65 is a side elevation view of a C/G shift control system diagram on a snowmobile.

FIG. 65 is a side elevation view of a control system diagram on a snowmobile 65x with multiple attached dynamic device means. The snowmobile front suspension system 65B, power drive system 65e, rear suspension system 65f, front lighting system 65c, steering assembly 65d, rear drive gear 65g, and rear braking system 65i are capable of control through control system 65h. Control system 65k will sensor conical area 65a for C/G shift data. Control system 65h includes a sensor device and a control system as described in FIG. 1. Control system 65h outputs control signals to the attached dynamic devices 65b, 65e, 65f, 65c, 65d, 65g, and 65i through wire harness assemblies.

Figure 66:
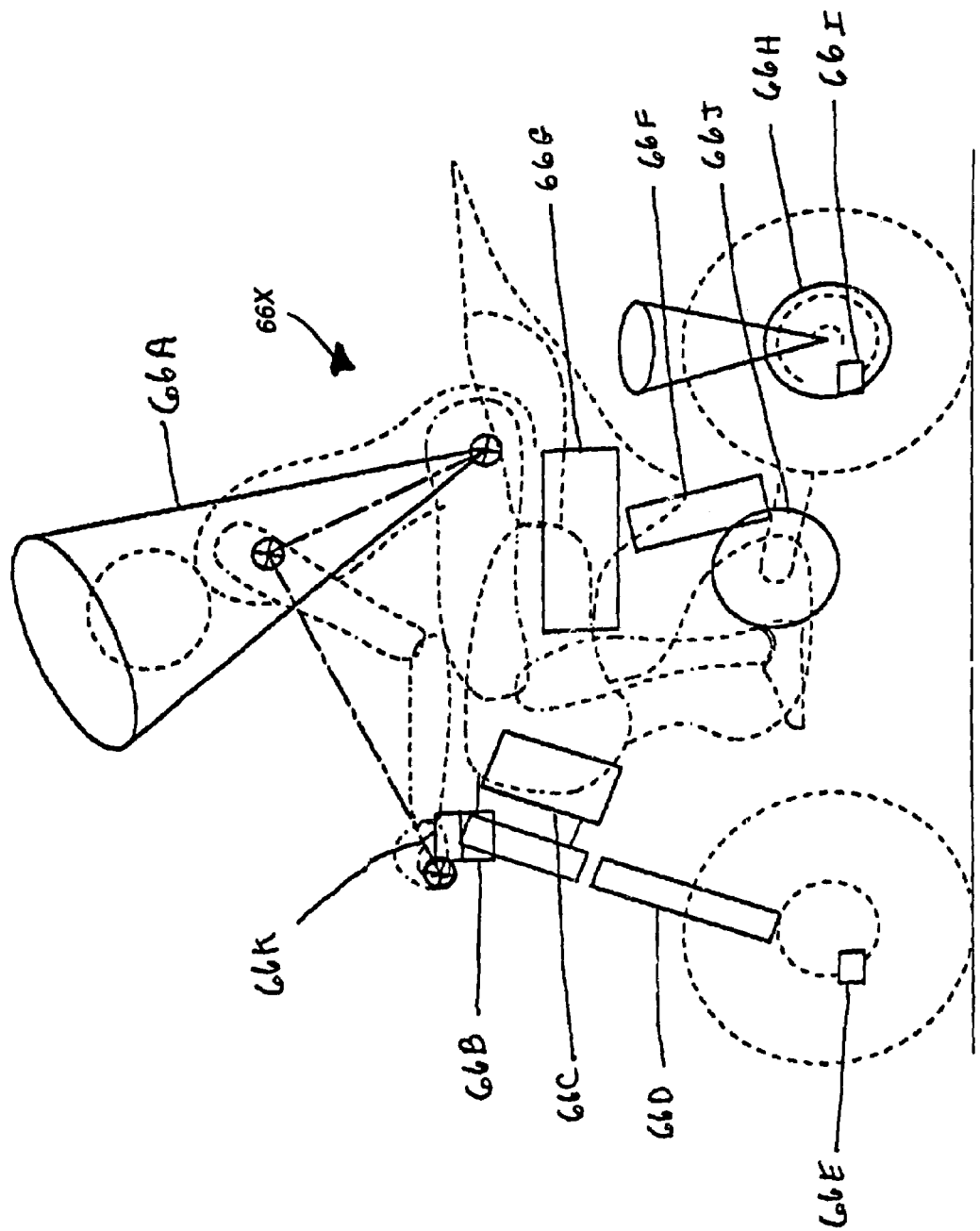
FIG. 66 is a side elevation view of a C/G shift control system diagram on an enduro motorcycle.

FIG. 66 is a side elevation view of a control system diagram on an enduro motorcycle 66X with multiple attached device means. The motorcycle front steering assembly 66B, frame adjustable geometry system 66C, front suspension 66D, front brake assembly 66E, power drive system 66F, rear suspension assembly 66G, rear drive gear assembly 66H, rear brake assembly, and front gear ratio assembly 66J are adjusted through control system 66K. Control system 66K will sense conical area 66A for C/G shift data. Control system 66K includes a sensor device and a control system as described in FIG. 1. Control system 66K outputs control signals to the attached dynamic devices 66B, 66C, 66D, 66E, 66F, 66G, 66H, 66I, and 66J through wire harness assemblies.

Figure 67:
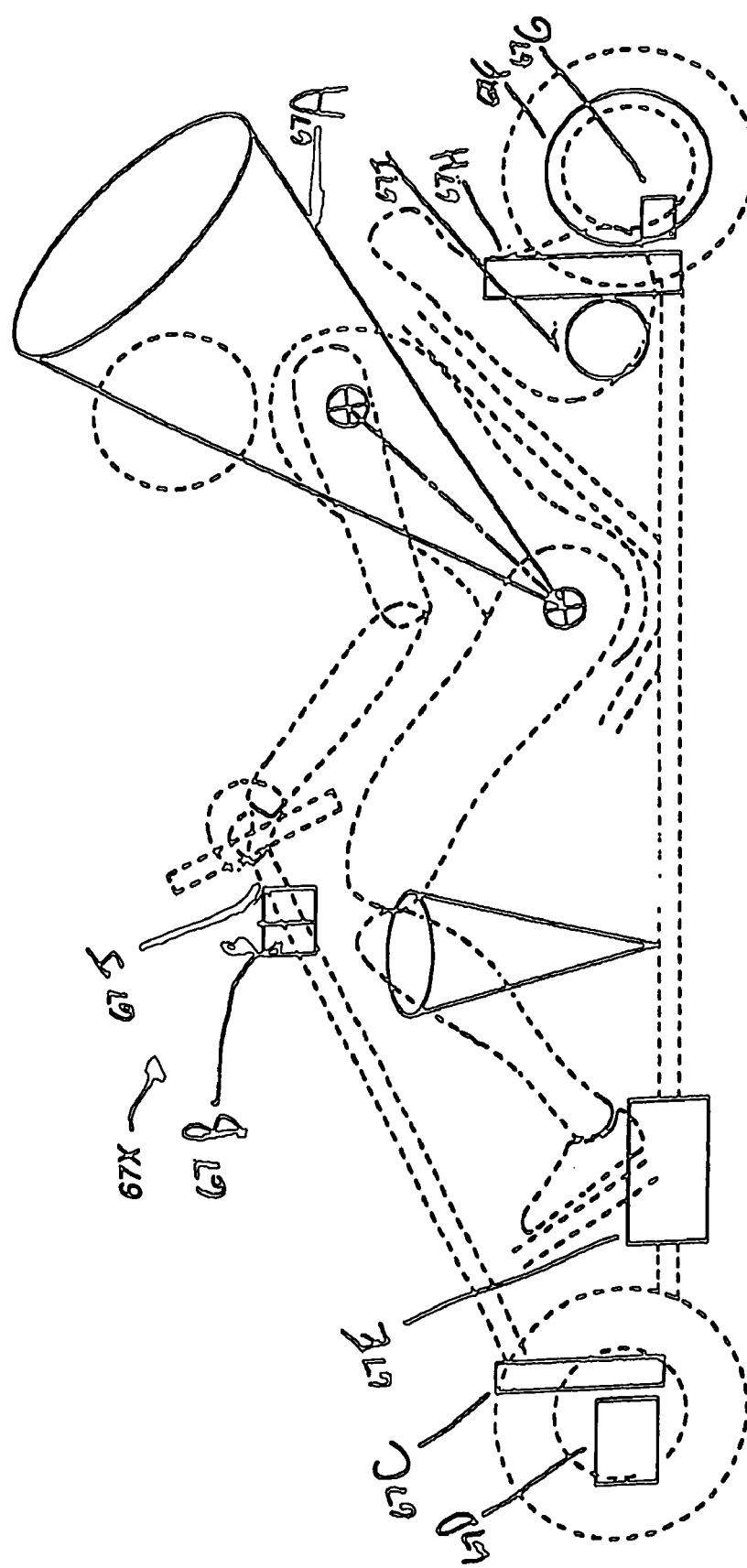
FIG. 67 is a side elevation view of a C/G shift control system diagram on a go cart.

FIG. 67 is a side elevation view of a control system diagram on a go cart 67x with multiple attached dynamic device means. The go cart 67x front steering assembly 67b, frame adjustable geometry system 67e, front suspension 67c, front brake assembly 67d, power drive system 67i, rear suspension assembly 67h, rear drive gear assembly 67f, and rear brake assembly 67g are adjusted through control system 67j. Control system 67j will sense conical area 67a for C/G shift data. Control system 67j includes a sensor device and a control system as described in FIG. 1. Control system 67j outputs control signals to the attached dynamic devices 67b, 67e, 67c, 67d, 67i, 67h, 67f, and 67g through wire harness assemblies.

Figure 68:
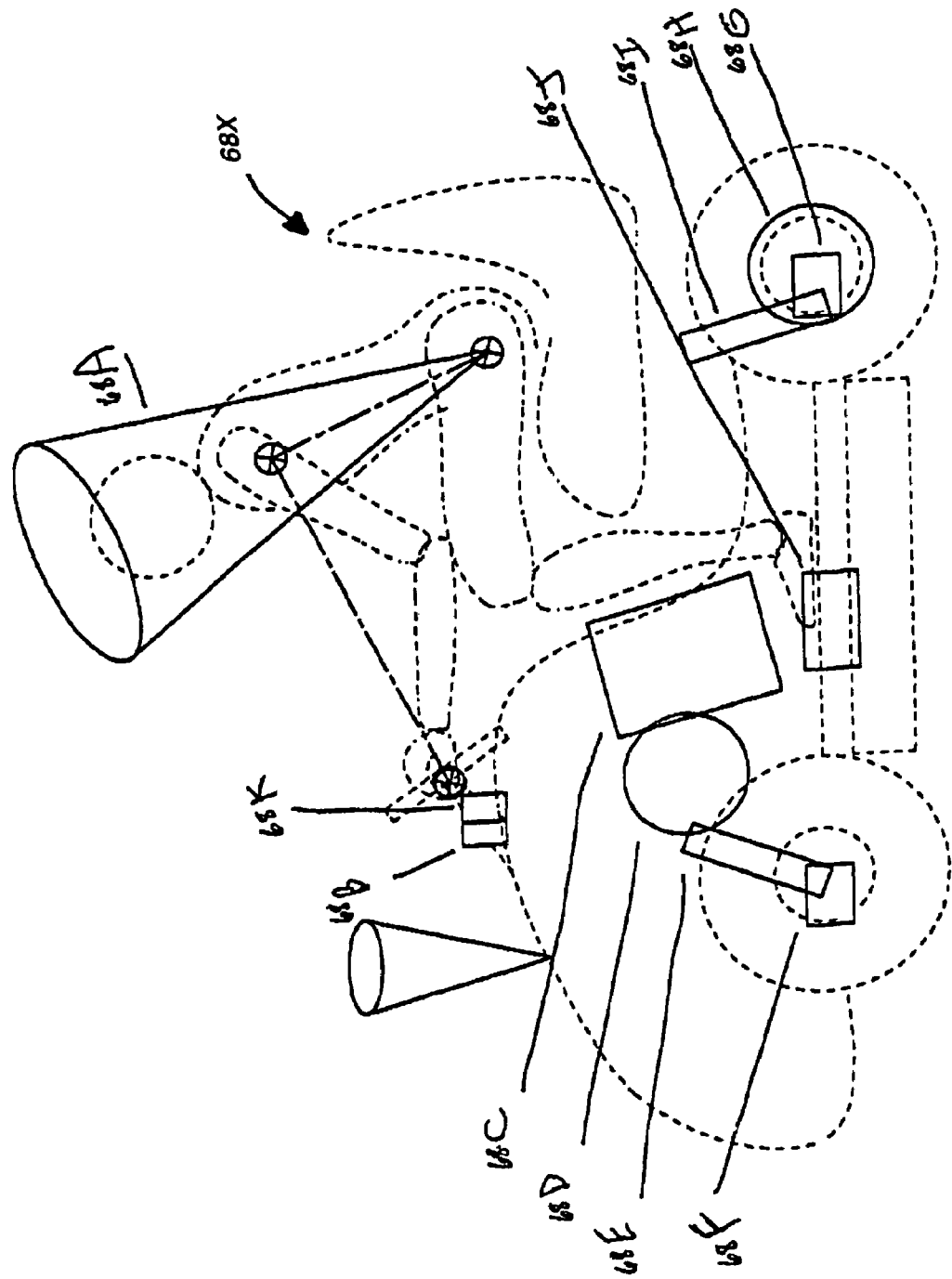
FIG. 68 is a side elevation view of a C/G shift control system diagram on a lawn tractor.

FIG. 68 is a side elevation view of a control system diagram on a lawn tractor 68x with multiple attached dynamic device means. The lawn tractor 68x front steering assembly 68b, frame adjustable geometry system 68j, front drive gears system 68d, front suspension system 68e, front brake assembly 68f, power drive system 68c, rear suspension assembly 68i, rear drive gear assembly 68h, and rear brake assembly 68g are adjusted through control system 68k. Control system 68k will sense conical area 68a for C/G shift data. Control system 68k includes a sensor device and a control system as described in FIG. 1. Control system 68k outputs control signals to the attached dynamic devices 68b, 68j, 68d, 68e, 68f, 68c, 68i, 68h, and 68g through wire harness assemblies.

Figure 69:
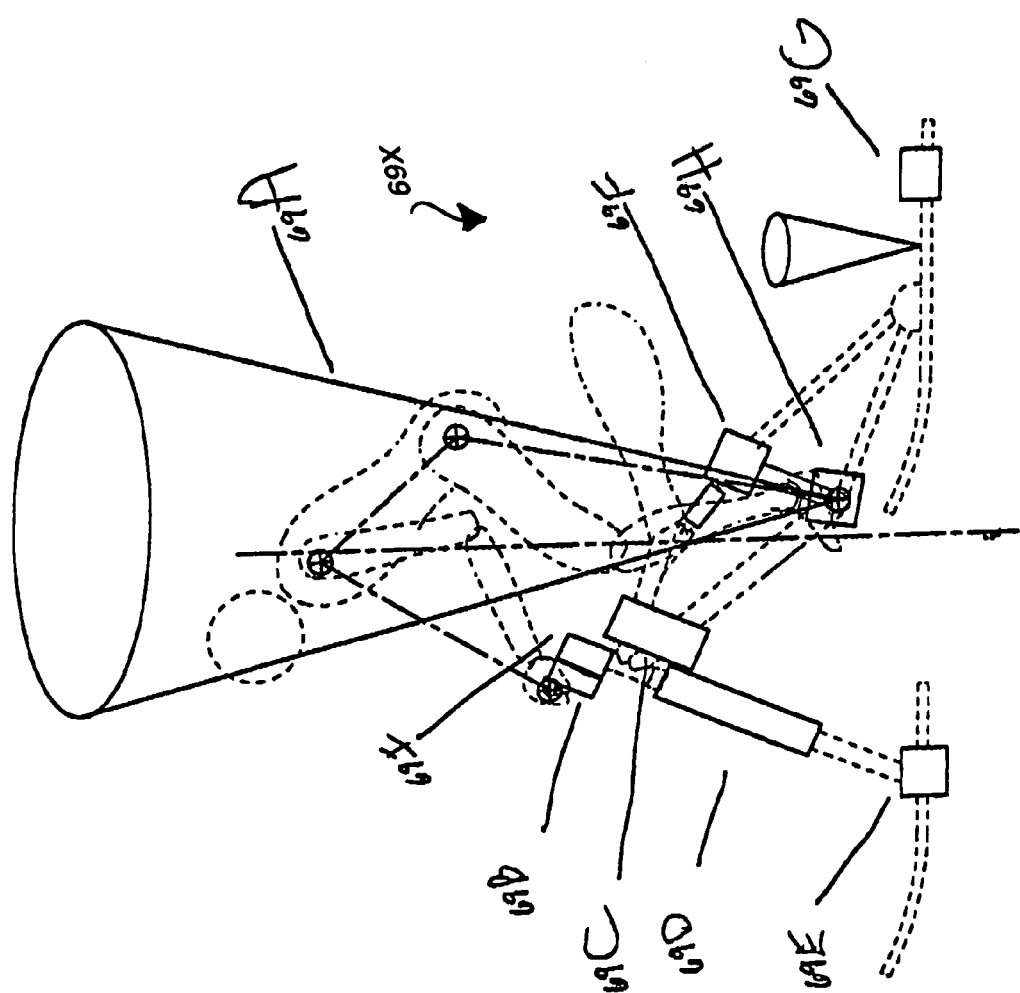
FIG. 69 is a side elevation view of a C/G shift control system diagram on a ski bike.

FIG. 69 is a side elevation view of a control system diagram on a ski bike 69x with multiple attached dynamic device means. The ski bike 69x front steering assembly 69b, frame adjustable geometry system 69c, front suspension system 69d, front brake assembly 69e, rear suspension assembly 69f, safety retention system 69h, and rear brake assembly 69g are adjusted through control system 69i. Control system 69i will sense conical area 69a for C/G shift data. Control system 69i includes a sensor device and a control system as described in FIG. 1. Control system 69i outputs control signals to the attached dynamic devices 69b, 69c, 69d, 69e, 69f, 69h, and 69g through wire harness assemblies.

Figure 70:
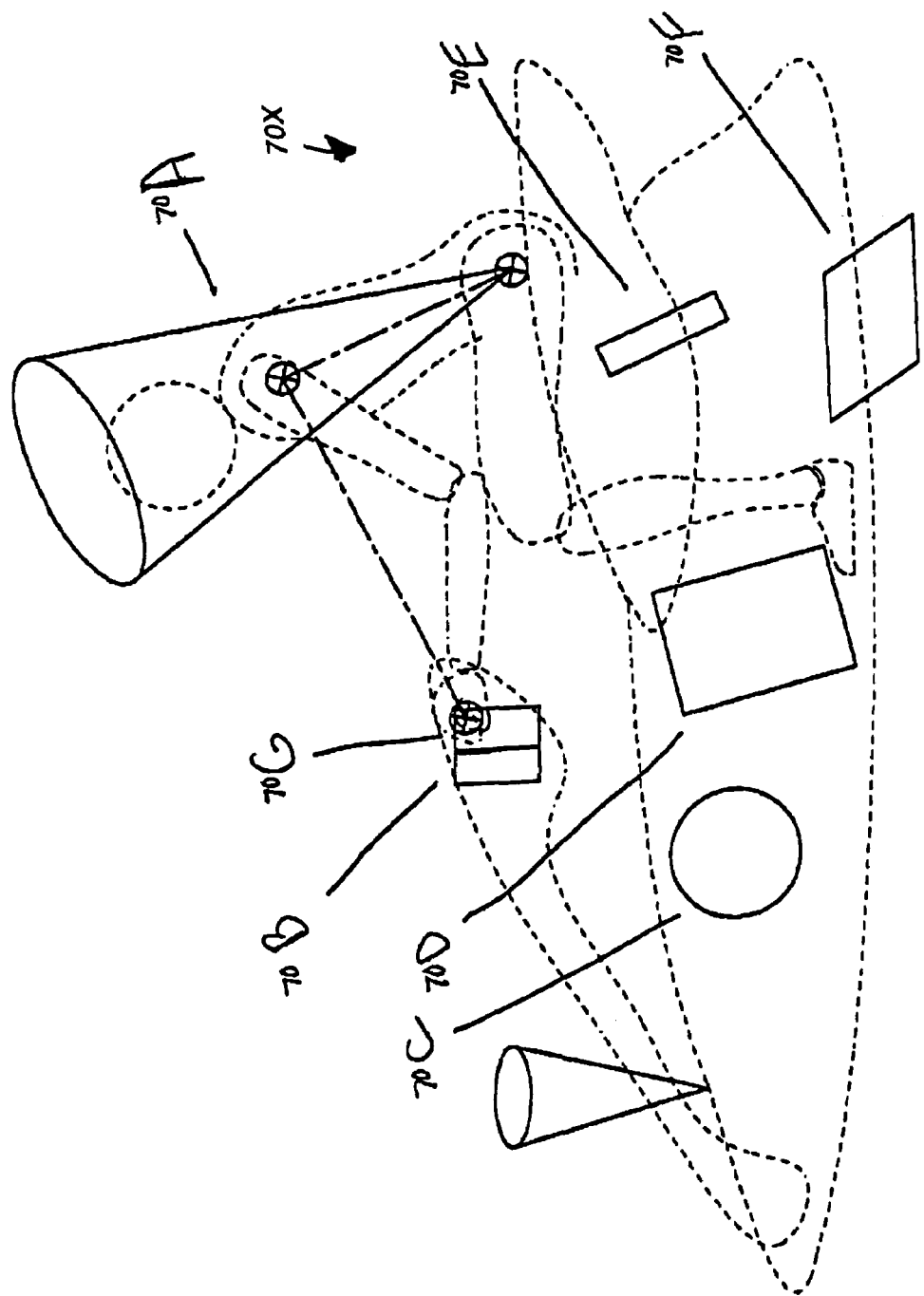
FIG. 70 is a side elevation view of a C/G shift control system diagram on a jet ski.

FIG. 70 is a side elevation view of a control system diagram on a jet ski 70x multiple attached dynamic device means. The jet ski 70x front steering assembly 70b, frame adjustable geometry system 70d, front drive assembly 70c, rear suspension assembly 70e, and rear trim tab assembly 70f are adjusted through control system 70g. Control system 70g will sense conical area 70a for C/G shift data. Control system 70g includes a sensor device and a control system as described in FIG. 1. Control system 70g outputs control signals to the attached dynamic devices 70b, 70d, 70c, 70e, and 70f through wire harness assemblies.

Figure 71:
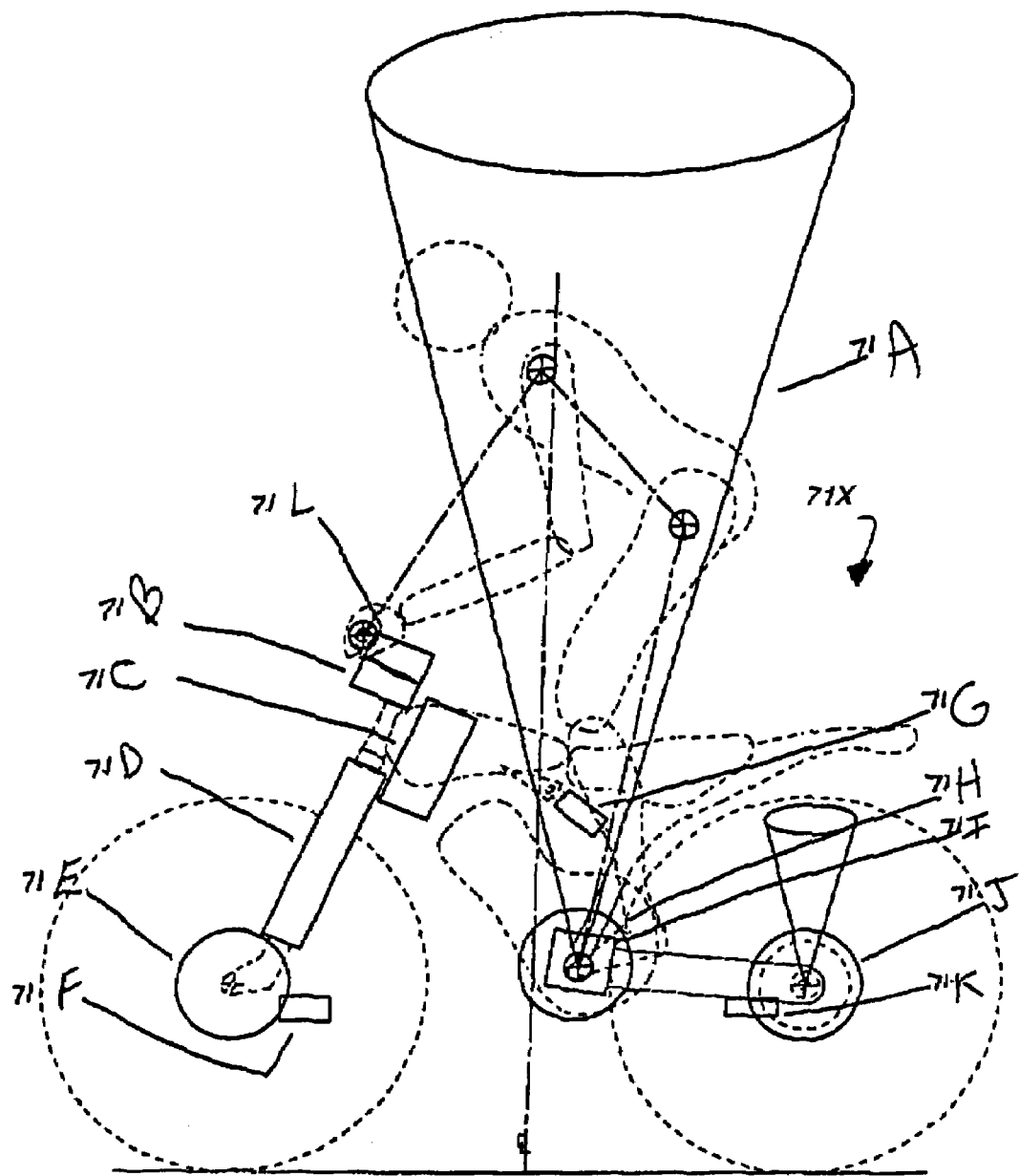
FIG. 71 is a side elevation view of a C/G shift control system diagram on an off-road motorcycle with human standing.

FIG. 71 is a side elevation view of a control system diagram on an off-road motorcycle 71x with human standing with multiple attached dynamic device means. The off-road motorcycle 71x front steering assembly 71b, frame adjustable geometry system 71c, front suspension 71d, front brake assembly 71f, front drive assembly 71e, power drive system 71i, rear suspension assembly 71g, rear drive gear assembly 71j, rear brake assembly 71k, and front gear ratio assembly 71h are adjusted through control system 71l. Control system 71l will sense conical area 71a for C/G shift data. Control system 71L includes a sensor device and a control system as described in FIG. 1. Control system 71L outputs control signals to the attached dynamic devices 71b, 71c, 71d, 71f, 71e, 71i, 71g, 71j, 71k, and 71h through wire harness assemblies.

Figure 72:
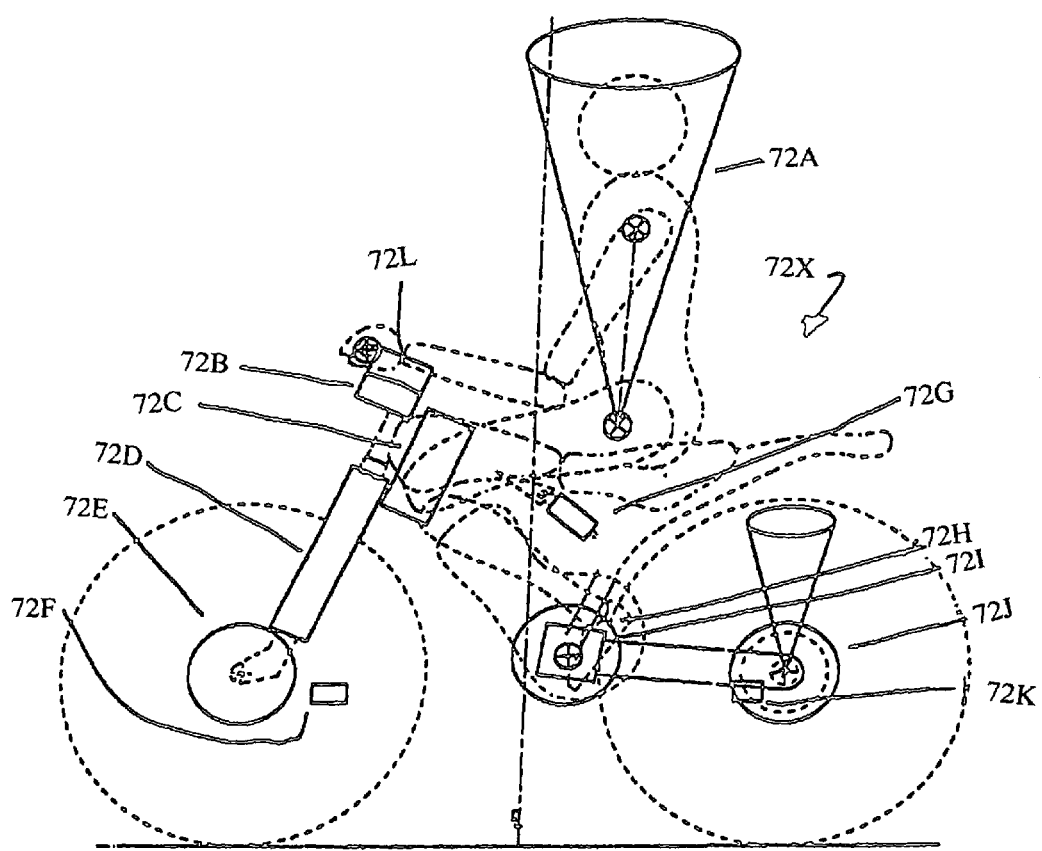
FIG. 72 is a side elevation view of a C/G shift control system diagram on a road motorcycle with human seated.

FIG. 72 is a side elevation view of a control system diagram on a road motorcycle 72x with human seated with multiple attached dynamic device means. Road motorcycle 72x front steering assembly 72b, frame adjustable geometry system 72c, front suspension 72d, front brake assembly 72f, front drive assembly 72e, power drive system 72i, rear suspension assembly 72g, rear drive gear assembly 72j, rear brake assembly 72k, and front gear ratio assembly 72h are adjusted through control system 72l. Control system 72l will sense conical area 72a for C/G shift data. Control system 72l includes a sensor device and a control system as described in FIG. 1. Control system 72l outputs control signals to the attached dynamic devices 72b, 72c, 72d, 72f, 72e, 72i, 72g, 72j, 72k, and 72h through wire harness assemblies.

Figure 73:
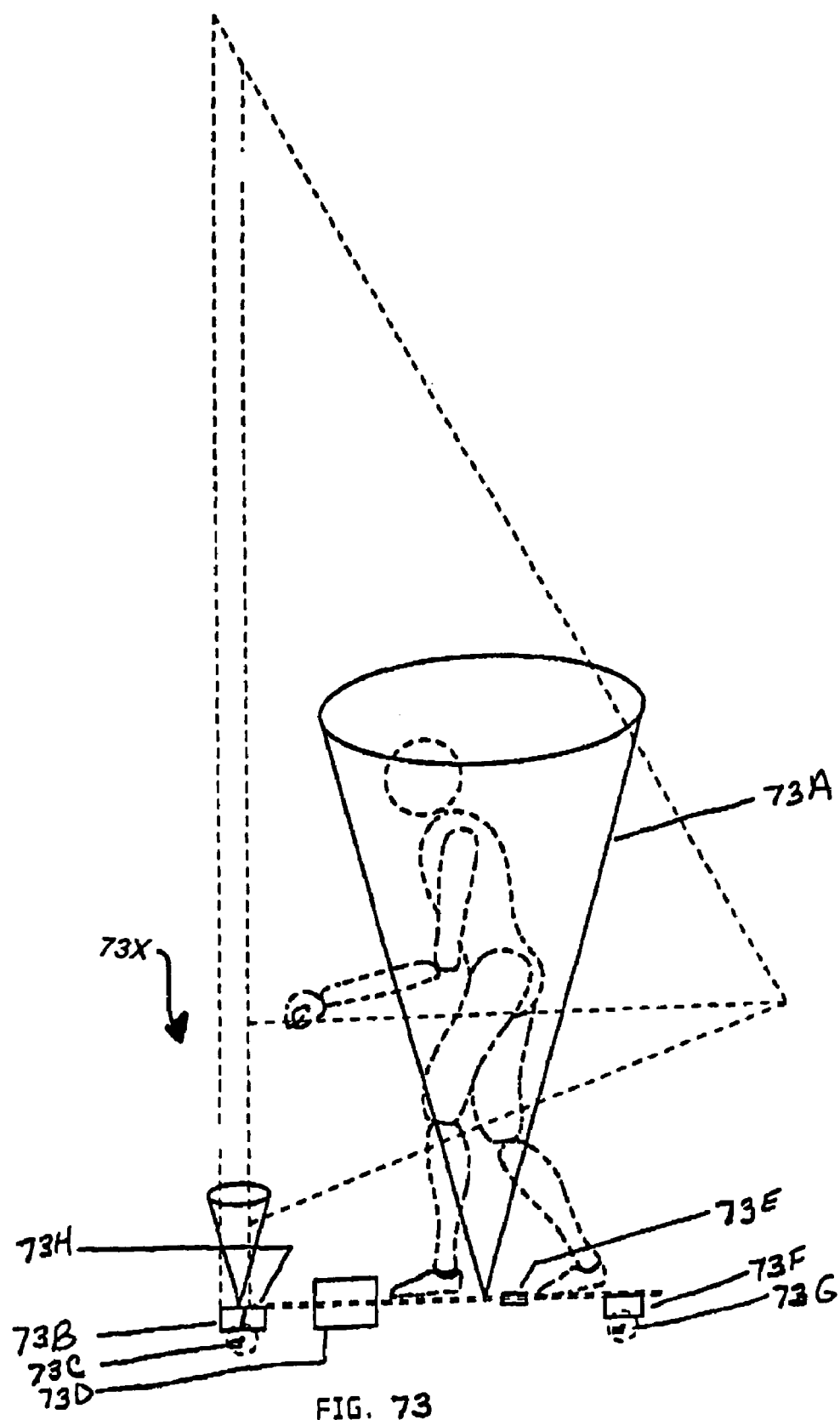
FIG. 73 is a side elevation view of a C/G shift control system diagram on a wind scooter.

FIG. 73 is a side elevation view of a control system diagram on a wind scooter 73x with multiple attached dynamic device means. Wind scooter 73x front steering assembly 73b, frame adjustable geometry system 73d, front brake assembly 73c, rear suspension assembly 73f, rear brake assembly 73g, and rear retention safety assembly 73e are adjusted through control system 73h. Control system 73h will sense conical area 73a for C/G shift data. Control system 73h includes a sensor device and a control system as described in FIG. 1. Control system 73h outputs control signals to the attached dynamic devices 73b, 73c, 73f, 73g, and 73e through wire harness assemblies.

Figure 74:
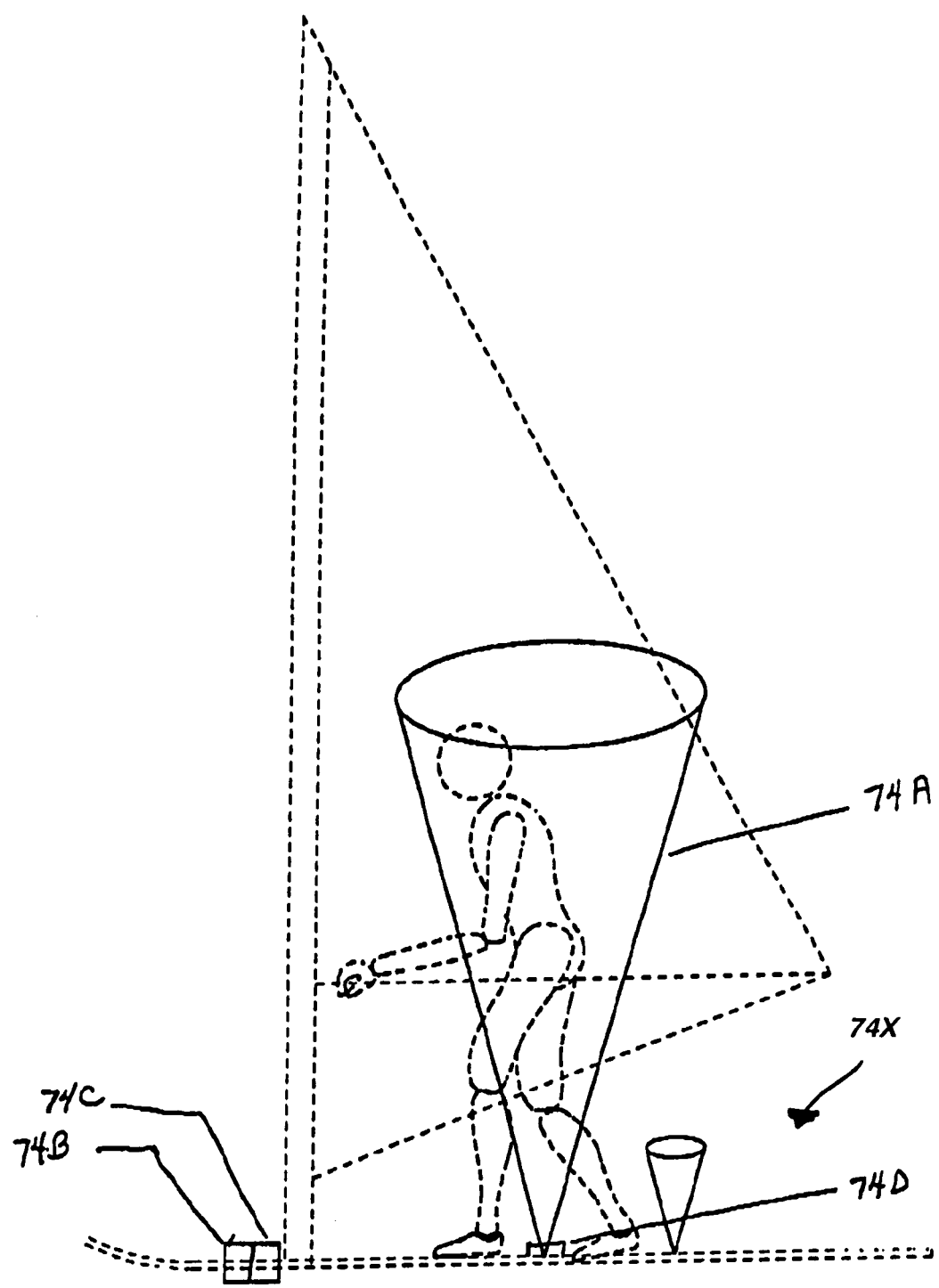
FIG. 74 is a side elevation view of a C/G shift control system diagram on a wind surfboard.

FIG. 74 is a side elevation view of a control system diagram on a wind surfboard 74x with multiple attached dynamic device means. Wind surfboard 74x front steering assembly 74b and safety retention assembly 74d are adjusted through control system 74c. Control system 74c will sense conical area 74a for C/G shift data. Control system 74c includes a sensor device and a control system as described in FIG. 1. Control system 74c outputs control signals to the attached dynamic devices 74b and 74d through wireless methods.

Figure 75:
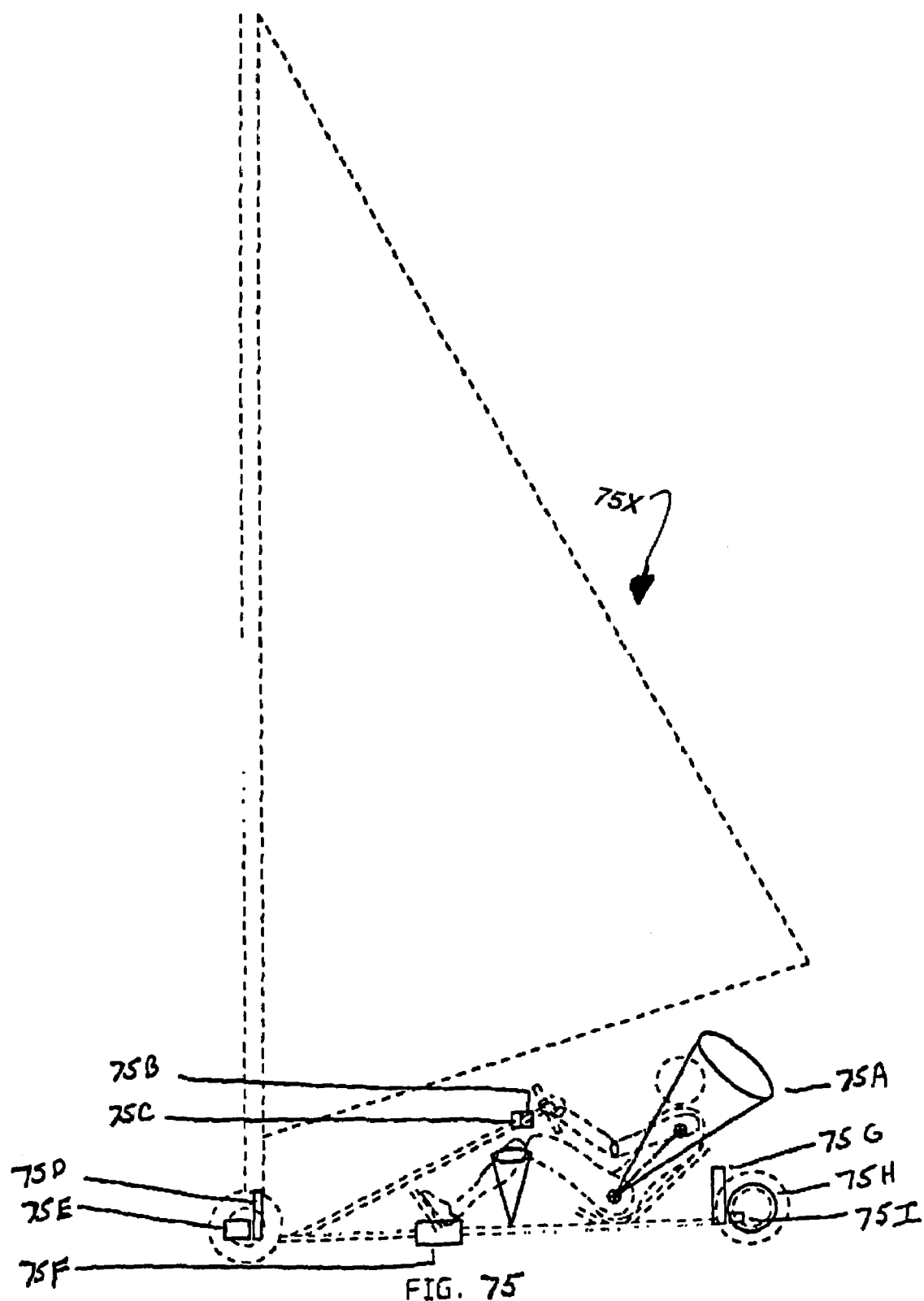
FIG. 75 is a side elevation view of a C/G shift control system diagram on a wind cart.

FIG. 75 is a side elevation view of a control system diagram on a wind cart 75x with multiple attached dynamic device means. Wind cart 75x front steering assembly 75c, frame adjustable geometry system 75f, front brake assembly 75e, front suspension assembly 75d, rear suspension assembly 75g, rear brake assembly 75i, and rear drive assembly 75h are adjusted through control system 75b. Control system 75b will sense conical area 75a for C/G shift data. Control system 75b includes a sensor device and a control system as described in FIG. 1. Control system 75b outputs control signals to the attached dynamic devices 75c, 75f, 75e, 75d, 75g, 75i, and 75h through wire harness assemblies.

Figure 76:
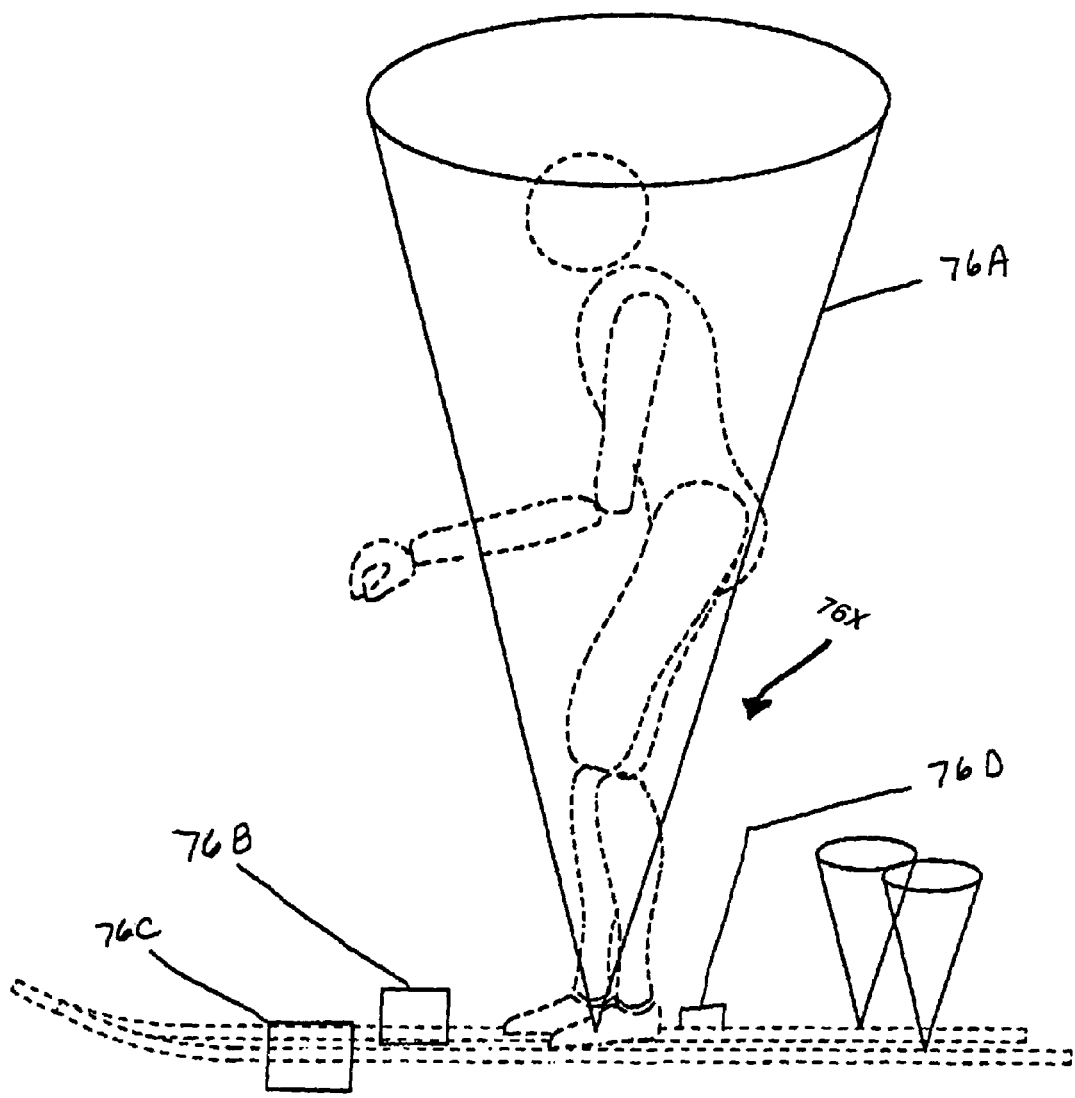
FIG. 76 is a side elevation view of a C/G shift control system diagram on skis.

FIG. 76 is a side elevation view of a control system diagram on skis 76x with multiple attached dynamic device means. Skis 76x flex modifying assembly 76c and safety retention assembly 76d are adjusted through control system 76b. Control system 76b will sense conical area 76a for C/G shift data. Control system 76b includes a sensor device and a control system as described in FIG. 1. Control system 76b outputs control signals to the attached dynamic devices 76c and 76d through wire harness assemblies.

Figure 77:
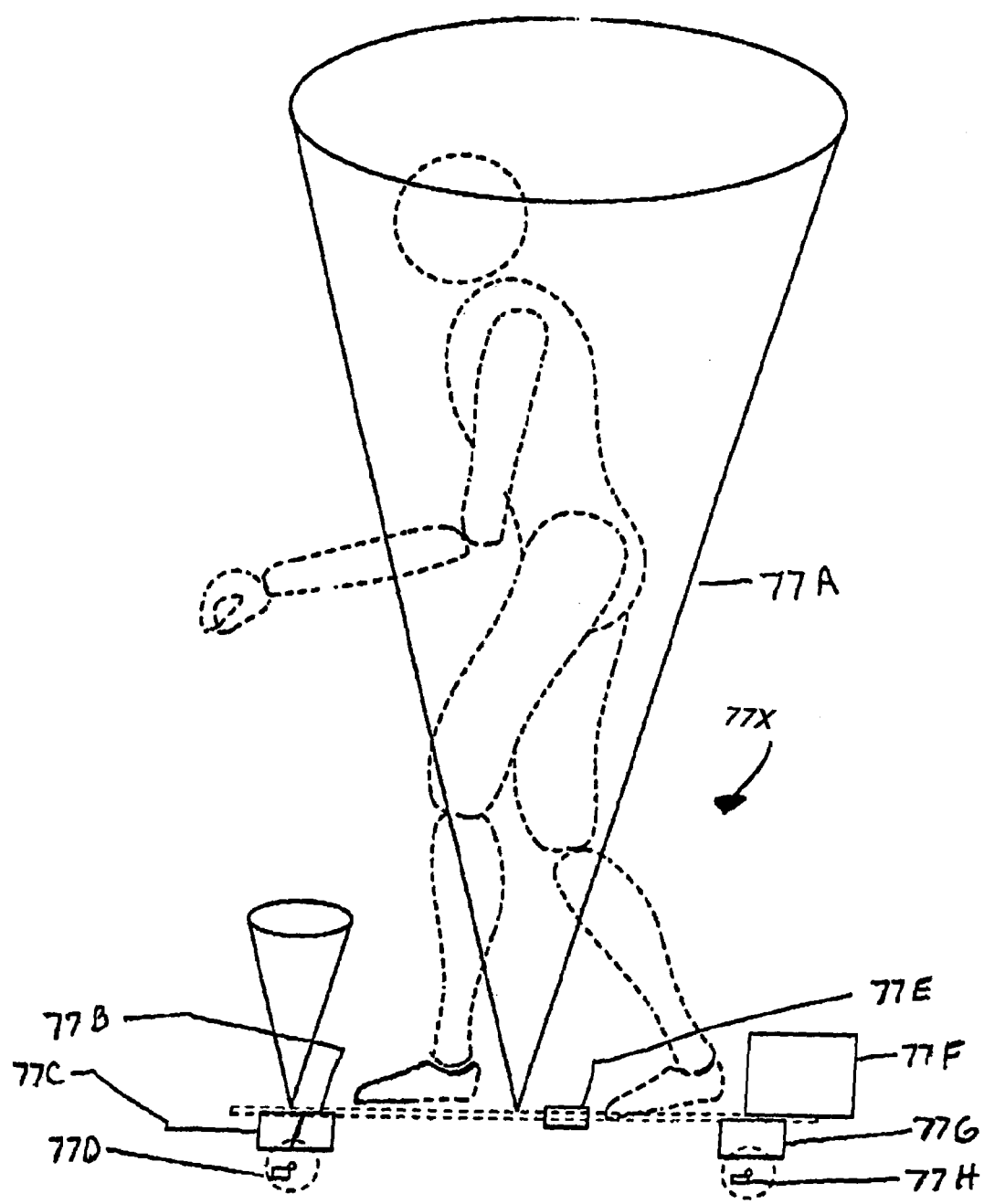
FIG. 77 is a side elevation view of a C/G shift control system diagram on a powered skateboard.

FIG. 77 is a side elevation view of a control system diagram on a powered skateboard 77x with multiple attached dynamic device means. Powered skateboard 77x front suspension assembly 77c, frame adjustable flex geometry system 77e, front brake assembly 77d, rear suspension assembly 77g, rear brake assembly 77h, and rear power device assembly 77f are adjusted through control system 77b. Control system 77b will sense conical area 77a for C/G shift data. Control system 77b includes a sensor device and a control system as described in FIG. 1. Control system 77b outputs control signals to the attached dynamic devices 77c, 77e, 77d, 77g, 77h, and 77f through wire harness assemblies.

Figure 78:
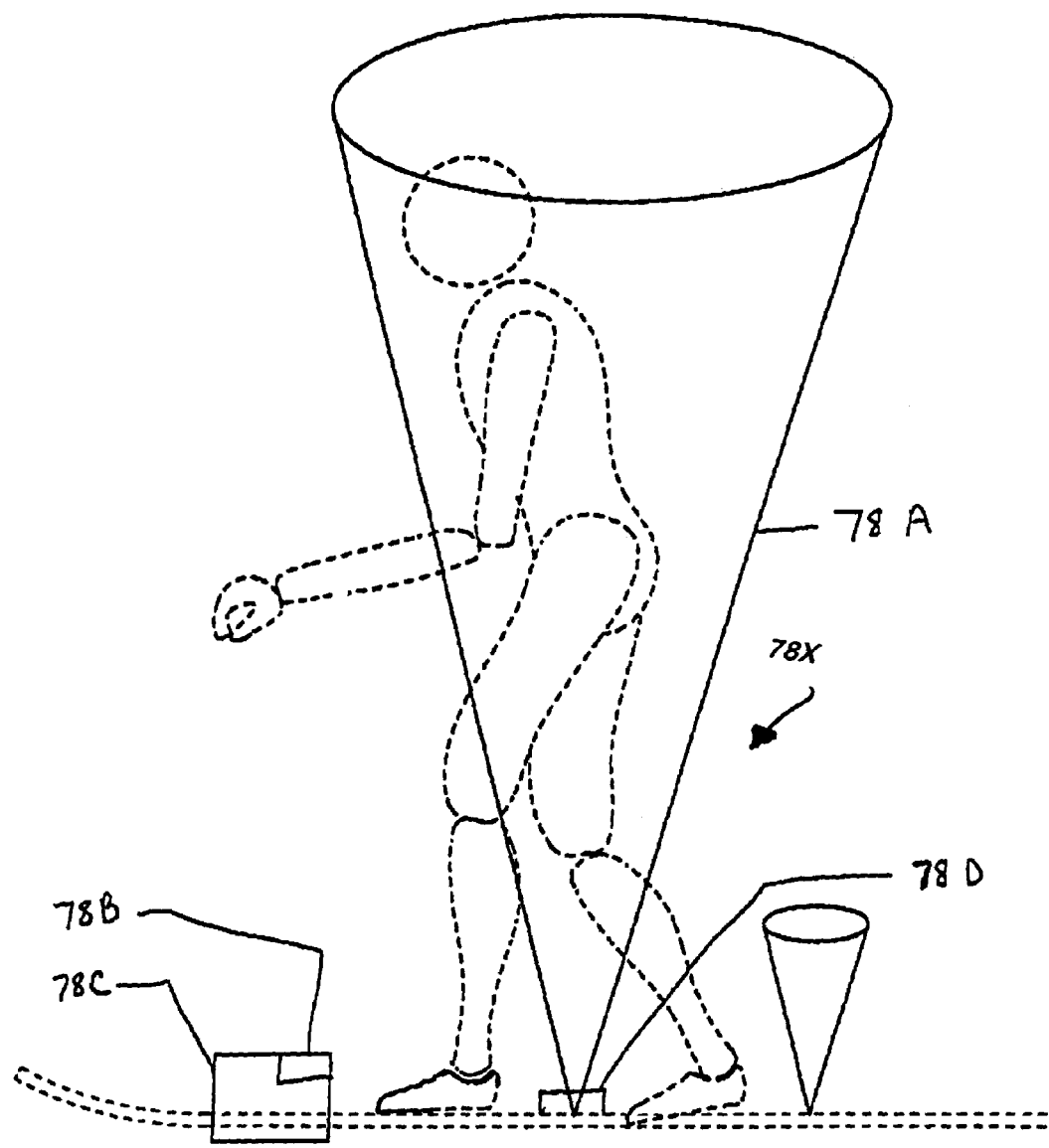
FIG. 78 is a side elevation view of a C/G shift control system diagram on a snowboard.

FIG. 78 is a side elevation view of a control system diagram on a snowboard 78x with multiple attached dynamic device means. Snowboard 78x flex modifying assembly 78c and safety retention assembly 78d are adjusted through control system 78b. Control system 78b will sense conical area 78a for C/G shift data. Control system 78b includes a sensor device and a control system as described in FIG. 1. Control system 78b outputs control signals to the attached dynamic devices 78c and 78d through wire harness assemblies.

Figure 79:
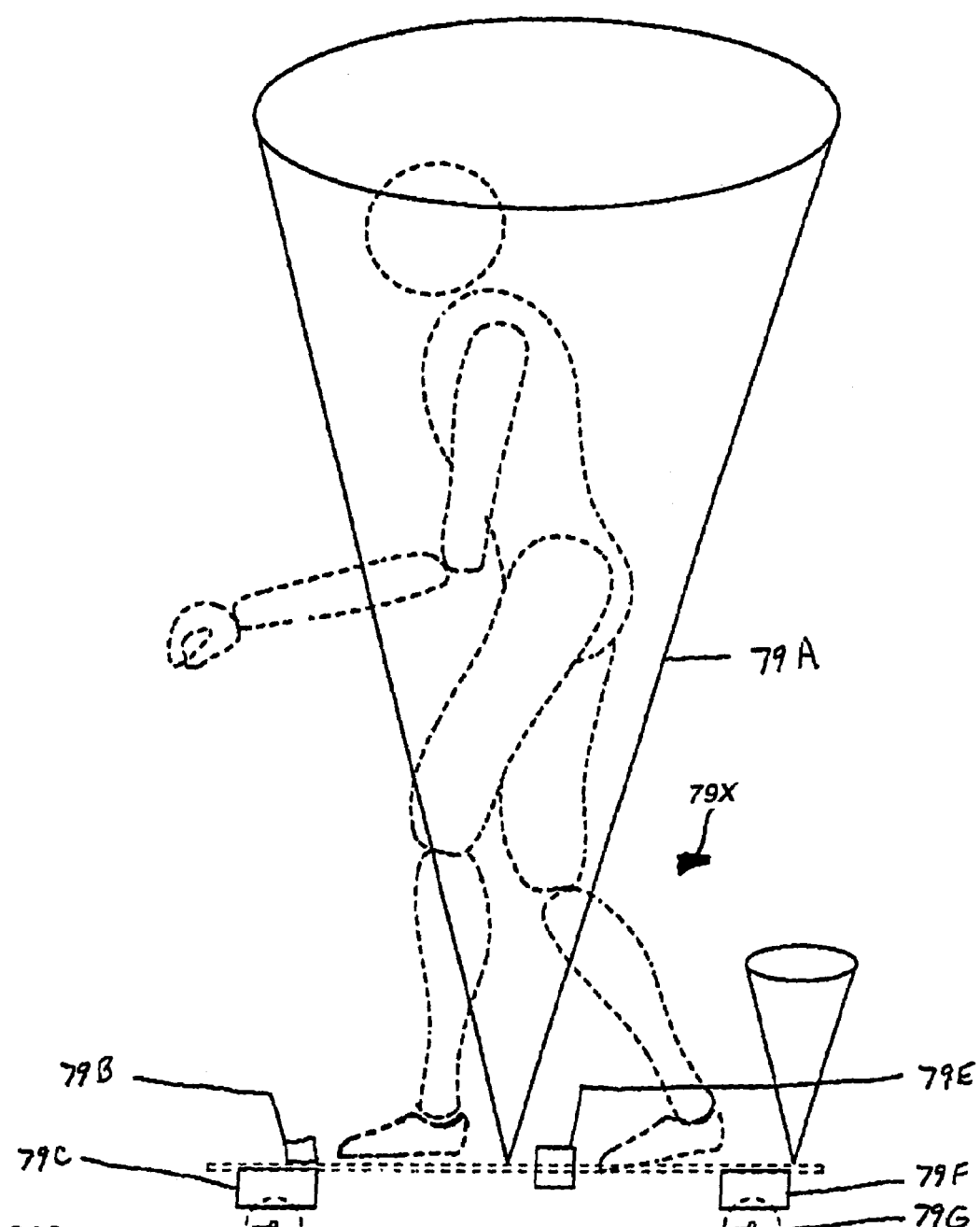
FIG. 79 is a side elevation view of a C/G shift control system diagram on a skateboard.

FIG. 79 is a side elevation view of a control system diagram on a skateboard 79x with multiple attached dynamic device means. Skateboard 79x front suspension assembly 79c, frame adjustable flex geometry system 79e, front brake assembly 79d, rear suspension assembly 79f, and rear brake assembly 79g are adjusted through control system 79b. Control system 79b will sense conical area 79a for C/G shift data. Control system 79b includes a sensor device and a control system as described in FIG. 1. Control system 79b outputs control signals to the attached dynamic devices 79c, 79e, 79d, 79f, and 79g through wire harness assemblies.

Figure 80:
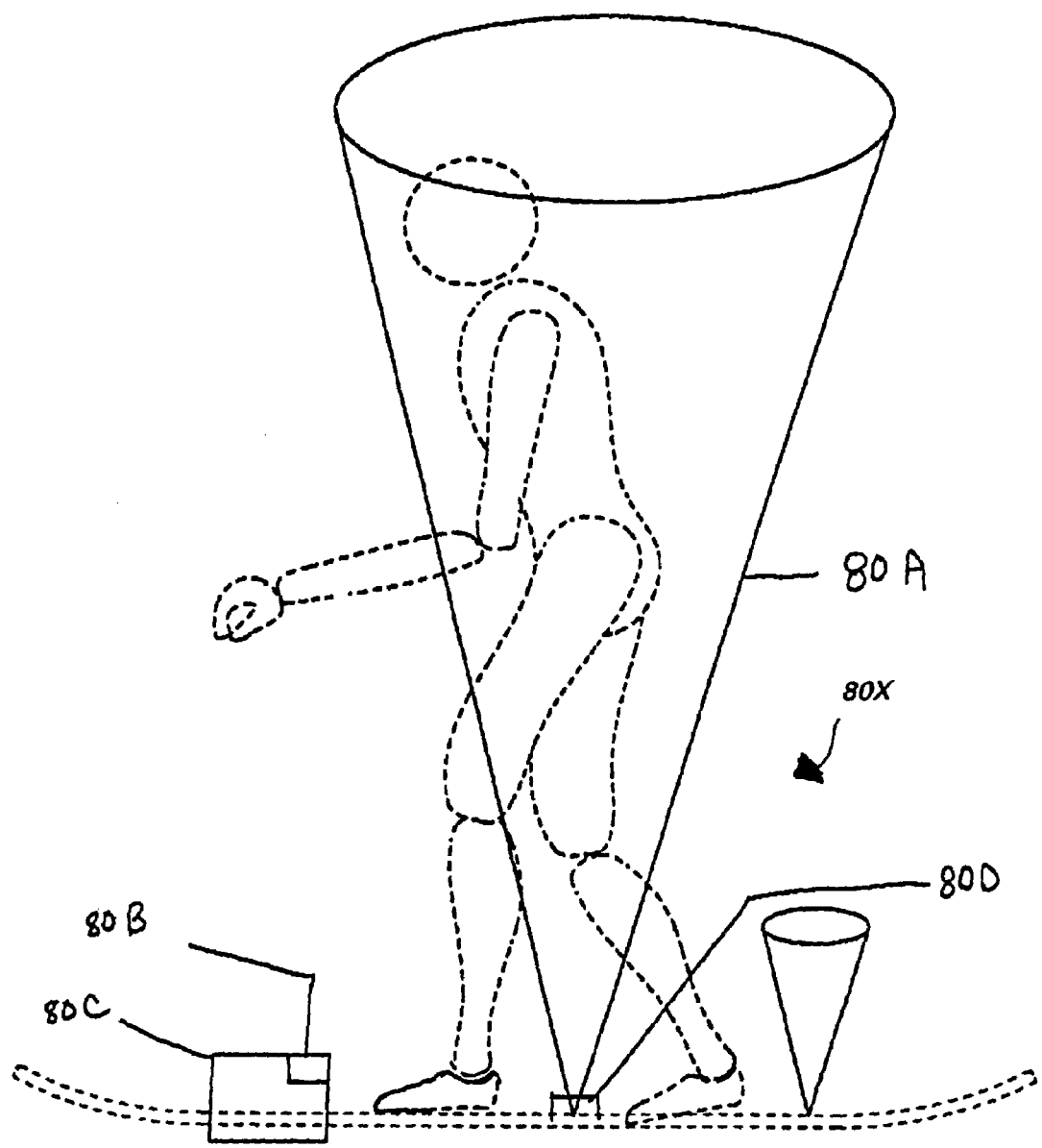
FIG. 80 is a side elevation view of a C/G shift control system diagram on a surfboard.

FIG. 80 is a side elevation view of a control system diagram on a surfboard 80x with multiple attached dynamic device means. Surfboard 80x flex modifying assembly 80c and safety retention assembly 80d are adjusted through control system 80b. Control system 80b will sense conical area 80a for C/G shift data. Control system 80b includes a sensor device and a control system as described in FIG. 1. Control system 80b outputs control signals to the attached dynamic devices 80c and 80d through wire harness assemblies.

Figure 81:
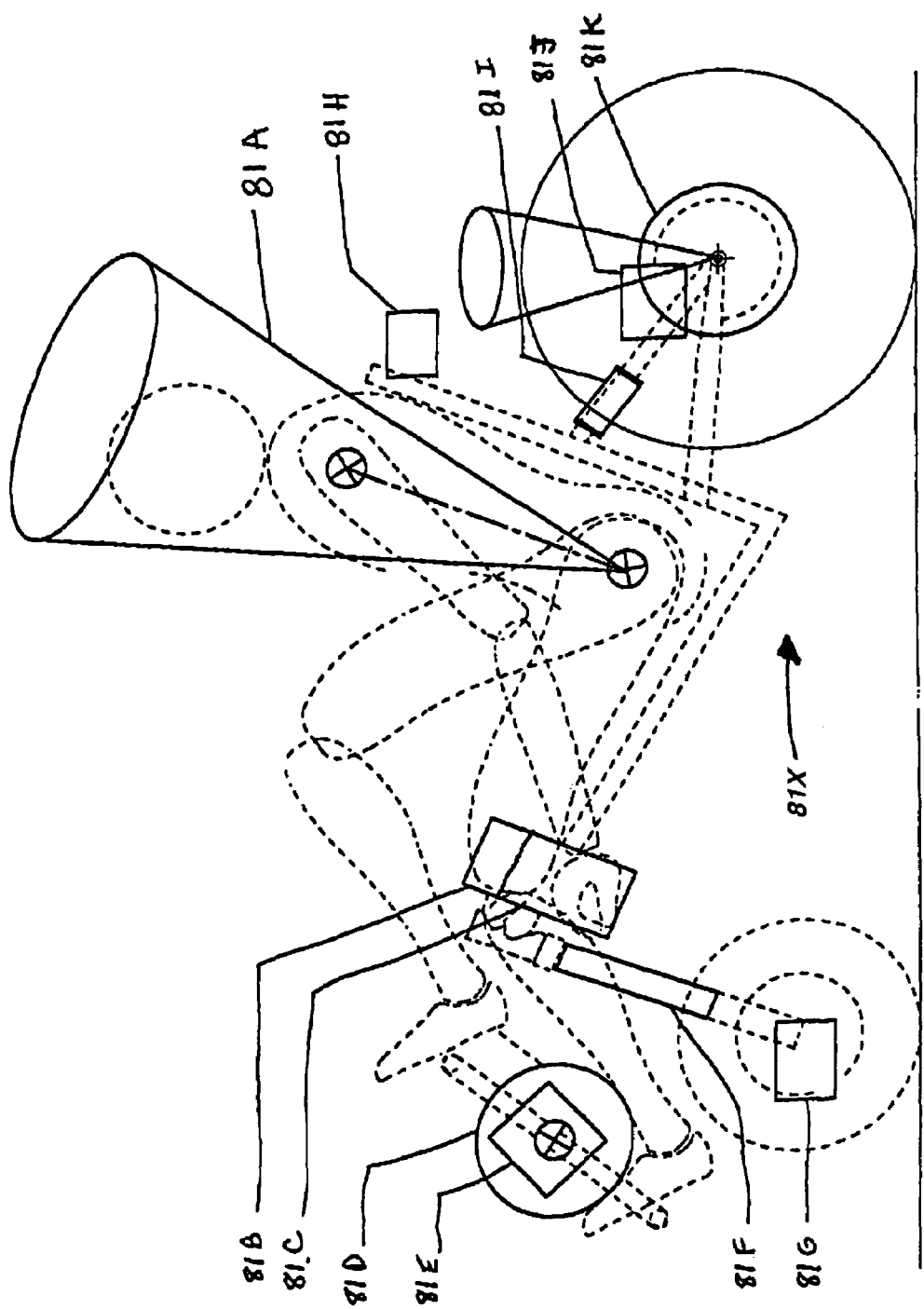
FIG. 81 is a side elevation view of a C/G shift control system diagram on a recumbent bicycle.

FIG. 81 is a side elevation view of a control system diagram on a recumbent bicycle 81x with multiple attached dynamic device means. The recumbent bicycle 81x front steering assembly 81c, front gear system 81d, front suspension assembly 81f, front brake assembly 81g, front drive system 81e, rear suspension assembly 81i, rear drive gear assembly 81k, and rear brake assembly 81j are adjusted through control system 81b. Control system 81b will sense conical area 81a for C/G shift data. Control system 81b includes a sensor device and a control system as described in FIG. 1. Control system 81b outputs control signals to the attached dynamic devices 81c, 81d, 81f, 81g, 81e, 81i, 81k, and 81j through wire harness assemblies.

Figure 82:
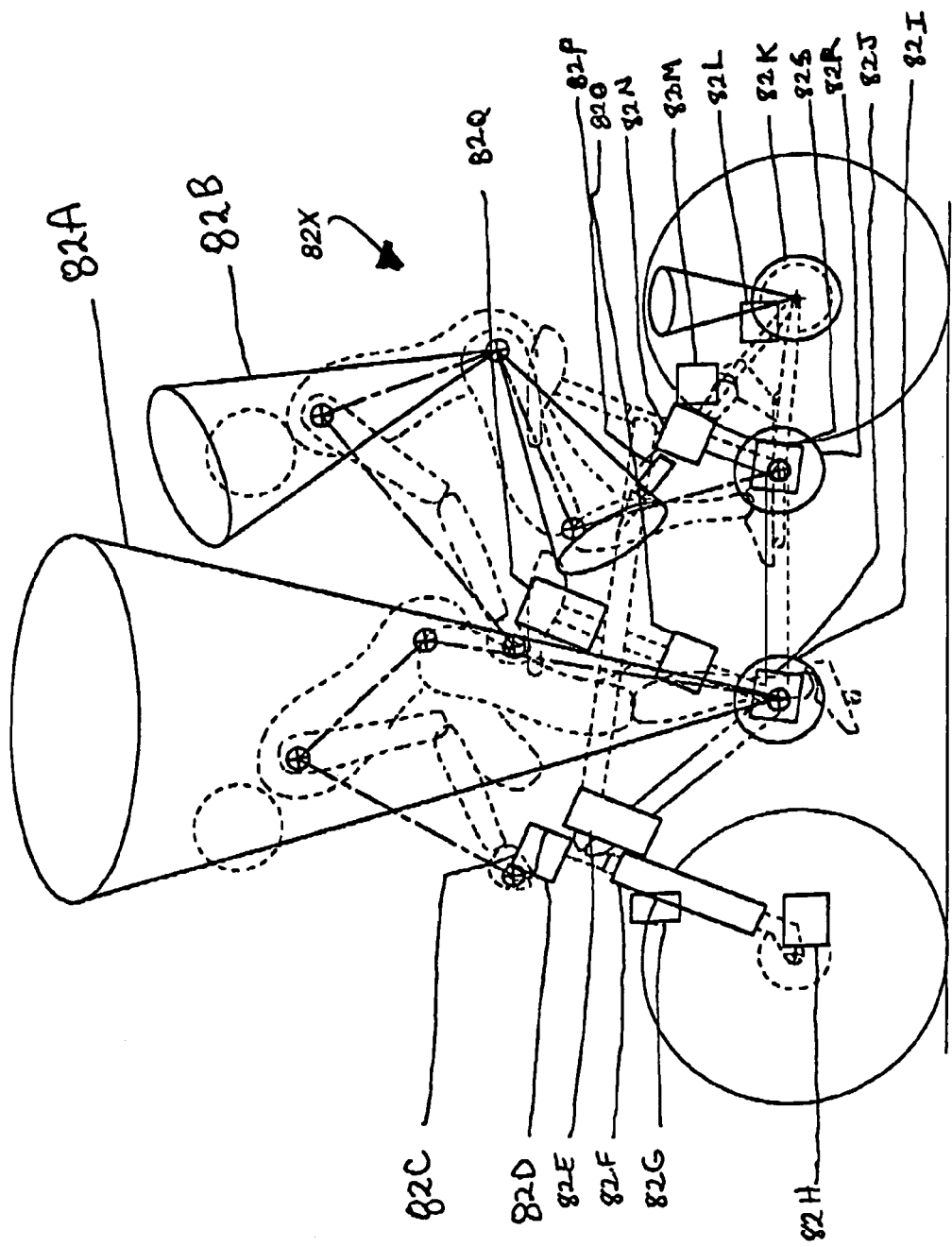
FIG. 82 is a side elevation view of a C/G shift control system diagram on a tandem bicycle.

FIG. 82 is a side elevation view of a control system diagram on a tandem bicycle 82x with multiple attached dynamic device means. The tandem bicycle 82x front steering assembly 82d, front light system 82g, front suspension assembly 82f, frame adjustable geometry assembly 82e, front brake assembly 82h, front drive system 82i, front shoe retention assembly 82j, rear frame suspension assembly 82p, rear drive gear assembly 82k, middle suspension assembly 82o, rear frame geometry adjusting system 82n, rear safety lighting system 82m, rear steering suspension assembly 82q, middle drive assembly 82r, middle retention assembly 82s, and rear brake assembly 82l are adjusted through control system 82c. Control system 82c will sense conical areas 82a and 82b for C/G shift data. Control system 82c includes a sensor device and a control system as described in FIG. 1. Control system 82c outputs control signals to the attached dynamic devices 82d, 82g, 82f, 82e, 82h, 82i, 82j, 82p, 82k, 82o, 82n, 82m, 82q, 82r, 82s, and 82L through wire harness assemblies.

Figure 83:
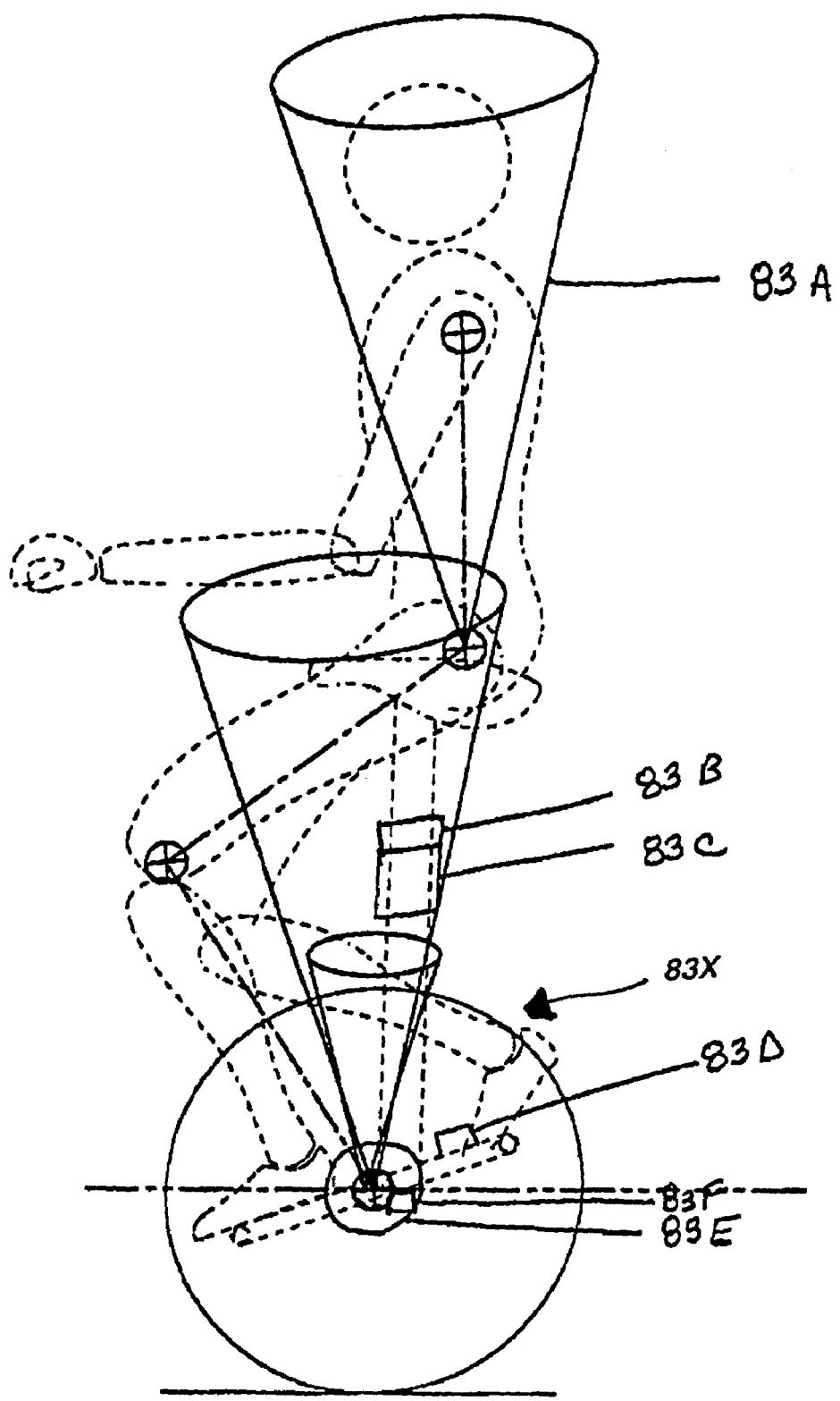
FIG. 83 is a side elevation view of a C/G shift control system diagram on a unicycle.

FIG. 83 is a side elevation view of a control system diagram on a unicycle 83x with multiple attached dynamic device means. The unicycle 83x gear system 83e, seat suspension assembly 83c, brake assembly 83f, and safety feet retention system 83d are adjusted through control system 83b. Control system 83b will sense conical area 83a for C/G shift data. Control system 83b includes a sensor device and a control system as described in FIG. 1. Control system 83b outputs control signals to the attached dynamic devices 83e, 83c, 83f, and 83d through wire harness assemblies.

Figure 84:
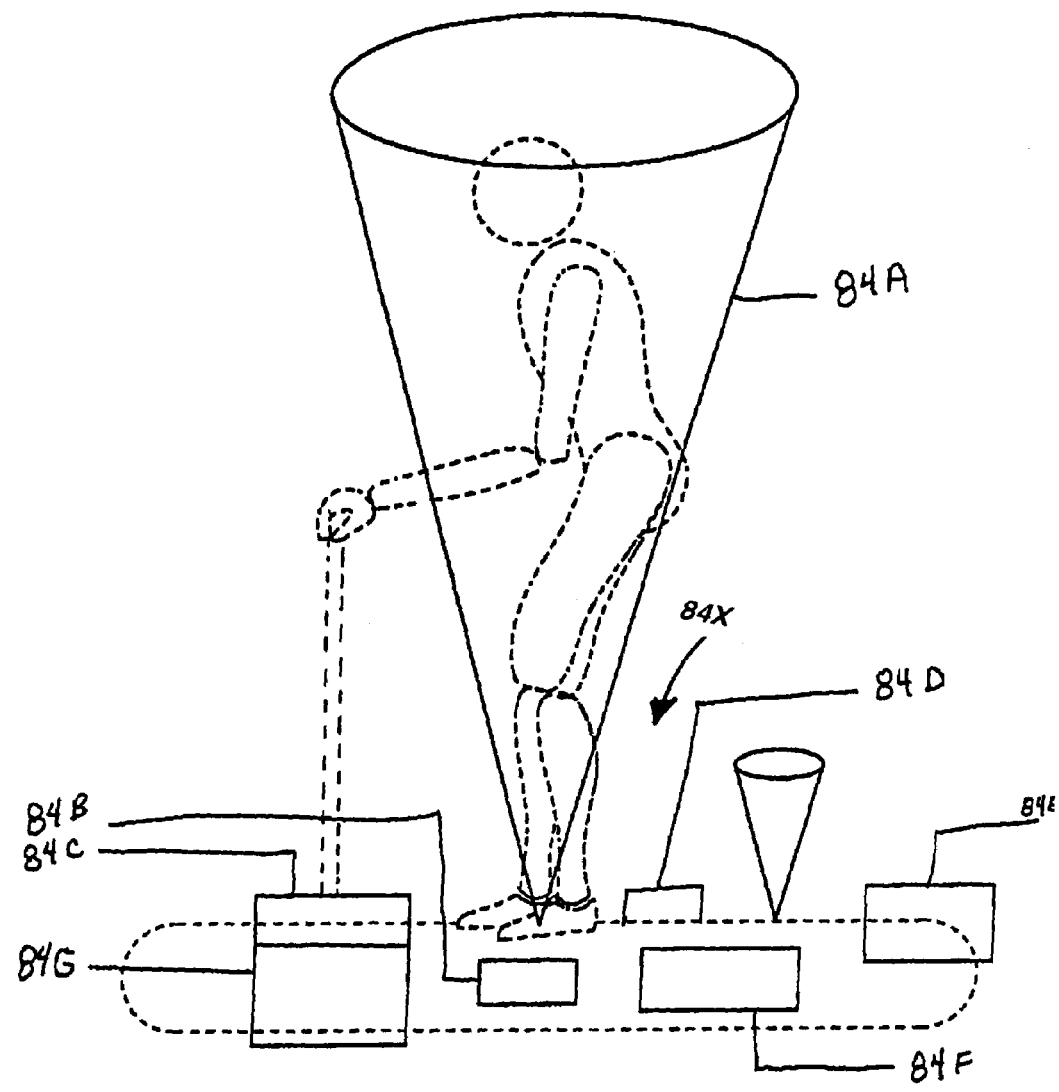
FIG. 84 is a side elevation view of a C/G shift control system diagram on a hovercraft.

FIG. 84 is a side elevation view of a control system diagram on a hovercraft 84x with multiple attached dynamic device means. Hovercraft 84x front steering assembly 84c, front power system assembly 84g, safety retention device 84d, frame adjustable directional trim system 84f, and rear stabilizer assembly 84e are adjusted through control system 84b. Control system 84b will sense conical area 84a for C/G shift data. Control system 84b includes a sensor device and a control system as described in FIG. 1. Control system 84b outputs control signals to the attached dynamic devices 84c, 84g, 84d, 84f, and 84e through wire harness assemblies.

Figure 85:
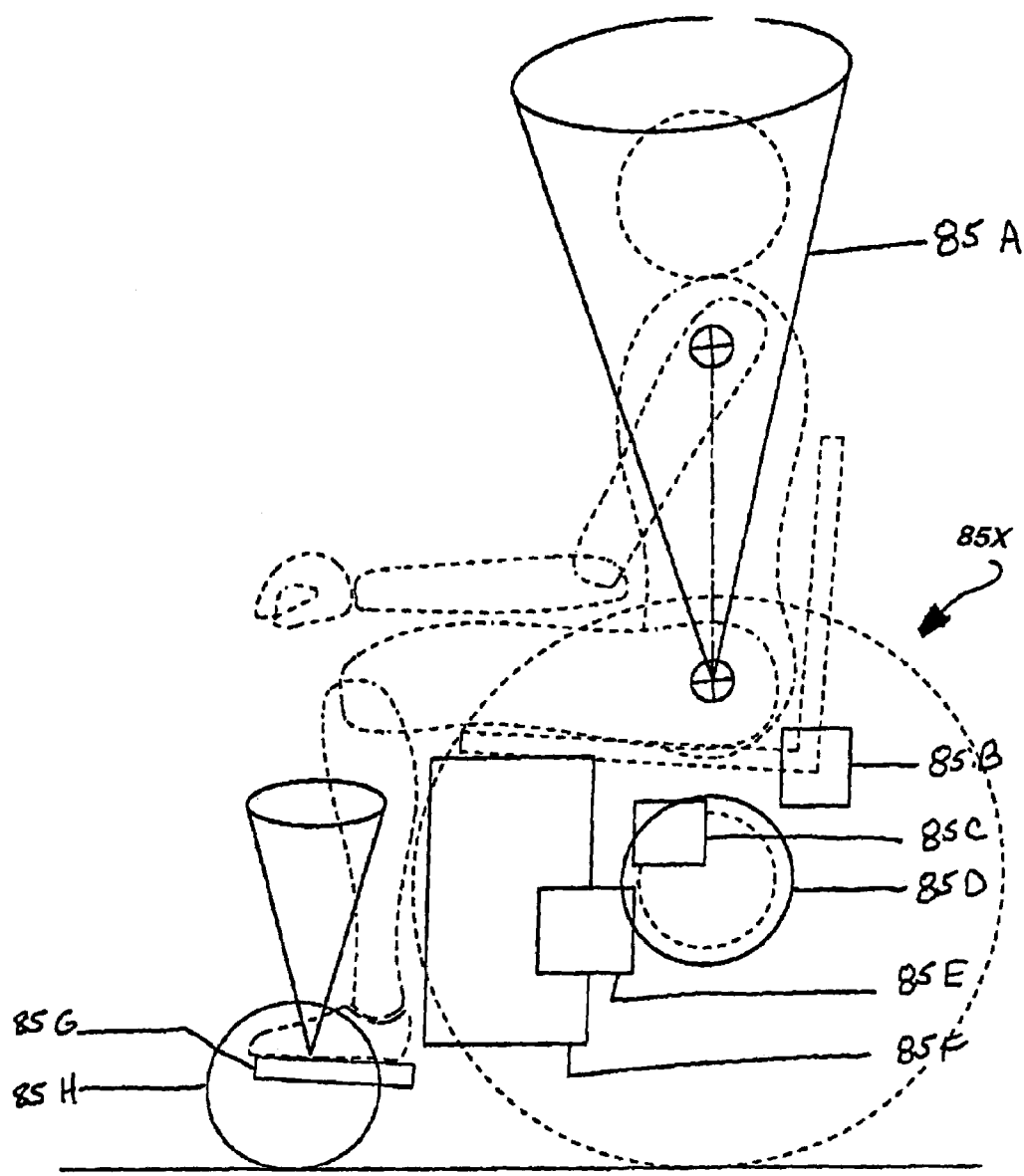
FIG. 85 is a side elevation view of a C/G shift control system diagram on a wheelchair.

FIG. 85 is a side elevation view of a control system diagram on a wheelchair 85x with multiple attached dynamic device means. Wheelchair 85x steering assembly 85g, front power system assembly 85f, seat suspension assembly 85e, front wheel braking assembly 85h, rear wheel brake assembly 85c, and rear wheel drive gear assembly 85d are adjusted through control system 85b. Control system 85b will sense conical area 85a for C/G shift data. Control system 85b includes a sensor device and a control system as described in FIG. 1. Control system 85b outputs control signals to the attached dynamic devices 85g, 85f, 85e, 85h, 85c, and 85d through wire harness assemblies.

Figure 86:
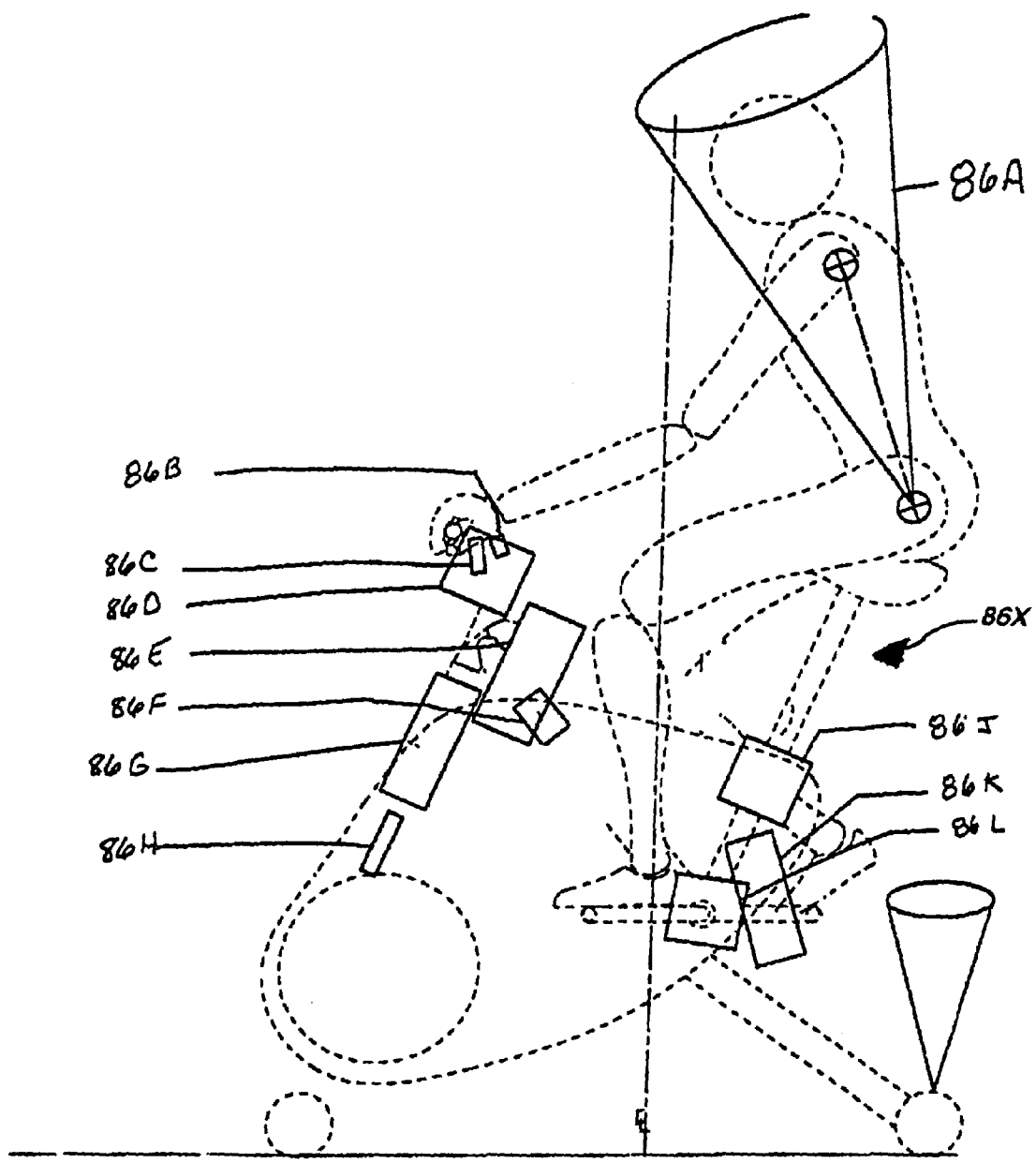
FIG. 86 is a side elevation view of a C/G shift control system diagram on a stationary cycle.

FIG. 86 is a side elevation view of a control system diagram on a stationary cycle 86x with multiple attached dynamic device means. Stationary cycle 86x steering assembly 86g, front panel interactive display screen assembly 86c, manual data input device 86b, interactive relay connector 86h, front suspension assembly 86g, adjustable frame geometry assembly 86e, pedal resistance assembly 86l, rear frame suspension assembly 86k, and rear tilt control assembly 86j are adjusted through control system 86c. Control system 86c will sense conical area 86a for C/G shift data. Control system 86c includes a sensor device and a control system as described in FIG. 1. Control system 86c outputs control signals to the attached dynamic devices 86g, 86c, 86b, 86h, 86g, 86e, 86l, 86k, and 86j through wire harness assemblies.

Figure 87:
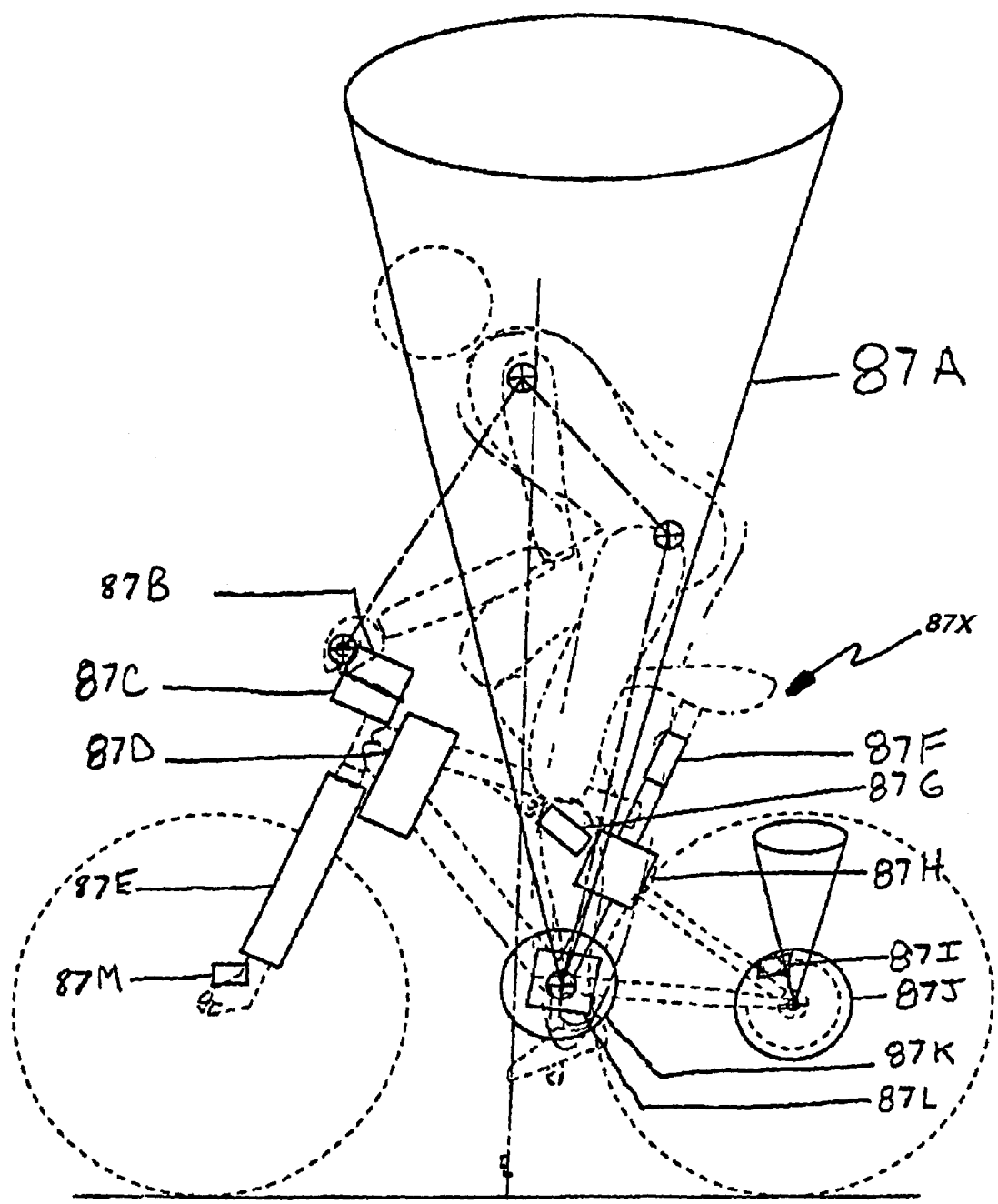
FIG. 87 is a side elevation view of a C/G shift control system diagram on an off-road bicycle.

FIG. 87 is a side elevation view of a control system diagram on an off-road bicycle 87x with multiple attached dynamic device means. The off-road bicycle 87x front steering assembly 87c, front frame adjustable geometry system 87d, front suspension 87e, front brake assembly 87m, front drive gear assembly 87k, feet safety retention system 87l, rear frame suspension assembly 87g, rear drive gear assembly 87j, seat suspension device 87f, rear brake assembly 87i, and rear frame adjustable geometry assembly 87h are adjusted through control system 87b. Control system 87b will sense conical area 87a for C/G shift data. Control system 87b includes a sensor device and a control system as described in FIG. 1. Control system 87b outputs control signals to the attached dynamic devices 87c, 87d, 87e, 87m, 87k, 87l, 87g, 87j, 87f, 87i, and 87h through wire harness assemblies.

Figure 88:
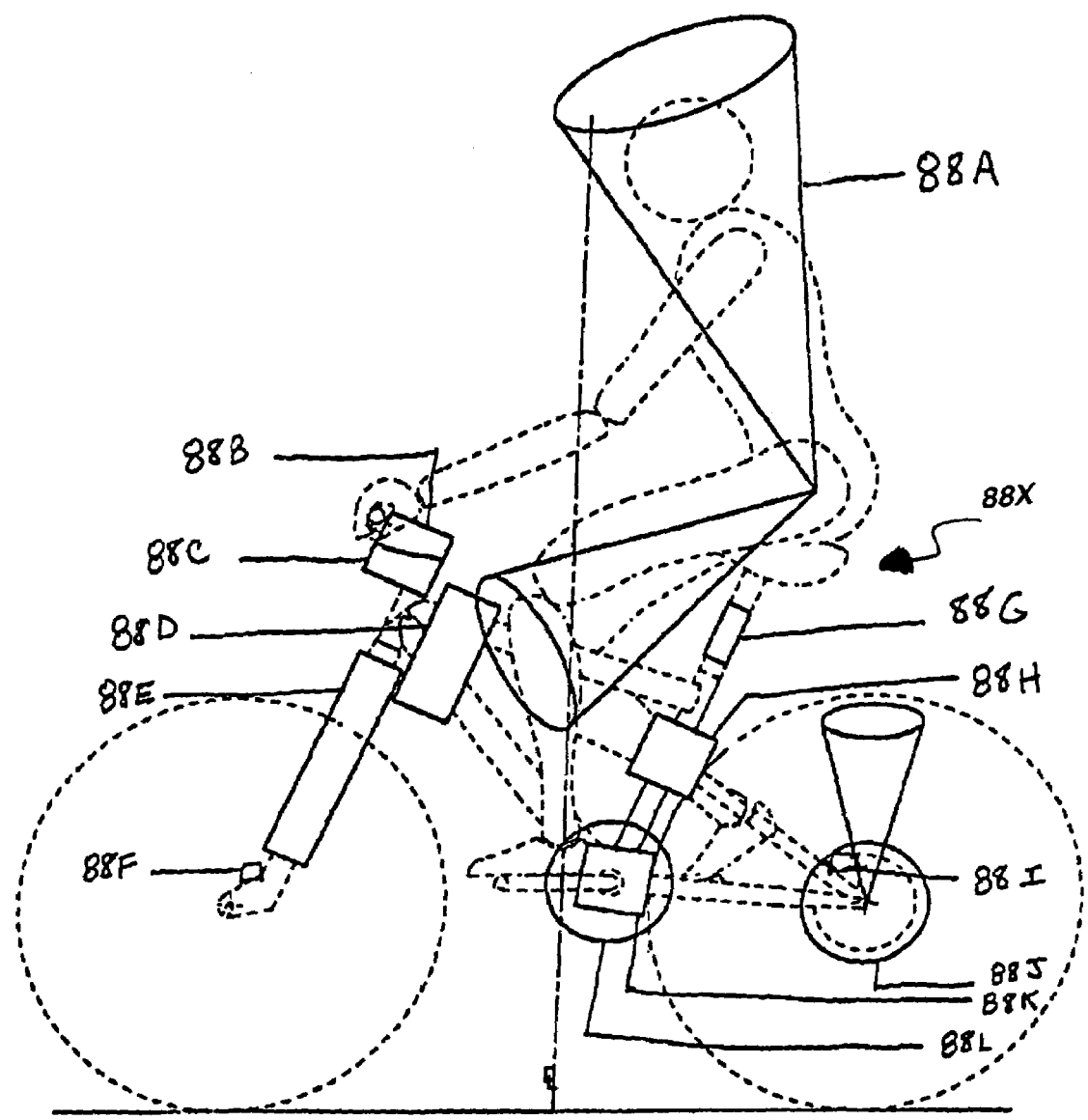
FIG. 88 is a side elevation view of a C/G shift control system diagram on an all road bicycle.

FIG. 88 is a side elevation view of a control system diagram on an all road bicycle 88x with multiple attached dynamic device means. The all road bicycle 88x front steering assembly 88c, front frame adjustable geometry system 88d, front suspension 88e, front brake assembly 88f, front drive gear assembly 88l, feet safety retention system 88k, rear drive gear assembly 88j, seat suspension device 88g, rear brake assembly 88i, and rear frame adjustable geometry assembly 88h are adjusted through control system 88b. Control system 88b will sense conical area 88a for C/G shift data. Control system 88b includes a sensor device and a control system as described in FIG. 1. Control system 88b outputs control signals to the attached dynamic devices 88c, 88d, 88e, 88f, 88l, 88k, 88j, 88g, 88i, and 88h through wire harness assemblies.

Figure 89:
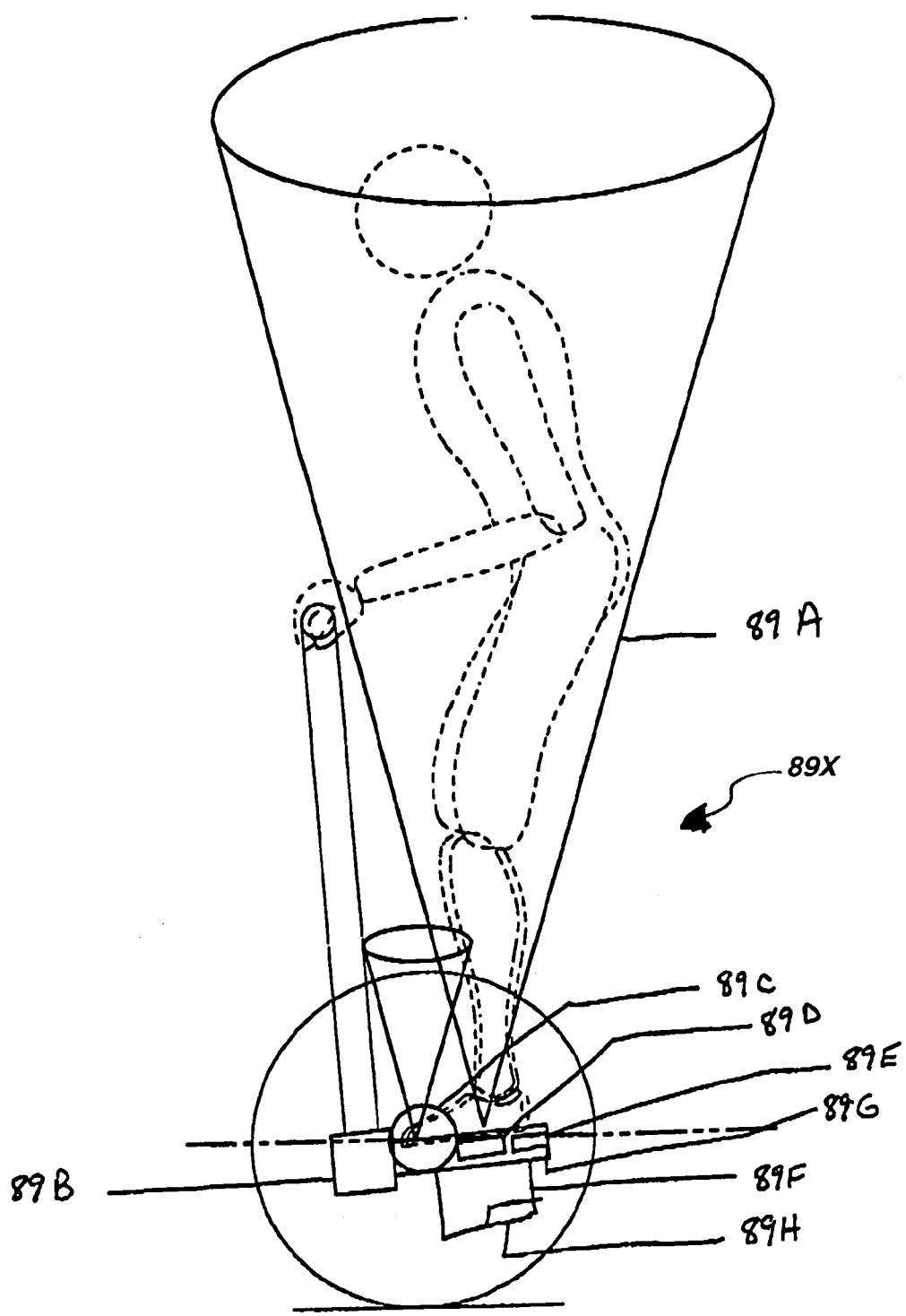
FIG. 89 is a side elevation view of a C/G shift control system diagram on a scooter, motorized with a single axle.

FIG. 89 is a side elevation view of a control system diagram on a motorized scooter 89x with a single axle with multiple attached dynamic device means. The motorized scooter 89x front steering assembly 89b, suspension platform 89e, power brake assembly 89h, power drive assembly 89f, feet safety retention system 89g, and drive gear assembly 89c are adjusted through control system 89d. Control system 89d will sense conical area 89a for C/G shift data. Control system 89d includes a sensor device and a control system as described in FIG. 1. Control system 89d outputs control signals to the attached dynamic devices 89b, 89e, 89h, 89f, 89g, and 89c through wire harness assemblies.

Figure 90:
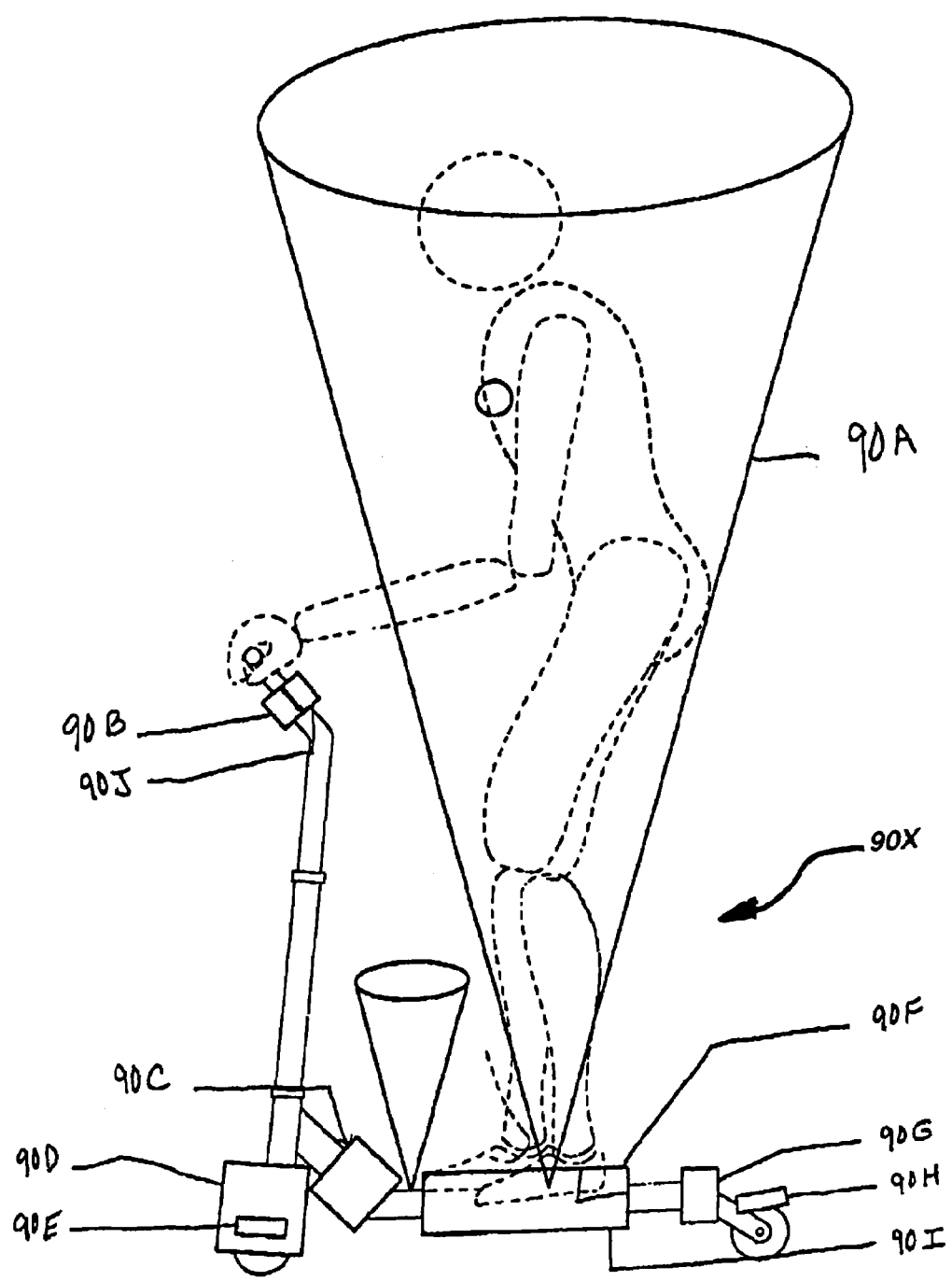
FIG. 90 is a side elevation view of a C/G shift control system diagram on a scooter, motorized with multiple axles.

FIG. 90 is a side elevation view of a control system diagram on a motorized scooter 90x with multiple axles with multiple attached dynamic device means. The motorized scooter 90x front steering assembly 90b, front axle suspension assembly 90d, front brake assembly 90e, front adjustable frame geometry assembly 90c, feet safety retention system 90f, platform leveling assembly 90i, rear axle suspension assembly 90g, and rear axle brake assembly 90h are adjusted through control system 90j. Control system 90j will sense conical area 90a for C/G shift data. Control system 90j includes a sensor device and a control system as described in FIG. 1. Control system 90j outputs control signals to the attached dynamic devices 90b, 90d, 90e, 90c, 90f, 90i, 90g, and 96h through wire harness assemblies.

Figure 91:
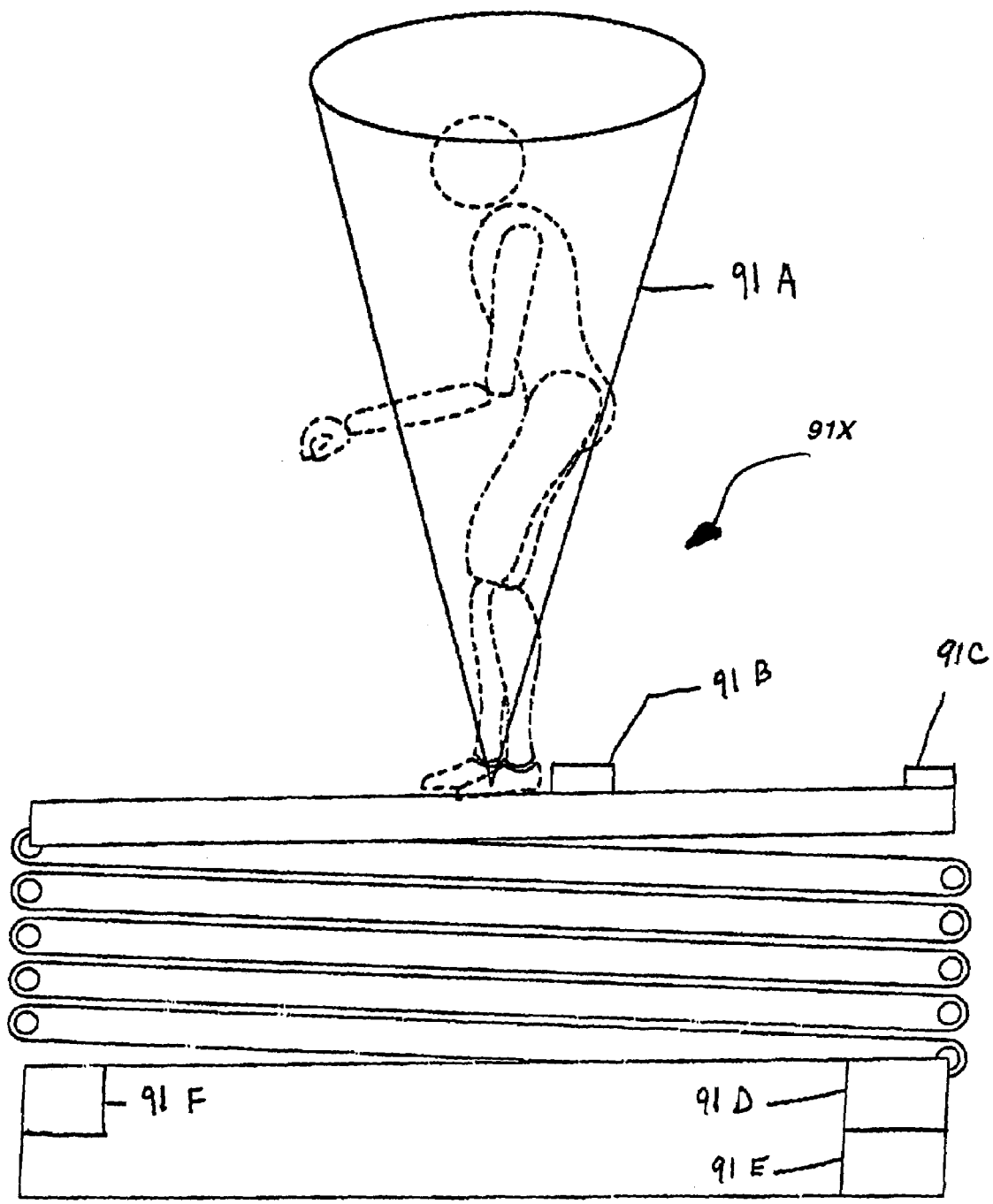
FIG. 91 is a side elevation view of a C/G shift control system diagram on a scissor lift vehicle.

FIG. 91 is a side elevation view of a control system diagram on a scissor lift vehicle 91x with multiple attached dynamic device means. Scissor lift vehicle 91x adjustable scissor lift frame geometry power system 91d, adjustable scissor lift brake assembly system 91e, personnel safety retention assembly 91b, and power tilt compensation assembly 91f are adjusted through control system 91c. Control system 91c will sense conical area 91a for C/G shift data. Control system 91c includes a sensor device and a control system as described in FIG. 1. Control system 91c outputs control signals to the attached dynamic devices 91d, 91e, 91b, and 91f through wire harness assemblies.

Figure 92:
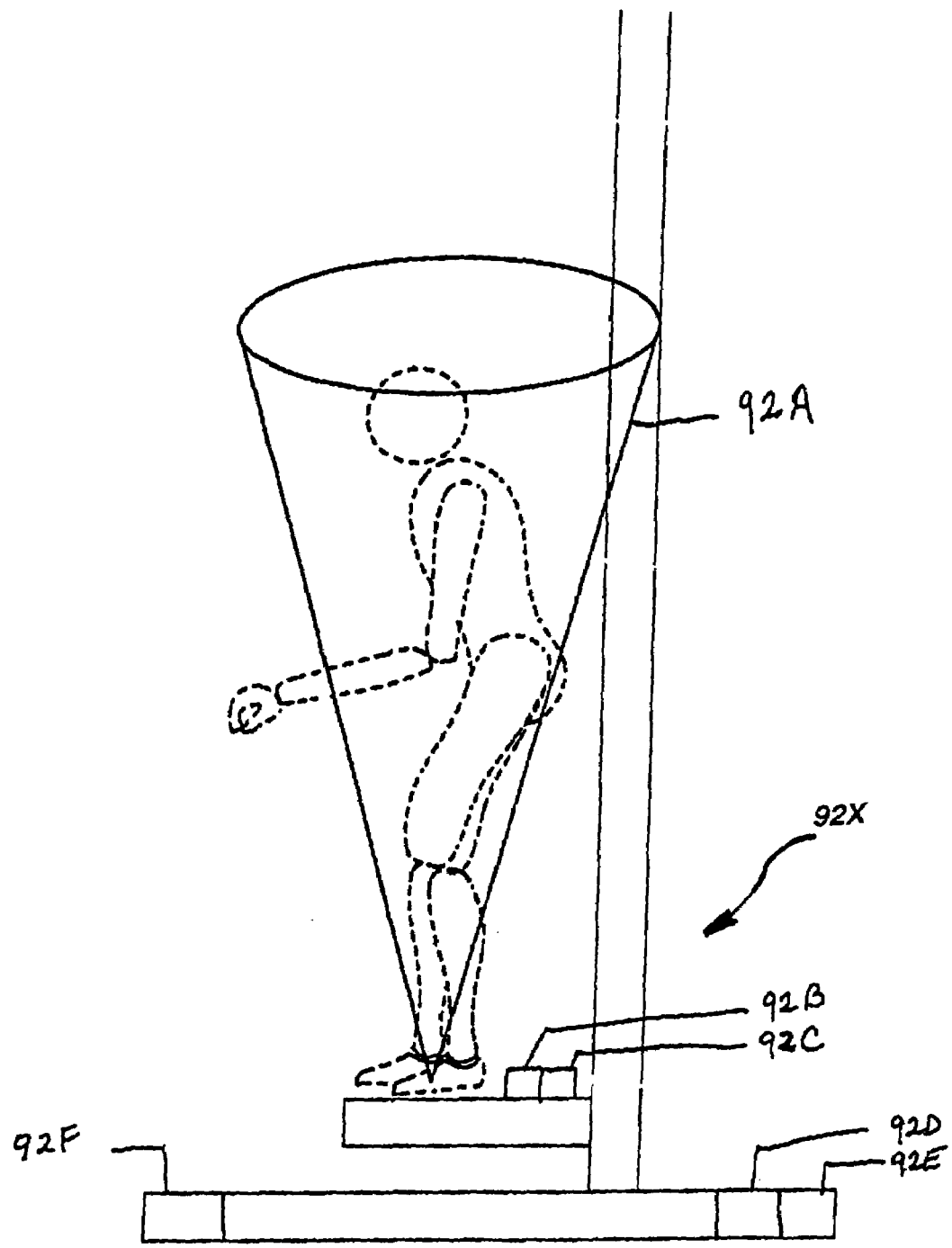
FIG. 92 is a side elevation view of a C/G shift control system diagram on a telescoping lift.

FIG. 92 is a side elevation view of a control system diagram on a telescoping lift vehicle 92x with multiple attached dynamic device means. Telescoping lift vehicle 92x adjustable telescoping lift power system 92d, adjustable lift brake assembly system 92e, personnel safety retention assembly 92b, and power tilt compensation assembly 92f are adjusted through control system 92c. Control system 92c will sense conical area 92a for C/G shift data. Control system 92c includes a sensor device and a control system as described in FIG. 1. Control system 92c outputs control signals to the attached dynamic devices 92d, 92e, 92b, and 92f through wire harness assemblies.

Figure 93:
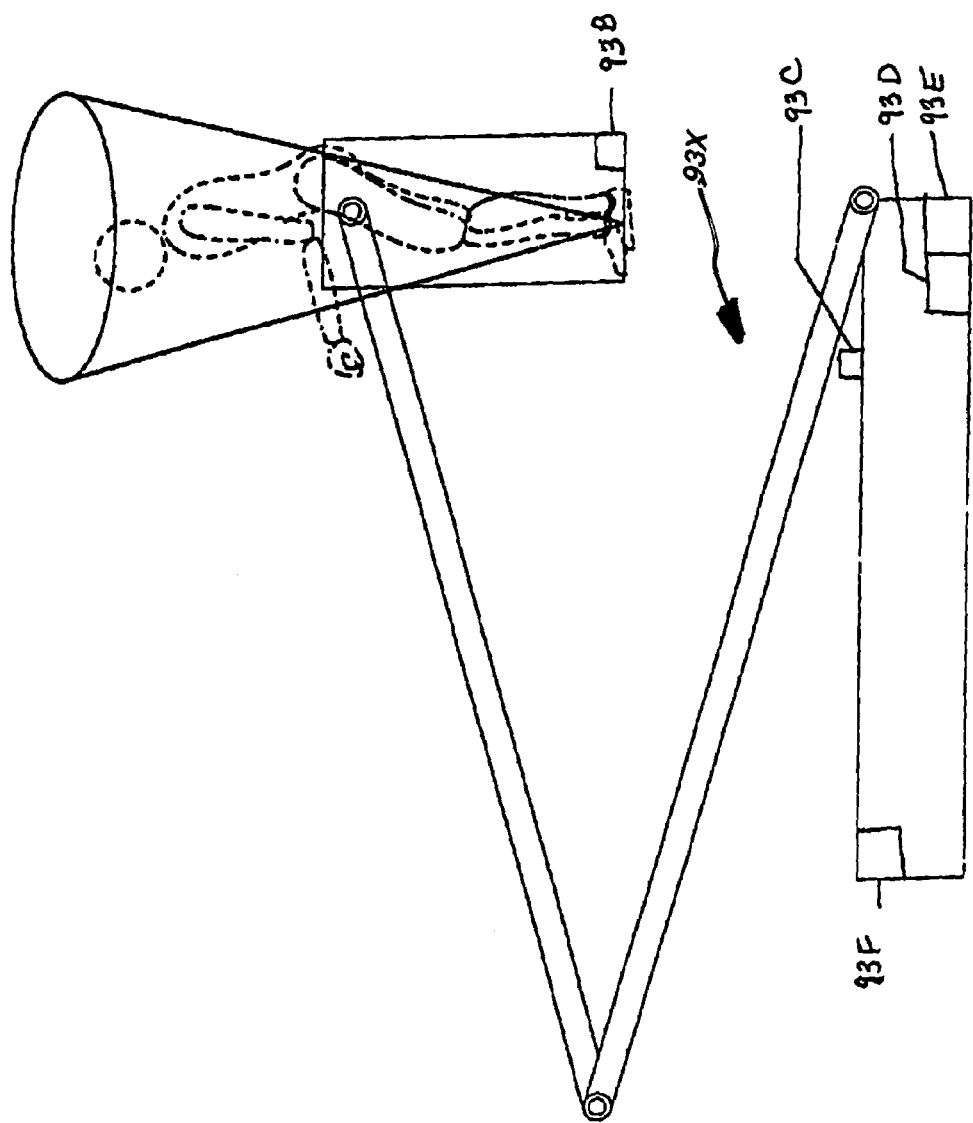
FIG. 93 is a side elevation view of a C/G shift control system diagram on a snorkel lift.

FIG. 93 is a side elevation view of a control system diagram on a snorkel lift vehicle 93x with multiple attached dynamic device means. Snorkel lift vehicle 93x adjustable lift frame power system 93d, adjustable lift power brake system 93e, personnel safety retention assembly 93b, and power tilt compensation assembly 93f are adjusted through control system 93c. Control system 93c will sense conical area 93a for C/G shift data. Control system 93c includes a sensor device and a control system as described in FIG. 1. Control system 93c outputs control signals to the attached dynamic devices 93d, 93e, 93b, and 93f through wire harness assemblies.

FIGS. 94a, 94b and 94c are C/G shift conical representations. FIG. 94a is based on height characteristic of a human versus the larger C/G shift conical representation FIG. 94b) of a taller human. The C/G shift conical representation in FIG. 94c is taller and thinner based on the typical range of motion of the standing human. The C/G shift conical representation 94d is shorter and wider based on the range of motion of the seated or squatting human position.

Figure 95:
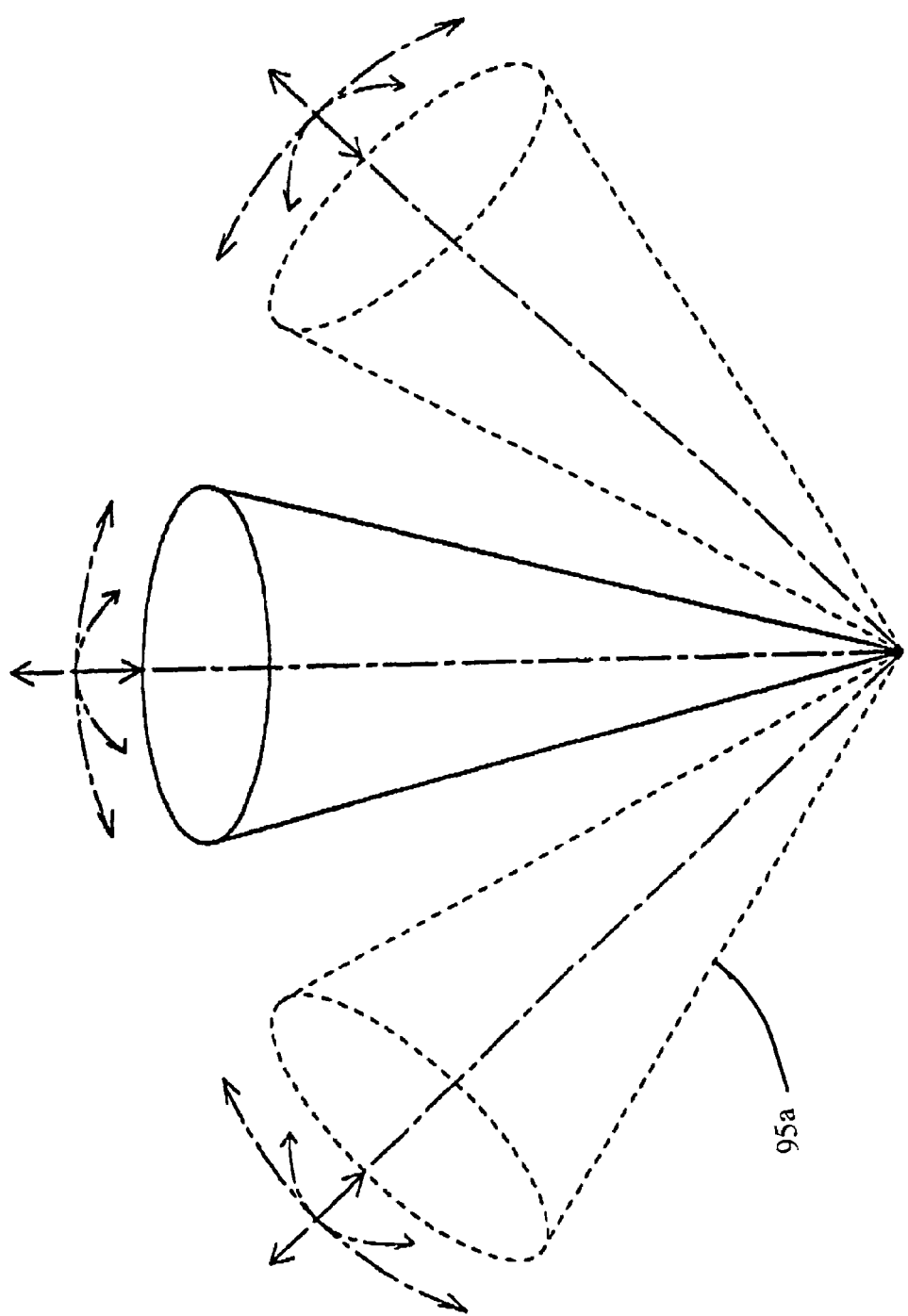
FIG. 95 is a cone shape representation and rotation freedom display.

FIG. 95 is an isometric cone shape representation 95a and the variable range of motion that represents the center of gravity positions possible.

Figure 96:
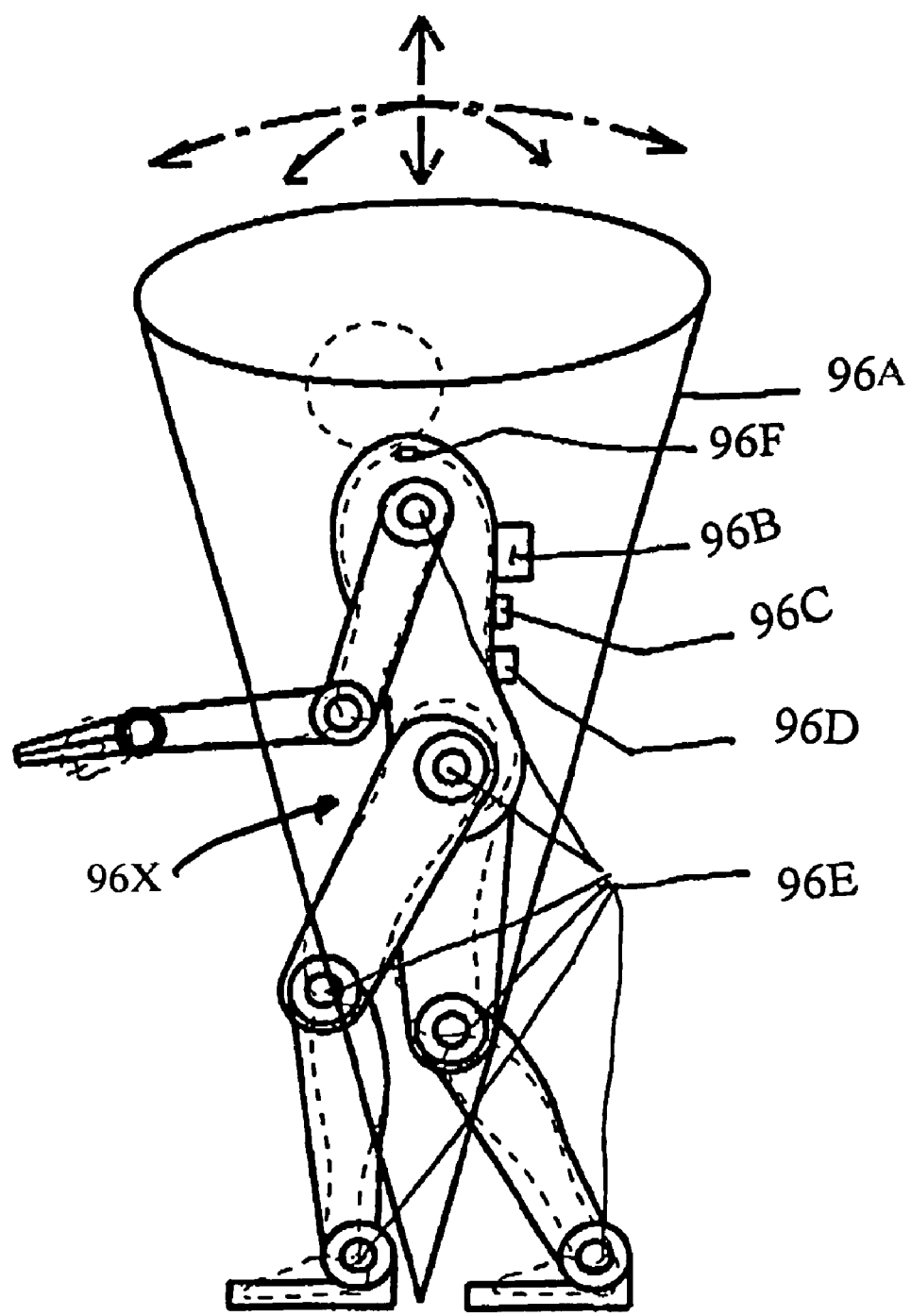
FIG. 96 is a side elevation view of a C/G shift control system diagram on an exoskeleton conveyance lifting device.

FIG. 96 is a side elevation view of a control system diagram of an exoskeleton conveyance lifting device with attached dynamic device means. The exoskeleton conveyance 96x drive motor assembly 96b, safety shutdown system assembly 96c, tilt adjustment assembly 96d, and exoskeleton frame adjusting joint assemblies 96e are adjusted through control system 96f. Control system 96f will sense conical area 96a for center of gravity shift and mass shift data. Control system 96f includes a sensor device and a control system as described in FIG. 1. Control system 96f outputs control signals to the attached dynamic devices 96b, 96c, 96d, and 96e through wire harness assemblies.

Figure 97:
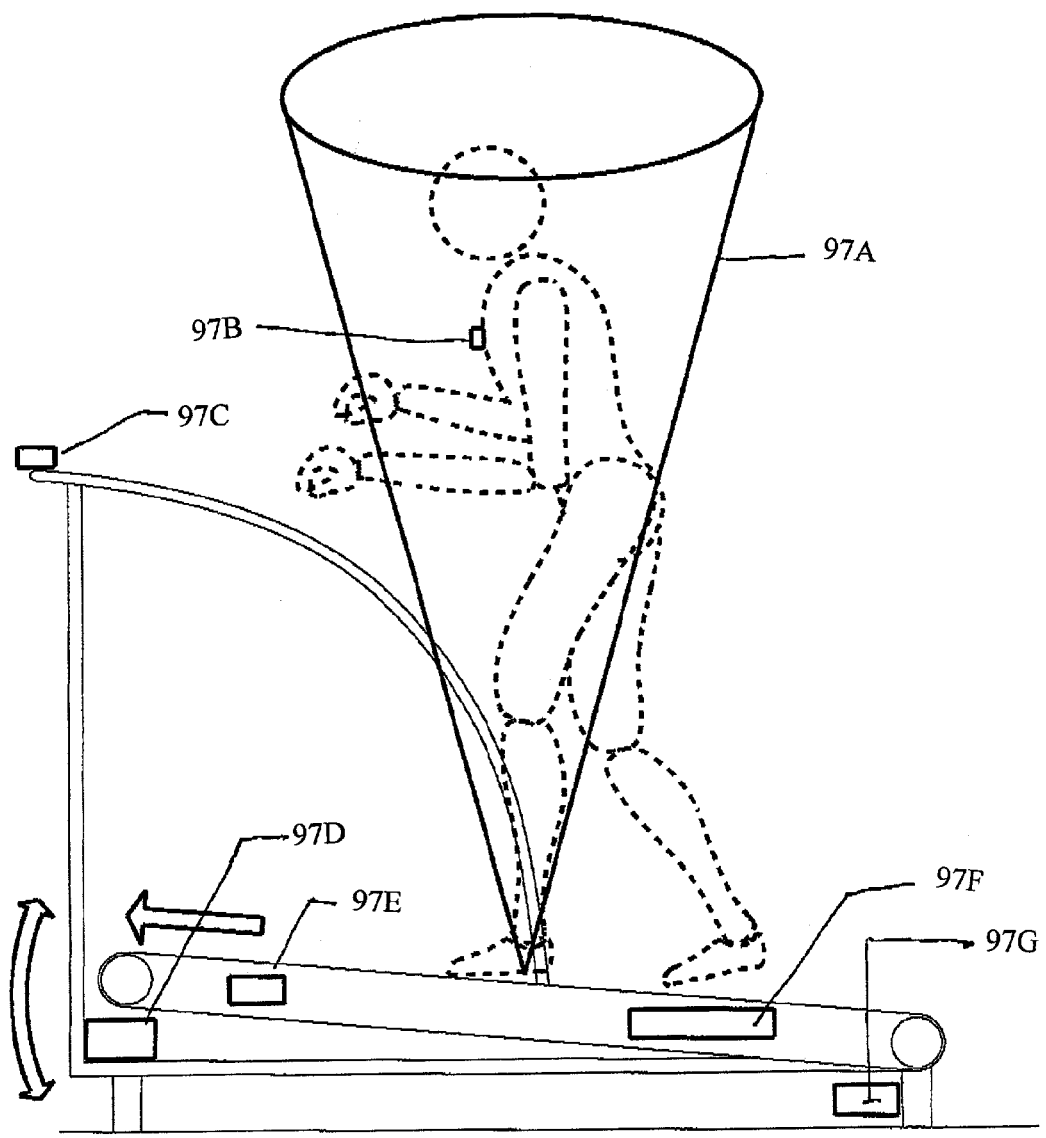
FIG. 97 is a side elevation view of a C/G shift control system diagram on a treadmill exercise device.

FIG. 97 is a side elevation view of a control system diagram on a treadmill exercise device with multiple attached dynamic device means. The treadmill 97x drive motor assembly 97d, lift motor assembly 97e, tension adjustment assembly 97f, tilt adjustment assembly 97g, and safety switch system 97b are adjusted through control system 97c. Control system 97c will sense conical area 97a for center of gravity shift data. Control system 97f includes a sensor device and a control system as described in FIG. 1. Control system 97f outputs control signals to the attached dynamic devices 97d, 97e, 97f, 97g, and 97b through wire harness assemblies.

The advantages of using the interactive human center of gravity and mass shift control system is that terrain is not required to be the initiator of the vehicle's dynamic systems. Thus, the invention is not concerned with where the contact points are, but is more concerned with actual center of gravity shifts and range of motion. Example: Rider could be in contact at three contact points to bicycle, and yet load is shifted from rear to front by merely leaning torso forward more. Contact points still the same, but C/G position and mass shift has occurred. Typical current inactive, semi-active, and active suspension systems will not sense this nuance.

While the invention has been described in relation to preferred embodiments of the invention, it will be appreciated that other embodiments, adaptations and modifications of the invention will be apparent to those skilled in the art.

What is claimed is:

1. A payload transport bicycle having a ride characteristic adjustment mechanism, said payload having a mass, the improvement comprising:

sensor apparatus for sensing a mass shift of said payload relative to said bicycle and producing signals corresponding to said mass shift, and means coupling said signals to said ride adjustment mechanism to adjust the ride characteristic of said bicycle.

2. In a two-wheeled payload transport vehicle having a ride characteristic adjustment mechanism in the form of an attached dynamic system and wherein said attached dynamic system includes, singly or in multiple, front suspension, rear suspension, dual suspension, front brake, rear brake, front drive, rear drive, adjustable frame geometry, safety equipment, steering control, and power control, said payload having a center of gravity position, the improvement comprising:

sensor apparatus for sensing changes in said center of gravity position of said payload relative to said vehicle, and means connected to said ride characteristic adjustment mechanism and responsive to sensed changes in said center of gravity position to adjust the ride characteristic of said vehicle; and wherein said vehicle is selected from a human or motor powered vehicles including bicycles, scooters, skateboards, mopeds, electric bikes, and motorcycles.

3. In a two-wheeled payload transport vehicle having a ride characteristic adjustment mechanism in the form of an attached dynamic system and wherein said attached dynamic system includes, singly or in multiple, front suspension, rear suspension, dual suspension, front brake, rear brake, front drive, rear drive, adjustable frame geometry, safety equipment, steering control, and power control, said payload having a center of gravity position, the improvement comprising:

sensor apparatus for sensing changes in said center of gravity position of said payload relative to said vehicle, and means connected to said ride characteristic adjustment mechanism and responsive to sensed changes in said center of gravity position to adjust the ride characteristic of said vehicle and wherein said vehicle is a bicycle and said ride characteristic adjustment mechanism is a shock absorber.

4. The payload transport vehicle defined in claim 3 wherein said means connected to said ride characteristic adjustment mechanism includes a linkage.

5. A payload transport bicycle having a ride characteristic adjustment mechanism, said payload having a mass, the improvement comprising:

sensor apparatus for sensing a mass shift of said payload relative to said bicycle and producing signals corresponding to said mass shift, and means coupling said signals to said ride adjustment mechanism to adjust the ride characteristic of said bicycle, and wherein said ride characteristic adjustment mechanism includes, singly or in multiple, front suspension, rear suspension, dual suspension, front brake, rear brake, front drive, rear drive, adjustable frame geometry, safety equipment, steering control, and power.

* * * * *